(12) United States Patent
Miller et al.

(10) Patent No.: US 7,937,281 B2
(45) Date of Patent: May 3, 2011

(54) ACCELERATED PROCESS IMPROVEMENT FRAMEWORK

(75) Inventors: Michael P. Miller, Alexandria, VA (US);
Sarah Bengzon, Herndon, VA (US);
Christine Rebok, Ashburn, VA (US);
Pedro Suriel, South Riding, VA (US);
Steven Huck, Mt. Prospect, IL (US);
Anna Au-Yeung, Chicago, IL (US);
Samuel Wong, Hoffman Estates, IL (US); Gary Dang, Chicago, IL (US);
Steven E. Pabalate, Alexandria, VA (US); Nicholas J. Miranda, Fairfax, VA (US)

(73) Assignee: Accenture Global Services Limited, Dublin (IE)

( * ) Notice: Subject to any disclaimer, the term of this patent is extended or adjusted under 35 U.S.C. 154(b) by 1266 days.

(21) Appl. No.: 10/314,421

(22) Filed: Dec. 9, 2002

(65) Prior Publication Data
US 2006/0235732 A1 Oct. 19, 2006

Related U.S. Application Data

(63) Continuation-in-part of application No. 10/005,759, filed on Dec. 7, 2001, now Pat. No. 7,035,809.

(60) Provisional application No. 60/399,459, filed on Jul. 31, 2002.

(51) Int. Cl.
*G06F 9/44* (2006.01)
(52) U.S. Cl. .......................................................... 705/7
(58) Field of Classification Search ........................ None
See application file for complete search history.

(56) References Cited

U.S. PATENT DOCUMENTS

| 5,301,270 | A | | 4/1994 | Steinberg et al. |
| 5,548,506 | A | * | 8/1996 | Srinivasan ........................ 705/8 |
| 5,729,746 | A | * | 3/1998 | Leonard ........................ 717/101 |
| 5,767,848 | A | * | 6/1998 | Matsuzaki et al. ............ 715/751 |
| 5,864,480 | A | * | 1/1999 | Ladd ............................... 700/83 |

(Continued)

FOREIGN PATENT DOCUMENTS

WO WO 01/25970 4/2001

OTHER PUBLICATIONS

Tim Pyron, "Special Edition Using Microsoft Project 2000," Que, (Sep. 27, 2000).*

(Continued)

*Primary Examiner* — Romain Jeanty
*Assistant Examiner* — Brett Feeney
(74) *Attorney, Agent, or Firm* — Finnegan, Henderson, Farabow, Garrett & Dunner, LLP

(57) ABSTRACT

The present invention relates to a method and related system for assisting and expediting an organization production of a more mature product. The method and system may include implementation of processes using a combination of both electronic hardware and software and implementation locally or over a network such as an intranet or the Internet. In another embodiment, the method may be implemented using a document management system to administer files related to the steps in the method. These files may assist a user in the creation of required documentation. A document management tool may be integrated with the document management system to associate documentation with steps in the method. A navigator tool may be employed to create a graphical display of the steps in the method using data contained in the files. Another embodiment of the present invention uses Web-DAV-based communication to coordinate access to multiple document repositories.

25 Claims, 85 Drawing Sheets

U.S. PATENT DOCUMENTS

| | | | |
|---|---|---|---|
| 6,256,773 | B1 | 7/2001 | Bowman-Amuah |
| 6,424,979 | B1 * | 7/2002 | Livingston et al. ............ 715/206 |
| 6,601,233 | B1 * | 7/2003 | Underwood .................. 717/102 |
| 6,889,096 | B2 * | 5/2005 | Spriggs et al. .................. 700/17 |
| 7,035,809 | B2 | 4/2006 | Miller et al. |
| 7,139,999 | B2 * | 11/2006 | Bowman-Amuah .......... 717/101 |
| 7,212,987 | B2 * | 5/2007 | Swanke et al. ..................... 705/9 |
| 7,292,990 | B2 * | 11/2007 | Hughes ............................... 705/9 |
| 2002/0059512 | A1 * | 5/2002 | Desjardins ........................ 713/1 |
| 2002/0078432 | A1 | 6/2002 | Charisius et al. |
| 2002/0111922 | A1 * | 8/2002 | Young et al. .................... 705/80 |
| 2002/0147620 | A1 * | 10/2002 | Walsh ............................... 705/7 |
| 2003/0004754 | A1 * | 1/2003 | Krutz ................................ 705/2 |
| 2003/0033191 | A1 * | 2/2003 | Davies et al. ................... 705/10 |
| 2004/0093584 | A1 * | 5/2004 | Le ................................ 717/103 |

OTHER PUBLICATIONS

WebDAV Resources Website, found at: http://web.archive.org/web/20001201185500/http://www.webday.org/ (Dec. 1, 2000).*

Mark Goodyear et al., Andersen Consulting, "Netcentric and Client/Server Computing," (Auerbach 1999).*

G. Clemm et al., "Versioning Extensions to WebDAV," RFC3253 (The Internet Society Mar. 2002).*

WebDAV website, FAQ, available at: www.webdav.org.*

Priscilla Fowler & Stan Rifkin, "Software Engineering Process Group Guide," Software Engineering Institute—Carnegie Mellon University, CMU/SEI-90-TR-024 (Sep. 1990).*

Anne McCrory, Jargon Judge: "Solution," Computerworld, vol. 32, iss. 19, p. 64 (May 11, 1998).*

Fowler P and Rifkin S (1990). Software Engineering Process Group Guide. Software Engineering Institute. Sep. 1990. pp. 1-159.*

Paulk MC (1998). Using the Software CMM in Small Organizations. Carnegie Mellon University.*

Rafoo Dm, Vnadeville JV and Martin RH (1999). Software Process Simulation to Achieve Higher CMM Levels. Journal of Systems and Software. 46(2/3): 1-11.*

Paulk MC (2002). Invsting in Software Process Improvement an Executive Perspective. Presentation SEI.*

Johnson DL and Brodman JG (1997). Tailoring the CMM for Small Businesses, Small Organizations, and Small Projects. SPN Newsletter. 8: 1-16.*

Paulk MC, Curtis B, Chrissis MB and Weber CV (1992). The Capability Maturity Model for Software. CMM v1.1.*

Iversen J. Hohansen J, Nielsen and Pries-Heje J (1997). Combining Quantitative and Qualitative Assessment Methods in Software Process Improvement. pp. 1-19.*

Kasse T and McQuaid PA (1998). Entry Strategies Into the Process Improvement Initiative. Software Process—Improvement and Practice 4: 73-88.*

McFeeley, M (1996); IDEAL A User's Guide for Software Process Improvement.*

Karl E. Wiegers and Doris C. Sturzenberger (2000). A Modular Software Process Mini-Assessment Method. IEEE Software. Jan./Feb. 2000. pp. 62-69.*

Silvia T. Acuña, Angélica De Antonio, Xavier Ferré, Marta López and Luis Maté. The Software Process: Modelling, Evaluation and Improvement. Handbook of Software Engineering and Knowledge Engineering vol. 0, No. 0 (2000) World Scientific Publishing Company. pp. 1-35.*

Alder RS (1998). Software Process Improvement. Crosstalk The Journal of Defense Software Engineering. September. pp. 2-31.*

Alitzer RJ and Downin DE (1998). Measure for Measure A Practical Quality Management Program. The Proceeding of Software Engineering Process Group Conference (SEI SEPG '98) Mar. 1998 pp. 1-10.*

International Search Report, dated Mar. 20, 2003, for Application No. PCT/US02/39193.

Major et al., Meeting the Software Challenge: Strategy for Competitive Success, Research Technology Management, vol. 41, Issue 1 Jan./Feb. 1998, pp. 48-56.

Paulk et al., Capability Maturity Model for Software, Version 1.1, Technical Report, Software Engineering Institute, Carnegie Melon University, Pittsburgh, PA, Feb. 1993, pp. 11-12, 33-34, 38, 60.

European Patent Application No. 02804748.8 (Publication No. EP1461753), Communication regarding the declaration under Rule 45 EPC, with Annex to the communication; Date: Sep. 6, 2007.

Fowler et al. "Software Engineering Process Group Guide," CMU/SEI-90-TR-024, EDS-90-TR-225 (Pittsburgh: Carnegie Mellon University, Sep. 1990), online: Software Engineering Process Group Guide <http://www.sei.cmu.edu/publications/documents/90.reports/90.tr.024.html>.

Hackos, J., From Theory to Practice: Using the Information Process-Maturity Model as a Tool for Strategic Planning, Technical Communications, Washington, vol. 44, Issue 4, Nov. 1997 pp. 369-381 [Proquest].

Jovanovic et al., ISO 9001 Standard and Software Quality Improvement, Benchmarking for Quality Management and Technology, vol. 4, Issue 2, 1997, starting p. 148 [Dialog: file 15].

Macdonald et al., The Quality Process, TI Technical Journal, vol. 14, No. 2, Mar.-Apr. 1997.

McFeeley, IDEALsm: A User's Guide for Software Process Improvement, Software Engineering Institute, Carnegie Melon University, Pittsburgh, Pennsylvania, Feb. 1996 [Google].

Office Action issued in U.S. Appl. No. 10/005,759, Advisory Action; Date Mailed: Jan. 20, 2004.

Office Action issued in U.S. Appl. No. 10/005,759, Corrected Notice of Allowance; Date Mailed: Jul. 26, 2005.

Office Action issued in U.S. Appl. No. 10/005,759, Notice of Allowance; Date Mailed: Dec. 2, 2004.

Office Action issued in U.S. Appl. No. 10/005,759; Date Mailed: Mar. 12, 2003.

Office Action issued in U.S. Appl. No. 10/005,759; Date Mailed: Sep. 30, 2003.

Official Communication issued in Canadian Patent Application No. 2 470 394; Date Mailed: Jan. 23, 2009.

* cited by examiner

ACCELERATED PROCESS IMPROVEMENT FRAMEWORK

RELATED APPLICATIONS

This application is a continuation-in-part of U.S. application Ser. No. 10/005,759, filed on Dec. 7, 2001 now U.S. Pat. No. 7,035,809, the contents of which are hereby incorporated by reference in their entirety. The application further claims priority from U.S. Provisional Application No. 60/399,459 filed on Jul. 31, 2002, the contents of which are also incorporated by reference in their entirety.

FIELD OF THE INVENTION

The present invention relates to a method for assisting and expediting an organization's progression through the levels of the Capability Maturity Model (CMM). Specifically, the present invention relates to a method and related system for arranging and administering an organization's infrastructure and a project of interest so that the organization and the product may be more mature, as measured by the CMM.

BACKGROUND OF THE INVENTION

The Capability Maturity Model® (CMM®) may refer specifically to the Capability Maturity Model for Software (SW-CMM) or, more generally, to a number of other process improvement models developed by the Software Engineering Institute (SEI) and registered to Carnegie Mellon University. The SW-CMM was the first model developed by the SEI, and it originally evolved from the need for the United States Department of Defense to have another measure besides "lowest bidder" in determining who should win project bids. Specifically, the Department of Defense desired a method to better compare and distinguish well designed and shoddy, defective products. The two major usages of the SW-CMM are: (1) as a model for Software Process Improvement (SPI) and (2) as a measure of the capability to produce quality systems. Specifically, the CMM may help a purchaser differentiate properly working product from an incomplete, non-functioning, poorly designed product by providing information on a producing organization and its production and development procedures.

The CMM is an example of a model-based improvement approach that focuses on creation process quality. The rationale for this focus is that, unlike hardware, manufacturing software is essentially error free (i.e., the production of the disks containing the program), but the quality defects (i.e., bugs) are produced during the concept and development process. Therefore, waiting to identify defects after creation of the product is generally difficult and costly. The CMM may be used as a guideline for prioritizing limited resources on the most important, foundational improvements. In the SW-CMM, Key Process Areas (KPAs) define "building blocks" based on industry best practices. The ultimate goal is to establish "continual improvement" of the software engineering process and the resulting products, kaizen (Statistical Process Control), which is common in nonsoftware engineering disciplines. The CMM is described more fully in Mark C. Paulk, *The Capability Maturity Model: Guidelines for Improving the Software Process (The SEI Series)* (Addison-Wesley Pub Co.) (1995).

The Capability Maturity Model Integration$^{SM}$ (CMM$^{SM}$) was developed to integrate the SW-CMM and various other existing models into a common model. The developers of the CMMI are seeking to establish common terminology between the models, as well as identifying commonality and variability. The SEI is expected to release Version 1.1 of CMMI in the near future.

The SW-CMM model defines five capability levels and identifies Key Process Areas (KPAs). The CMMI model replaces the KPAs with Process Areas (PAs). The lower levels of the CMMI and the related PAs focus mainly on management processes and industry minimal standards. Higher CMMI levels and the related PAs generally focus more on organizational and technical processes. The higher levels and their PAs also strive for "industry-best" practice.

While the entire scope of the CMMI is vast and generally outside the range of this document, the various levels of the CMMI are now quickly described. At level 0 or "Incomplete", a project has not yet started. Upon initiation and existence of the project, the project is at level 1. At "Initial" or level 1, the product conditions are ad hoc, chaotic, and high-risk. At "Repeatable" or level 2, the project may repeatedly perform some functions with difficulty. Relevant PAs to level 2 are Requirements Management (RM); Project Planning (PP); Project Monitoring and Control (PMC or PC); Supplier Agreement Management (SAM or SM); Process and Product Quality Assurance (PPQA or QA); Configuration Management (CM); and Measurement and Analysis (MA).

At "Organizationally Defined" or level 3, the relevant PAs include Requirements Development (RD); Technical Solution (TS); Product Integration (PI); Validation (Va); Verification (Ve); Organization Process Focus (OPF or PF); Organizational Process Definition (OPD or PD); Organizational Training (OT); Integrated Project Management (IPM or IM); Risk Management (RSKM or Rk); Decision Analysis and Resolution (DAR or DA); Organizational Environment for Integration (QI); and Integrated Teaming (IT).

At "Quantitatively Managed" or level 4, the relevant PAs are Quantitative Process Management (QPM or QM) and Organizational Process Performance (OPP or OP). QPM relates to the informed and correct use of rigorous statistical techniques such as statistical process control (SPC), with the focus on removing specific or attributable causes of variance, and OPP relates to the use of statistical techniques to measure process efficiency. The fifth and highest level, "Optimizing", is basically equivalent to bottom-up process improvement or continuous improvement. In CMMI, the level 5 PAs are Organizational Innovation and Deployment (OID or ID) and Causal Analysis and Resolution (CAR or CA).

The Capability Maturity Model for Software (SW-CMM) was the first, but not the only, model for improvement of software development. Some other models developed by the SEI include: Integrated Product Development CMM (IPD-CMM), which was renamed and incorporated into CMMI Integrated Product and Process Development (IPPD); People CMM (P-CMM) for Training, Career Development, and Human Resource-related issues; Personal Software Process$^{SM}$ (PSP$^{SM}$); Software Acquisition CMM® (SA-CMM); and Systems Engineering CMM® (SE-CMM), which is being incorporated into CMMI for Systems Engineering/Software Engineering. Similarly, FAA-iCMM (a model similar to CMMI and incorporating elements of SW-CMM, SE-CMM, and SA-CMM) was developed by the Federal Aviation Administration.

Achieving higher levels of CMM maturity is a desirable goal in itself because it generally implies that an organization is producing a superior product and services since the higher levels of the CMM generally require the existence of infrastructure and procedures leading to better tested and developed software and other products. As suggested above, organizations also have secondary financial incentives to achieve higher CMM levels, because customers, such as the United States Department of Defense, are increasingly requiring software suppliers to have a sufficiently high CMM level (e.g., at least level 2) before being awarded a contract.

A threshold problem for many organizations is that the requirements for the different maturity levels are relatively complex to understand and implement. It is, therefore, a goal of the present invention to provide a method allowing businesses to achieve higher CMM levels without having to understand the complicated requirements of each level.

Furthermore, the process of achieving higher CMM levels of increased maturity is typically a difficult, expensive, and time-intensive process. While some of the costs are unavoidable, many of the difficulties of achieving higher CMM levels occur because the requirements for the levels do not fit well within the general operations and structure of most organizations. Drastically changing an organization's structure and operations is generally a complex and difficult process. Therefore, another goal of the present invention is to provide a method that simplifies and potentially accelerates the process of modifying an organization's operations and structure to meet the requirements of the higher CMM levels.

Similarly, many organizations also have difficulty implementing changes to achieve higher CMM or CMMI levels because the organization use of these maturity models as merely checklists of criteria. The maturity models, while serving as a measure to assess organizations, offer little guidance to organizations on implementation of the specified criteria. The random implementation of the items on a maturity model checklist results in increased time and cost for maturation in comparison to carrying out systemic changes that may concurrently satisfy multiple checklist items and assist the organization in achieving several checklist items. Furthermore, a piecemeal implementation of the CMM worsens the above-described problems of complexity and cost. It is, therefore, another goal of the present invention to provide a method by which organizations may implement systemic changes to achieve higher levels of CMM maturity.

SUMMARY OF THE INVENTION

In response to these and other needs, the present invention provides a method and related system for assisting and expediting an organization's transformation toward higher levels of the Capability Maturity Model (CMM) or other derivative maturity models. In particular, the present invention provides a method for producing a more mature product. A preferred embodiment of the method comprises the managing an organization developing the product, whereby the organizational management comprises managing personnel of the organization and implementing a product improvement process. The method may further comprise managing a project for developing the product and managing the delivery of the product. Furthermore, actions undertaken during the organizational management affects implementation of the project and delivery managements, and the actions undertaken during the project and delivery managements likewise affect implementation of the organizational management.

In another embodiment, this method may be implemented using a combination of both electronic hardware and software and may be implemented locally or over a network such as an intranet or the Internet. In another embodiment, the method may be implemented using a document management system to administer files related to the steps in the method. These files may assist a user in the creation of required documentation. A document management tool may be integrated with the document management system to associate documentation with steps in the method. A navigator tool may be employed to create a graphical display of the steps in the method using data contained in the files. Another embodiment of the present invention uses WebDAV-based communications to coordinate access to multiple document repositories.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENT

Figure 1:
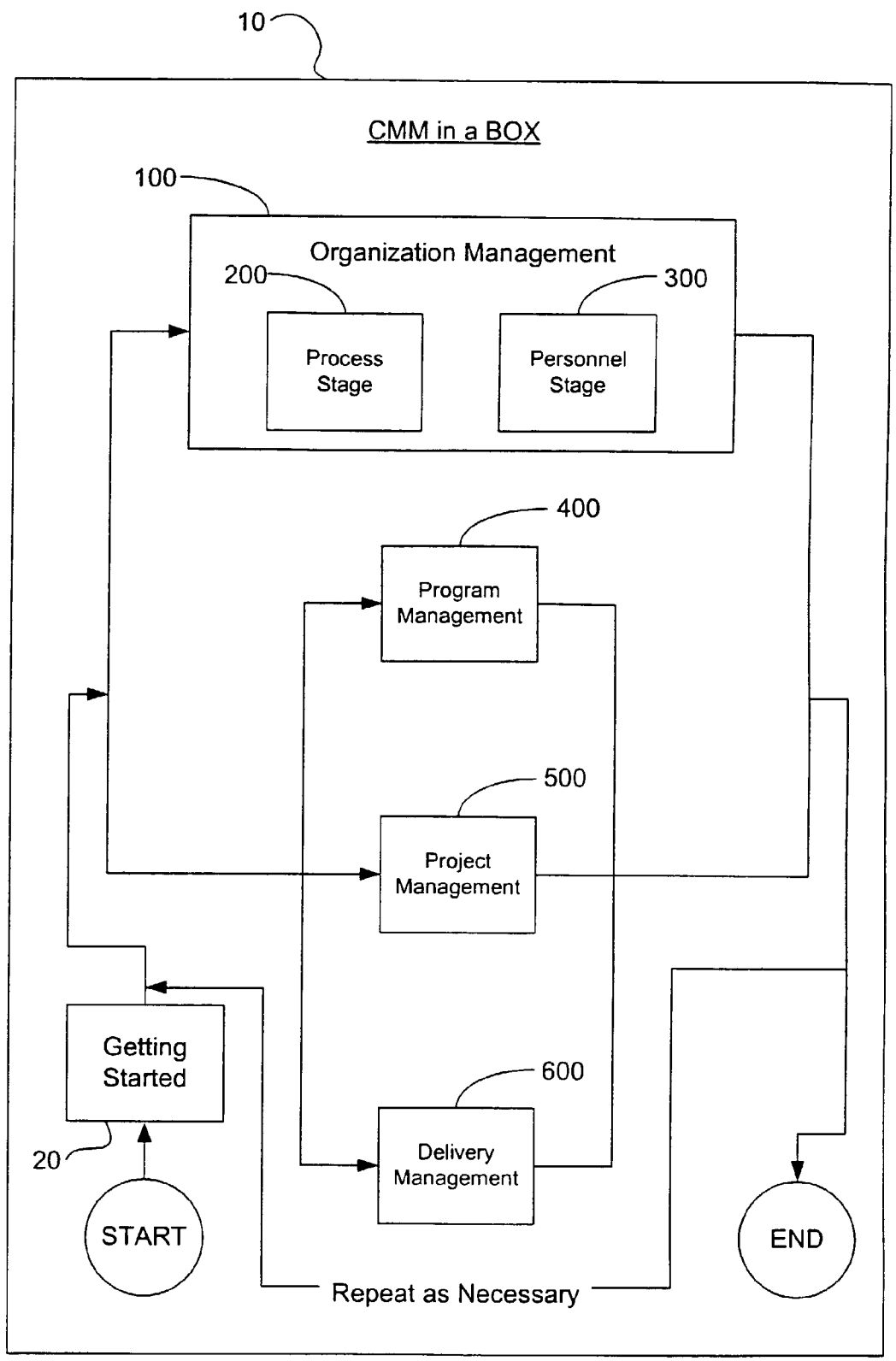
FIG. 1 is a flowchart depicting the steps in a method for producing more mature products in accordance with an embodiment of the present invention.

As generally illustrated in FIG. 1, the present invention provides a CMM in a BOX method 10 for easing and speeding an organization's transformation toward higher levels of the above-described CMM hierarchy. The CMM in a BOX method 10 generally comprises the steps of getting started 20, organization management 100, program management 400, project management 500, and delivery management 600. As suggested in FIG. 1, the CMM in a BOX method 10 performs as a cycle in which actions performed during the organization management 100 help control the current steps of program management 400, project management 500, and delivery management 600. Subsequently, the actions performed during program management 400, project management 500, and delivery management 600 adjust the step of organization management 100. Each of these steps of CMM in a Box method 10 is described in greater detail below.

In these discussions, it should be appreciated that the various steps of the CMM in a Box method 10 preferably include the creation or updating of various documentation (or monuments) that detail and verify the execution of tasks performed by the organization. These documents may be used to demonstrate compliance with the higher levels of the CMM or CMMI. Some of these documents are listed directly with the associated steps, but a complete listing is beyond the scope of the present application. A short listing and summary of some of the various documents that may be created or updated during the steps of the CMM in a Box method 10 is listed below in Table 1.

The CMM in a BOX method 10 begins with getting started step 20. In step 20, the organization prepares to initiate the other steps in the CMM in a BOX method 10. In particular, the organization may review the requirements of the various management steps 100, 300, 400, and 600. Similarly, the organization may review the CMM or CMMI and their general requirements in order to better understand the goals to be accomplished during the various steps of the CMM in a Box method 10.

Organization Management

As illustrated in FIG. 1, Organizational Management 100 is divided into two stages, process step 200 and personnel step 300. The Organization management step 100 generally concerns activities related to the structure and activities of an organization. The process stage 200 contains the methodologies, process flows, tools, and templates to create and maintain a Software Engineering Process Group (SEPG). It should be noted that in the CMMI, the SEPG is replaced by a Process Group to allow for the inclusion of systems engineering. Thus, this application uses the SEPG to refer to a group overseeing software and non-software processes. As suggested by its title, the personnel stage 300 contains the methodologies, process flows, tools and templates to perform organizational design and development, measurement performance, and conduct organizational training.

Figure 2A:
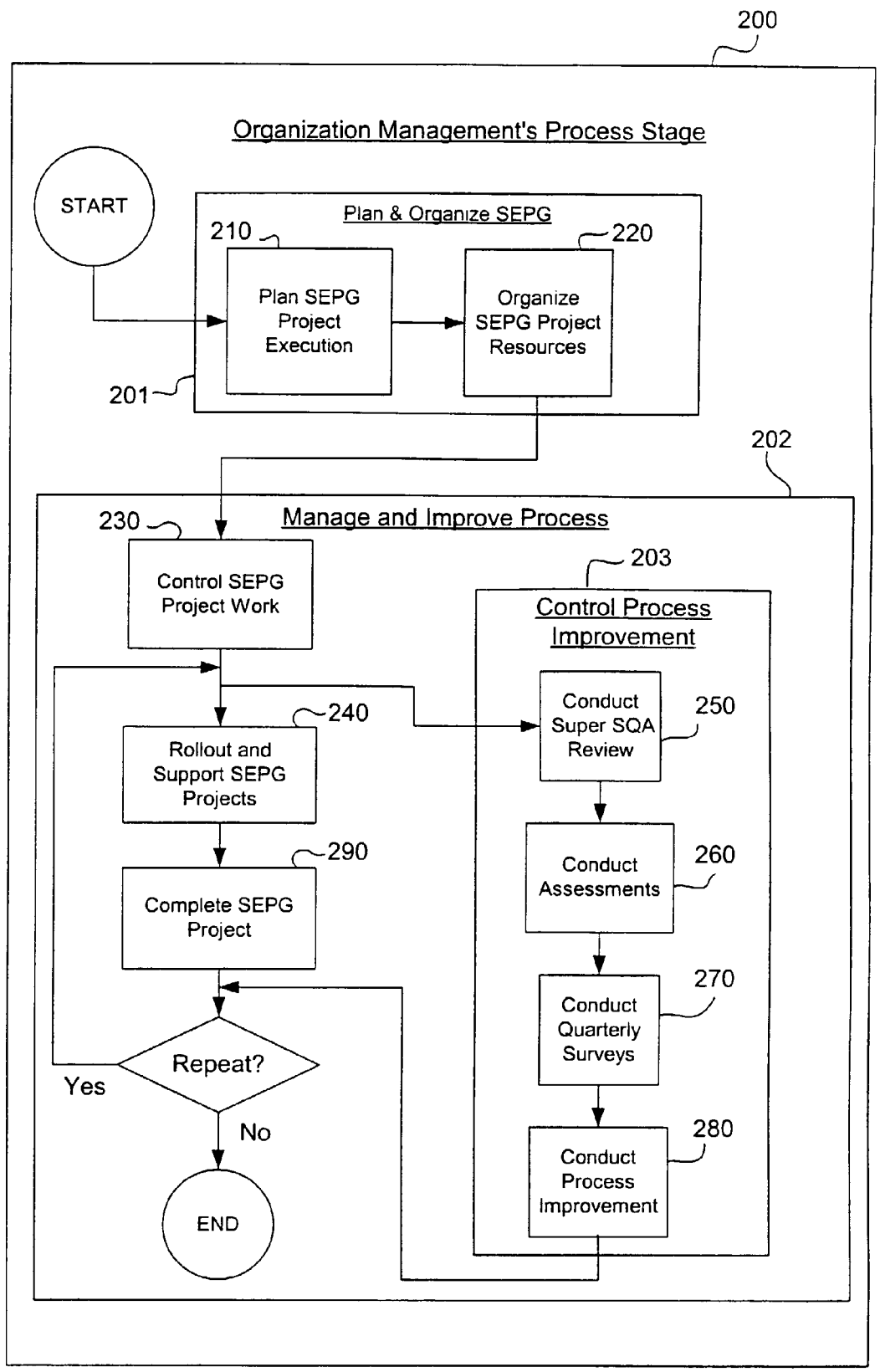
FIGS. 2A-2J are flowcharts depicting the steps of the process stage of organization management in accordance with embodiments of the method of FIG. 1.

As depicted in FIG. 2A, the process stage 200 consists of the steps of planning and organizing a SEPG, step 201; and of managing and improving the organization's processes, step 202. Step 201 is further subdivided into planning SEPG project execution (step 210) and organizing SEPG project resources (step 220). Likewise, managing and improving the organization's processes in step 202 may be subdivided into controlling SEPG project work (step 230); rolling out and supporting SEPG projects (step 240), completing the SEPG project 290, and controlling process improvement (step 203). In turn, the step of controlling process improvement, step 203, consists of conducting a super SQA review, step 250; conducting assessments, step 260; conducting quarterly surveys, step 270; and conducting process improvements, step 280.

In the planning and organizing of the SEPG in step 201, the organization first performs the planning of the SEPG project execution, step 210. While planning SEPG project execution in step 210, the SEPG defines its process improvement plan and subordinate plans for the fiscal year. Since the SEPG is a continuously operating project, plans are reviewed and updated annually, at a minimum, usually with the beginning of a new fiscal year. Step 210 begins at the initiation of the project to define the pieces of an initial project plan and all subordinate plans that should be used to manage the execution of the project. Using this information, the organization seeks to develop a SEPG project plan, a SEPG work plan, a communication and sponsorship plan, a configuration management plan, a risk management plan, and a training needs matrix, as these objects are defined in the CMM. The organization further performs decision analysis and resolution during the planning of the SEPG project execution, step 210.

Figure 2B:
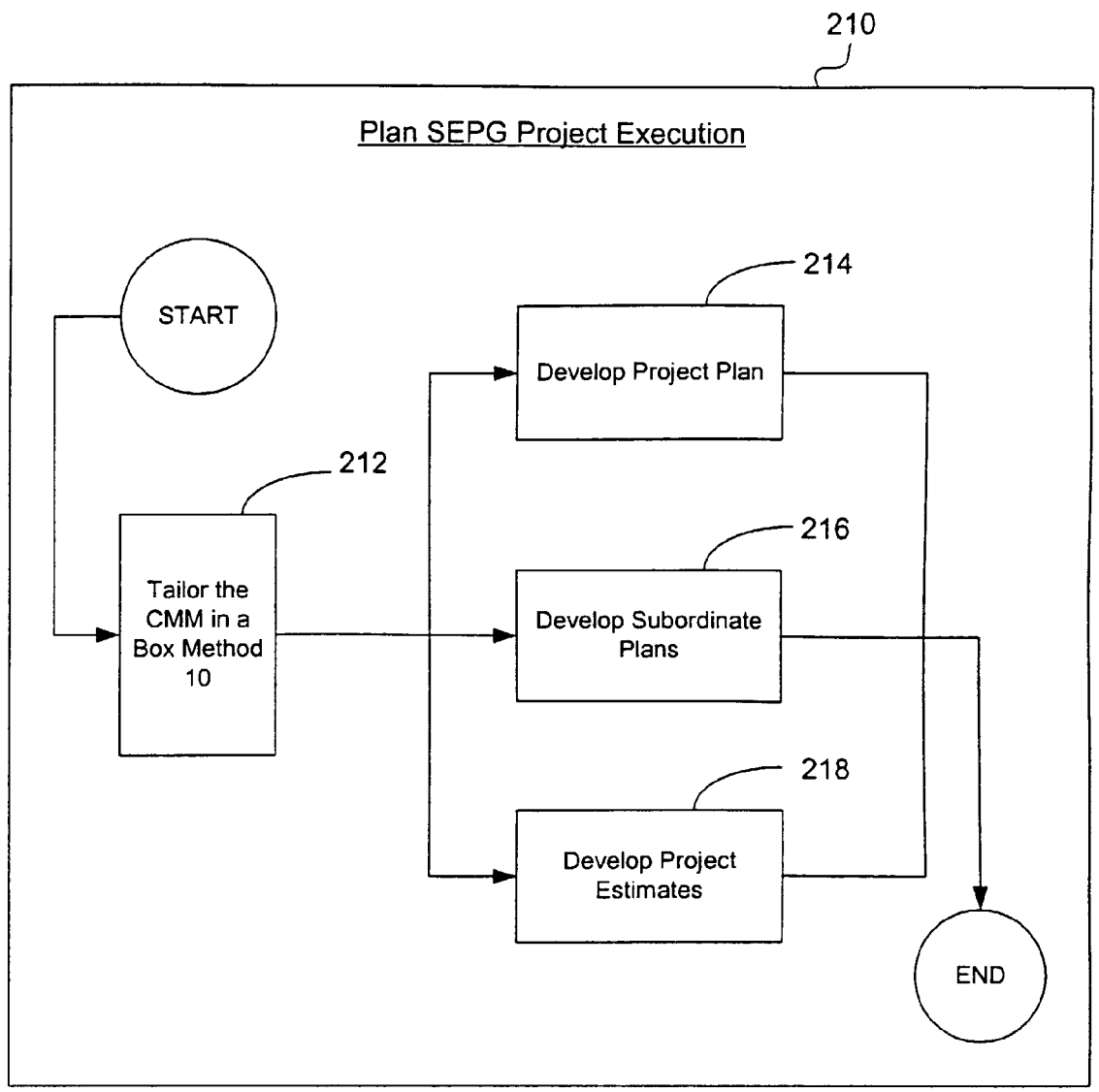

One possible process for planning the SEPG project execution, step 210, is generally depicted in FIG. 2B. In an initial aspect of the planning a SEPG project execution, step 210, the organization tailors the CMM in a BOX method 10 as needed. Specifically in step 212, the organization determines whether to waive or skip steps in the CMM in a BOX method 10 as required by organization or the particular project. For instance, the organization skip tasks that are inapplicable to a project and therefore unneeded to either achieving higher levels of maturity in the CMM or to develop more mature products.

Another step in the SEPG project execution, step 210, is to develop a project plan, step 214. The project plan describes the project approach for the project timetable, metrics, organization, supplier agreement management, communication and sponsorship strategy, training, quality initiatives, software system development process, configuration management, logistics, facilities, tools, and purchasing. It further describes the project approach for training, metrics tracking, and roles and responsibilities on the project. The organization may also use Decision Analysis and Resolution (DAR) to develop the Project Plan, as defined in the CMMI.

The organization may further develop subordinate plans, step 216. The development of the appropriate subordinate plans, step 216, satisfies the needs of the project, such as the creation of subordinate plans for subcontractor management, risk management, communication and sponsorship, and configuration management, all of which are described in greater detail below. In the development of subordinate plans, step 216, the organization may further create a work plan. For instance, the organization may create a "bottom-up" or task-level project work plan based upon estimates where critical paths and dependencies are defined and managed within a project work-planning tool, such as Microsoft Project and Project Workbench®.

Another aspect of the SEPG project execution process, step 210, is to develop project estimates, step 218. The organization may develop project estimates, step 218, using an estimating tool as a starting point for the estimates. For instance, estimates may be developed using the following steps: (1) tailor tasks and estimating model; (2) determine estimating factor values; (3) define work packages; (4) determine a timeline for the estimate; (5) reconcile a present estimate to an initial estimate; and (6) document assumptions used to form the estimates. The organization preferably further validates any estimates by verifying estimates against estimates or actual results from comparable projects. To form accurate estimates of available resources, the organization should further consider other resource-tapping activities such as community involvement, recruiting, mentoring, and training, when evaluating resources.

Figure 2C:
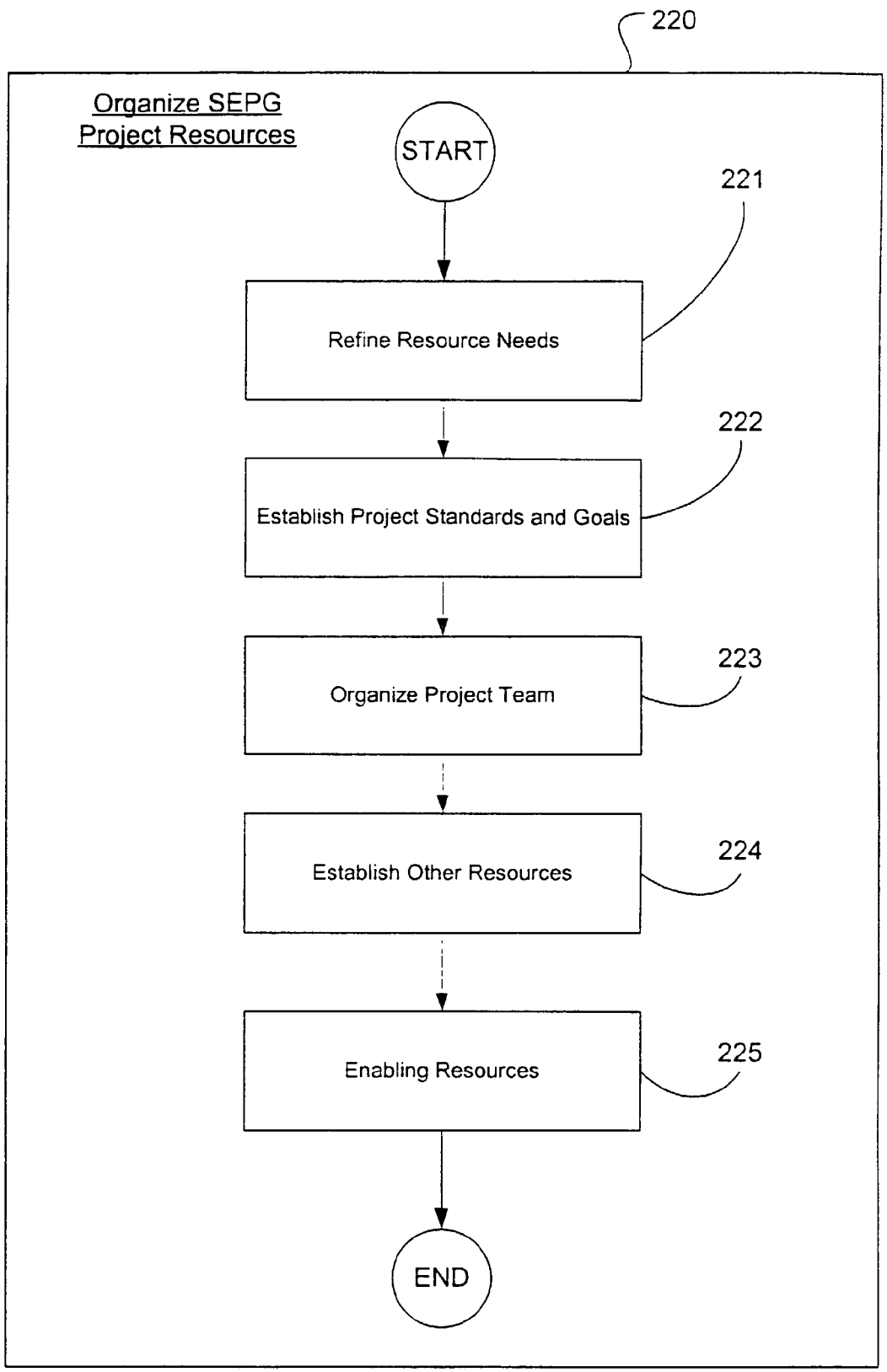

Returning to FIG. 2A, the organization then continues the process stage 200 and the planning and organizing the SEPG, step 201, by organizing the SEPG project resources, step 220. During step 220, the SEPG focuses on obtaining, assigning and training its human resources, and establishing the project's other physical resources including installation of tracking tools and document repositories. This task is performed iteratively as needed to organize, mobilize and manage SEPG resources throughout the execution of the project. The organization performs step 220 as needed to organize the project's human resources, to establish other resources, to make work assignments and to any training needed to enable resources. Turning to FIG. 2C, the first step in organizing the SEPG project resources in step 220 is to refine resource needs, step 221. In this step 221, the organization defines the team organization structure, schedules the work, and defines the human and physical resource needs of the project. These tasks are performed in view of each project's requirements. By refining resource needs in step 221, the organization helps to ensure that project staffing and facilities needs are met on a timely basis without affecting the completion date and the quality of the work. The organization may complete this refining of resource needs in step 221 by: (1) determining project organization structure; (2) balancing a development schedule using human resource guidelines; and (3) refining physical resource needs that were outlined in the logistics, facilities, and tools section of the project plan formed in step 214.

Returning to FIG. 2C, the organization continues the organization of the SEPG process resources in step 220 by establishing project standards and goals, step 222. The establishment of project standards and goals in step 222 is accomplished by developing, modifying, and adopting administrative and project-specific project standards and procedures. Examples of administrative procedures are employee availability checklists, time accounting procedures, status reporting, vacation scheduling, etc. Project standards and procedures include design and development standards, and the use of project specific tools.

The organization continues the organizing the SEPG process resources in step 220 through organizing a project team in step 223, also illustrated in FIG. 2C. The selection of project team members is based on project requirements. Other elements in the organization of a project team are the finalization of the project team's organization structure and documentation in an organization chart in the project plan. The organization should further update the training needs matrix to document: (1) the training required of each project team member and (2) the proposed means for fulfilling the training. The training needs matrix is further used to track project team member training. In another implementation, organizing a project team in step 223 may further require the organization to determine, as a team, the project's mission, vision, and charter, and then to document these determinations in the project plan and orientation binder that are created as required to achieve higher maturity levels in the CMM.

Returning to FIG. 2C, another task in the organization of SEPG project resources is to establish other resources indirectly needed for the SEPG project, step 224. Specifically, the organization performs this task by organizing the physical resources, such as hardware or software, provided by program management and developing the orientation and/or training needed to support the activities of the project team. The establishment of other resources in step 224 helps create a work environment that promotes communication, collaboration, and group cohesion.

Also, as illustrated in FIG. 2C, the organization of SEPG project resources in process 220 further includes enabling resources, step 225. An organization performs this step 225 to orient and train team members, to coach and evaluate team members, and to manage the physical resources assigned to the project. The enabling of resources in step 225 aids the project manager in motivating and challenging team members, while helping to ensure that various project personnel believe their work to be important. Specifically, the organization should communicate the project's mission, vision, and charter to new team members. Large projects may also elect to formalize these items at the program level, and projects may conduct one or more meetings that include all team workers.

Figure 2D:
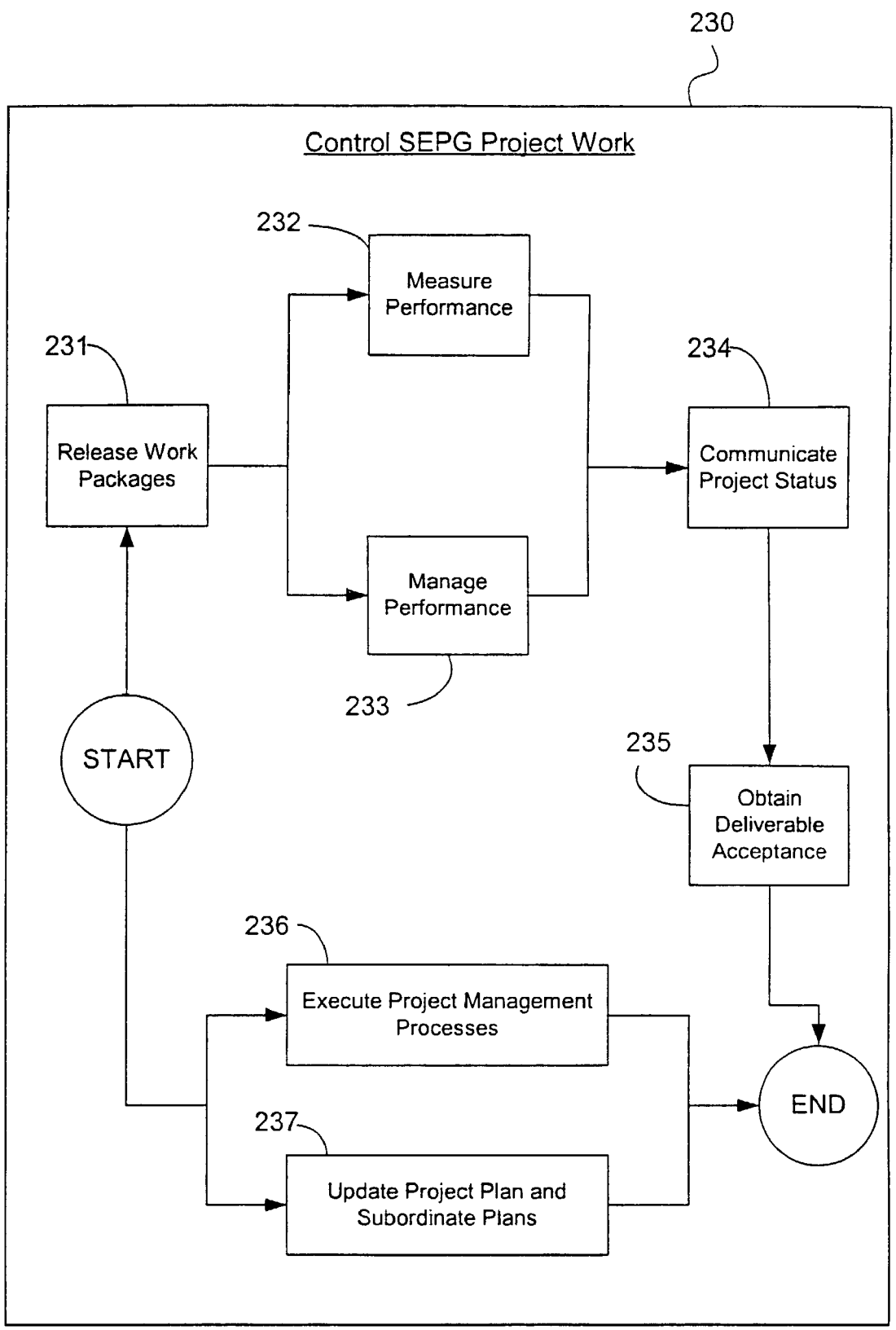

Referring to FIG. 2A, another element in the process stage 200 is to manage and improve the organization's processes, step 202. The first step in the management and improvement of process is the control of SEPG project work in step 230. During the control of SEPG project work in the step 230, SEPG project management monitors the execution of the project against project plan and makes adjustments as necessary. Project Status Reports are prepared for the Project Sponsor. Potential and actual problems are identified through the measuring and monitoring of progress and performance against the SEPG Project Plan. Depending on the type of problem identified, an Issue, Risk, System Investigation Request (SIR) or Change Request (CR) is logged. The SIRs and the CRs are described in greater detail below. SEPG Project management is expected to take appropriate corrective actions to resolve problems that are discovered. The controlling of SEPG project work in the step 230 is also illustrated in FIG. 2D and is now described in greater detail. The controlling of SEPG project work in the step 230 includes releasing work packages, step 231. Work packages are generally described in the CMM criteria and generally relate to the tasks and functions given to the various workers in a project. To release work packages, the organization should (1) assemble and release work packages according to the work plan and (2) communicate the requirements of the work packages to the assigned team members. The project team then performs the work needed to develop the required deliverable good. During step 231, the organization preferably acts to ensure that each team member understands assigned responsibilities, including target dates and budgets. Furthermore, the organization should implement the project so that each team member (1) is able to provide input regarding various responsibilities and (2) accepts these responsibilities.

As depicted in FIG. 2D, a following task in the control of SEPG project work, step 230, is measuring performance, step 232. The task of measuring performance in step 232 generally includes capturing actual results and calculation of metrics in order to manage performance. The capture metrics are outlined in the SEPG project plan formed in step 214 and include cost, effort, scope, quality, and schedule. The organization should further track project infrastructure and technical requirements, such as hardware, software, and performance requirements that were outlined during planning in step 210. The organization should also analyze any deviations from the project plan and identify, in a timely manner, the causes for the deviations.

Concurrent with measuring of performance in the step 232 is managing performance, step 233, as illustrated in FIG. 2D. Managing performance in step 233 generally requires the organization to manage project performance against the previously defined project and work plans. To manage project performance in view of the project and work plans, the organization proactively assesses performance, status, quality and risk. When the actual results from the development of the project do not match the plans, the organization should further determine alternative goals or actions. The implementing organization may further obtain approval for corrective actions, and then take corrective actions. The corrective actions may include, but are not limited to, work process changes, team building, training, increased or decreased supervision, work assignment changes, reassignment of team members, initiation of risk responses, the change of requests to be pursued with program management as part of the configuration management process, project replanning changes that specify needed modifications to the project plan, project plan revisions (work package changes, etc.) or escalation to program management. The organization should also reevaluate project decisions throughout the project life cycle, when various project triggers or other issues, risks, etc. arise. The organization may also manage team member performance according to organizational and industry standards and tools.

Continuing with FIG. 2D, following the measuring of performance in step 232 and the managing of performance in step 233, the organization communicates project status, step 234. During step 234, the organization generally develops and communicates project status to all project stakeholders according to the project plan. The project stakeholders include project and senior management and other affected groups. The organization may further conduct status and review meetings involving affected groups as appropriate. During the communication of project status in step 234, the organization should document meeting minutes as required for the CMM.

Continuing with FIG. 2D, following the communication of project status in step 234, the organization obtains acceptance of interim deliverable goods, step 235. Obtaining acceptance of interim deliverable goods in step 235 generally requires that the organization obtain acceptance of interim deliverables by all designated stakeholders, as appropriate, at key interim points throughout the project life cycle. Any acceptance of final deliverables takes place in connection with completing the program.

Concurrent with the above-described steps 231-235, another task in the control of SEPG project work in step 230 is to execute project management processes, step 236. The organization should execute step 236 in conjunction with other project control activities, such as measurement activities and status reporting. Also, the project management processes may occur continuously, periodically, or may be event driven. One project management process in step 236 is risk management, which addresses the identification, analysis, and avoidance/mitigation aspects of risk management on a project. During risk management, the organization may perform risk identification, during which the organization identifies, names, and describes the various risks. The organization should further generate a list of specific incremental risks in the project's risk tracking tool. For instance, the organization may document known triggers for a risk, the potential damage for each risk item, and references for the sources of risk. Another risk management task in step 236 is risk analysis, in which the organization analyzes the identified risks. In the risk analysis, the organization should classify the risks and include any additional information necessary to support the analysis. The organization may then select a rank/prioritized list of top risks. For instance, the organization may create a list of the top five risks to a project. Another risk management task is risk avoidance and mitigation. Risk avoidance activities address the sources of a risk, thereby reducing the probability that it would become a problem. For a top ranked or prioritized risk, the organization should identify how the risk can be avoided. Risk mitigation measures attack the consequences of a risk, reducing the risk's potential impact on the project. For the top ranked/prioritized risks, the organization may identify actions to reduce the impact of the risk if it occurs. The organization may also use Decision Analysis and Resolution (DAR) to assess the risks, where DAR is defined above. Many automated risk management applications are commonly available, and an organization may choose from these various risk management applications as needed to best fulfill the needs of the organization.

Another task in the execution of project management in step 236 is scope management, which addresses the acceptance of requirements to define scope and the requirements to change control process. For instance, one scope management task is requirements development. During the task of requirements development, the organization identifies and documents requirements needed to promote and ensure bidirectional traceability, so that the organization may trace requirements between the development and the testing of the requirements. As with all work products, requirements are preferably placed under configuration management (CM), as defined in the CMMI. Another scope management task is requirements acceptance, during which the organization documents and reviews requirements with all affected groups and obtains acceptance from the affected stakeholders. The organization should further establish baseline standards for satisfying the requirements. Another scope management task for the organization is making any required changes to the requirements and their baselines. The organization generally follows the project's change control process for any changes to baselined requirements. Namely, the organization submits a change request; reviews a change request; performs impact analysis, including cost, schedule and efforts impacts; determines disposition; implements change, including associated impact to other work products and activities; and notifies requester and affected groups. Again, the organization may determine if it is necessary to use DAR to assess changes in scope.

Another project management process in step 236 in the execution of the project management processes is configuration management. This task addresses the set of activities performed to establish and maintain the integrity of the project work products throughout the project's life cycle. One set of configuration management tasks relates to configuration identification activities. During the configuration identification activities, the organization identifies, names, and describes each of the configuration items that should be placed under configuration management. In particular, all work products should be placed under some type of configuration management. During the configuration identification activities, the organization generally uses the CM plan to define a baseline for the configuration items and to indicate the level of configuration management for each item.

Another configuration management process in step 236 is the configuration of control activities. Generally, the organization requests, evaluates, approves or disapproves, and implements changes to the baselined configuration items defined during the configuration identification activities. All of the configuration items should be archived and placed under the project's documented change control process.

Configuration of status accounting activities is another configuration management process in step 236. During this process, the organization records and reports the status of the project's configuration items. Similarly, the organization should further perform configuration audits. Specifically, the organization may, using the CM plan, determine the extent to which actual configuration items reflect the planned configuration items. The purpose of this task is to ensure that the entire configuration is correct and complete. The organization should further document results as required in the CMMI.

Another project management process of the execution of the project management process in step 236 is issue management and escalation. This task involves the identification and documentation of issues using an issue tracking tool, as well as a review of the issue and an analysis of any impact on deliverables, scope, contingency, resources, costs, schedule, and/or quality. Specifically, the organization should identify a resolution approval party, an issue's owner, and determine expected time frames. The organization may also determine if it is necessary to use DAR to assess the issue, as described above. The organization may further research and identify issue solution alternatives. Subsequently, the organization may refer the issue to program/senior management when: (1) the project cannot resolve the issue internally, (2) when the issue impedes the progress of a project, and when the issue is beyond the authority of the project manager to resolve. These are generally issues that: (1) cannot be resolved within a project team, (2) are resolvable with action items, (3) can be escalated to the next level, (4) Are reactively discovered during the course of development, (5) affect program/project scope, costs, schedule, projected business performance, or high level design, (6) affect multiple projects or releases, and/or (7) involve groups outside the project that affect project delivery. The organization should accordingly monitor issues status and approve or reject resolutions. At the same time, the organization should communicate resolutions to stakeholders and affected parties and take corrective action as described above in the context related to management of performance tasks.

Returning to FIG. 2D, another step during process of controlling the SEPG project work in step 230 is updating the project plan and subordinate plans, step 237. In particular, throughout the life cycle of the project, the project plan and subordinate plans (Risk Management, Configuration Management, Work Plan, Subcontractor Management Plan, Community and Sponsorship Plan) should be updated as appropriate by the organization to reflect any changes on the project that would effect the content of the documentation.

Referring again back to FIG. 2A, another task of the management and improve process 202 in project stage 200 is the rollout and support of SEPG projects, step 240. During the rollout and support of SEPG projects in step 240, new projects to be supported by the SEPG are identified and SEPG processes and tools are delivered to them. SEPG Liaisons may conduct process reviews of the SEPG-supported projects. Other project-created items referenced during the rollout and support task include the Service Level Agreement, Tailoring & Waiver Request, Metrics Workbook and Metrics Plan. The organization performs this task of step 240 to rollout SEPG processes and tools throughout the organization. The process of rollout and support of SEPG projects in step 240 is illustrated in greater detail in FIG. 2E. Specifically, the rollout and support of SEPG projects in step 240 comprises the steps of identifying new projects, step 241; assigning a SEPG liaison, step 242; conducting a project kickoff, step 243; approving or disapproving waivers, step 244; collecting project metrics, step 245; conducting best practices reviews, step 246; reporting best practices status, step 247; and conducting project close out, step 248.

Figure 2E:
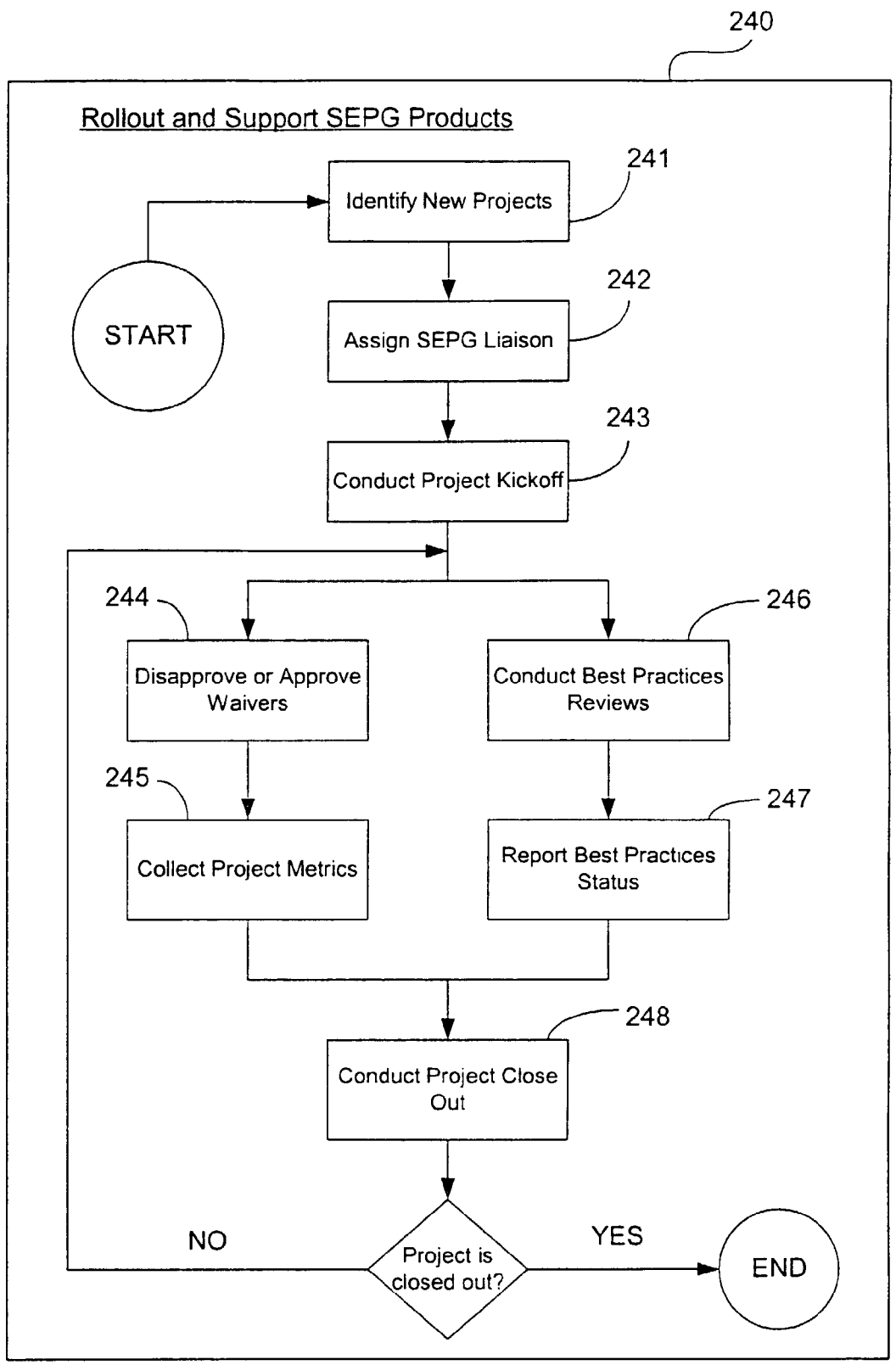

Referring to FIG. 2E, during the identification of new projects in step 241, the organization should identify new projects that are in the planning stages. Then, in step 242, a SEPG rollout team leader assigns a SEPG liaison by evaluating the current workload among the available SEPG liaisons and select the most appropriate SEPG liaison for the current project. The rollout team leader preferably discusses the assignment with the SEPG liaison and sends a memo to the SEPG liaison informing him or her of the assignment, with a copy to the project manager and the SEPG program leader.

Continuing with FIG. 2E, the next step of conducting a project kickoff in step 243 is conducting a kickoff meeting, preferably within 2 weeks of notification of support to be provided by SEPG. The SEPG liaison should schedule a time to meet with the project management team to discuss the kickoff. The SEPG liaison should also ask a project manager for project documentation such as the proposal, the statement of work, estimating tool estimates, and the workplan, if available. This discussion is to establish the project organization, identify projects to support, and to ascertain the scope of the SEPG effort.

Referring again to FIG. 2E, the next task in the rollout and support of SEPG projects in step 240 is to approve or disapprove waivers, step 244. In particular, the SEPG liaison or SEPG manager should work with the project or proactively identify any area where a project may need a waiver. A waiver request template should be available through the SEPG or through the SEPG liaison. A senior management official should sign the waiver request form, thereby acknowledging its risk and impact to the project. Also, the SEPG liaison should review the waiver request form for completeness and determine the disposition of the waiver request. The SEPG liaison then forwards the waiver request form to the SEPG project manager with a recommendation for disposition. Subsequently, the SEPG liaison informs the project manager of the disposition of the waiver request.

Continuing with FIG. 2E, the next task is to collect project metrics, step 245. Step 245 may include one or more undertaking that help to ensure that the project metrics are collected in an organized and efficient manner. These undertakings may include collecting monthly project metrics, collecting best practice reviews, collecting quality review results, collecting stakeholder scorecard data, and collecting people satisfaction survey results.

Continuing with FIG. 2E, another step is to conduct best practices reviews, step 246. With the conducting of best practice reviews, the SEPG liaisons should conduct monthly best practice reviews with project management in order to track and monitor compliance with CMMI requirements. The review criteria are based on the CMMI process areas and can be found within a best practices matrix. The reviews identify nonconformance items and areas for improvement. The SEPG liaisons should review the information gathered from the team and enter comments into the notes/comments section of the first best practice review matrix. During the meeting, the SEPG liaisons and project managers should review the matrix and determine which items have been met and those that would require additional information or documentation (artifacts). Based on the review, the SEPG liaisons should complete the best practice matrix with documentation on additional information required from the project. Once the project reaches substantially complete compliance with the identified best practices, the best practice review focus becomes one of continued compliance and includes project team leaders and project team members. The SEPG liaisons should document and spot-check areas for compliance based on past reviews. These interviews may be conducted with or without project management in step 500, described below.

Continuing with FIG. 2E, the next step is to report best practice status, step 247. There are two ways to report on the best practice status. The SEPG liaison may document Non-Conformance Items (NCI) and issues in a best practice notes/comments section and submit this to project management after the conclusion of the Best Practice review, preferably within two days. The project manager generally has a short time, such as one week, to provide a response for each NCI, including a target completion date for correcting the NCI. Alternatively, the SEPG liaison may complete a best practice "Dashboard" report with updated scores, open items, and risks. The report should be sent to project management and SEPG rollout and program leaders.

Continuing with FIG. 2E, the next step is to conduct project close out, step 248. The organization may implement phase close out. In phase close out, the SEPG liaison may approve or disapprove the waivers, collect project metrics, conduct best practice reviews, and report on best practice status, etc. This process of rolling out and support of SEPG projects, along with the control of process improvements (step 203) described below, may then be repeated until the project is closed out. Next, in project closed out, the SEPG liaison works with the project manager and the management team to evaluate the overall impact and value of the SEPG program on the project. This evaluation should be done through the completion of a project close-out memo, verification of updates to the internal corporate resource by the project knowledge champion, verification of submission of the project's actual and estimated values to owners of the estimating tool via the profiling tool, collection of final project metrics, and collection of best practice and SEPG suggestions and comments.

Figure 2F:
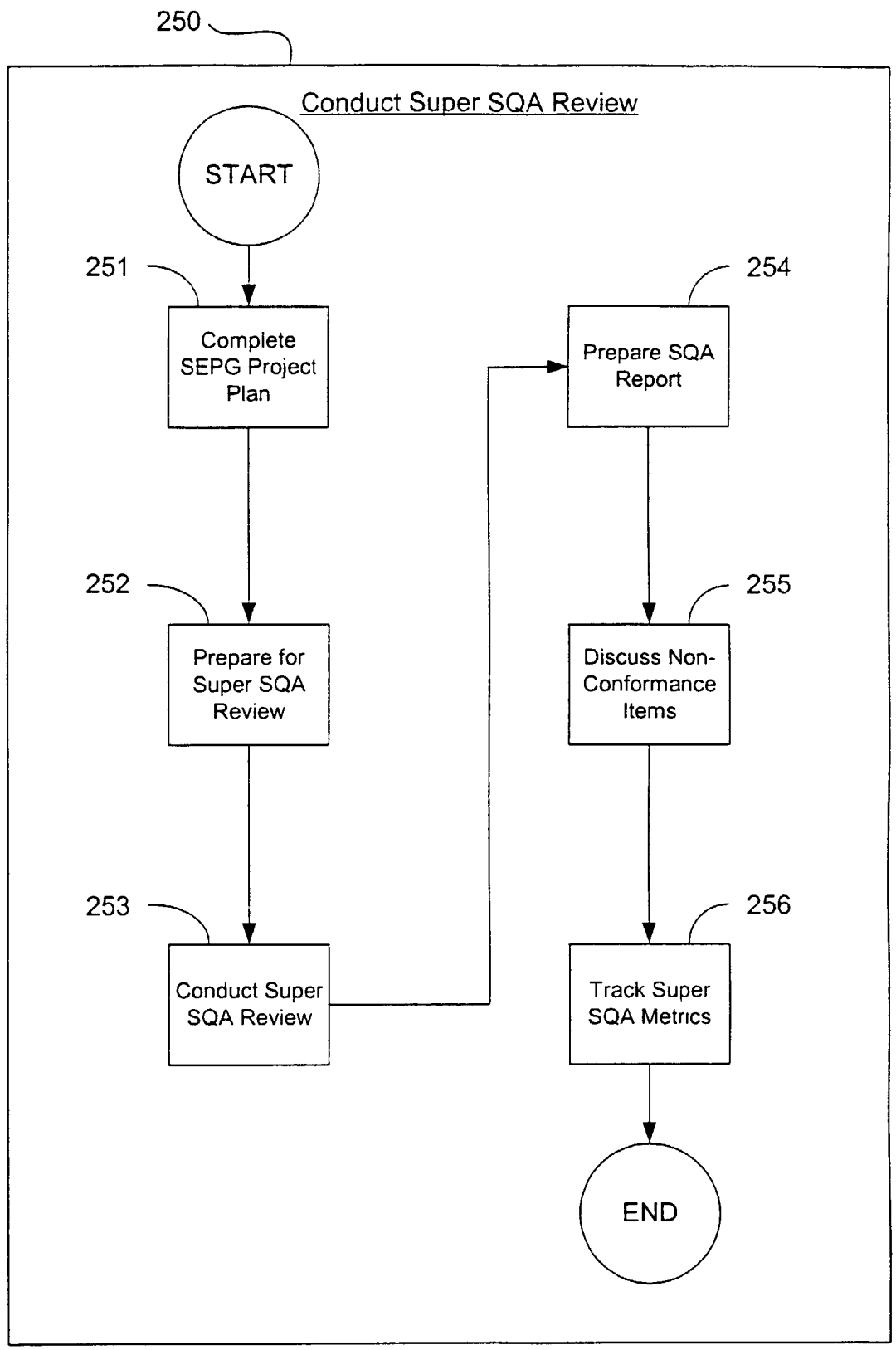
Figure 2G:
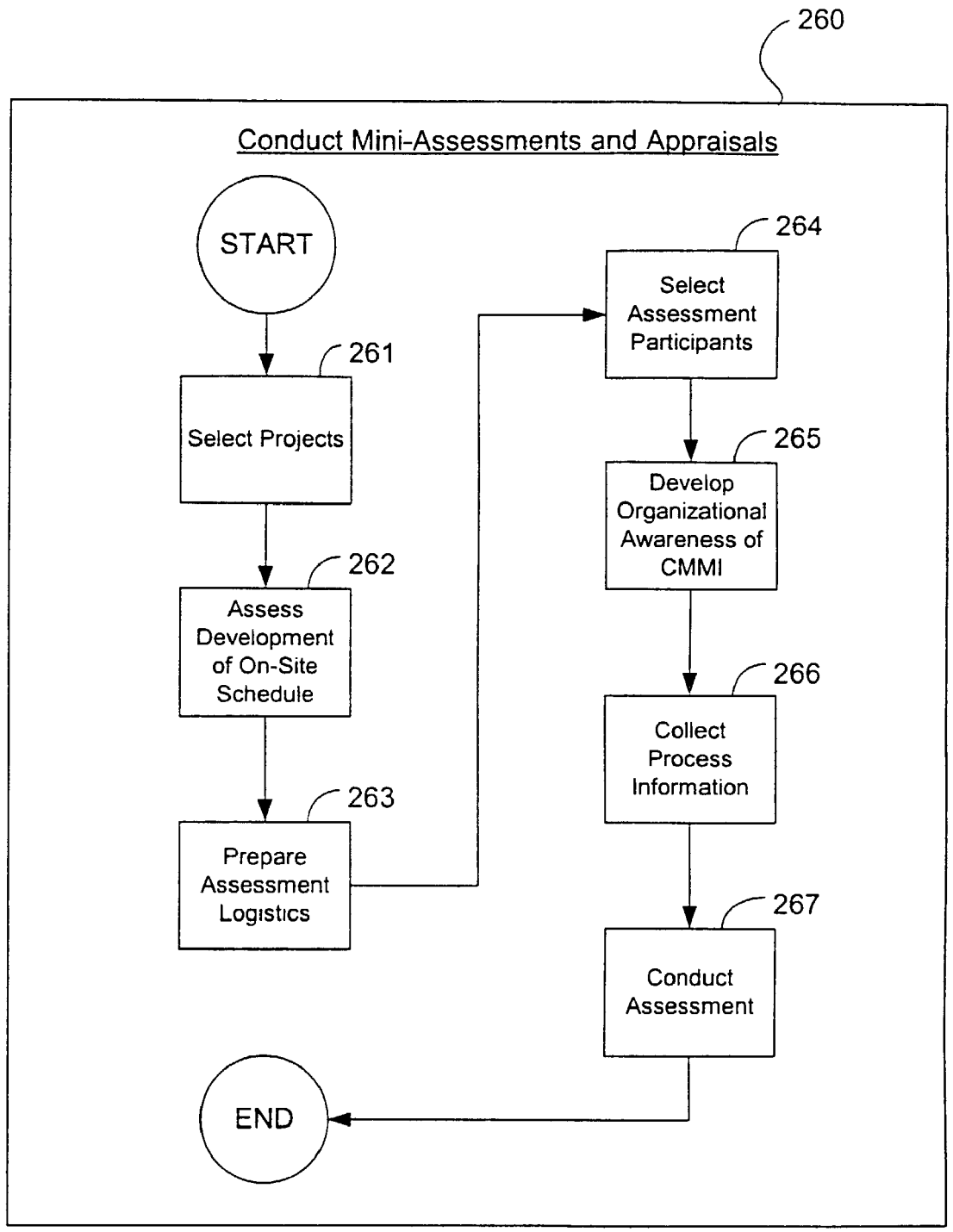
Figure 2H:
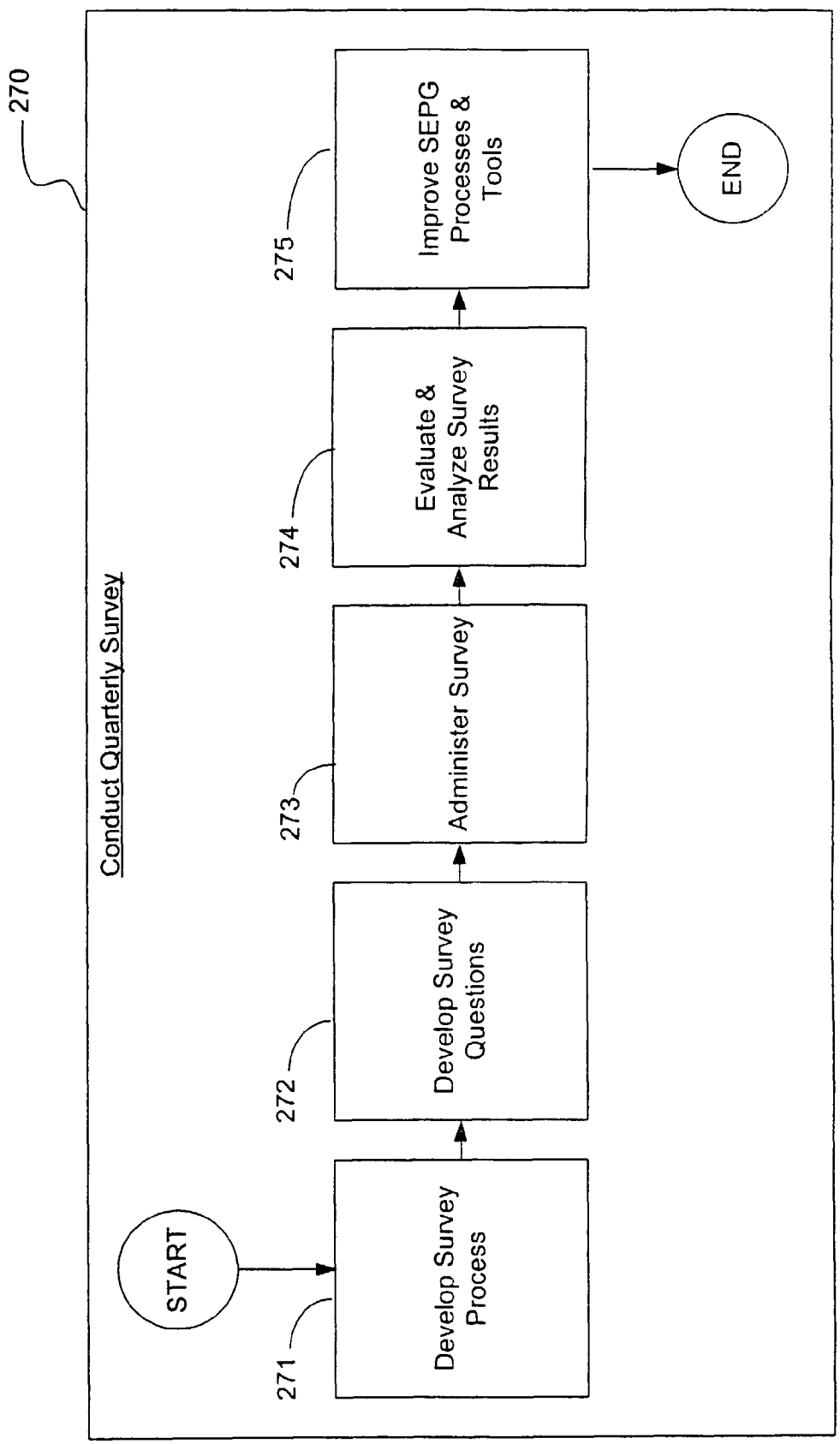
Figure 2I:
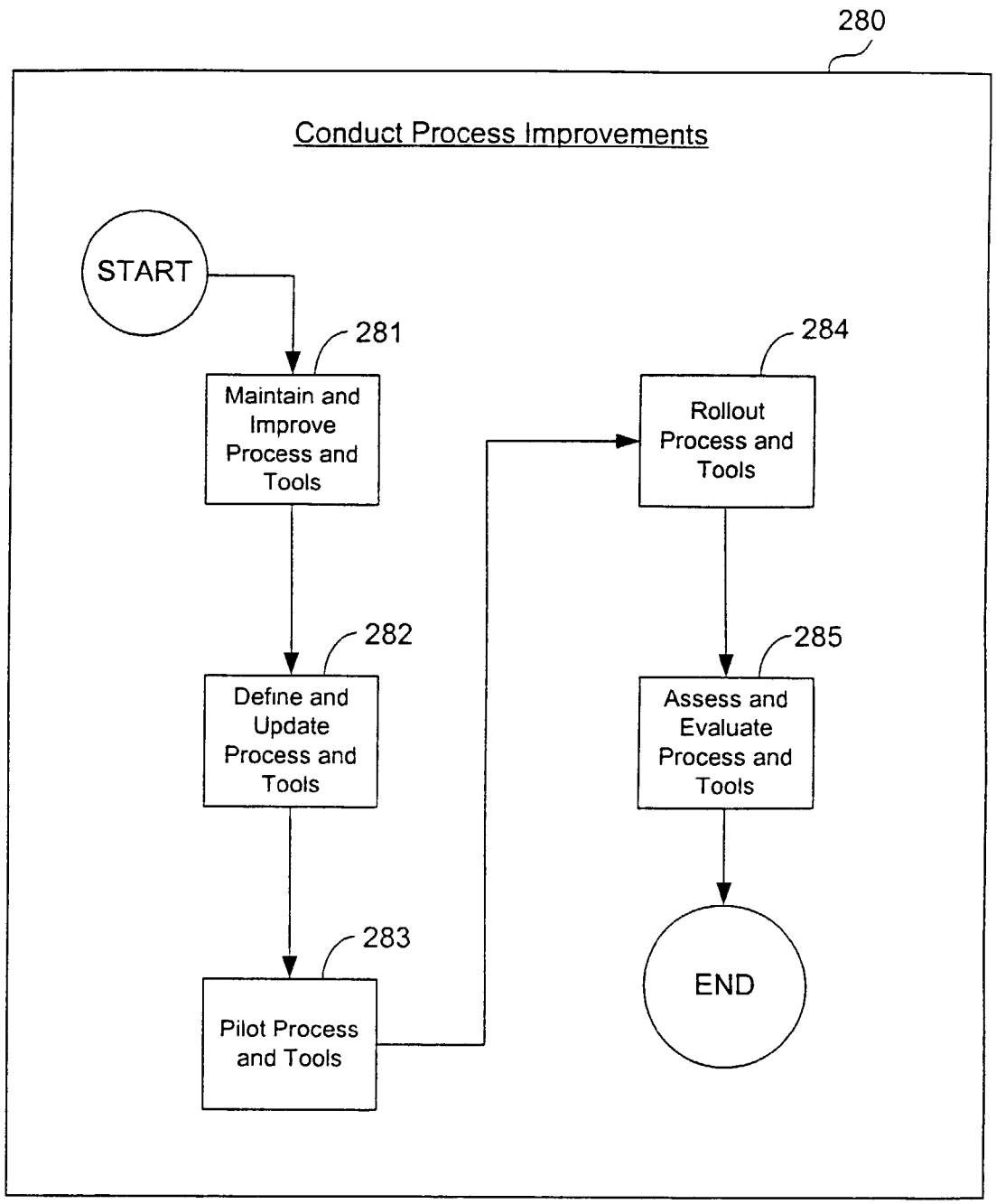
Figure 2J:
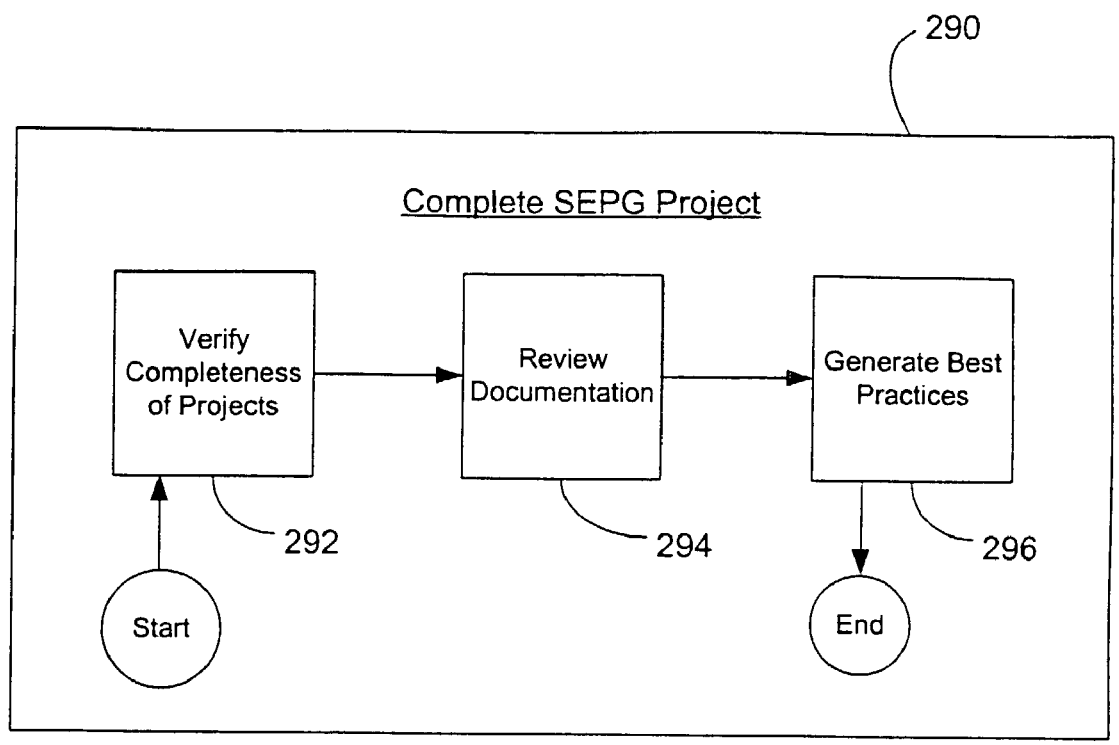

Following the conducting of the close out in step 248, the organization may complete the SEPG projects in step 290, as depicted in FIG. 2J. To complete the SEPG projects in step 290, the SEPG Liaison reviews the Closing Memo and SQA Debrief created by projects that are complete and no longer require SEPG support. Specifically, the organization verify the completion of the supported projects, review the documentation produced in steps 230 and 240, and generate a list of best practices as desirable to produce a more mature product, respectively steps 292-296.

Referring back to FIG. 2A, another task of the management and improvement process, step 202, in the project stage 200 is to control process improvements, step 203. The control of process improvements in step 203 brings together the tasks associated with controlling and conducting process improvement. As highlighted in the methodology, the Control Process Improvement, Rollout & Support SEPG Projects, and Complete SEPG Projects tasks are iterative in nature. Once processes and tools are improved, the SEPG is responsible for delivering these new processes and tools to its projects. Improving the control process in step 203 is comprised of the following steps: conducting a super software quality assurance (SQA) review (step 250), conducting mini-assessments and appraisals (step 260), conducting intermittent surveys (step 270) and conducting process improvements (step 280).

One aspect of improving the control process in step 203 is to conduct a super SQA review, step 250. In step 250, the SEPG plans and organizes a Super Software Quality Assurance (SQA) review of its documents. A report is prepared based on the findings and reviewed with the SEPG Team. The results of this review help the SEPG to improve internal processes. The organization performs this step 250 to conduct software process and work product quality assurance reviews to verify project adherence to standards and procedures, such as any identified best practices. The quality program section of the Project Plan is described above in greater detail within the text accompanying FIG. 2B. Turning to FIG. 2F, the process of conducting a super SQA review in step 250 is described in greater detail. The first task of conducting the super SQA review in step 250 is to complete a SEPG project plan. In step 251, the process improvement (PI) team leader typically (1) identifies documents and processes to be reviewed; (2) ensures that documents in the Project Plan and Work Plan are consistent; (3) identifies Super SQA reviewers, reviewees, and review criteria, (4) identifies roles and responsibilities; (5) identifies SQA metrics; (6) references the SQA plan in the quality section of the project plan; and (7) creates the SQA Plan.

In the next step of conducting the super SQA review of step 250, the organization prepares for the super SQA review, step 252, as depicted in FIG. 2F. In one implementation of step 252, the PI team leader sets the super SQA review expectations. The PI team representative also submits reminder notifications to the super SQA reviewer based on any scheduled super SQA reviews, provides the Super SQA Reviewer with the Super SQA Reviewer training presentation and the SEPG Program SQA Plan, and provides the super SQA reviewer with standards and supporting documents to be reviewed. The PI team representative may further provide the super SQA reviewer with document owner contact and availability information, as defined in the CMMI. The super SQA reviewer then typically gathers and reviews criteria/standards and supporting documents from the PI team representative, reviews any super SQA reviewer training presentation, and schedules meetings with document owners.

Referring to FIG. 2F, the next step of conducting the super SQA review of step 250 is to conduct the super SQA review, step 253. The super SQA reviewer should review processes and documents against review criteria/standards, conduct interviews with document owners, identify nonconformance items, and follow up with the document owners as needed for meeting with the requirements of the desired CMM level. The document owner participates in the interview with the super SQA reviewer and remains available to answer questions. The PI Team Leader should also remain available to answer questions.

In the next step 254, the organization, through the SQA reviewer, prepares an SQA report to document a detailed summary of findings and recommendations, as illustrated in FIG. 2F. Specifically, the SQA Report should include an item number, the date reported, and an accurate description of nonconformance items. The SQA reviewer may further distribute the SQA Report to the PI Team Leader, and schedule discussion of nonconformance items with the SEPG Program Lead. The PI team representative also prepares and documents responses in the SQA Report, including an indication of whether the PI team representative agrees or disagrees with the reason statement, or otherwise determines the findings to be not applicable to the particular organization or project.

Subsequently, the organization should discuss nonconformance items, step 255 in FIG. 2F. In step 255, the super SQA reviewer typically schedules and conducts a discussion of nonconformance items with the PI team leader, as well as verifying an adequate resolution of nonconformance items. Likewise, the PI team leader should discuss nonconformance items with the Super SQA Reviewer and refer disagreement items for facilitation to the SEPG Program Leader. A PI team representative should update the SQA report with proposed resolution(s) and projected completion date(s) for proposed changes/actions, and update and return the report, as well as all necessary documents, to the SQA reviewer for verification. The PI team representative further creates the System Investigation Requests (SIRs) and/or Change Requests (CRs) as necessary for the CMMI. The SIRs correspond to reports created to document errors in the product, and CRs conversely correspond to enhancements in the product that are beyond the scope of the original product. A SEPG liaison may then review and resolve escalated nonconformance items.

Returning to FIG. 2F, the next step of conducting the super SQA review of step 250 is to track the super SQA metrics, step 256, by having the super SQA reviewer send the final report to the PI team leader. The PI team leader then forwards the final report and metrics to SEPG program leader, including metrics such as SQA schedule variance, and the number of nonconformance items. The PI team leader further tracks and reports on all open nonconformance items, while keeping project copies of documentation/reports.

Returning to FIG. 2A, the next step in improving the control process in the step 203 is to conduct assessments, step 260. In step 260, the SEPG coordinates activities to determine the state of an organizations processes and practices. This assessment can take many forms and can range from informal process assessments, mini-appraisals or full-scale evaluations. In any of these situations the organization can utilize outside contractors to conduct the review. Step 260 generally includes three stages: preparation, an on-site period, and wrap-up. After a series of interviews and review of documentation, the assessment results are then presented back to the organization. The organization should follow the same basic process when conducting an appraisal. In both cases, the organization may utilize an external group to execute the mini-appraisal and/or assessment. The process of conducting the mini-assessments and appraisals in step 260 is more fully illustrated in FIG. 2G.

As depicted in FIG. 2G, the first task in the assessments in step 260 is to select projects, step 261. In step 261, the organization carefully selects projects used for the assessment in order to paint an accurate picture of the organization's processes. Generally, from one to four projects should be selected for assessment. Projects may be selected using the following criteria: (1) the project should be representative of the work (present and future) of the organization, and aligned with the business objectives of the organization; (2) the project should have at least six people working on it; (3) the project should have a duration of greater than three months; and (4) the project should not have a critical activity or milestone during the on-site period. Additionally, at least one of the projects should be in the build stage. Personnel from the selected projects should also be available for interviews and presentations.

Returning to FIG. 2G, the next task in the mini-assessment and appraisal is to assess the development of an onsite schedule, step 262. The core of the assessment during step 260 is made up of the onsite period, which usually lasts from five to ten days. The onsite period consists of three basic activities: (1) gathering information through interview sessions with project leaders, team leaders, and functional area representatives; (2) mapping information to processes areas within the scope of the assessment through consolidation sessions; and (3) reporting findings and observations back to the organization through preliminary and final findings presentations. An executive session and a debriefing session is conducted to wrap up the on-site period. There is no limit to the number of hours spent on a particular activity; however, the assessment team is bound to the tasks that need to be completed before the next day. Training the assessment team is the other activity that can be considered part of the onsite period, as required, and can be scheduled just before the assessment activities begin.

As depicted in FIG. 2G, the next step in step 260 is to prepare assessment logistics, step 263. During step 263, a local assessment coordinator works with the assessment team leader to identify and prepare the logistics for conducting the on-site period. Logistical preparations include reservation of rooms for the on-site period (presentation, interview, and assessment team rooms); computer and presentation equipment (projectors, LAN connections, access to a phone, printer, copier, and general supplies); arranging for food and beverages, as well as accommodations for the assessment team, and confirming building/office access for the assessment team during the on-site period.

The next step in step 260 is to select assessment participants, step 264, as depicted in FIG. 2G. In the selection of assessment participants in step 264, a good cross section of the organization must be considered when selecting assessment participants. This is done through interviewing individuals from each selected project, including the project leader, project team members, as well as personnel from supporting groups, such as quality assurance, configuration management, and/or the database group. Individuals who have been involved in developing or maintaining software in the organization also should be included in the list of interviewees. Participants selected for the assessment should come from different parts of the project life cycle, have at least six months of experience with the organization (and at least three months with the project), and be able to articulate their observations and opinions about the organization and its projects. Selected participants preferably can dedicate from six to eight hours to the assessment activities during the on-site period. For the assessment to take place, the assessment sponsor must be present for the initial and final presentations.

Returning to FIG. 2G, the next step in the mini-assessment and appraisal is to develop organizational awareness of CMMI, step 265. The organization performs this task to train assessment participants on what the assessment will involve, how the assessment will be conducted, and what the organization expects of assessment participants. Awareness activities may include training sessions and distribution of awareness materials to everybody in the organization. The assessment sponsor, or the organization's management (if different from the sponsor), must demonstrate their total support for the initiative.

As depicted in FIG. 2G, the next step in the mini-assessment and appraisal is to collect process information, step 266. Step 266 is performed in preparation for the assessment of the collection of the documentation used in the current management and technical processes. Selected members of the organization fill out a maturity questionnaire to provide a baseline for scoping the assessment. The appropriate process documentation from both the organization and the projects being assessed should be collected to be reviewed by the team for the purpose of developing the assessment findings and observations. A documentation index should be created and, if required, the collected documents should be mapped to the CMMI process areas.

Returning to FIG. 2G, the next step in step 260 is to conduct the assessment, step 267. In step 267, the assessment team visits the organization with the objective of mapping the organization's management and development processes against the CMMI. In particular, the assessment team should be trained. The assessment team should further conduct an opening meeting and interview project leaders, team leaders, and functional area representatives. The assessment team should further review collected documentation and consolidate information gathered and map it to process areas in the CMMI. Subsequently, the assessment team should conduct follow-up interviews, as required, and prepare and present preliminary findings to management and staff. Likewise, the assessment team should prepare and present final findings to the organization, incorporating feedback received from the preliminary findings presentation. The assessment team then conducts any executive and debrief sessions and prepares a final report. At the conclusion of the assessment, the assessment team files an assessment report with the Software Engineering Institute (SEI), including with the assessment the final presentation and the summary report.

Returning to FIG. 2A, the next step in improving the control process in step 203 is to conduct a quarterly survey, step 270. The organization performs step 270 to receive feedback from projects regarding the SEPG processes and tools. During step 270, the SEPG designs and delivers a quarterly Process Improvement Survey to the projects it supports. The results of this survey are an input into the SEPG team's Process Improvement efforts. While named a quarterly survey, it should be appreciated that the survey may occur at other intervals and time periods. Results of this survey should be used to improve SEPG processes and tools. The process of conducting the quarterly survey in step 270 is depicted in FIG. 2H. The first task is to develop a survey process, in step 271, for administering the process improvement survey. This survey may be administered by the SEPG. The responsibilities for this task should be assigned to a sub-team. In developing the survey in step 271, the organization should consider the effect of the survey transmission medium and the methods through which the survey results will be analyzed. The organization should next develop the survey questions, step 272. The organization should select question on which the SEPG would like to receive feedback. Preferably, when developing survey questions, the organization should choose nonleading questions. The organization should also preferably use a response scale that can be easily quantified, such as the Lickert scale. The organization should next, in step 273, administer the survey using the medium chosen in step 271. At this point, in step 274, the organization may evaluate and analyze the survey results received from respondents using the process developed in step 271. The organization may then use the survey results to improve the SEPG processes and tools, step 275. During step 275, the organization may also publicize the results of the survey.

Returning to FIG. 2A, the next step in improving the control process in step 203 is to conduct process improvements, step 280. The organization performs step 280 to manage process improvement activities. During step 280, the SEPG takes the feedback it received from the SQA review, assessments, quarterly surveys, and feedback from other sources, and begins translating this feedback into improvements in SEPG processes and tools. Results from step 280 will be used to maintain, update, and develop SEPG processes, tools, and assets. Step 280 is illustrated in greater detail in FIG. 2I.

As depicted in FIG. 2I, the first step in conducting process improvements is to maintain and improve processes and tools, step 281. In step 281, anyone in the organization and its external reviewers may identify a process improvement opportunity (with a process, template, training, standard, tools, or the document repository itself). This could be in the form of an error (through a SIR), an improvement, an enhancement request (through a CR), or any other process improvement concern. The process improvement team leader should examine the process improvement opportunity, and a decision may be made on implementing the process improvement. If it is determined that the changes will be incorporated into the appropriate process asset (process, template, standard, training, etc.) in accordance with SEPG standards, then a SIR or CR may be documented to capture the change.

Returning to FIG. 2I, the next step in conducting process improvements, step 280, is to define and update processes and tools, step 282. In step 282, anyone in the organization may identify a new process or tool to be defined, documented, and/or built. The first type of process to be created is an internal SEPG process that uses a new process template to document process flows and descriptions. The second type of process to be created includes processes and tools that are part of the SEPG methodology. Process definition is submitted to a SEPG team leader for review and approval. If a process is approved, it will be scheduled for release to the organization and/or SEPG team, depending on the type of process submitted.

As depicted in FIG. 2I, the next step in conducting process improvements, step 280, is to pilot processes and tools, step 283. Once the process or tool to be piloted has been completed and approved, it is time to determine the pilot group, time frame, scope and functionality, roles and responsibilities, and entry and exit criteria, as part of step 283. The SEPG program manager may then work with a process asset owner to communicate the pilot's scope and expectations with the pilot group. The pilot group will be trained on the use and implementation of the process asset. The pilot is conducted with the process asset owner providing support to the pilot group in terms of providing clarification, additional training, or technical support, as necessary. At the end of the pilot period, the process asset owner debriefs with the pilot group or at least with a representative of the group to evaluate the pilot. Strengths and weaknesses of the process are identified, documented, and addressed.

Returning to FIG. 2I, the next step in conducting process improvements, step 280, is to roll out processes and tools, step 284. In step 284, once feedback from the pilot group is incorporated into the process asset, it will be rolled out to the organization and/or SEPG team, as necessary. In step 284, the SEPG liaisons have the primary responsibility of communicating the new processes and tools to the organization's projects.

Returning again to FIG. 2I, the last step in conducting process improvements, step 280, is to assess and evaluate processes and tools, step 285. During step 285, the organization determines how processes and tools will be evaluated. The organization may further conduct intermittent or quarterly process improvement surveys.

Personnel Stage

Figure 3A:
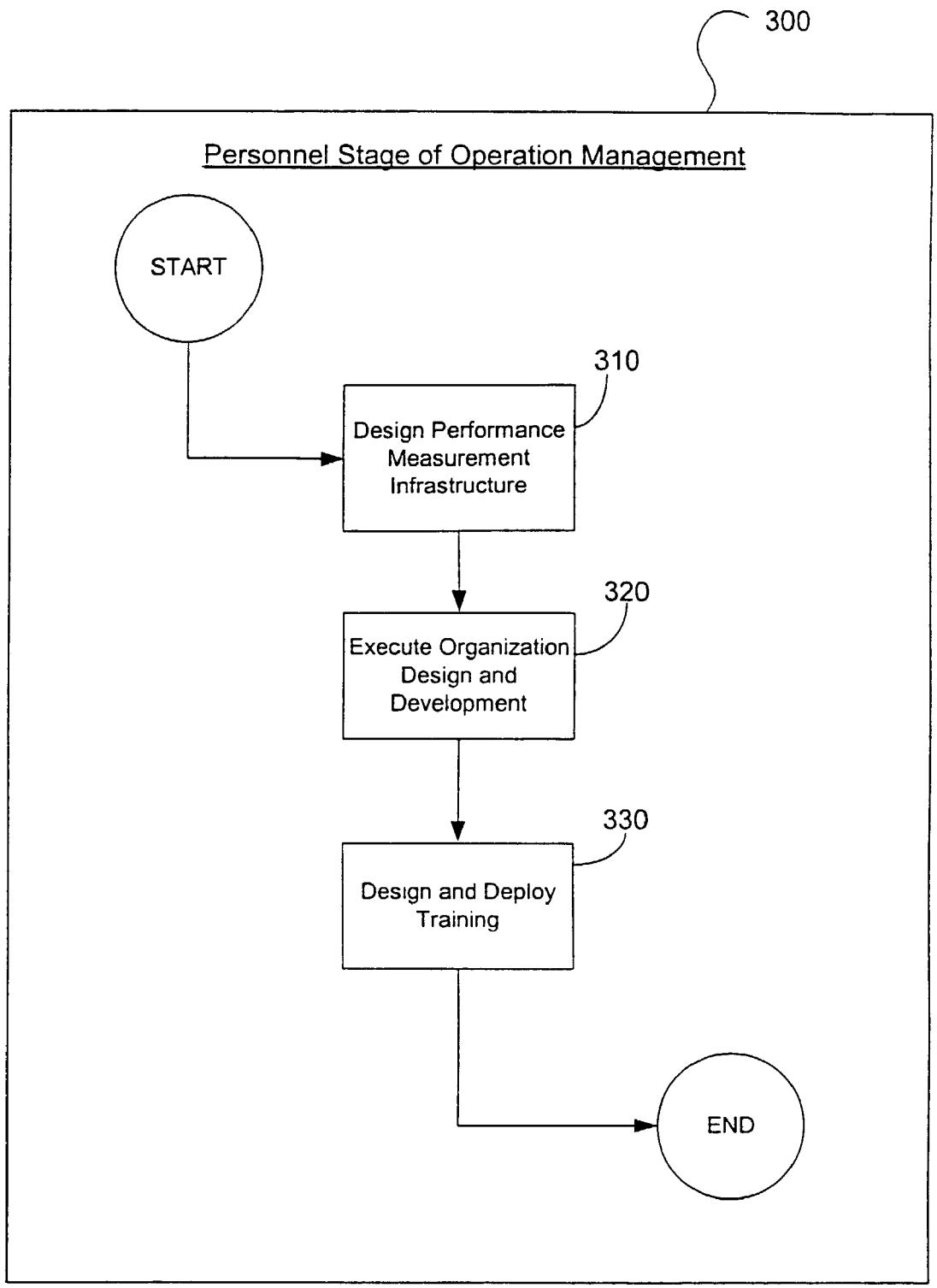
FIGS. 3A-3D are flowcharts depicting the steps of the personnel stage of organization management in accordance with embodiments of the method of FIG. 1.

Returning to FIG. 1, a second process within the organization management step 100 relates to personnel management, step 300. The actions of step personnel management in step 300 generally relate to acquiring, organizing, and training the organization's personnel as needed to encourage the development of more mature products and achieve higher levels of CMM maturity. Organizational Training of step 300 is generally necessary to enable personnel to develop skills to meet specific roles and responsibilities during solutions delivery in step 600 described below. The process of personnel management is generally depicted in FIG. 3A and comprises the actions of designing a performance measurement infrastructure, step 310; executing organization design and development, step 320; and designing and deploying training, step 330; and is now briefly described.

The designing of a performance measurement infrastructure in step 310 generally relates to planing activities related to performance measurement to provide the organization with a means for judging the effectiveness of the organization. The designing a performance measurement infrastructure in step 310 is summarized in FIG. 3B. The first step in step 310 is to validate and reach agreement on organization strategy, step 312. Step 312 generally involves the organization's key stakeholders in the development and/or validation of the organization's strategy, specifically the organization's mission, vision, and overall objectives. Because performance measurement cascades down from the organization strategy, the organization's strategy should be understood and agreed upon by those accountable for implementing it.

Returning to FIG. 3B, the next step in designing a performance measurement infrastructure in step 310 is to produce a performance measurement scorecard, step 314. In step 314, the organization uses a balanced scorecard to measure performance. The balanced scorecard is a measurement tool that translates strategic objectives into a coherent set of performance measures. The scorecard is "balanced" because it measures both leading and lagging indicators. These indicators are expressed in financial and nonfinancial terms.

Figure 3B:
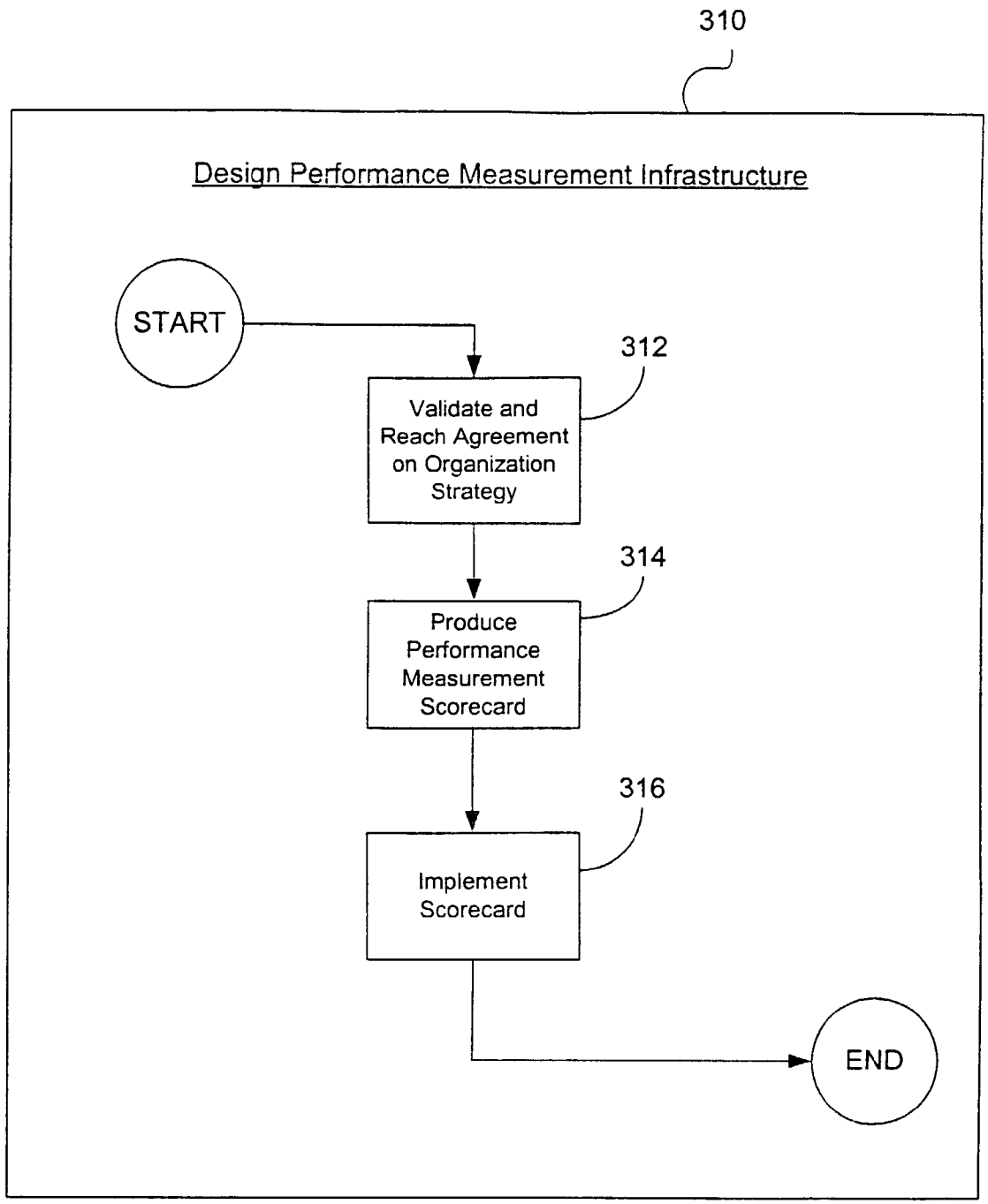

Subsequently, in step 316, the organization implements the scorecard, as depicted in FIG. 3B. Implementing the scorecard generally requires that the specific information for performance goals, metrics, and targets be collected from the front lines. Furthermore, the organization should compile at the strategic level each performance perspective, objective, metric, and target. Also, the organization should create and communicate top down, bottom up, and interactive performance measures. Subsequently, the organization should solicit feedback to test the effectiveness of metrics and how the performance measures fit in with the organization strategy.

Figure 3C:
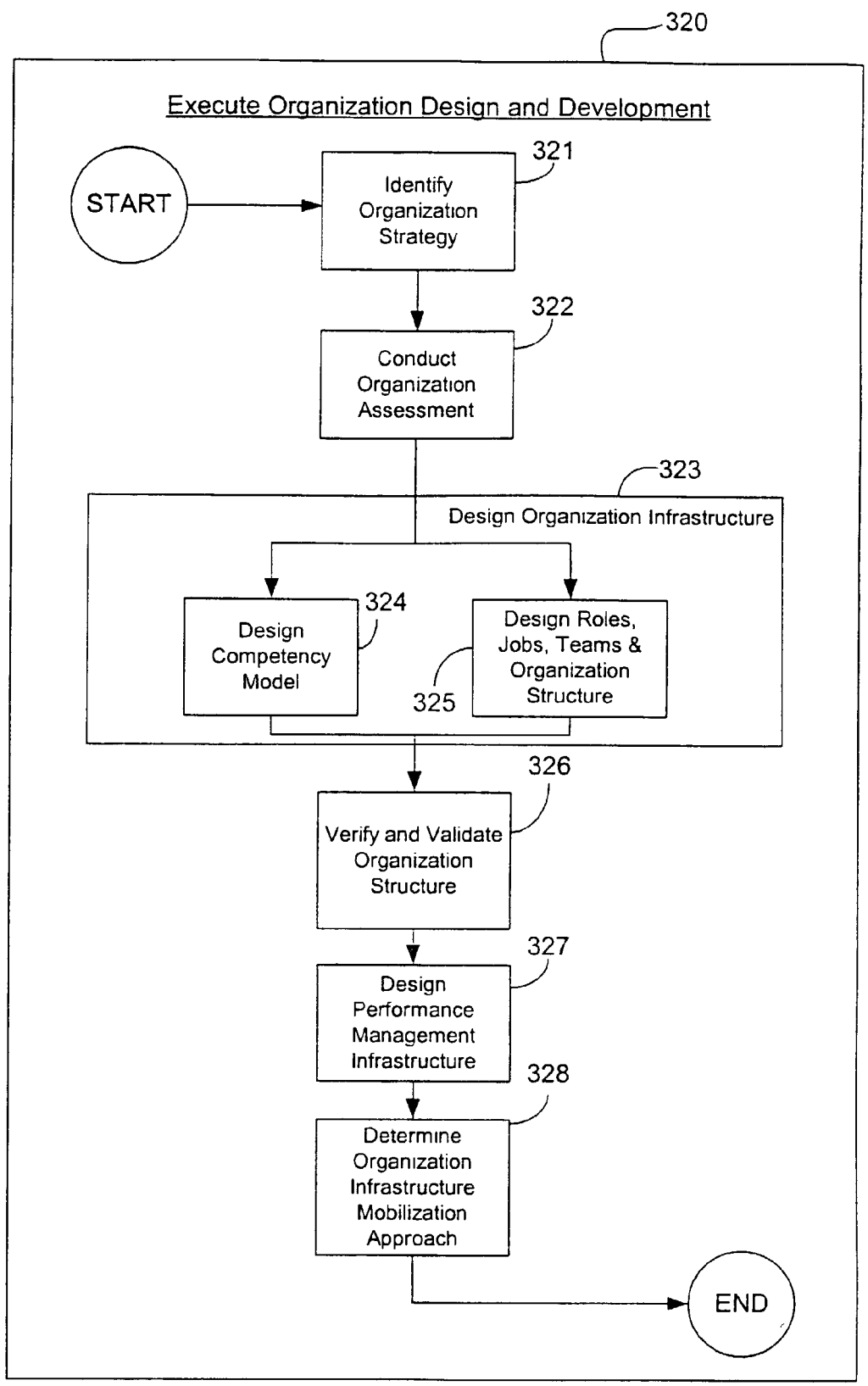

Turning to FIG. 3C, the next step in the personnel stage 300 is to execute the organization design and development, step 320. The organization performs step 320 to plan activities related to organization design and development. Step 320 involves coordinating the tasks associated with defining a strategy for the organization, assessing the organization against this strategy, and deigning and implementing a new organization. Note that step 320 assumes that the organization has a Human Resource Organization with the skills to design and implement new elements of the organization. The organization should to have experience in organization design and development. The substeps of the organization of design and development in step 320 are illustrated in FIG. 3C.

The first task in step 320, as illustrated in FIG. 3C, is to identify an organization strategy, step 321. In step 321, business outcomes, core competencies and guiding principles are defined. These definitions will position the organization relative to business goals and objectives, vision and mission, management philosophy, customer values, critical behaviors and competitive environment. Specifically, the organization should identify an organization strategy before detailed organization design. The organization should be designed to reflect not only where the company is relative to strategy, philosophy, and the value proposition of its customers, but also where it needs to achieve a competitive advantage in the future. The organization strategy sets the direction by defining business outcomes, core competencies, and guiding principles that will be used to anchor the organization design and development process.

As depicted in FIG. 3C, the next step in the execution of the organization design and development in step 320 is to conduct an organization assessment, step 322. It should be noted that the assessment differs from assessment used with SEPG. The organization assessment helps to identify the supports and barriers to transformation and build a case for implementation. An organization assessment in step 322 consists of assessing an organization's current situation, its future aspirations, and the gap between them; then identifying the initiatives required to fill these gaps. In step 322, enablers and barriers to organizational transformation are identified and a case for implementation is built. This is accomplished through an assessment of the current organizational environment and future organizational aspirations, identifying the gaps between these two, and identifying a course of action to close those gaps.

Referring to FIG. 3C, the next task in step 320 is to design an organization infrastructure, step 323, to create structures established to form individuals into the desired performing organization. The organization infrastructure's goal is to allow workers to effectively accomplish their tasks within the business process so that an overall goal is met. In step 323, the organization will design a competency model and design roles, jobs, teams and organizational structures. The competency model definition will document the knowledge, skills and other attributes/abilities associated with high performance on a job. The roles, jobs, teams and organizational structures will document the responsibilities associated with: the individual (roles), groups of related roles (obs), groups of jobs (teams) and the span of control, reporting relationships and functional relationships of all of these components. Step 323 has two subtasks—to design a competency model, step 324, and to design roles, jobs, teams and an organization structure, step 325. Steps 324-325 may be conducted iteratively and/or concurrently. In designing a competency model in step 324, the organization should group together related competencies to form a competency model. A competency is a cluster of related knowledge, skills, and other attributes/abilities associated with high performance on a job; and a competency model is a group of related competencies required to perform a career field such as team leader or technical coach. Similarly, during the process of designing an organization structure in step 325, the organization defines the roles played by individuals, the jobs they hold, the teams in which they work, and the relationship between teams. The organization should logically define roles for individuals on the basis of their competencies, as decide in step 324.

Returning to FIG. 3C, the next task in step 320 is to verify and validate an organization structure, step 326. In step 326, all components of the newly defined organizational infrastructure and reviewed to verify and validate that they meet the needs and goals of the organization. Specifically, the organization should verify and validate that any new organization design meets the needs of the business and is internally consistent. The organization should further confirm the new organization design with any subject matter experts and initiative sponsors. Continuing with step 326, the organization should organize review sessions to validate how well the components of the new organization design (roles, jobs, teams, organization infrastructure, performance management infrastructure) fit together to support new initiatives.

The next task in step 320, as illustrated in FIG. 3C, is to design a performance management infrastructure, step 327. In step 327, the organization's performance measurement scorecard is developed based on the organization's strategic objectives. This scorecard is then used to measure the organization's performance. Note that this task assumes that the organization has a Human Resource Organization with the skills to design and implement a performance measurement scorecard, and that the organization has experience in organizational performance management. Thus, in step 327, the organization defines a means for assessing, rewarding, and developing the individuals in an organization. The performance management infrastructure has four components: (1) designing the performance management approach; (2) designing the performance appraisal instruments; (3) designing career progression; and (4) designing the compensation and reward structure. Overall, the organization should establish a system to reward individuals for desired contributions.

The final task in step 320 is to determine an organization infrastructure mobilization approach, step 328, as illustrated in FIG. 3C. In step 328, the organization determines and mobilizes the resources required to staff the new organization infrastructure established in step 323. The organization may determine profiles for the ideal candidates, determine sizing and timing needs, and determine a sourcing approach. For instance, candidates may be profiled to fit job descriptions, the organizations new size may be determined and an approach to sourcing and staffing jobs may be finalized and executed.

Figure 3D:
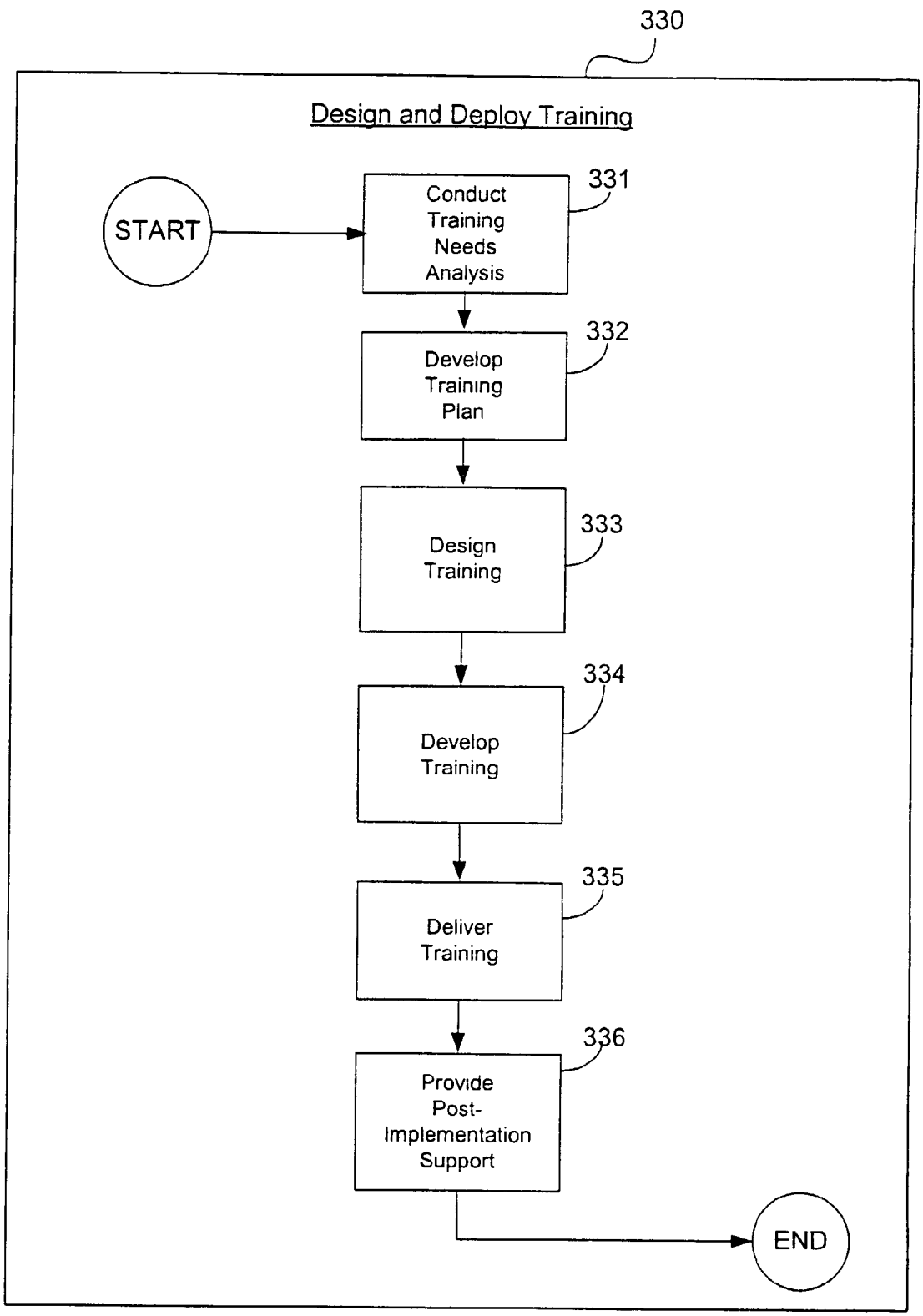

Returning to FIG. 3A, the next process in the personnel stage 300 is to design and deploy training, step 330. In step 33, the training needs of the organization are analyzed and a Training Plan is created, training is designed, developed and deliverer and post implementation support is provided. The organization performs step 330 to plan activities related to training employees. The design and deployment of training during step 330 is illustrated in greater detail in FIG. 3D. As illustrated in FIG. 3D, the first task in step 330 is to conduct a training needs analysis, step 331, during which the organization identifies, by name, the participants to be trained, along with the courses and modules on which these participants will be trained. In step 331, target audiences and participants are identified, and training courses and modules are planned. The training needs analysis in step 331 may be conducted in two phases. During the first phase, the organization gathers the high-level training needs for the organization. Similarly, the second phase consists of gathering the detailed training needs for the organization.

Returning to FIG. 3D, the next task in FIG. 3D is to develop a training plan, step 332, as needed, to describe the organization's overall training approach. In step 332, the overall organizational approach to training is documented. The training plan formed in step 332 may include any of following sections/topics: Objectives; assumptions; overall training approach; training courses, modules, and topics; training timeline; training logistics; and training evaluation.

The next task in step 330, as illustrated in FIG. 3D, is to design training, step 333. In step 333, the training standards, templates, instructor and participant guides and the actual layout/format of training are developed. Specifically, the organization may develop the layout/format for the training materials. The development includes developing training development standards as well as templates for any instructor and participant guides.

Similarly, the next task in step 330, as illustrated in FIG. 3D, is to develop training, step 334. In step 334, course content is created using the materials compiled during the training design step 333. The organization may implement step 334 by creating the course content using the training development standards and instructor and participant guides. Other material created in step 334 may include "Train-the-Trainer" materials, visuals, job aids/handouts, and tracking documents. Using the training materials developed during step 334, the organization may deliver training, step 335, such as a Train-the-Trainer session, a pilot training session, and the actual training.

Returning to FIG. 3D, the next task in step 330 is to provide post-implementation support, step 336. In particular, during step 336, the organization should provide a short-term dedicated staff (e.g., one or two weeks) to support the users in applying what they've learned on the job. Furthermore, the support staff should be available to answer questions, identify and troubleshoot issues, and share best practices.

Throughout steps 200 and 300, as well as other steps in the CMM in a Box Method 10, the organization may need to commit to one or more actions (not illustrated) as required to achieve higher maturity levels in the CMM or the CMMI. Commit points are major decisions regarding reporting the progress of present work and obtaining authorization to continue. Commit points define the boundaries of each stage around key decisions related to content, context and course of action. For instance, a commit point may be implemented prior to the executing and design of an organization infrastructure in step 320, to require that the design of the new organization structure must be approved before further implementation can proceed.

Program Management

Figure 4A:
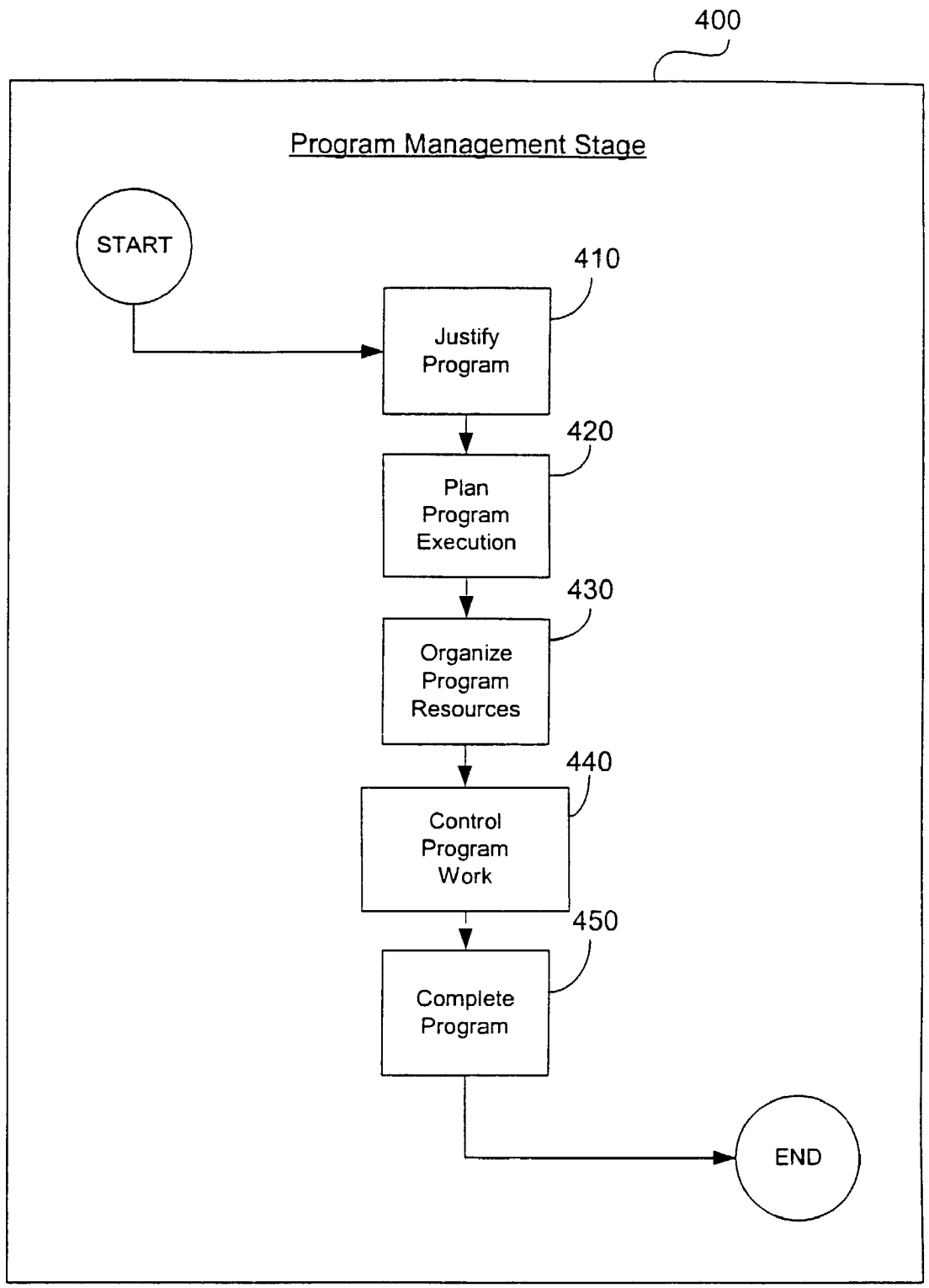
FIGS. 4A-4F are flowcharts depicting the steps of program management in accordance with embodiments of the method of FIG. 1.

Returning to FIG. 1, a second primary component of the CMM in a BOX method 10 of the present invention is program management step 400. Program management step 400 generally concerns activities directly related to the creation and refinement of a program for implementing the CMM in a BOX method 10. Specifically, program management 400 focuses on the continuous oversight needed to support the delivery of a business solution through multiple projects and releases. Appropriate disciplines, techniques, and tools are used in step 400 to plan and organize the work, and to manage the incremental delivery of the new business solution. As illustrated in FIG. 4A, the program management stage 400 generally comprises the steps of justifying the program (step 410); planning the program execution (step 420); organizing program resources (step 430); controlling program work (step 440); and completing the program (step 450). These individual steps are now described in greater detail.

As depicted in FIG. 4A, the organization may first justify the program, step 410. In step 410, a Program Business Case is prepared. The program business case approach is referenced to develop the business case. The business case is designed to secure stakeholder support for the program. Topics of the business case include the program's understanding of the current problem, the proposed solution to the problem that is to be implemented by the program, and a cost/benefit analysis. Justification of the program to all key stakeholders and sponsors helps in the successful execution, implementation and completion of the program. The program business case should provide economic justification for the change journey and for each program within the change journey. The program business case generally explains why the sponsoring organization should change, what value it receives by changing, and what steps are necessary for a successful change. The program business case addresses three main components, including business context and change imperatives, value impact analysis, and change journey. The tasks in the justification of the program in step are generally illustrated in FIG. 4B.

Figure 4B:
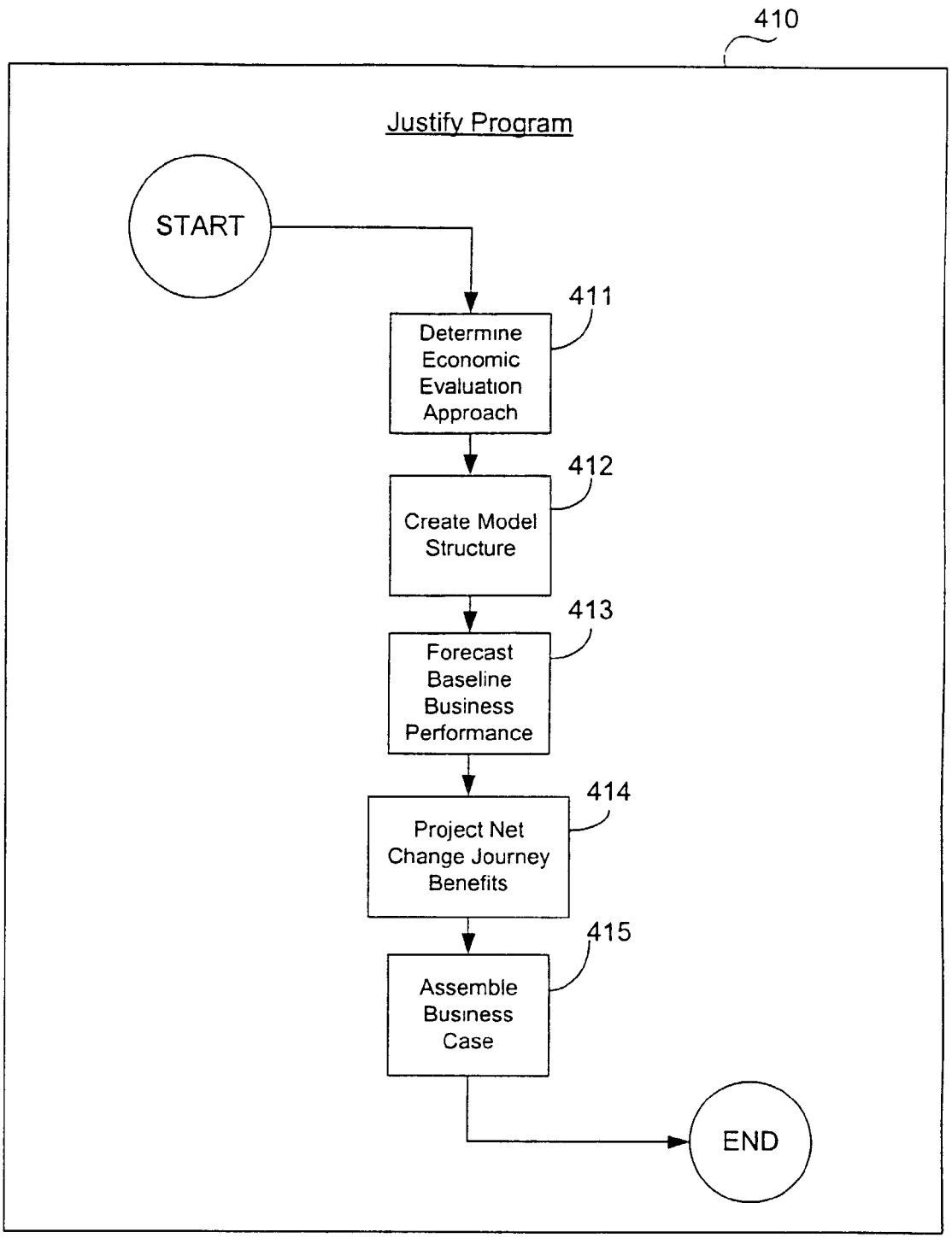

Referring to FIG. 4B, the organization first determines an economic evaluation approach, step 411, to obtain a "buy in" from the appropriate stakeholders in the sponsoring organization on the overall implementation approach for the program. Specifically, the organization tries to demonstrate the tangible benefits of a program to the affected parties. Step 411 attempts to show the process of implementing the program as an investment with positive, long-term benefits.

Returning to FIG. 4B, the next task in step 410 is to create a model structure, step 412. In step 412, the organization obtains internal agreement regarding the structure of the model used to determine the benefits of implementing the program. For example, benefits to be derived may be expressed in terms of increased market share or reduced operating costs. In this way, affected parties may communicate the program's effects in terms of similar measures of costs and benefits. As suggested in FIG. 4B, the organization may also attempt to justify the program by forecasting baseline business performance, step 413. In other words, the organization may attempt to determine how the organization and its comprising units would perform without implementing the program. Continuing with FIG. 4B, another task in step 410 is to project net change journey benefits, step 414. The organization performs step 414 to predict and quantify the benefits that will be derived from implementing the program.

The next step in step 410 is to assemble a business case, step 415, using the results assembled during steps 411-14. The organization may perform step 415 to document rationale for implementing the program. Ultimately, this documentation may serve as a motivational tool for change within the organization.

Figure 4C:
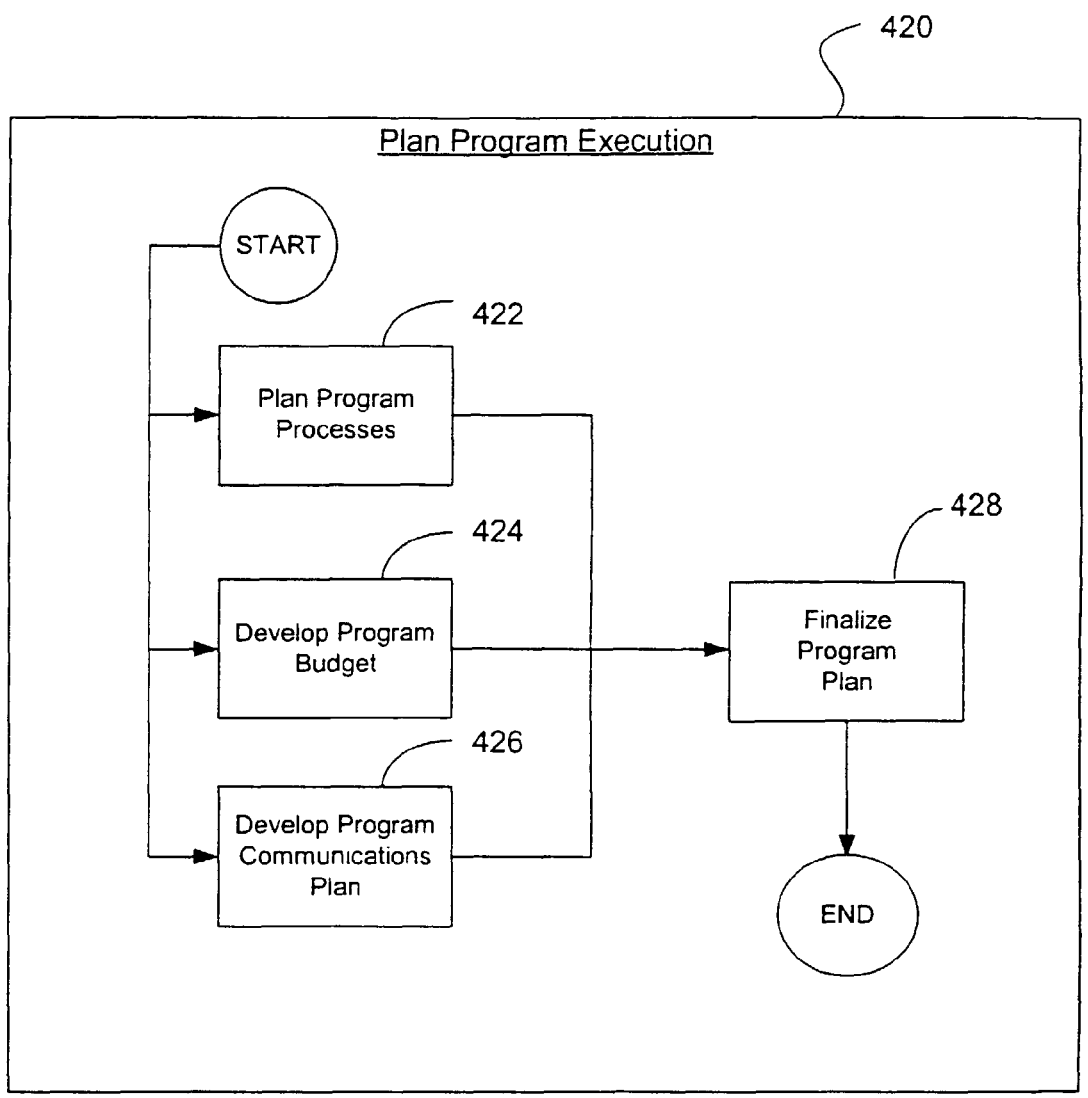

Returning to FIG. 4A, the next task in the program management stage 400 is to plan the program execution, step 420. During step 420, the organization develops plans for the program itself, financial management and resource management. Program approaches are referenced during the creation of these documents. These plans guide the continued implementation of the program and are what the program will monitor itself against during later tasks. The individual tasks of step 420 are illustrated in FIG. 4C. In step 420, the organization may develop a consolidated program plan, which documents the necessary tasks, effort, schedule, and costs for all releases of a business capability. The organization may also refine a program statement of work, and develop bottom-up project plans. Subsequently, the organization reconciles these plans with the top-down plans to generate a program baseline. The organization may have performed step 420 initially during program planning, in conjunction with or prior to the analysis stage 700 described below. Then, step 420 may be reinitiated during the course of the program as replanning is required by program management.

Looking at FIG. 4C, the first task of the plan program execution in step 420 is to plan program processes, step 422. The organization may specifically determine all the management processes necessary to support the program. These relate to resources, vendors, quality, configuration, releases, issues, problems, risk, finances, contingency, and performance reporting. The organization may establish and document goals and metrics for each management process. The organization should begin this task package at the start of the program, and refine the management processes as the program progresses. The organization may perform this initial planning at the program level to help ensure that there are no gaps or overlaps of activities. While all the activities within the Delivering phase may be required for a particular business capability, it is unlikely that all of the activities should fall within the scope of a single project team. If the initial distribution of the activities to project type is done at the program level, the risk of missing or duplicate activities is limited.

Returning to FIG. 4C, the next step in the plan program execution, step 420, is to develop a program budget, step 424. In step 424, the organization may establish a program budget that augments the cost baseline established in the program plan. The program budget provides the additional information needed by program management to manage the day-to-day financial affairs of the program.

Another step in the plan program execution, step 420, is to develop a program communications plan, step 426, as illustrated in FIG. 4C. In step 426, the organization may identify and plan messages to program personnel, key program executives, and other stakeholders in the program. In that way, step 426 addresses the communication needs within the program teams.

Subsequently, the organization performs the task of finalizing the program plan, step 428, as depicted in FIG. 4C. In step 428, the organization may assemble the composite program plan. The Program Plan compiles the outputs from the plan management process 422 with the development of a program plan in step 424. The organization may then obtain executive and other appropriate management understanding and approval of the fully elaborated program plan and its components. The organization further briefs all key stakeholders (i.e., executive management, and impacted business operations) to ensure their understanding of, and commitment to, the program plan. This is crucial, because following this task: (1) the program should be described to the organization, and (2) more personnel should be assigned to the program. The organization may then take this opportunity to resolve any unclear or incorrect stakeholder expectations.

Returning to FIG. 4A, the next step of the program management 400 is to organize program resources, step 430. During the step 430, resource requirements are analyzed and aligned so as to meet program objectives. As the program determines its resource needs, the Program Resource Request is completed to obtain the resources. Organize Program Resources is linked closely to planning the program's execution and pertains to staffing of the overall program. Under the Plan Program Execution task, the Program will plan for and deal with resource questions related to subordinate projects. Specifically, the organization may generally analyze resource requirements, initiate the procurement of goods and services, obtain human and physical resources from participating entities, assign these resources to projects, and release the resources upon project completion. The organization may perform step 430 throughout the life of the program created and implemented in step 400.

Figure 4D:
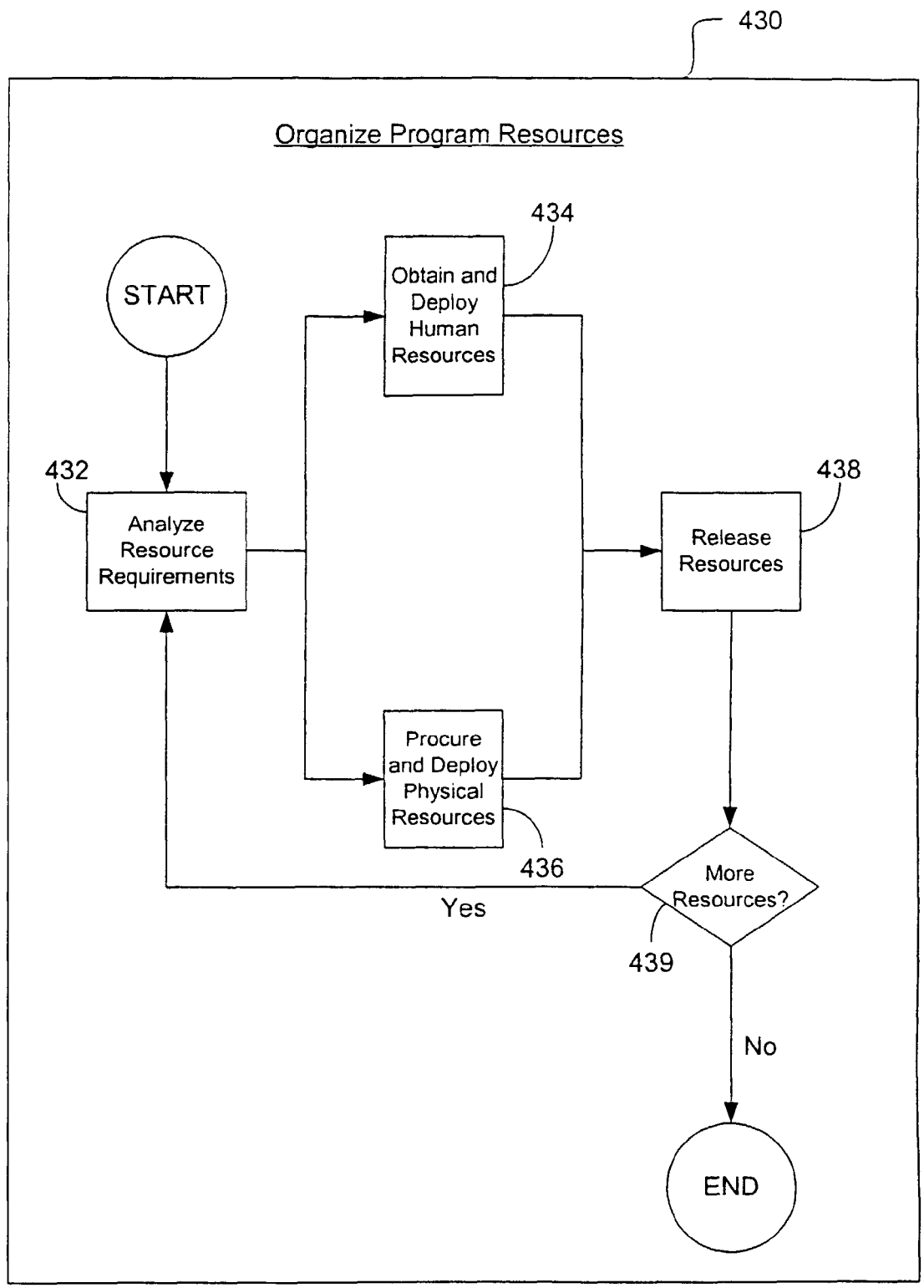

As illustrated in FIG. 4D, in order to obtain and deploy resources, the organization may analyze resource requirements, step 432. This task analyzes resource requirements as defined in a program management resource plan. Resource requirements are consolidated from project needs and should generally include desired resource provider (generally the organization itself), if previously determined, resource skill/type, and time period (such as monthly). Continuing with step 432, the organization may create a program resource management plan that forecasts resource needs by stage and capability release.

Returning to FIG. 4D, the organization may further obtain and deploy human resources, step 434. Human resources are obtained by initiating a request with the Human Resources Organization, interviewing potential candidates, and selecting the candidate that best fits the requirements. Human resources are then assigned to projects as they arrive at the program. This task, alternatively, may be assigned to the projects. The program resource management plan may reflect actual information regarding the resource request.

Returning to FIG. 4D, the organization may also procure and deploy physical resources, step 436. Physical resources are generally procured by initiating a resource request, evaluating the potential resources, and selecting the resource that best fits the requirements. Resources are then assigned to projects as they arrive at the program. The Physical Assets Inventory and the Program Resource Management Approach are generally both updated to reflect actual information regarding the resource request.

Referring again to FIG. 4D, the organization also releases resources, step 438. When human resources are assigned to projects, they receive a "roll-off" date indicating when these human resources are eligible for reassignment within or outside the program. If not reassigned inside the program, human resources are released to appropriate human resources departments for reassignment. Similarly, physical resource utilization is scheduled by each project, and these resources are returned upon completion of use. This process generally coincides with the completion of each stage of work. At that point, a determination should be made whether to retain or release the human and physical resources from the program. At this point in process 430, the entire process 430 may repeat if there are more program resources to organize, decision 439.

Figure 4E:
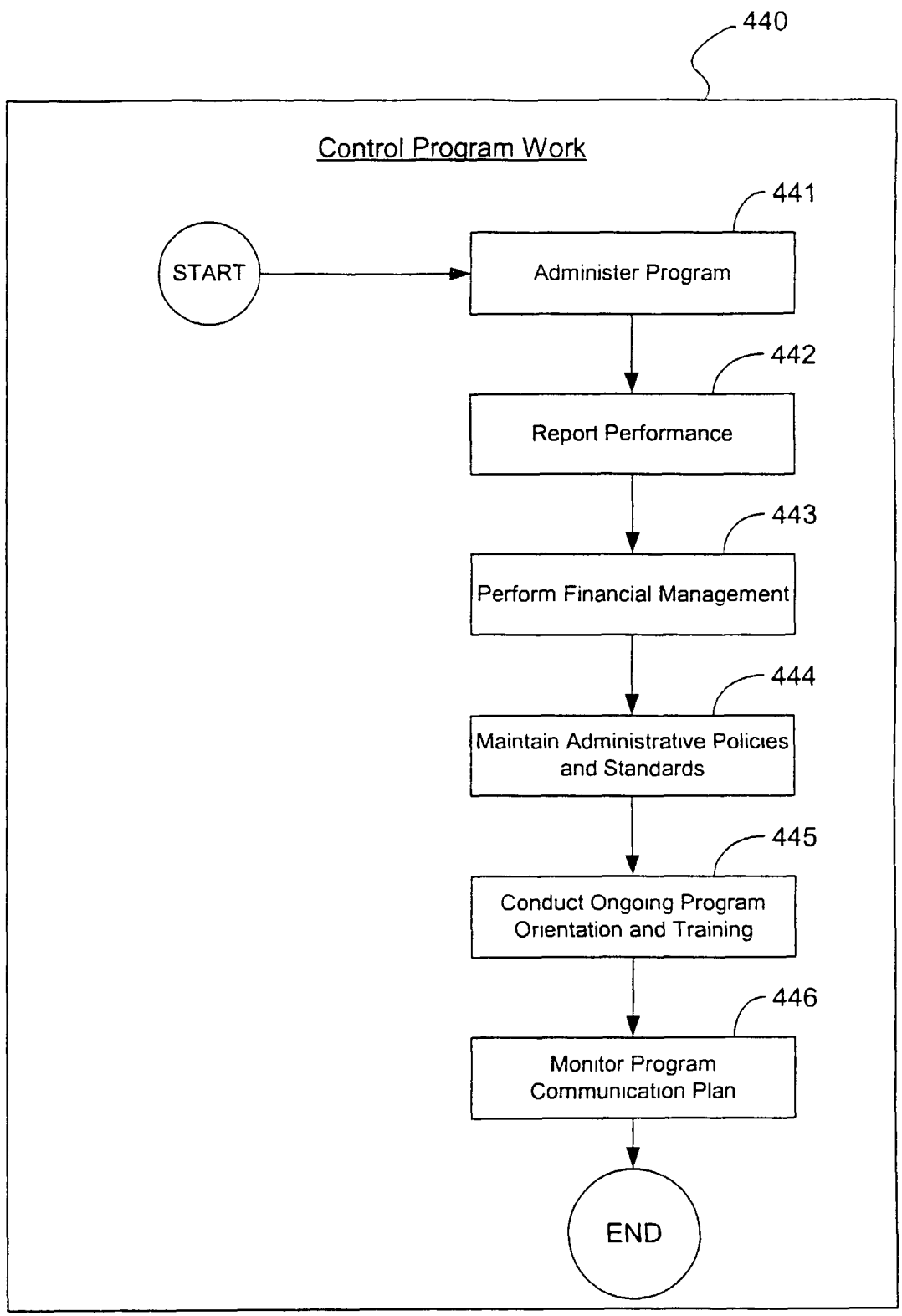

FIGS. 4A and 4E illustrate another step in the program management process, the control of program, step 440. In step 440, program management monitors program performance against program plans. Deviations from the plan are monitored. Corrective action is taken to resolve deviations as necessary. Program plans are updated to reflect modifications to the program. Step 440 generally provides leadership to guide the planning and execution of program work. In step 440, the organization may maintain key working relationships within the program, while monitoring and developing the skills and performance of program management team members. The organization may further identify and assess problems with program performance, and specify corrective actions as needed. The organization may evaluate program metrics to determine progress toward program objectives, and to determine whether or not the current metrics are still relevant. The organization may further assess whether or not the program is on track by reviewing program, project, and vendor performance.

The first task of step 440 is to administer the program, step 441 as illustrated in FIG. 4E. An effective program administration results in a planned, organized, and managed program management office performing a wide range of cost-effective activities. As required, the teamwork environment requirements list deliverable should be updated to reflect relevant changes in the program. Program leaders should also strive to maintain a culture that encourages program participants to achieve maximum results. Program leaders should also communicate the common program vision to inspire others to support program goals.

A second task in step 440 is to report performance, step 442, as illustrated in FIG. 4E. The organization may process and prepare reports for cost/schedule and other performance data (e.g., quality, risk, resource, etc.). This should involve a standard set of reports as defined in the program performance reporting approach section of the program plan. Any ad hoc reports requested by program management may also be prepared.

Returning to FIG. 4E, another task in step 440 is to perform financial management, step 443. Specifically, the organization may report, monitor, and account for the program's financial performance and results by performing the financial management functions as specified in the Program Financial Management Approach section of the Program Plan. Similarly, in step 444, the maintenance of administrative policies and standards, the organization may update and refine the administrative policies and standards on the basis of their effectiveness and the evolving needs of the program, as illustrated in FIG. 4E. The organization should further communicate the changes to the program team members.

Returning to FIG. 4E, the next task in step 440 is to conduct, as necessary, ongoing program orientation and training, step 445. In step 445, the organization may conduct periodic orientation and training sessions as new members join the program, as new types of training are required, and as team members need additional career development opportunities. Likewise, in step 446, the organization monitors a program communications plan to help to ensure that the appropriate groups accomplish their responsibilities. The program management office itself may also be responsible for performing some of the activities as directed in the program communications plan.

Figure 4F:
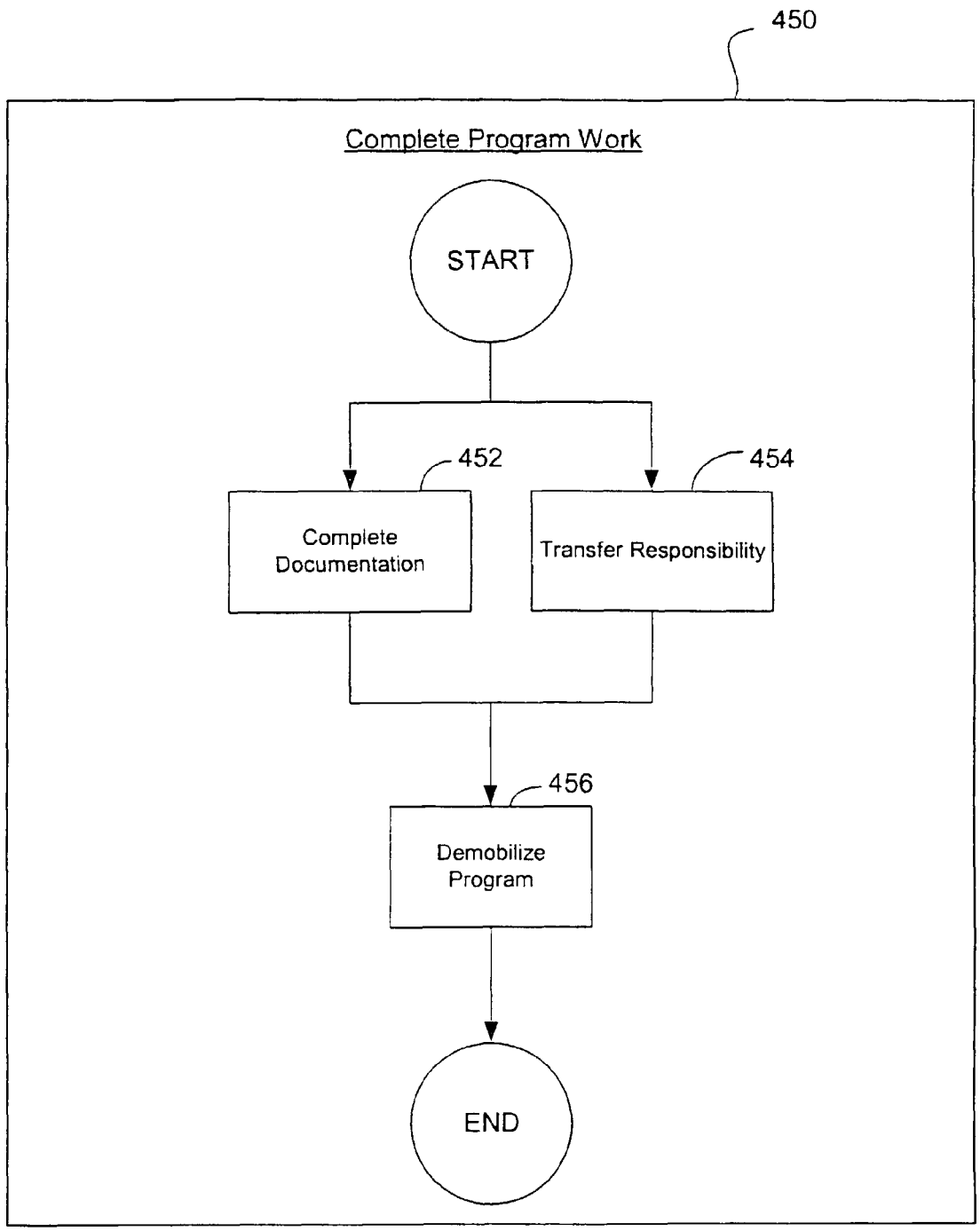

In another group of steps illustrated in FIG. 4F, the organization may complete the program, step 450. In step 450, a program closeout report is prepared along with other program closeout documentation. The program is demobilized and responsibility for the program is transferred to the necessary parties. The organization achieves an orderly and successful program closure by formally transferring responsibility for the solution components to the operational units, obtaining formal management acceptance of the competitive solutions delivered, releasing the remaining human and physical resources to their providing organizations/owners, and completing a disposition of all program documentation and other materials.

As illustrated in FIG. 4F, one step in the completing the product is to complete documentation, step 452. The activities needed to complete all program documentation include preparing any final documentation needed to close the program, including final cost, performance reports, etc. Additionally, a final review of the documentation is performed in step 452 to ensure that it is complete and conforms to program standards. The organization should also identify materials that should be shared across the organization, especially process improvements, methodologies, techniques, estimating models, and reusable components. The organization should also take steps to ensure that the materials are included in the appropriate repositories. The program documentation and other materials are transferred to any appropriate locations. Key deliverables are sent to the software engineering process group team, as determined. A summary of the program's final disposition, assets, records, and other appropriate, relevant information should be contained in the program closeout report deliverable.

Continuing with FIG. 4F, another step in the completion of the product is to transfer program responsibility, step 454. This activity transfers responsibility for the business capability to the appropriate organizational unit(s). Responsibility is assumed by the organizational units responsible for the continuing operation, maintenance, and use of the business capability and its underlying components.

Returning to FIG. 4F, another step in the completion of the product is to demobilize the program, step 456. The resources to be released include the remaining program participants and all facilities (including furniture and equipment). The human resources are returned to the organizational units that provided them. The physical resources are released or returned to their owners. Any remaining procurement agreements (purchase orders, contracts, leases, rental agreements, etc.) are closed out.

Project Management

Figure 5A:
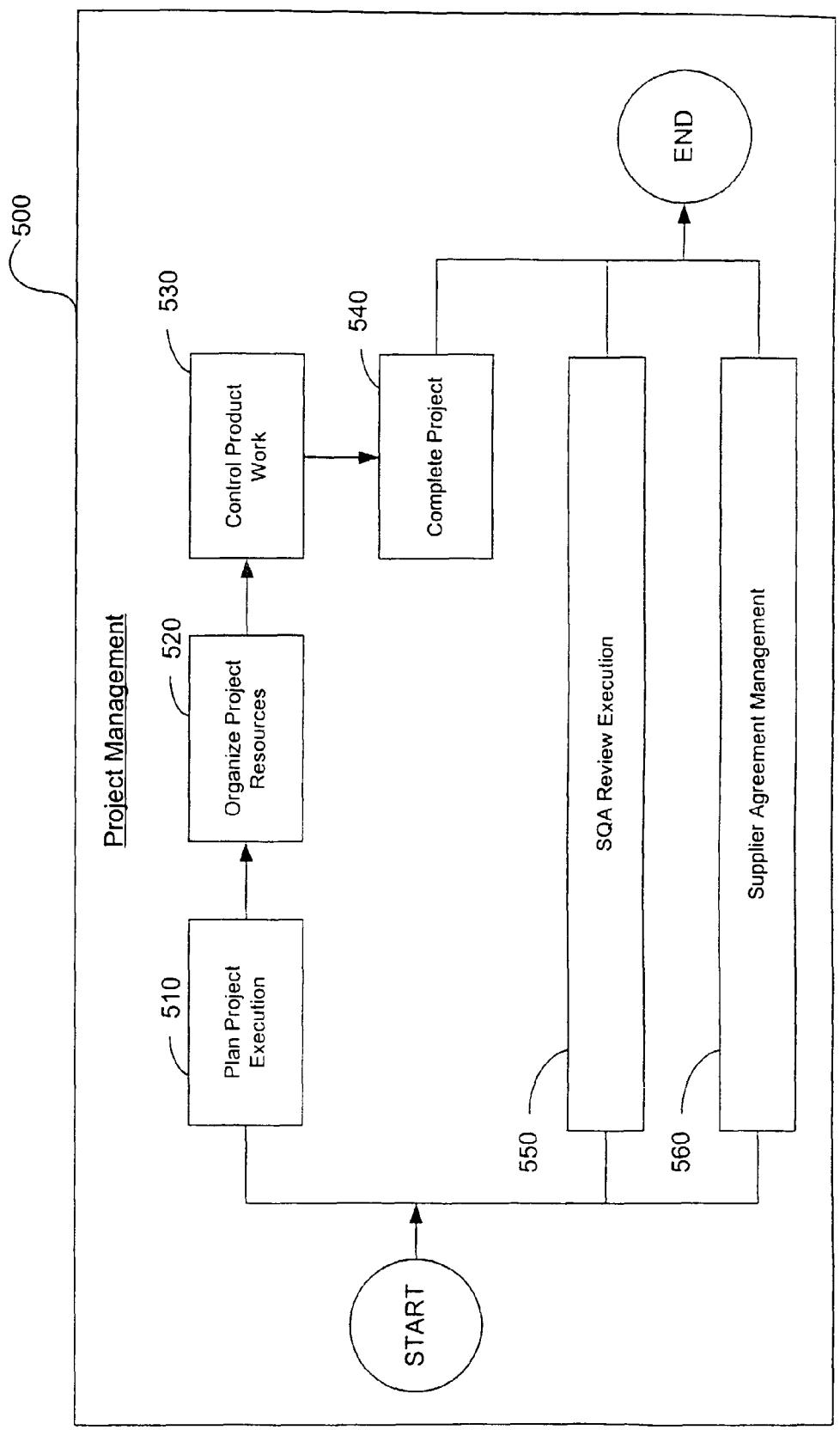
FIGS. 5A-5O are flowcharts depicting the steps of project management in accordance with embodiments of the method of FIG. 1.

Returning to FIG. 1, the CMM in a BOX method 10 generally calls for the organizations to concurrently perform project management 500 with the program management 400. The project management 500 is generally depicted in FIGS. 5A-5O. Project management 500 generally concerns activities and structures directly related to the creation and refinement of a project or product for sale. Project management 500 controls the delivery of the specific components from which a business solution is derived through the balanced management of Scope, Quality, Effort, Risk and Timeline (SQERT). Project management 500 focuses on making critical decisions and managing risk that will ensure the delivery of the promised scope, on time and within budget at the agreed-upon levels of quality. When a program management function exists, project management works closely with program management to execute the SQERT activities in relation to the delivery of multiple projects under one overall program. As illustrated in FIG. 5A, project management 500 generally includes planning of project execution (step 510); organization of project resources (step 520); control project work (step 530); completion of the project (step 540); an SQA review execution (step 550); and supplier agreement management (step 560).

Figure 5B:
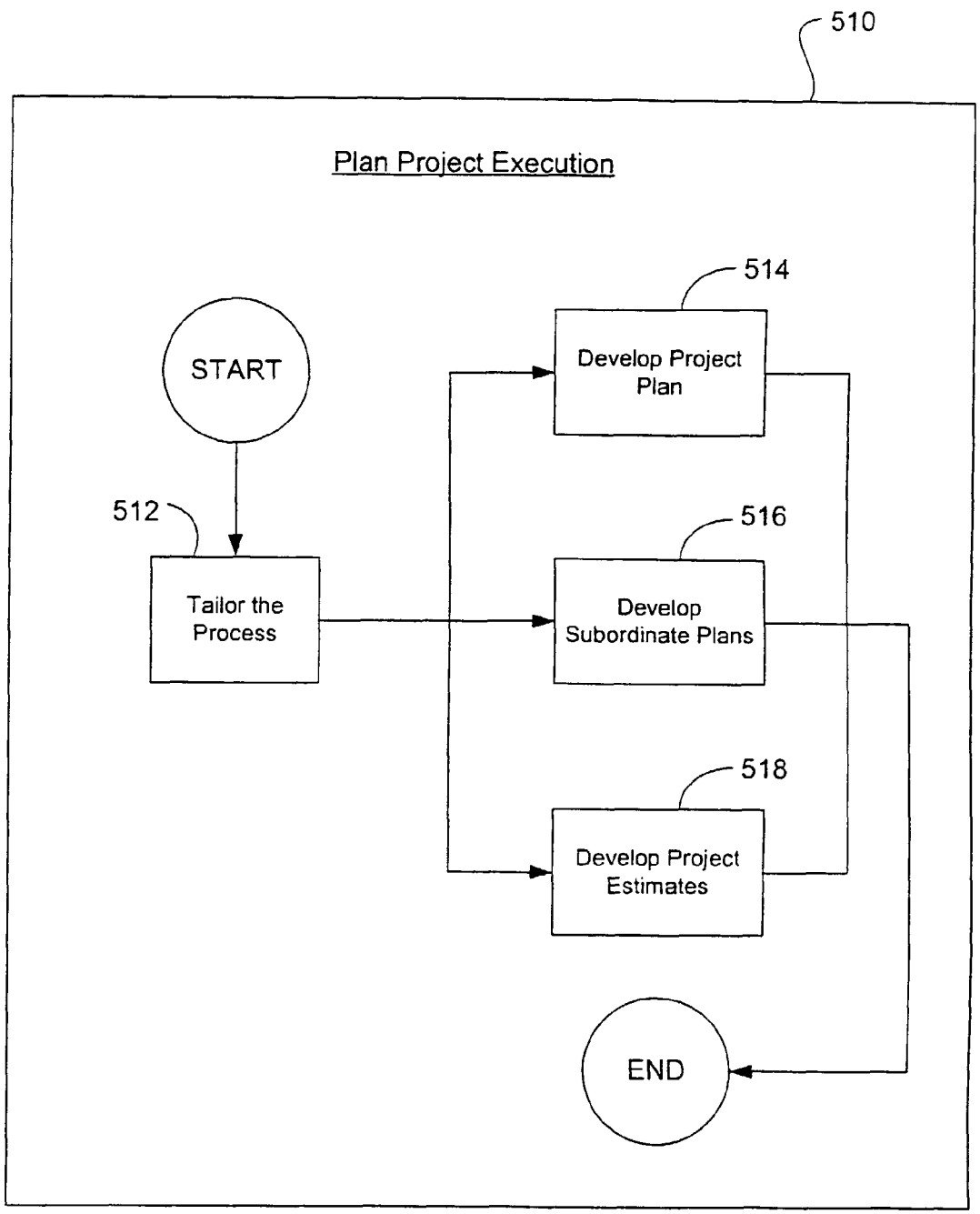

FIG. 5B presents the individual tasks required in the planning of project execution, step 510. The organization may perform this task package 510 at project initiation to define pieces of the initial Project Plan and subordinate plans that should be used to manage the execution of the project. The tasks associated with Plan Project Execution, such as planning and estimating, are performed throughout the project lifecycle at predefined decision points, and whenever replanning is required. During the planning of project execution in step 510, the organization may tailor the process, step 512, to suit a project's needs by using known tools or means. The organization may further request a waiver for any required steps that should not be followed on the particular project.

The organization may further implement the planning of project execution, step 510 through the development of a project plan, step 514, as illustrated in FIG. 5B. The organization may perform this task using a template to customize a specific project. The project plan describes the project approach for the project timetable, metrics, organization, supplier agreement management, communication and sponsorship strategy, training, quality initiatives, software system development process, configuration management, logistics, facilities, tools, and purchasing. The project plan also describes the project approach for training, metrics tracking, and roles and responsibilities on the project. The organization may further use a best practices matrix, a metrics plan, a DAR reference document, and a training needs matrix to develop the project plan, as defined in the CMMI. The DAR reference document describes the formal DAR process and provides guidelines for identifying DAR triggers, setting thresholds, and selecting the best techniques. This information should be used to complete the quality program section of the project plan. The metrics plan generally contains the list of required and recommended metrics that a project should include in the project plan.

The planning of project execution, step 510, continues in FIG. 5B with the development of subordinate plans, step 516. In step 516, the organization may develop the appropriate subordinate plans to satisfy the needs of the project. For instance, the organization may define, as needed, subordinate plans for subcontractor management, risk management, communication and sponsorship, and configuration management. All projects require the creation of a work plan, and an organization may create a bottom-up or task-level project work plan based upon estimates. Critical paths and dependencies are defined and managed within the project work-planning tool, such as the Microsoft Project and Project Workbench®.

Returning to FIG. 5B, the next step in plan project execution 510 is to develop project estimates, step 518. The development of project estimates in step 518 is analogous to the development of project estimates in step 218, as described above in FIG. 2B. Specifically, the organization may develop project estimates, step 518, using an estimating tool as a starting point for the estimates. For instance, estimates may be developed using the following steps: (1) tailor tasks and estimating model; (2) determine estimating factor values; (3) define work packages; (4) determine a timeline for the estimate; (5) reconcile a present estimate to an initial estimate; and (6) document assumptions used to form the estimates. The organization preferably further validates any estimates by verifying estimates against estimates or actual results from comparable projects. To form accurate estimates of available resources, the organization should further consider other resource-tapping activities, such as community involvement, recruiting, mentoring, and training, when evaluating resources.

Figure 5C:
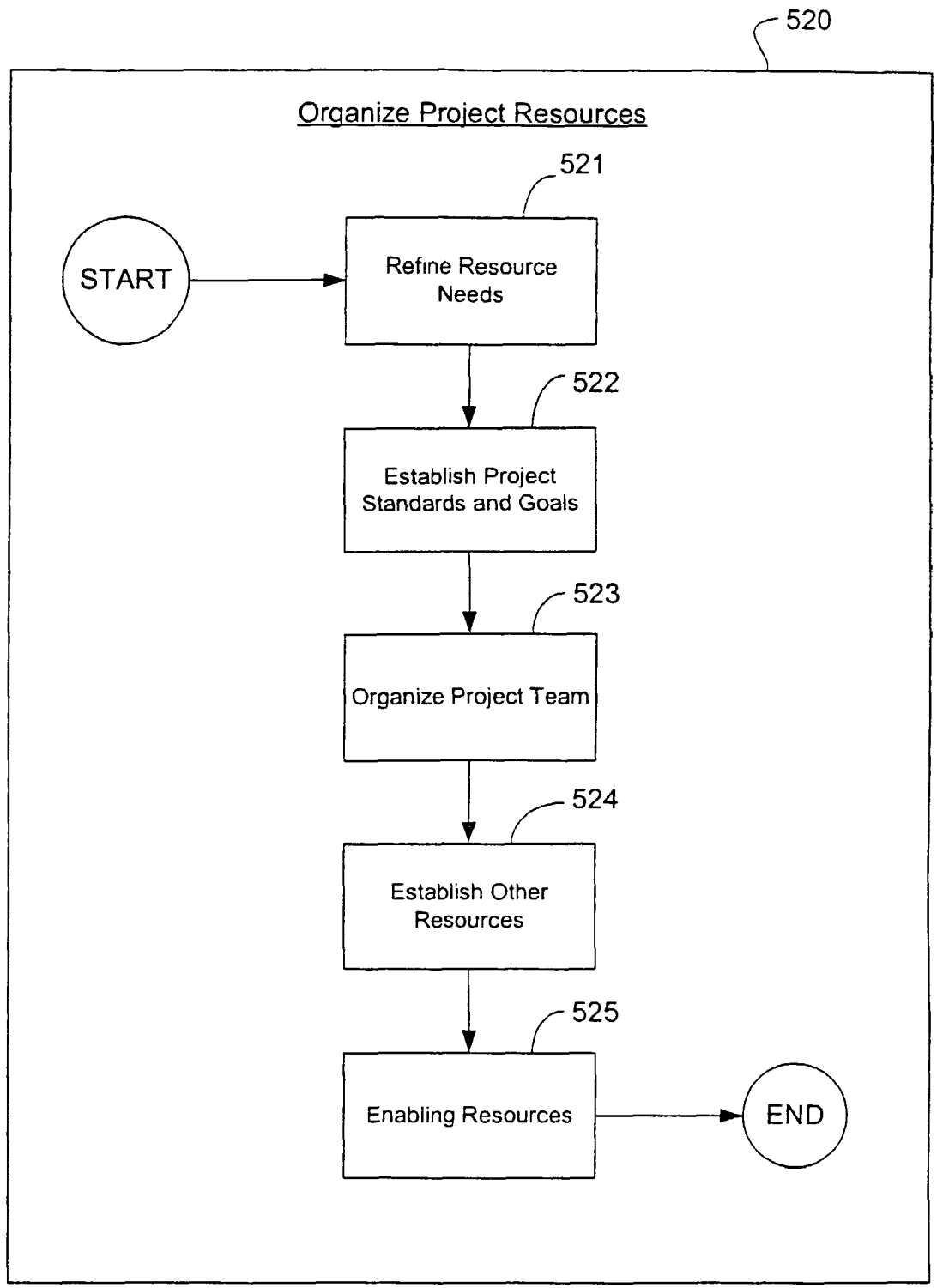

Another step of the project management 500 is to organize project resources, step 520, as illustrated in FIG. 5C. The organizing of project resources in step 520, as well as in substeps 521-25, are analogous to steps 220-25, described above in FIG. 2C. The organization can perform these tasks as needed to organize the project's human resources, establish other resources, to make work assignments, and to develop training enabling resources. In step 520, the project focuses on obtaining, assigning and training its human resources and establishing the project's other resources. This task is performed iteratively as needed to organize, mobilize and manage project resources throughout the execution of the project.

Turning to FIG. 5C, the first step in organizing the project resources in step 520 is to refine resource needs, step 521. In this step 521, the organization defines the team organization structure, schedules the work, and defines the human and physical resource needs of the project. These tasks are performed in view of each project's requirements. By refining resource needs in step 521, the organization helps to ensure that project staffing and facilities needs are met on a timely basis without affecting the completion date and the quality of the work. The organization may complete this refining of resource needs in step 521 by (1) determining project organization structure; (2) balancing a development schedule using human resource guidelines; and (3) refining physical resource needs that were outlined in the logistics, facilities, and tools section of the project plan formed in step 210.

Returning to FIG. 5C, the organization continues the organization of the process resources in step 520 by establishing project standards and goals, step 522. The establishment of project standards and goals in step 522 is accomplished by developing, modifying, and adopting administrative and project-specific project standards and procedures. Examples of administrative procedures are employee availability checklists, time accounting procedures, status reporting, vacation scheduling, etc. Project standards and procedures include design and development standards, and the use of project-specific tools. The establishment of these standards and procedures preferably improves the organization's communication, operating efficiency, and overall control of the project.

The organization continues the step of organizing the process resources, step 520, through organizing a project team in step 523, as also illustrated in FIG. 5C. The selection of project team members is based on project requirements. Other elements in the organization of a project team are the finalization of the project team's organization structure and documentation in the organization chart of the project plan. The organization should further update a training needs matrix to document (1) the training required of each project team member and (2) the proposed means for fulfilling the training. This document is used to track project team member training. In another implementation, organizing a project team in step 523 further requires the organization to determine, as a team, the project's mission, vision, and charter, and then to document these determinations in a project plan and orientation binder that is created as required for the CMM.

Returning to FIG. 5C, another task in the organization of project resources in step 520 is to establish other resources, step 524. Specifically, the organization performs this task to organize the physical resources, such as hardware or software, provided by program management and to develop the orientation and/or training needed to support the activities of the project team. The establishment of other resources in step 524 helps create a work environment that promotes communication, collaboration, and group cohesion.

Also as illustrated in FIG. 5C, the organization of project resources in process 520 further includes enabling resources, step 525. Organizations perform this step to orient and train team members, manage the physical resources assigned to the project, and coach and evaluate team members. The enabling of resources in step 525 aids the project manager in motivating and challenging team members and while helping to ensure that various project personnel believe their work to be important. Specifically, the organization should communicate the project's mission, vision, and charter to new team members. Large projects may also elect to formalize these items at the program level, and projects may conduct one or more meetings that include all team workers.

Figure 5D:
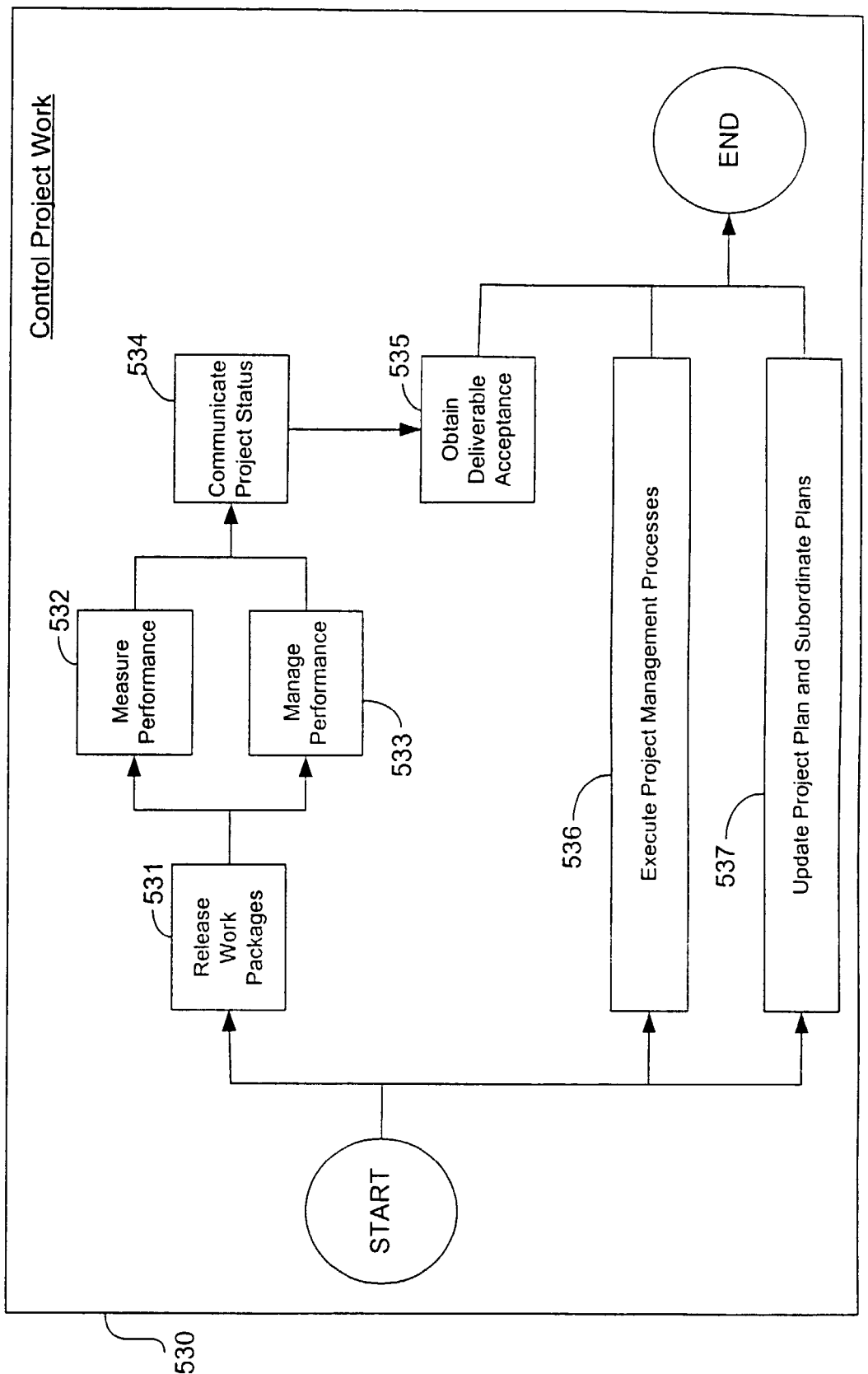

As illustrated in FIG. 5D, another step in the project management 500 is to control project work, step 530. In step 530, project management monitors the execution of the project against project plans and makes adjustments as necessary. Project Status Reports are prepared for the Project Sponsor. Potential and actual problems are identified through the measuring and monitoring of progress and performance against the Project Plan. Depending on the type of problem identified, an Issue, Risk, SIR or CR is logged. Project management is expected to take appropriate corrective actions to resolve problems that are discovered. Step 530 and constituting tasks 531-37 closely correlate, respectively, to steps 230-37, described in FIG. 2D and its accompanying text. The organization performs step 530 to control project execution throughout the project's life cycle. The control of project work in step 530 includes identifying potential and actual problems by monitoring and measuring progress against the project plan.

As illustrated in FIG. 5D, the controlling of project work in step 530 begins with the releasing of work packages, step 531. To release work packages, the organization should assemble and release work packages according to the work plan, and communicate their requirements to the assigned team members. Work packages are generally described in the CMM criteria and generally relate to the task and functions given to the various workers in a project. The project team then performs the work needed to develop the required deliverable good. During step 531, the organization preferably acts to ensure that each team member understands assigned responsibilities, including target dates and budgets. Furthermore, the organization should encourage each team member to provide input regarding various assigned responsibilities, including target dates and budgets, and to accept and carry out these assigned responsibilities.

As depicted in FIG. 5D, a following step in the control project work, step 530, is measuring performance, step 532. The measuring of performance in step 532 generally includes capturing actual results and calculation of metrics in order to manage performance. Capture metrics, as outlined in the organization metrics plan formed in step 510, include cost, effort, scope, quality, and schedule. The organization should further track project infrastructure/technical requirements, such as hardware, software, and performance requirements, that were outlined during planning in step 510. The organization should also analyze any deviations from the project plan and identify, in a timely manner, the causes for the deviations.

Concurrent with the measuring of performance in step 532 is managing performance, step 533, as illustrated in FIG. 5D. Managing performance in step 533 generally requires the organization to manage project performance against the previously defined project and work plans. To project performance in view of the project and work plans, the organization proactively assesses performance, status, quality, and risk. When the actual results from the development of the project do not match the plans, the organization should further determine alternative goals or actions. The implementing organization may further obtain approval for corrective actions, and then take corrective actions. The corrective actions may include, but are not limited to, work process changes, team building, training, increased or decreased supervision, work assignment changes, reassignment of team members, initiation of risk responses, the change of requests to be pursued with program management as part of the configuration management process, project replanning changes that specify needed modifications to the project plan, project plan revisions (work package changes, etc.) or escalation to program management. The organization should also reevaluate project decisions throughout the project life cycle, when project triggers or other issues, risks, etc. arise. In step 533, the organization may also manage team member performance according to organizational standards and tools.

Continuing with FIG. 5D, following the measuring of performance in step 532 and the managing of performance in step 533, the organization communicates project status, step 534. During the step 534, the organization generally develops and communicates project status to all project stakeholders according to the Project Plan. The project stakeholders include project and senior management and other affected groups. The organization further conducts status and review meetings involving affected groups as appropriate. During the communication of project status in step 534, the organization should document meeting minutes as required for the CMM.

Continuing with FIG. 5D, following the communication of project status in step 534, the organization obtains acceptance of interim deliverable goods, step 535. Obtaining acceptance of interim deliverable goods in step 535 generally requires that the organization obtain acceptance of interim deliverables by all designated stakeholders, as appropriate, at key interim points throughout the project life cycle. Any acceptance of final deliverables takes place in connection with completing the program.

Another task in the control of project work in step 530 is to execute project management processes, step 536. The organization should execute these processes in conjunction with other project control activities, such as measurement activities and status reporting. Also, the project management processes may occur continuously, periodically, or may be event driven. One project management process in step 536 is risk management, which addresses the identification, analysis, and avoidance/mitigation aspects of risk management on a project. One project management process is risk identification, during which the organization identifies, names, and describes the various risks. The organization should further generate a list of specific incremental risks in the project's risk-tracking tool. The organization documents known triggers for a risk, the potential damage for each risk item, and references for the sources of risk. Another risk management task in step 536 is risk analysis, in which the organization analyzes the identified risks. In risk analysis, the organization should classify the risks and include any additional information necessary to support the analysis. The organization may then select a rank/prioritized list of top risks. For instance, the organization may create a list of the top five risks to a project. Another risk management task is risk avoidance and mitigation. Risk avoidance activities address the sources of a risk, thereby reducing the probability that it should become a problem. For a top-ranked/prioritized risk, the organization should identify how the risk can be avoided. Risk mitigation measures attack the consequences of a risk, reducing the risk's potential impact on the project. For the top-ranked/prioritized risks, the organization may identify actions to reduce the impact of the risk if it occurs. The organization may also use DAR to assess the risks.

Another project management process in the execution of project management processes in step 536 is scope management, which addresses the acceptance of requirements to define scope and the requirements of change control process. For instance, one scope management task is requirements development. During the task of requirements development, the organization identifies and documents requirements needed to promote and ensure bi-directional traceability, so that the organization may trace requirements between the development and the testing of the requirements. As with all work products, requirements are preferably placed under configuration management (CM), as defined in the CMMI. Another scope management task is requirements acceptance, during which the organization documents and reviews requirements with all affected groups and obtains acceptance from the affected stakeholders. The organization should further establish baseline standards for satisfying the requirements. Another scope management task for the organization is to make any required changes to the requirements and their baselines. The organization generally follows the project's change control process for any changes to baselined requirements. Specifically, the organization submits a change request; reviews a change request; performs impact analysis, including cost, schedule, and efforts impacts; determines disposition; implements change, including associated impact to other work products and activities; and notifies requester and affected groups. Again, the organization may determine if it is necessary to use DAR to assess changes in scope.

Another project management process in step 536 in the execution of the project management processes is configuration management. This task addresses the set of activities performed to establish and maintain the integrity of the project work products throughout the project's life cycle. One set of configuration management tasks relates to configuration identification activities. During the configuration identification activities, the organization identifies, names, and describes each of the configuration items that should be placed under configuration management. In particular, all work products should be placed under some type of configuration management. During the configuration identification activities, the organization generally uses the CM plan to define a baseline for the configuration items and to indicate the level of configuration management for each item. Another configuration management process in step 536 is configuration of control activities. Generally, the organization requests, evaluates, approves or disapproves, and implements changes to the baselined configuration items defined during the configuration identification activities. All of the configuration items should be archived and placed under the project's documented change control process. Configuration of status accounting activities is another configuration management process in step 536. During this process, the organization records and reports the status of the project's configuration items using a configuration management status report. Similarly, the organization should further perform configuration audits. Specifically, the organization may, using the CM plan, determine the extent to which actual configuration items reflect the planned configuration items. The purpose of this task is to ensure that the entire configuration is correct and complete. The organization should further document results as required in the CMMI, using a configuration audit.

Another project management process of the execution of the project management process in step 536 is issue management and escalation. This task involves the identification and documentation of issues using an issue tracking tool, as well as a review of the issue and an analysis of any impact on deliverables, scope, contingency, resources, costs, schedule, and/or quality. Specifically, the organization should identify a resolution approval party, an issue's owner, and determine expected time frames. The organization may also determine if it is necessary to use DAR to assess the issue, as described above. The organization may further research and identify issue solution alternatives. Subsequently, the organization may refer the issue to program/senior management when: (1) the project manager cannot resolve the issue internally, (2) when the issue impedes the progress of a project, and when the issue is beyond the authority of the project manager to resolve. These are generally issues that (1) cannot be resolved within a project team, (2) are resolvable with action items, (3) can be escalated to the next level, (4) are reactively discovered during the course of development, (5) affect program/project scope, costs, schedule, projected business performance, or high-level design, (6) affect multiple projects or releases, and/or (7) involve groups outside the project that affect project delivery. The organization should accordingly monitor issues status while approving or rejecting resolutions. At the same time, the organization should communicate resolutions to stakeholders and affected parties and take corrective action as described above in the context related to management of performance tasks.

Returning to FIG. 5D, another step during the process of controlling the project work in step 530 is to update the project plan and subordinate plans, step 537. In particular, throughout the life cycle of the project, the project plan and subordinate plans (Risk Management, Configuration Management, Work Plan, Subcontractor Management Plan, Community, and Sponsorship Plan) should be updated as appropriate, by the organization to reflect any changes on the project that should affect the content of the documentation.

Figure 5E:
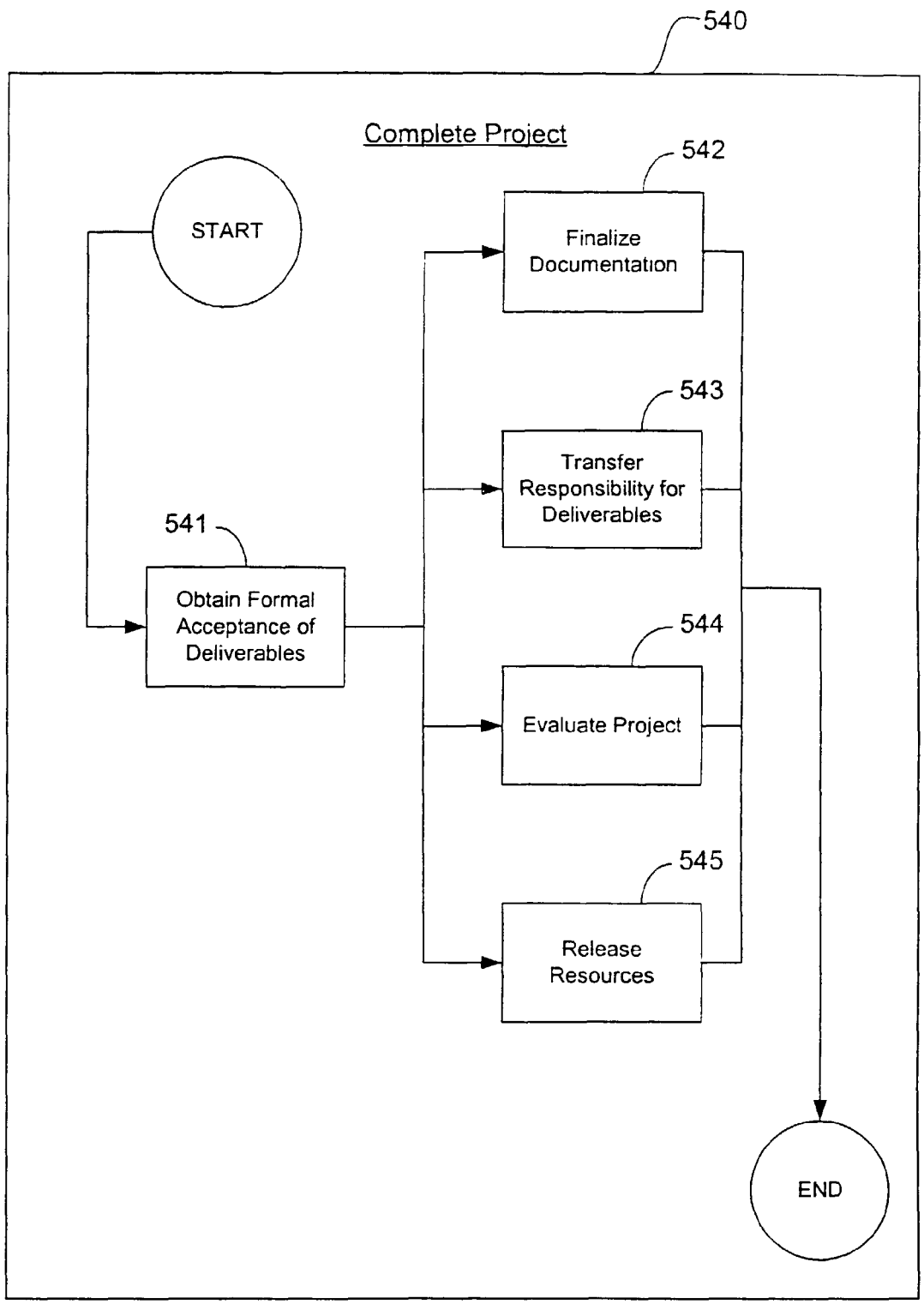

Another step of project management 500 is to complete the project, step 540, as illustrated in FIG. 5E. In step 540, project closeout is performed and overall project results are evaluated. Project Management verifies that all activities for a project are complete so that all resources can be released and all documentation and responsibilities can be transferred to the necessary parties. In this way, step 540 enables Project Management and the Project Sponsor to measure the success of the project and use results of the project as inputs to future efforts. A first step in completing the project in step 540 is to obtain a formal acceptance of deliverable(s), step 541, and this task 541 entails obtaining sign-offs on the final deliverables from the appropriate stakeholders. In effect, each stakeholder should agree that the project is, in fact, complete. Another step in completing the project during step 540 is the preparation of final documentation, step 542, in which the organization completes final revisions and packaging of deliverables. Likewise, the organization furthers the completion of the project in step 540 by transferring responsibility for deliverables, step 543, to formally transition responsibility for the deliverables to the appropriate parties. The transfer of responsibility for deliverables in step 543 generally includes the transition of training materials, operations manuals, and other supporting documents.

Continuing with the completion of the project in step 540, the organization evaluates the project, in step 544, by assessing the success of the project, summarizing the project's accomplishments, discussing/documenting any items for improvement, and channeling the resulting information through the appropriate quality management process. The various results of the evaluation of the projects in step 544 should be recorded in a closing memo, as specified in the CMMI. The results of the evaluation may include (1) reviewing the project work plan; (2) updating the estimates; (3) sending the project's actual results to the owners of the estimating tool; (4) submitting final project metrics to the Software Engineering Process Group (SEPG); and (5) conducting an SQA debriefing to discuss results of the SQA program and also process improvement points. Another step in the completion of the project, step 540, is to release resources, step 545. The organization performs step 545, for instance, to "roll off" human resources from the project and to return equipment and supplies to the appropriate custodian, thereby freeing these resources for use on other projects.

Figure 5F:
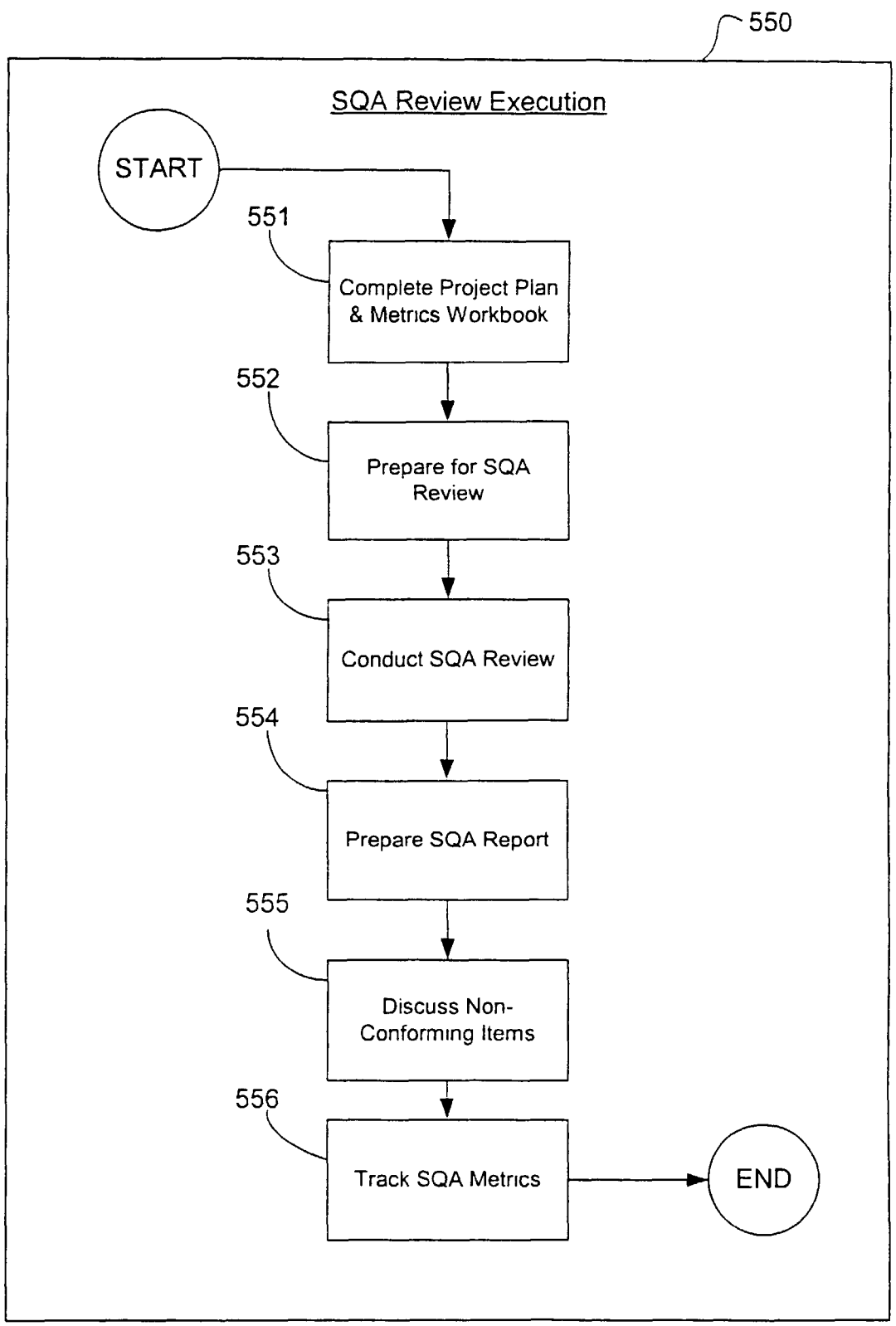

Returning to FIG. 5A, the next task in the project management 500 is software quality assurance (SQA) review execution, step 550, the substeps of which are illustrated in FIG. 5F. During the SQA review execution of step 550, the organization may conduct software process and work product quality assurance reviews to verify project adherence to standards and procedures. The first step of the SQA review execution 550 is to complete a project plan and metrics workbook, step 551. In this way, the project manager and SEPG liaison are encouraged and required to identify deliverables and processes to be reviewed; ensure that deliverables in the Project Plan and Work Plan are consistent; identify reviewers, reviewees, and review criteria; identify roles and responsibilities; identify SQA metrics; complete the quality program section of the project plan; and update the metrics workbook with the SQA review schedule.

Another step of the SQA review execution 550 is to prepare for an SQA review, step 552. In the SQA review, the project manager provides job accounting information to the SQA reviewer and sets SQA review expectations. In preparation for the SQA review during step 552, a deliverable owner (i.e., a party responsible for producing a deliverable product or service) provides the deliverable to be reviewed, where "deliverable" is defined in the CMMI. The deliverable owner further provides contact and availability information to the SQA reviewer and provides review criteria and standards to the SQA reviewer. In response, the SQA reviewer gathers the deliverable product or service, reviews the proposed review criteria and standards, schedules a meeting with the deliverable owner, and receives job accounting information from the project manager.

Returning to FIG. 5F, another step of the SQA review execution 550 is to conduct the SQA review, step 553. During the SQA review in step 553, the SQA reviewer generally reviews deliverables against review criteria/standards, identifies nonconformance items, and follows up with the deliverable owner as needed to meet the requirements of the CMMI. At the same time, a SEPG liaison reviews the project management deliverables against a best practices matrix. For the CMMI, the deliverable owner should be able to continue answering any questions.

Another step of the SQA review execution 550 illustrated in FIG. 5F is to prepare the SQA report, step 554. The SQA reviewer prepares a detailed summary of findings and recommendations, including item number, date reported, and an accurate description of nonconformance items. The SQA reviewer then distributes the SQA report to the deliverable owner and the SEPG liaison. The deliverable owner should then document responses in the SQA report template.

Continuing with FIG. 5F, another step of the SQA review execution 550 is to discuss nonconformance items, step 555. Specifically, the organization should require the deliverable owner to discuss any nonconformance items with the SQA reviewer. In addition, the deliverable owner updates the SQA Report with proposed resolution(s) and projected completion date(s) for agreed upon items. The deliverable owner also escalates disagreement items for facilitation and updates a return report, as well as any necessary documents to the SQA reviewer for verification. In response, the SQA reviewer should discuss nonconformance items with the deliverable owner and verify the resolution of nonconformance items. During step 555, the SEPG liaison and the project management should also resolve escalated nonconformance items and resolve, on a case-by-case basis, any issues that may arise due to scheduling conflicts between the SQA reviewers and the deliverable owners.

Continuing with FIG. 5F, another step of the SQA review execution 550 is to track SQA metrics, step 556. In step 556, the SQA reviewer sends the final report to the deliverable owner and the SEPG liaison. At this point, the SEPG liaison may update an SQA tracking tool and forward the final report and metrics to the project sponsor and project manager. Typically, the SEPG liaison includes metrics such as the SQA schedule variance; the number of nonconformance items; the cost/savings of the SQA program; the value added by conducting SQA reviews; and a best practices percentage showing compliance with desired best practice policies. As required by the CMMI, the project manager keeps copies of documentation and reports.

Figure 5G:
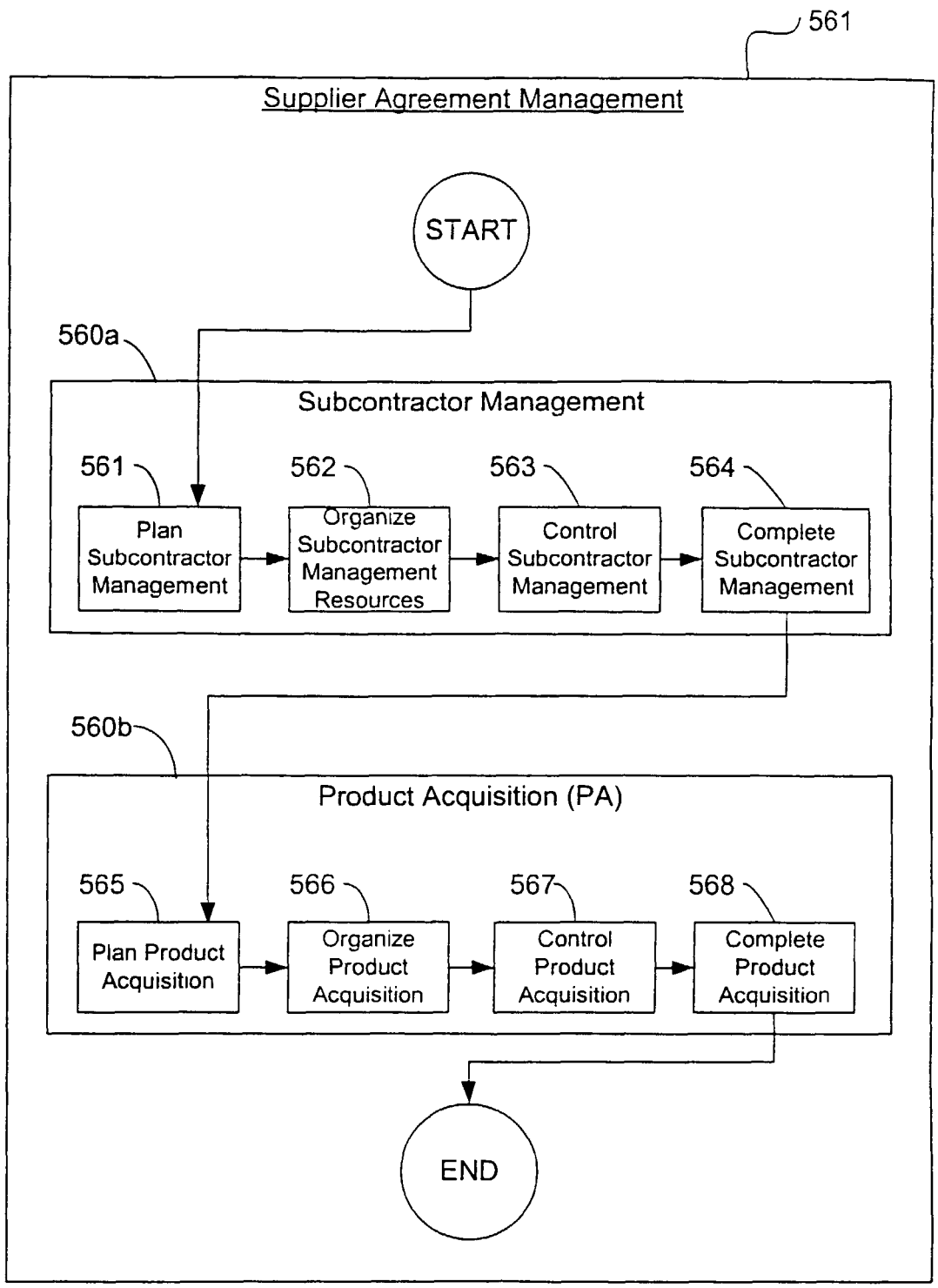

Another aspect in the project management 500 is supplier agreement management, step 560, which is generally illustrated in FIG. 5G. The supplier agreement management 560 comprises subcontractor management in step 560(*a*) and product acquisition in step 560(*b*). Specifically, the subcontractor management in step 560(*a*) comprises the tasks of planning subcontractor management, step 561; organizing subcontractor management resources, step 562; controlling subcontractor management, step 563; and completing subcontractor management, step 564, as illustrated in FIG. 5G. Likewise, product acquisition in step 560(*b*) comprises the tasks of planning product acquisition, step 565; organizing product acquisition, step 566; controlling product acquisition, step 567; and completing product acquisition, step 568, as depicted in FIG. 5G.

Figure 5H:
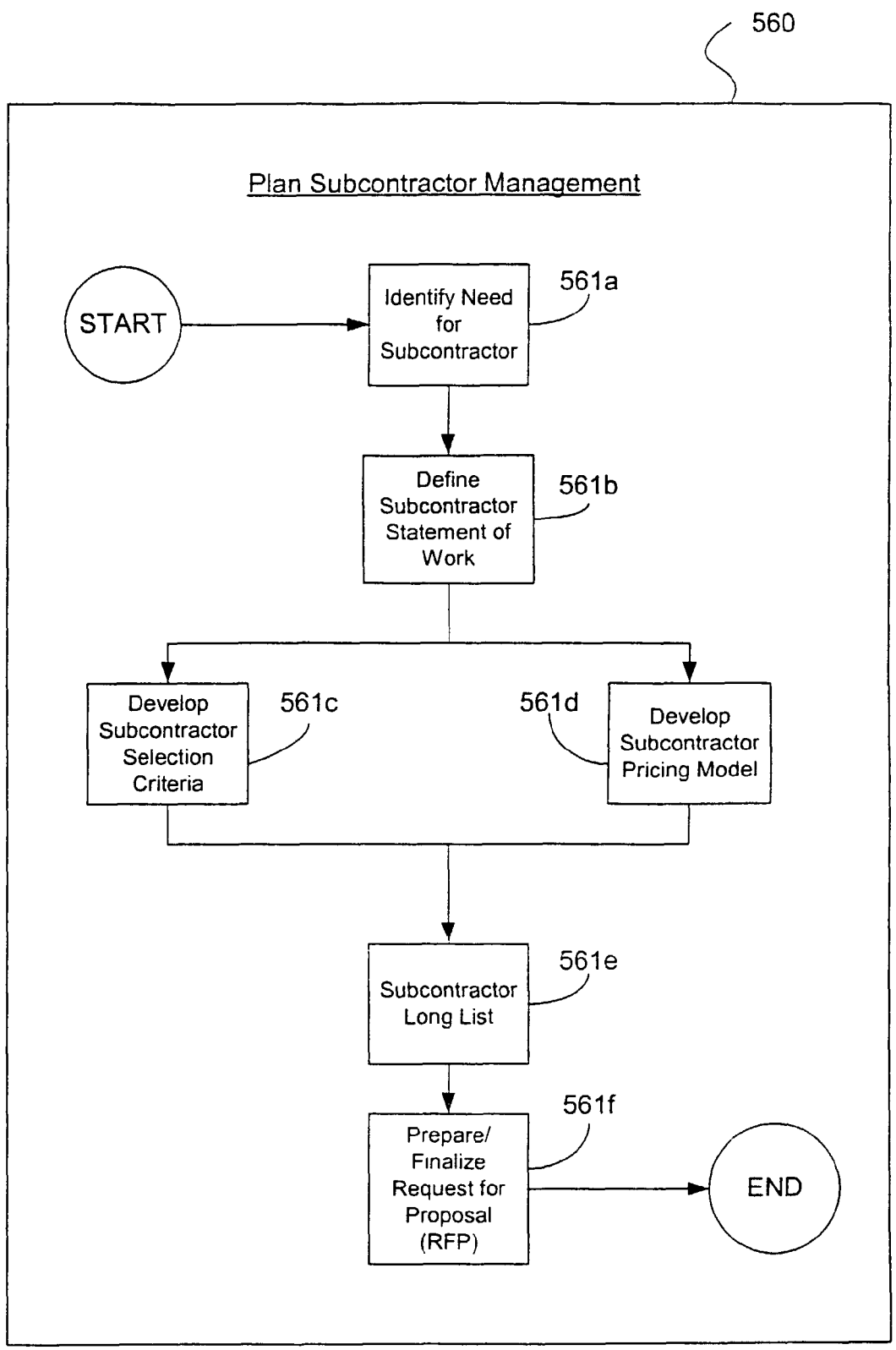

FIG. 5H depicts that tasks 561(*a*)-561(*f*) comprise the planning of subcontractor management in step 561. In step 561, project management plans for the project's use of subcontractors including developing criteria to be used for subcontractor selection. The first task in step 561 is to identify the need for a subcontractor, step 561(*a*). In step 561(*a*), the organization identifies a need for a subcontractor. Before the need for a subcontractor is determined, the business requirements for the project should be defined. The objective is to describe "what needs to be done and/or achieved" and which development team/s should be instrumental in implementing this requirement. The supporting analysis and research provide input with regard to the requirements, including the current capability analysis, constraint analysis, best practice research, and potential delivery options. If the project team does not have the resources to satisfy these requirements, then a subcontractor should be considered. Again, the organization may use DAR if necessary to evaluate the need for a subcontractor. If a subcontractor is needed, the organization should update the supplier agreement management section of the project plan with a description of the subcontractor arrangement. The organization may then prepare the subcontractor management plan.

Returning to FIG. 5H, the organization's next action during the planning of subcontractor management in step 561 is to define a subcontractor statement of work (SOW), step 561(b). The subcontractor SOW should clearly define the scope and objectives of the subcontract, the process that should be used to manage the subcontractor, and any standard contract clauses. The SOW should also provide as much detail as possible about the planned subcontract, including the contract monitoring process, the quality management process, the configuration management process, and the contract closure process. A proposal/project team is generally responsible for identifying the technical requirements that the subcontractor should satisfy.

As depicted in FIG. 5H, the organization's next action during the planning of subcontractor management in step 561 is to develop subcontractor selection criteria, step 561(c). Prior to assessing subcontractors, the organization should define the selection criteria. Whereas some criteria should be generic, such as quality, service, value, and past performance, there is greater value in defining specific criteria that apply to different categories of assets and services to be procured, especially those criteria concerning longer-term cost considerations. Selection criteria should also reflect defined business needs. To satisfy this step 561(c), the proposal/project team should create the subcontractor selection criteria using the template provided.

Next, in step 561(d), the organization should develop a subcontract pricing mode. In general, after defining the statement of work, it is necessary to establish the type of contract that will be used for the subcontract. It is important to determine the type of contract early in the process, as it has a fundamental impact on the subcontractor's proposal and economics of the program. This work should be closely coordinated with the development of the contract strategy.

Returning to FIG. 5H, the organization's next action during the planning of subcontractor management in step 561 is to create a subcontractor long list, step 561(e). Using the subcontractor selection criteria template provided, the organization in step 561(e) identifies the long list of subcontractors that will be invited to propose. This list may be based on the following criteria: satisfaction with existing/previous subcontractor work, market share of the subcontractor, industry reputation of the subcontractor, proximity of the subcontractor, availability of the subcontractor, financial status of the subcontractor, etc.

As depicted in FIG. 5H is the prepare/finalize request for proposal (RFP), step 561(f). The RFP should be created in step 561(f) after the need for a subcontractor has been established in step 561(a), the statement of work has been defined in step 561(b), the selection criteria have been established in step 561(c), the pricing model has been established in step 561(d), and the appropriate terms and conditions have been established. The RFP should be finalized with input from all relevant stakeholders.

Figure 5I:
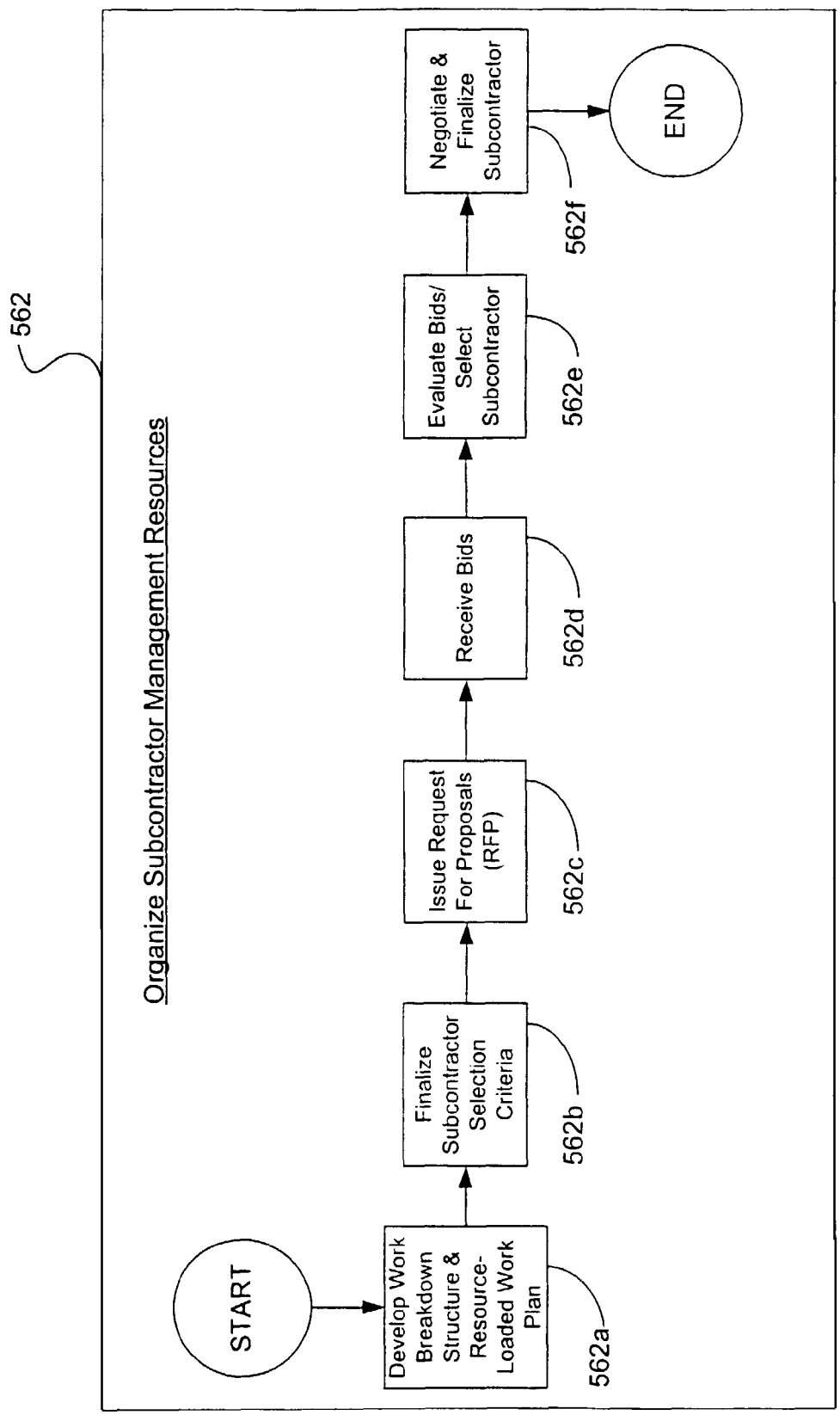

As depicted in FIG. 5G, the next task in the supplier agreement management in step 560(a) is to organize subcontractor management resources, step 562. The organization performs step 562 to organize resources associated with subcontract management. In step 562, the project Work Plan is updated to account for subcontractors. Tasks that will use subcontractor resources are documented. Subcontractor Selection Criteria are finalized and a subcontractor is selected. Turning now to FIG. 5I, the organization of subcontractor management resources in step 562 comprises the tasks of developing work breakdown structure (WBS) and a resource-loaded work plan, step 562(a); finalize subcontractor selection criteria, step 562(b); issue a request for proposal (RFP), step 562(c); receiving bids, step 562(d); evaluating bids to select a suitable subcontractor, step 562(e); and negotiating and finalizing a subcontract, step 562(f). It should be noted that steps 562(a)-(e) in the flow chart in FIG. 5I represent the potential tasks that would be completed to select a subcontractor, but many of these steps may be omitted based on project requirements.

In the development of the WBS and resource-loaded work plan of step 562(a), the WBS decomposes each business capability into manageable units and depicts the total scope of the solution needed to achieve the program/project objectives. The work plan sets out the major work processes and constituent units of work that will be used to accomplish the project. The resource-loaded work plan then matches available resources with each task in the work plan. Both the WBS and the resource-loaded work plan should document the tasks that will be completed using subcontractor resources.

In step 562(b), the organization should finalize subcontractor selection criteria, as depicted in FIG. 5I. In step 562(b), the organization updates the subcontractor selection criteria established during the plan subcontractor management of step 561 to finalize the criteria that will be used to evaluate subcontractor proposals. Continuing with FIG. 5I, during step 562(c), the organization next issues an RFP and distributes the RFP to a list of subcontractors identified for solicitation in step 561(e). The organization then receives bids, step 562(d), to gather proposals from subcontractors.

The organization should then evaluate the bids and select a suitable subcontractor, step 562(e) in FIG. 5I. In particular, as bids are received from subcontractors, the responses should be entered into a subcontractor selection criteria matrix to facilitate the evaluation process. Evaluators should also review the potential risks associated with each subcontractor. Once all responses have been entered into the matrix and all potential risks have been assessed, a selection can be made by the organization.

The organization should next negotiate and finalize a subcontract, step 562(f) in FIG. 5I. After the subcontractor is selected, it may be necessary to make additional negotiations to finalize the contract. As a result of finalizing the subcontract, it may be necessary to update the project plan and/or subcontractor management plan with any new conditions, such as the need to provide project-furnished facilities.

Returning to FIG. 5G, the next step in the subcontractor management in step 560(a) is to control subcontractor management in step 563. In step 563, the organization acts during project execution to monitor and control subcontractor activities for subcontractors that do not function as part of the project team. Subcontractors that work as part of the project team follow the processes outlined in the step of control project work in step 530. In addition, there should be regular status meetings with the subcontractor. During step 563, the work and work products of subcontractors are monitored through visual observation and/or Subcontractor Status Reports. Corrective action is taken as problems arise.

Figure 5J:
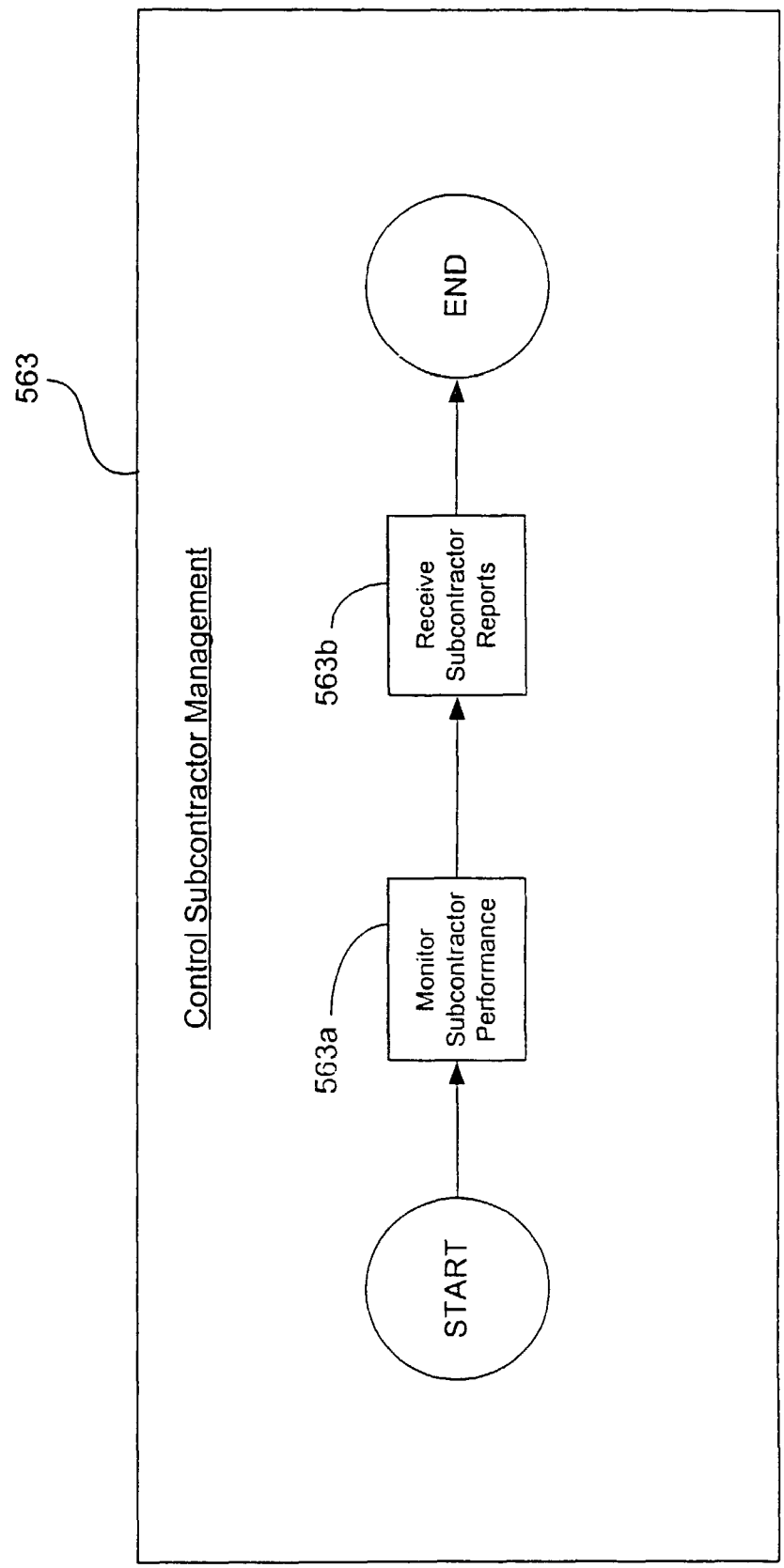

Substeps 563(a)-(b) of the control subcontractor management in step 563 are depicted in FIG. 5J. Specifically, in step 563(a), the organization monitor subcontractor performance: The project manager or designated team member overseeing the subcontractor should observe the subcontractor's performance on a regular basis and manage all communications with the subcontractor. If the subcontractor fails to perform as expected (e.g., late delivery, poor quality, etc.), the organization should act to remedy these failures to minimize their harmful effects on the project.

Likewise, in step 563(b), the organization should receive subcontractor reports, as illustrated in FIG. 5J. The subcontractor should submit all reports to the project team as specified in the subcontract. This may include status reports, turn-around documents, invoices, metrics, etc. These reports should be used to track subcontractor performance against the work plan and schedule milestones and evaluate quality of work.

Figure 5K:
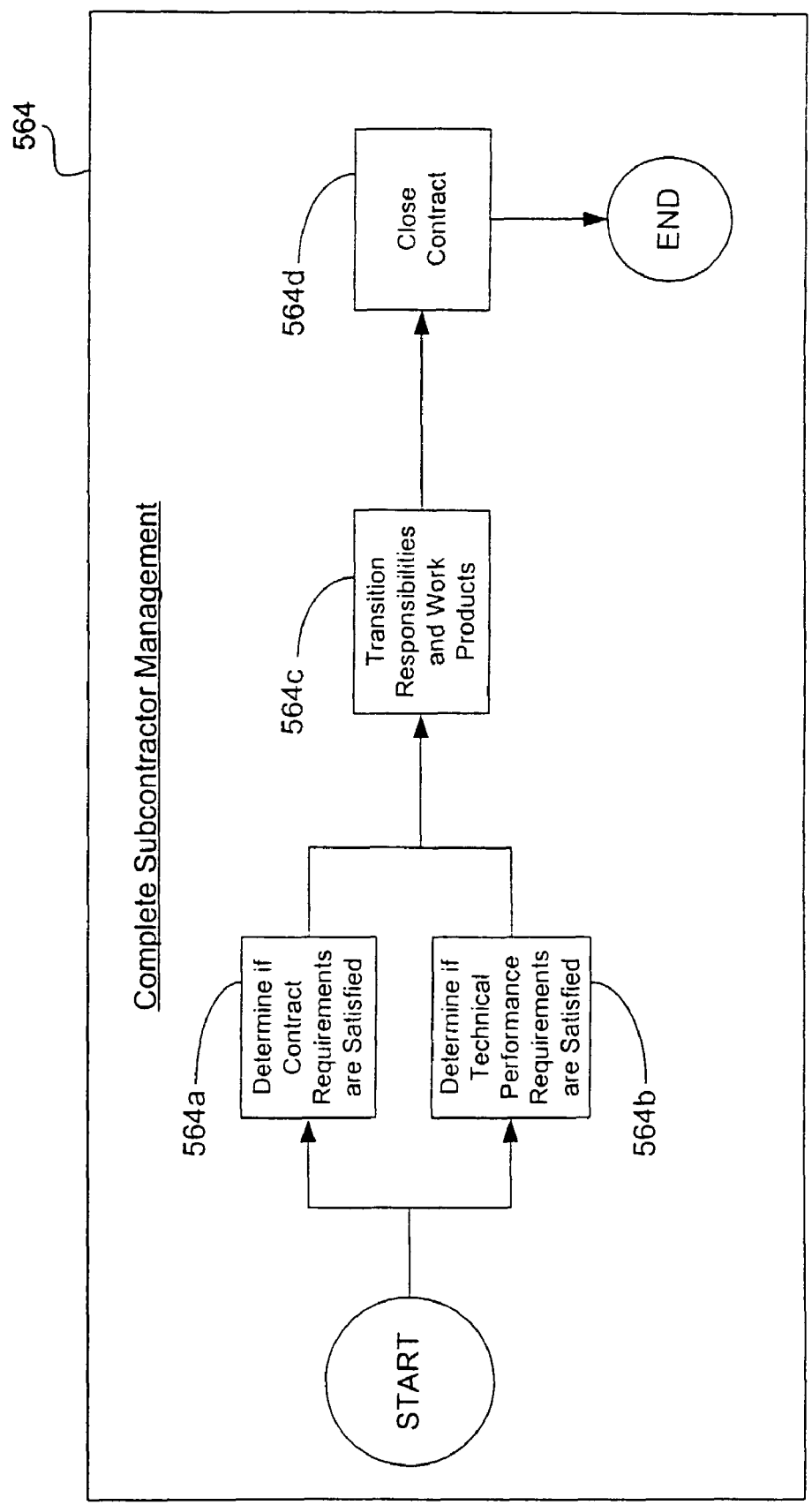

Returning to FIG. 5G, the final step in subcontractor management in step 560(a) is to complete subcontractor management, step 564. In step 564, project management verifies that the subcontractor has completed all tasks outlined in the subcontract and that technical performance requirements are satisfied. If the subcontractor successfully satisfies all contract requirements, both administrative and technical, the contract close out process occurs. If not, project management takes corrective action. Project Management updates the Closing Memo based on subcontractor deliverables and performance as necessary. As depicted in FIG. 5K, the tasks in the completion of subcontractor management in step 564 include the determination of whether contract requirements are satisfied, step 564(a); determining if technical performance requirements are satisfied, step 564(b); transitioning responsibilities and work products, step 564(c); and closing contract, step 564(d). In determining if contract requirements are satisfied in step 564(a), the organization assesses whether the subcontractor has failed to satisfy the contractual requirements. The organization further determines if any corrective actions may be needed.

Continuing with FIG. 5K, in determining if technical performance requirements are satisfied in step 564(b), the project manager or designated team member oversees a subcontractor and is responsible for assessing the technical performance of that subcontractor. The acceptance criteria for contractual closeout are documented in the SOW and should be used to evaluate the subcontractor's performance. This assessment may include a review of deliverables, metrics, invoices, etc., submitted by the subcontractor. If the subcontractor fails to satisfy the technical performance requirements of the contract, corrective action may be needed.

Referring again to FIG. 5K, the next task in completing the subcontractor management is the transition of responsibilities and work products, step 564(c): Once the subcontractor has successfully completed all work stated in the contract, it is necessary to transition the responsibilities and work products of the subcontractor to the appropriate party. Step 564(c) may require the subcontractor to train personnel in a given area, hand over system documentation and manuals, etc.

Then, in step 564(d), the organization may close the contract with the subcontractor, as illustrated in FIG. 5K. If the subcontractor successfully satisfies both administrative and technical contract requirements, the contract closeout process can occur. The contract closeout process may include the collection of information, such as performance metrics, from the subcontractor if this requirement was specified in the statement of work, request for proposal, or contract.

Returning to FIG. 5G, the corollary to the subcontractor management of step 560(a) is the product acquisition of step 560(b). The first task in the product acquisition is to plan the product acquisition in step 565. The organization performs step 565 to plan activities related to product selection and implementation. In step 565, the project's product needs are identified. The project's detailed approach to product acquisition is outlined in the Product Selection Approach. After determining a need for a product exists, a high-level review of the market is conducted to determine possible vendors and the product selection criteria are developed. It should also be noted that, in some cases, there are outside factors that govern the selection of products. Therefore, the following tasks 565(a)-565(d) may not always be necessary or inclusive. In addition, these tasks are only necessary when the product will be turned over to the client.

Figure 5L:
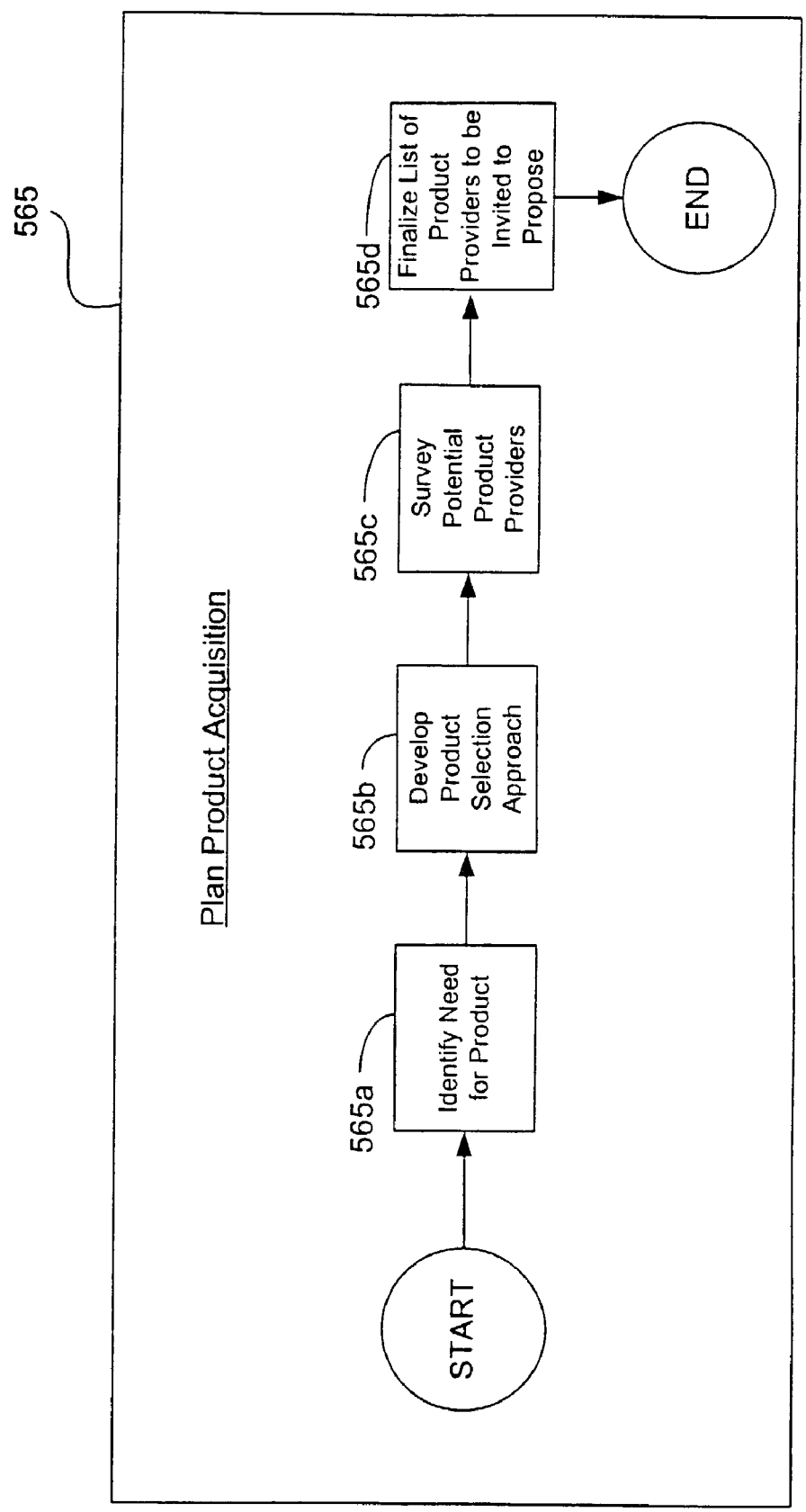

Turning now to FIG. 5L, the first task in the planning of product acquisition in step 565 is to identify a need for a product, step 565(a). In step 565(a), the organization determines if business needs can be satisfied with the implementation of an off-the-shelf product. Step 565(a) may also involve participation from the proposal/project team and the client. The organization may generally follow the guidelines in a DAR Reference document. Specifically, the triggers and thresholds documented in the project plan determine if it is appropriate to use DAR to evaluate the need and/or selection of an off-the-shelf product. The organization may likewise use the project plan to describe the project's need for an off-the-shelf product and to identify the areas in which it may be necessary or desirable to use an off-the-shelf product.

As depicted in FIG. 5L, the next task in the planning product acquisition in step 565 is to develop a product selection approach, step 565(b). In step 565(b), the organization may document the project's detailed approach for product acquisition. Likewise, another task in the product acquisition 560(b) is to survey potential product providers, step 565(c). In step 565(c), the organization may conduct a high-level review of the market to determine potential product providers or contact an alliances group for assistance in identifying providers. The organization may then document potential providers on a vendor long list according to product selection criteria. This step 565(c) may include input from several different sources such as Internet research, participants with past project experience, independent product ratings, etc. In some cases, step 565(c) may not apply as the project sponsor may dictate the specific application to be used.

Continuing with FIG. 5L, the next task in the planning of product acquisition in step 565 is to finalize the list the product providers to be invited to propose, step 565(d). In step 565(d), the organization identifies a list of product providers to be considered based on the information gathered during the survey of potential candidates. The organization may select providers that satisfy most of the project's requirements. In step 565(d), the organization may refer to predetermined product selection criteria with the product providers to be considered.

Continuing with FIG. 5G, the next task in the product acquisition step 560(b) is to organize product acquisition, step 566. In step 566, the organization organizes resources associated with product acquisition. Furthermore, the product selection criteria are finalized and vendors are invited to demonstrate their products. At the end of this task, final product selections are made. It should be noted that, in some cases, there are outside factors that govern the selection of products, and, therefore, some or all of steps 565(a)-(e), described below in FIG. 5M, may be skipped as necessary.

Figure 5M:
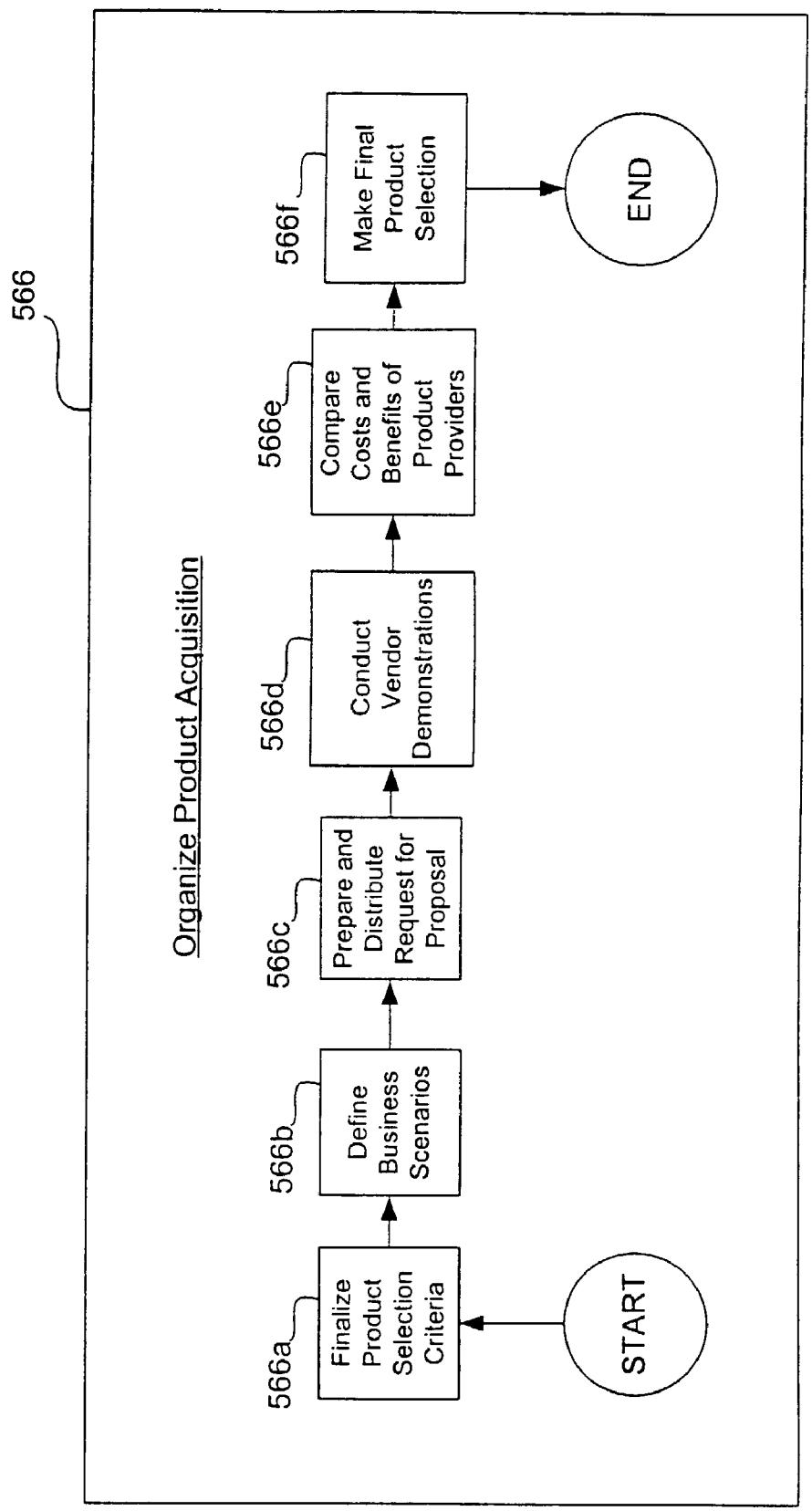

Turning now to FIG. 5M, the individual tasks that comprise the organization of the product acquisition in step 566. The first task is to finalize product selection criteria, step 566(a). In step 566(a), the organization should develop finalized selection criteria based on the organization's economic needs and goals, such as costs, timeframe, and quality concerns.

Next, in step 566(b), the organization may define business scenarios, as illustrated in FIG. 5M. Using the product selection criteria formed in FIG. 566(a), the organization may develop business scenarios that may then be used to form a questionnaire. In this way, the business scenarios may be used to evaluate product fit and performance during vendor demonstrations.

The next task in FIG. 5M is to prepare and distribute a request for proposal (RFP), step 566(c). In step 566(c), the organization should develop a RFP that requires the vendors and providers to propose similar configurations and have all hardware, software, and on-site consulting services (in days) identified and itemized. Providers can also submit their idea of an optimal configuration. Furthermore, the RFP should include as much information about application interaction as possible.

Returning to FIG. 5M, another task in the organization of product acquisition in step 566 is to conduct vendor demonstrations, step 566(d). In step 566(d), each finalist should provide a product demonstration. During the demonstration, the organization should evaluate how well each provider/vendor meets the various business scenarios.

Next, the organization may compare costs and benefits of product providers, step 566(e), as illustrated in FIG. 5M. In particular, the organization may use the product selection criteria to compare the proposals submitted by the product provider finalists. Also evaluate the potential risks associated with each product.

Continuing with FIG. 5M, another step in the organization of the product acquisition is to make a final product selection, step 566(f). The organization may select the product provider based on the final scores in the product selection criteria and an assessment of potential risks. Step 566(f) may also includes the preparation of a purchase agreement or contract. It may also be necessary in step 566(f) to update the project plan to document any new conditions that result from the product acquisition, such as the need to provide project-furnished facilities.

Returning to FIG. 5G, the next step in the product acquisition of step 560(b) is to control product acquisition, step 567. In step 567, the selected product is installed, testing is performed, and the performance of the product is evaluated. The organization may perform step 567 after acquiring the product to ensure that the product satisfies business needs and performs as anticipated. It should be noted that these tasks are typically performed only for new products that have not been previously tested and implemented. For products that have been previously implemented, application testing and performance are evaluated during previous product and acceptance testing.

Figure 5N:
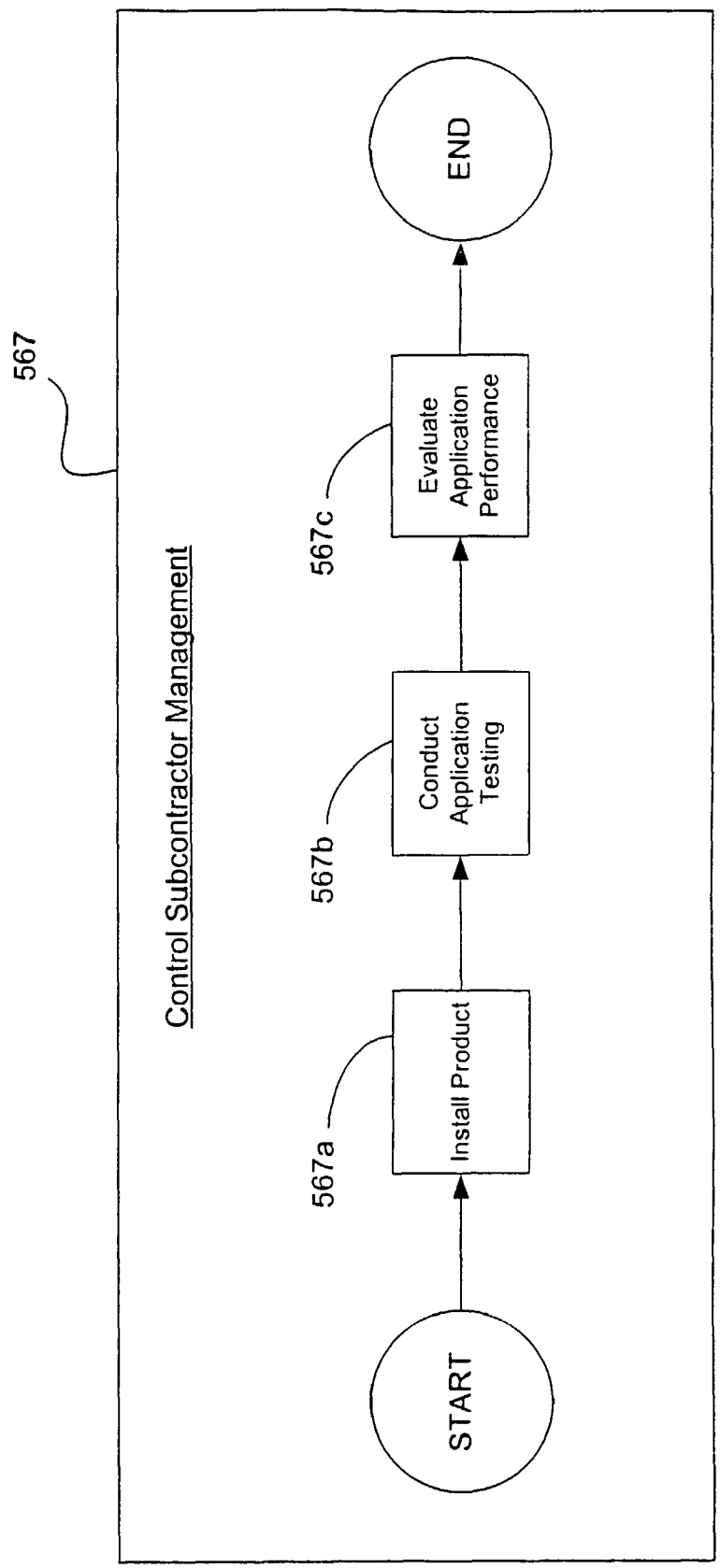
Figure 50:
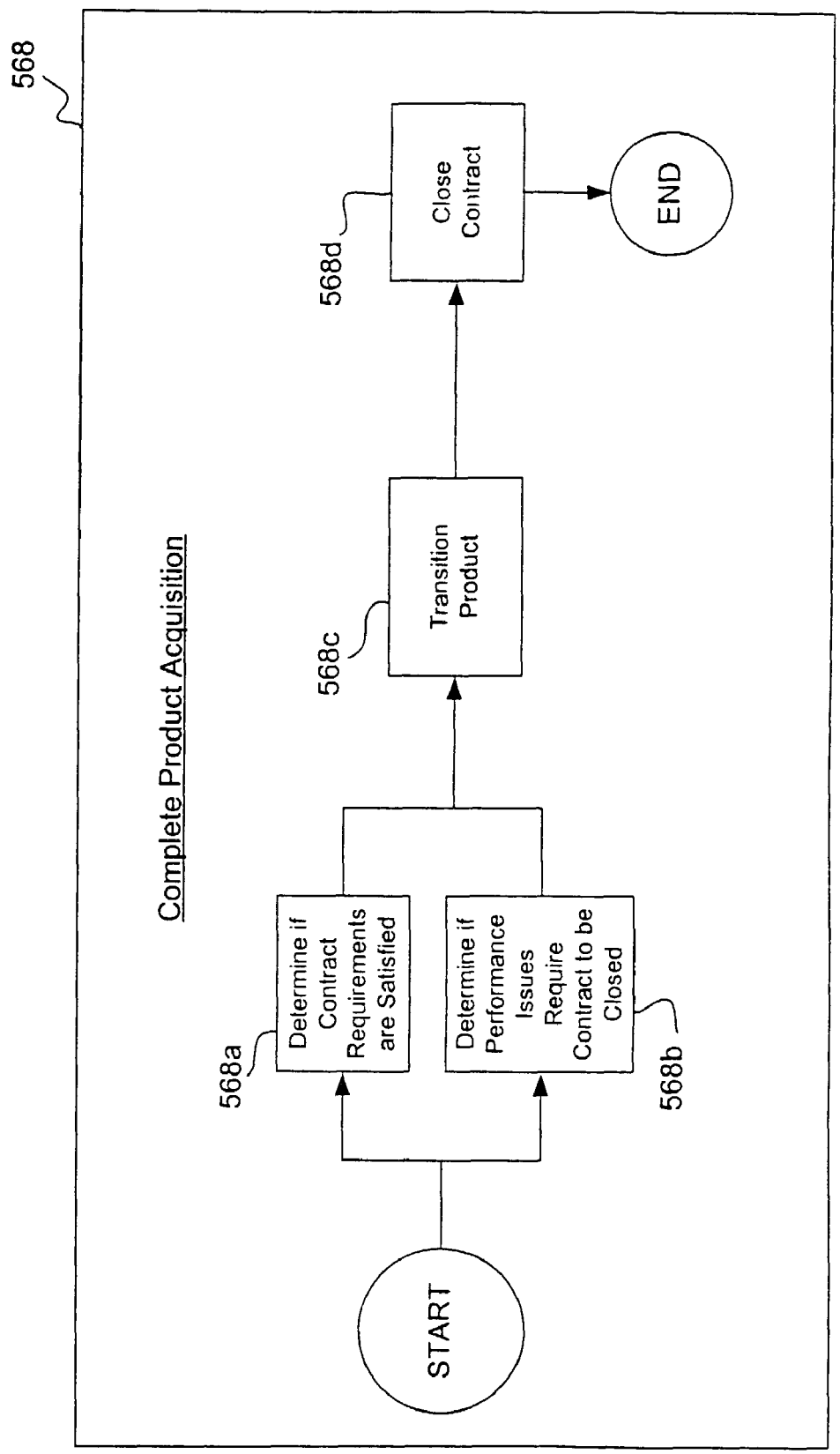

The substeps in the control of product acquisition in step 567 are depicted in FIG. 5N. The first task in controlling product acquisition in step 567 is to install or otherwise use the product in the environment to be used for acceptance and performance testing, step 567(a).

Next, in step 567(b), the organization conducts application testing, as illustrated in FIG. 5N. Specifically, once the product has been delivered, it is preferable in step 567(b) to perform a fit analysis to ensure that the software satisfies the business scenarios as originally intended. The fit analysis should map the product characteristics against both the existing user service class characteristics and the existing underlying components of the delivery vehicles (execution, operations, development, computing platforms, and network architecture).

Continuing with FIG. 5N, the next task in the control of the product acquisition is to evaluate application performance, step 567(c). Three different methods are available to evaluate product performance in step 567(c): comparison, application sizing, and electronic spreadsheet analysis. Comparison analysis may be performed using existing installations of the product with similar environments, operations, and configurations. Some product vendors perform application sizing to determine if the product is adequate for the project needs, but results should be interpreted with caution. Electronic spreadsheet analysis translates business transactions into resource utilization and service times for evaluation. The accuracy of electronic spreadsheet analysis is driven primarily by the knowledge of business functions, transaction rates, and package architecture.

Returning to FIG. 5G, another step in the product acquisition is to complete the product acquisition, step 568, to close out the product acquisition tasks. In step 568, project management determines if the contract requirements are satisfied. Once the product has been assessed and meets all performance and functional needs, the product and the job responsibilities associated with the product are transitioned to the appropriate party. At this point, the contract with the vendor is closed. The tasks in the completion of the product acquisition in step 568 are illustrated in FIG. 5O. Specifically, the completion of the product acquisition in step 568 comprises the tasks of determining if contract requirements are satisfied, step 568(a); determining if performance issues require contract to be closed step 568(b); transitioning the acquired product, step 568(c); and closing the product acquisition contract, step 568(d). In the determination of whether purchase contract requirements are satisfied during step 568(a), the organization assesses the product against the contract requirements to determine if the agreed upon conditions have been met. Next, in step 568(b), the organization determines whether performance issues require the product purchase contract to be closed. Specifically, the organization decides if the product meets performance requirements. If the product fails to meet performance requirements, it may be necessary to terminate the contract. Contact the alliances group for assistance in identifying a product with better fit or performance.

Once the product has been assessed and meets all performance and functional needs, it is necessary to transition the product and the job responsibilities associated with the product to the appropriate party. Accordingly, in step 568(c), the organization may transition the product as needed, as illustrated in FIG. 5O. Step 568(c) may require the organization to train the appropriate party, handing over system documentation and manuals, etc. Then in step 568(d), the organization may close the purchase contract after verifying that contract requirements have been satisfied.

Delivery Management

Figure 6A:
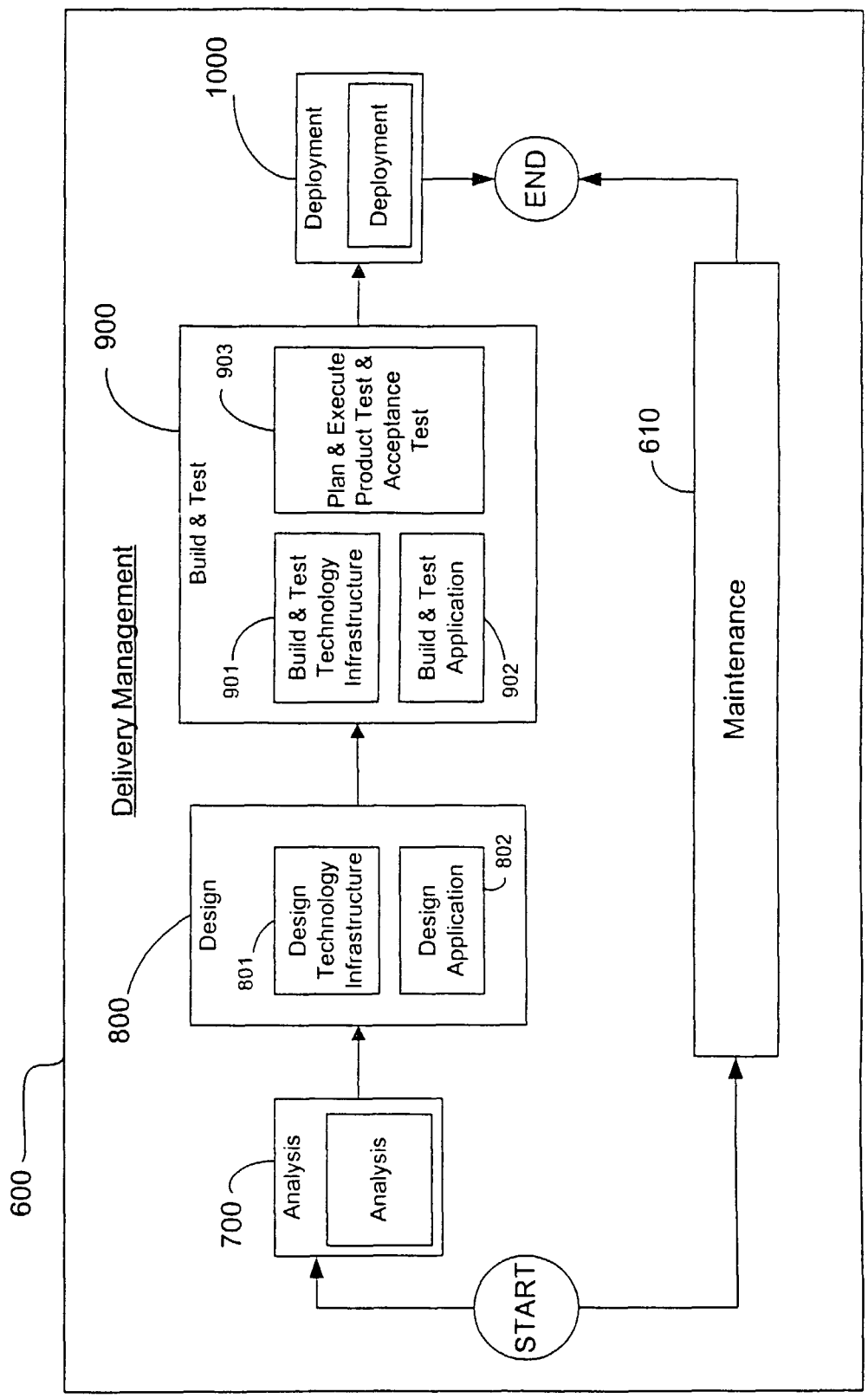
FIGS. 6A-6B are flowcharts depicting the steps of delivery management in accordance with embodiments of the method of FIG. 1.

Returning to FIG. 1, the next step of the CMM in a BOX method 10 of the present invention is to implement delivery management 600. Delivery management 600 relates to the activities undertaken to develop a system software application for eventual delivery to clients. The Delivery management step 600 translates the required business outcomes into a business solution. A business solution is the combination of business process, a technology solution and organizational changes that collectively create value by improving business performance. The Delivery Management Module defines a multi-functional approach for taking each business solution from analysis to deployment. As depicted in FIG. 6A, the delivery management 600 encompasses four stages of work: analysis, step 700; design, step 800; building and testing, step 900; and deployment, step 1000. One of the delivery programs should be mobilized for each business solution to be delivered.

Figure 7A:
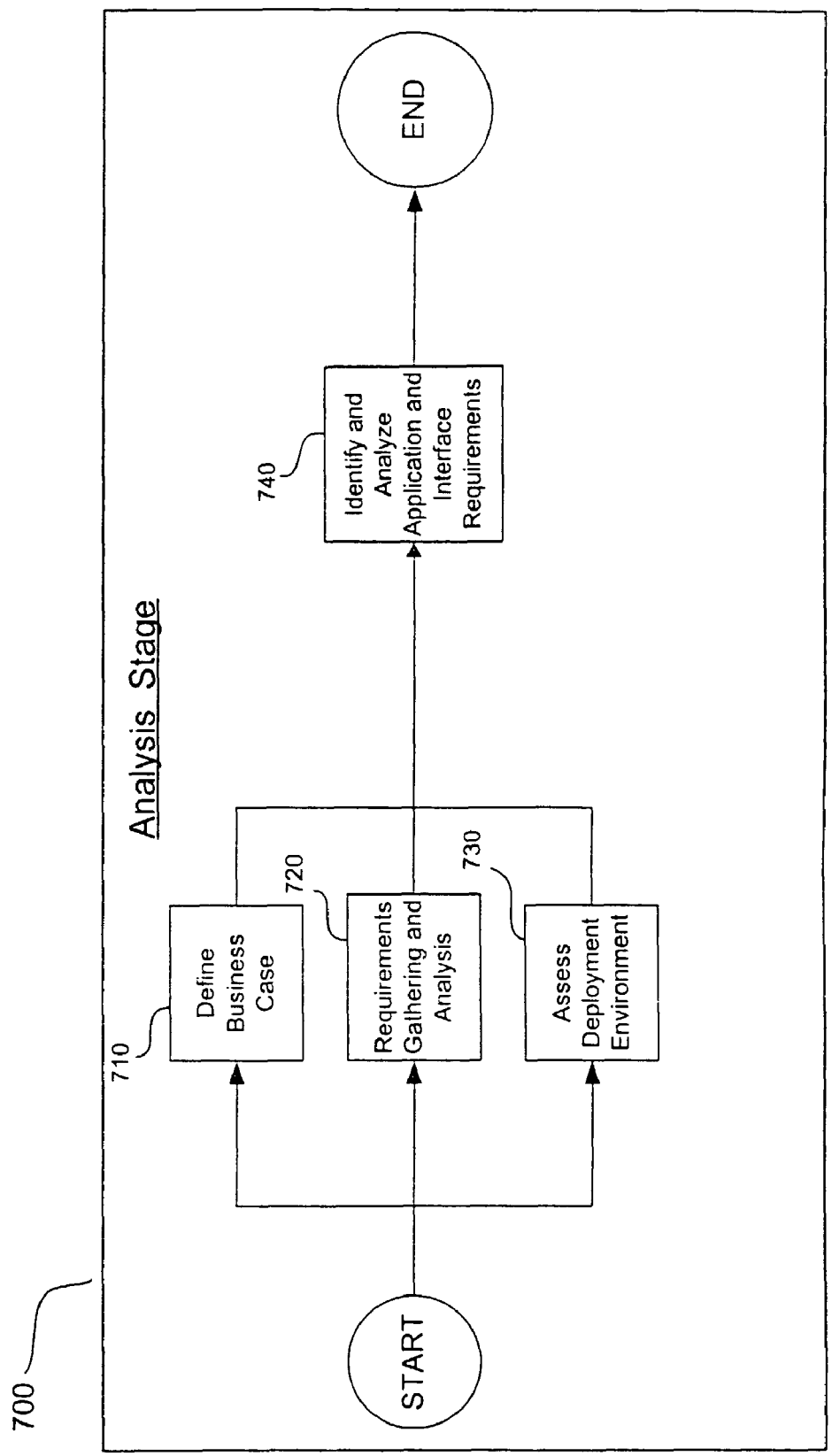
FIGS. 7A-7E are flowcharts depicting the steps of analysis stage of the delivery management of FIG. 6A in accordance with embodiments of the method of FIG. 1.

In analysis stage 700, the organization accesses and defines the tasks to be accomplished for delivery of the desired products. During stage 700, business, user and interface requirements are defined as necessary to define and commit to a specific implementation and release plan. The information gathered during stage 700 focuses on business requirements, describing it to the level of detail needed to finalize the delivery releases, define the specific requirements, and resolve implementation issues. As illustrated in FIG. 7A, the analysis stage 700 consists of defining a business case, step 710; gathering and analysis of requirements, step 720; assessment of the deployment environment, step 730; and identification and analysis of the application and interface requirements, step 740.

Figure 7B:
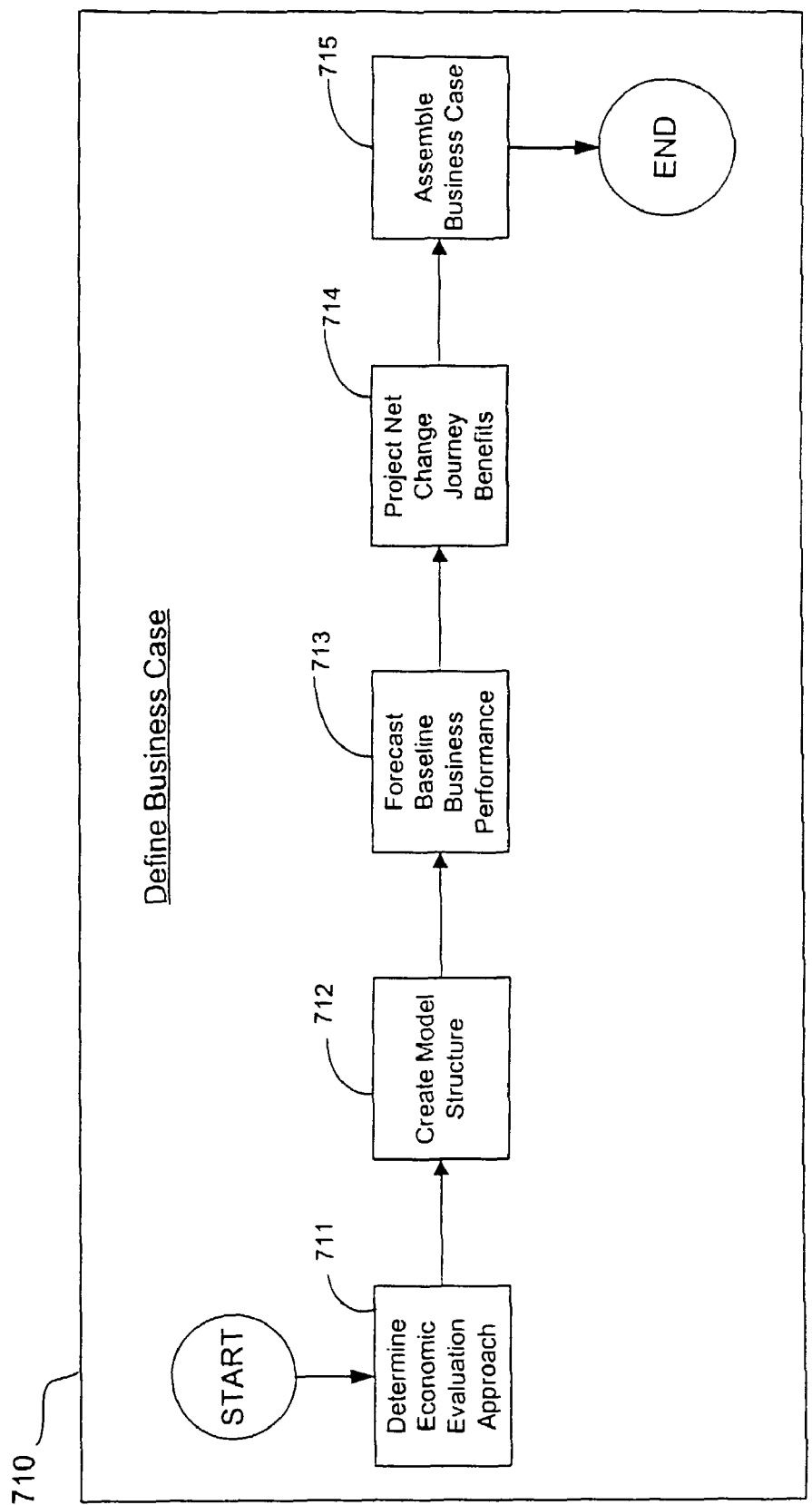

The first step in the analysis stage 700 is the defining of a business case, step 710, which is illustrated in FIG. 7B. In step 710, the organization defines the business case to determine benefits to be derived from, and justification for a proposed business solution. When defining a business case in step 710, the organization first determines an economic evaluation approach, step 711. Specifically, the organization performs this task to obtain commitments from the appropriate stakeholders in the sponsoring organization on the overall implementation approach for the proposed solution. This task treats the process of implementing a solution as an investment.

The organization subsequently creates a model structure, step 712. During this task, the organization obtains an agreement from the sponsoring organization regarding the structure of the model used to determine the benefits of implementing the proposed solution. For example, benefits to be derived may be expressed in terms of increased market share or reduced operating costs.

The organization next forecasts baseline business performance, step 713, to determine how the business should perform without the proposed solution. The next step in the analysis stage 710 is to project net change journey benefits, step 714, during which the organization attempts to predict and quantify the benefits that the sponsoring organization should derive from implementing the proposed solution. A further step in the analysis stage 710 is to assemble a business case, step 715. During step 715, the organization documents a rationale for implementing the proposed solution. Ultimately, this document should serve as a motivational tool for change.

Figure 7C:
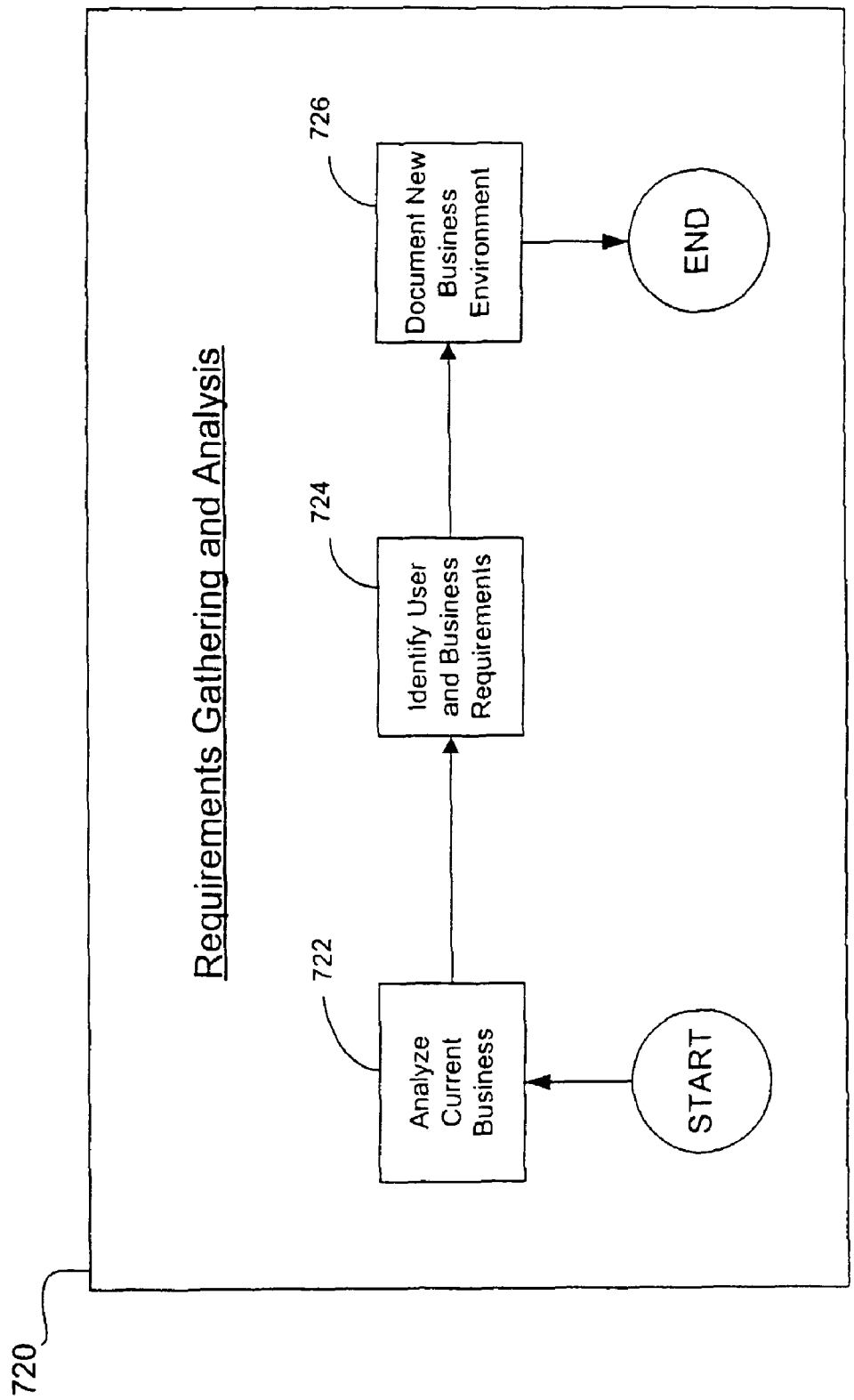

Turning now to FIG. 7C, the next step in the analysis stage 700 is the gathering and analysis of requirements, step 720. In step 720, the current business environment is assessed and new requirements for the business and users are defined. During the gathering and analysis of requirements in step 720, the organization analyzes its current business, step 722, to obtain an accurate picture of its elements, its operation, and its performance. The organization then identifies user and business requirements, step 724, to define and document high-level requirements for desired solutions. These requirements include changes to human performance, business process, and technology. The organization should seek to ensure that these requirements meet the needs stated in the proposal, business needs statement, work request, or task order, including interfaces to other systems. During step 724, project participants impacted by the requirements should be involved in the review and sign-off of the requirements. Another step in the gathering and analysis of requirements in step 720 is to document the new business environment, step 726. In step 726, the organization documents user locations and transaction volumes in any new business environment.

Figure 7D:
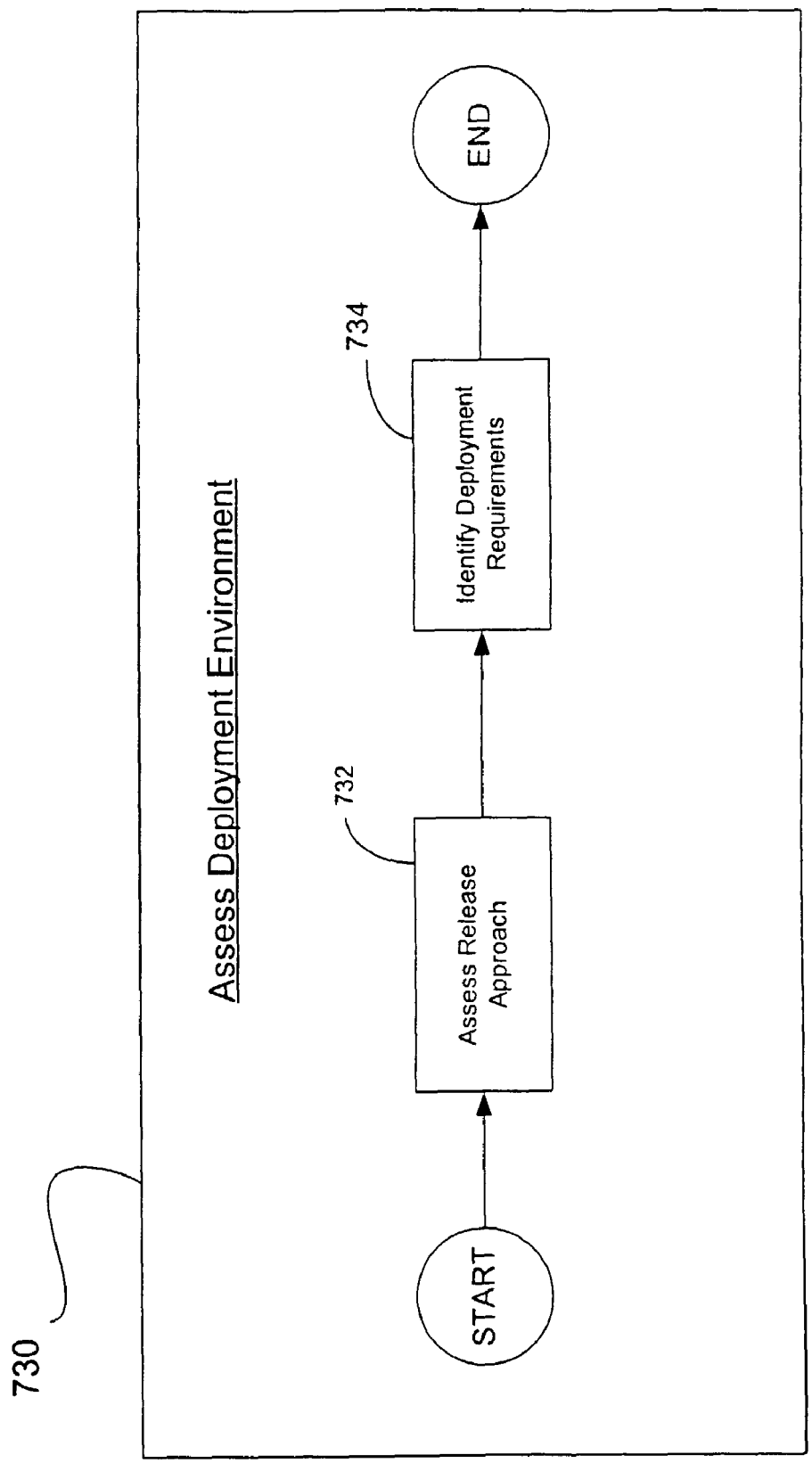

As illustrated in FIG. 7D, the analysis stage 700 continues with the assessment of the deployment environment, step 730, to ensure that deployment concerns and needs are considered sufficiently early in the development process. The objectives of the task are to consider the geographical, infrastructure, operational, and cultural differences between the current structure of the sponsoring organization and the desired structure, to define the deployment requirements, and to determine the optimal deployment mechanism.

In the evaluation of the deployment environment in step 730, the organization assesses its release approach, step 732, to review the deployment plan, particularly to identify risks and to justify costs for deployment. The organization further identifies deployment requirements, step 734, to identify deployment requirements for the proposed solution. A key deployment requirement is the production and release of the deliverable product or service. The organization should document the identified deployment requirements within a business requirements document.

The next step in the analysis stage 700 is the identification and analysis of the application and interface requirements, step 740. During step 740, the application and interface requirements are prepared based on the business and user requirements gathered. All agreed-upon requirements gathered to this point are entered in the Requirements Traceability Matrix. Step 740 is generally illustrated in FIG. 7E and comprises these steps: transforming business requirements into more detailed application and interface requirements, step 741; integration of performance support requirements, step 742; recovering current application and interface design, step 743; identifying application and interface quality requirements, step 744; analyzing application and interface requirements, step 745; and verifying requirements documentation, step 746.

During the transforming of business requirements into more detailed application and interface requirements in step 741, the organization uses the business requirements as a starting point to develop the application requirements. The application requirements should be in the context and scope of the business requirements. Also, these requirements should be verified to help ensure that the business process designs were properly interpreted. Then, in step 742, the integration of performance support requirements, the organization analyzes the tasks and factors that hinder user performance, taking into account their background and behavior.

Figure 7E:
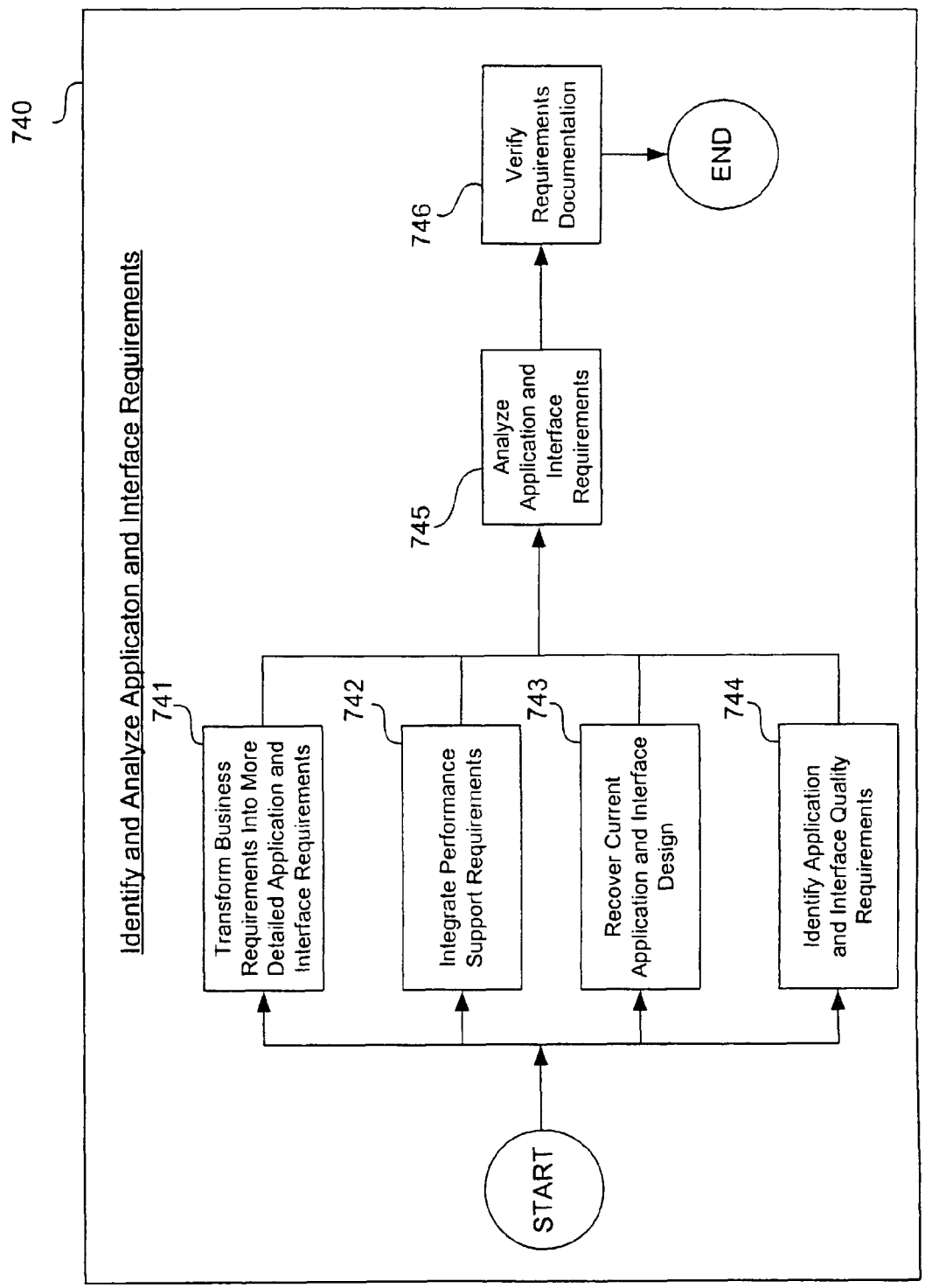

As illustrated in FIG. 7E, the next task in the identification and analysis of the application and interface requirements, step 740, is the recovery of current application and interface design, step 743. The recovery of current application and interface design in step 743 entails reviewing the current application/interface documentation and physical structures to gather requirements that may be omitted from the new application/interface. Step 743 includes the documentation of the present logical data structures. The organization should further identify expected requirements that otherwise may be assumed by the business representatives and not considered. Another task in step 743 is to verify that the review also covers interface requirements. In this way, the recovery of current application/interface design in step 743 provides an inventory for conversion and a potential starting point for bottom-up data modeling.

Subsequently, in step 744, the organization identifies application and interface quality requirements, as illustrated in FIG. 7E. During step 744, the organization seeks to select the quality attributes used to measure the application/interface functional and usability requirements, as these quality attributes should guide the design. Using these requirements, the organization should analyze application and interface requirements, step 745. Specifically, the organization should perform an analysis of the gathered requirements using process, event, data and content modeling techniques. Similarly, the organization may use validation techniques to confirm requirements such as prototyping and simulations. The organization may also create cases or scenarios to ensure requirements will be operational. The organization may additionally perform risk assessment against the identified requirements. The organization next documents the application and interface requirement specifications using a template. The actual requirements should be documented using a requirements traceability matrix for future tracking against other work products. The organization should make verify requirements are documented in a manner to ensure bidirectional traceability so that it is possible to trace requirements from the requirements development phase to the testing phase and vice versa. In addition, it should be possible to trace requirements across interfaces. In performing step 745, the organization preferably involves project participants impacted by the requirements in the review and sign-off of the requirements Returning to FIG. 7E, the next step is to verify the documentation of requirements, step 746. Specifically, the organization should review all requirement documents, such as executive architecture, development architecture, and operational architecture, thereby ensuring that these documents are in sync.

Returning to FIG. 6A, the next set of tasks in the delivery management 600 is to design, step 800. The design stage 800 focuses on designing the components of the technology infrastructure, including the execution/operations and development architectures. In addition, the design of the network, communication and computing platforms is performed in this stage. Design work should be coordinated with the development of the business processes, technical solution and organizational changes required to support the new infrastructure. The design process 800 is comprised of two tasks: designing the technology infrastructure, step 801 and designing the application, step 802.

Figure 8A:
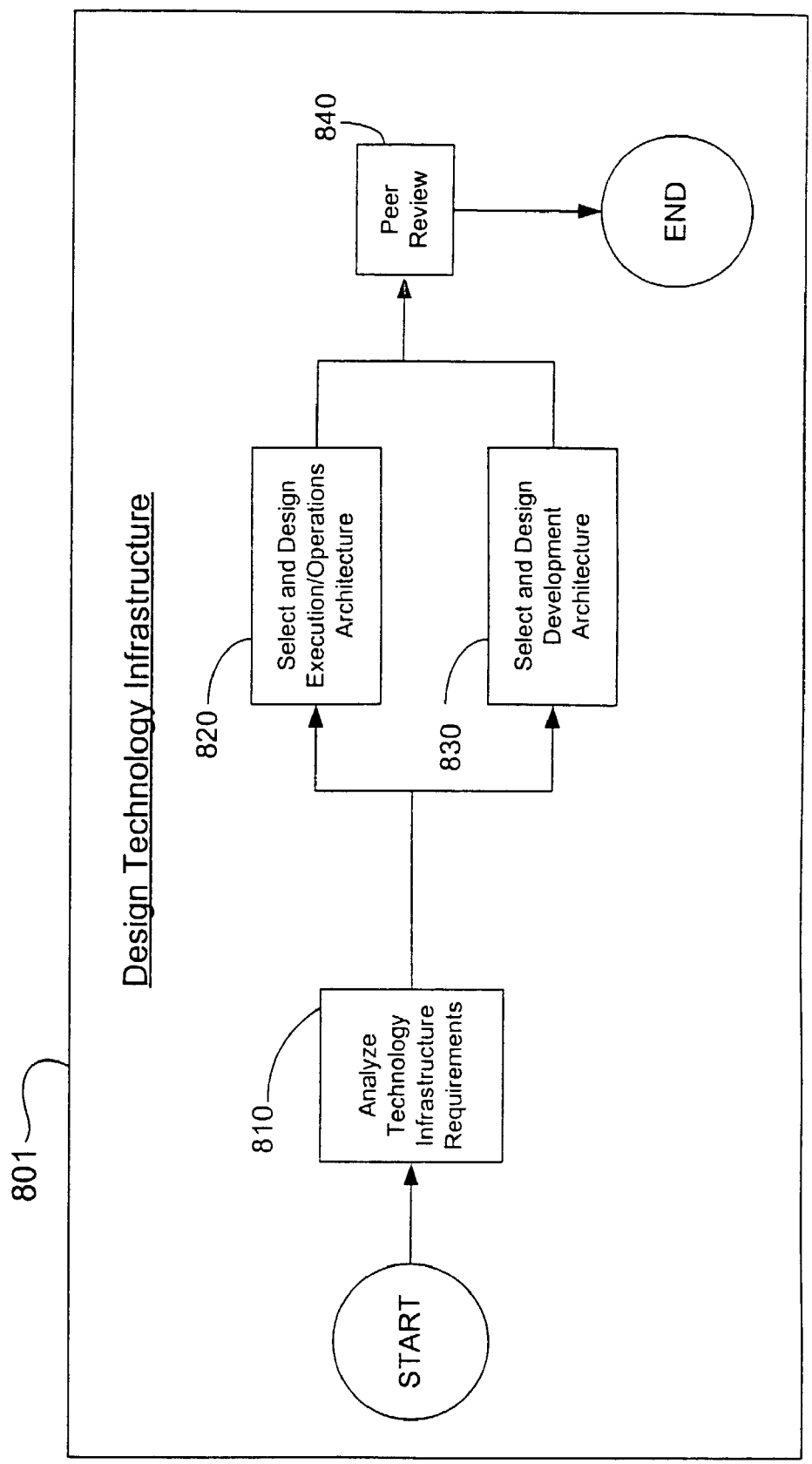
FIGS. 8A-8J are flowcharts depicting the steps of design stage of the delivery management of FIG. 6A in accordance with embodiments of the method of FIG. 1.
Figure 8B:
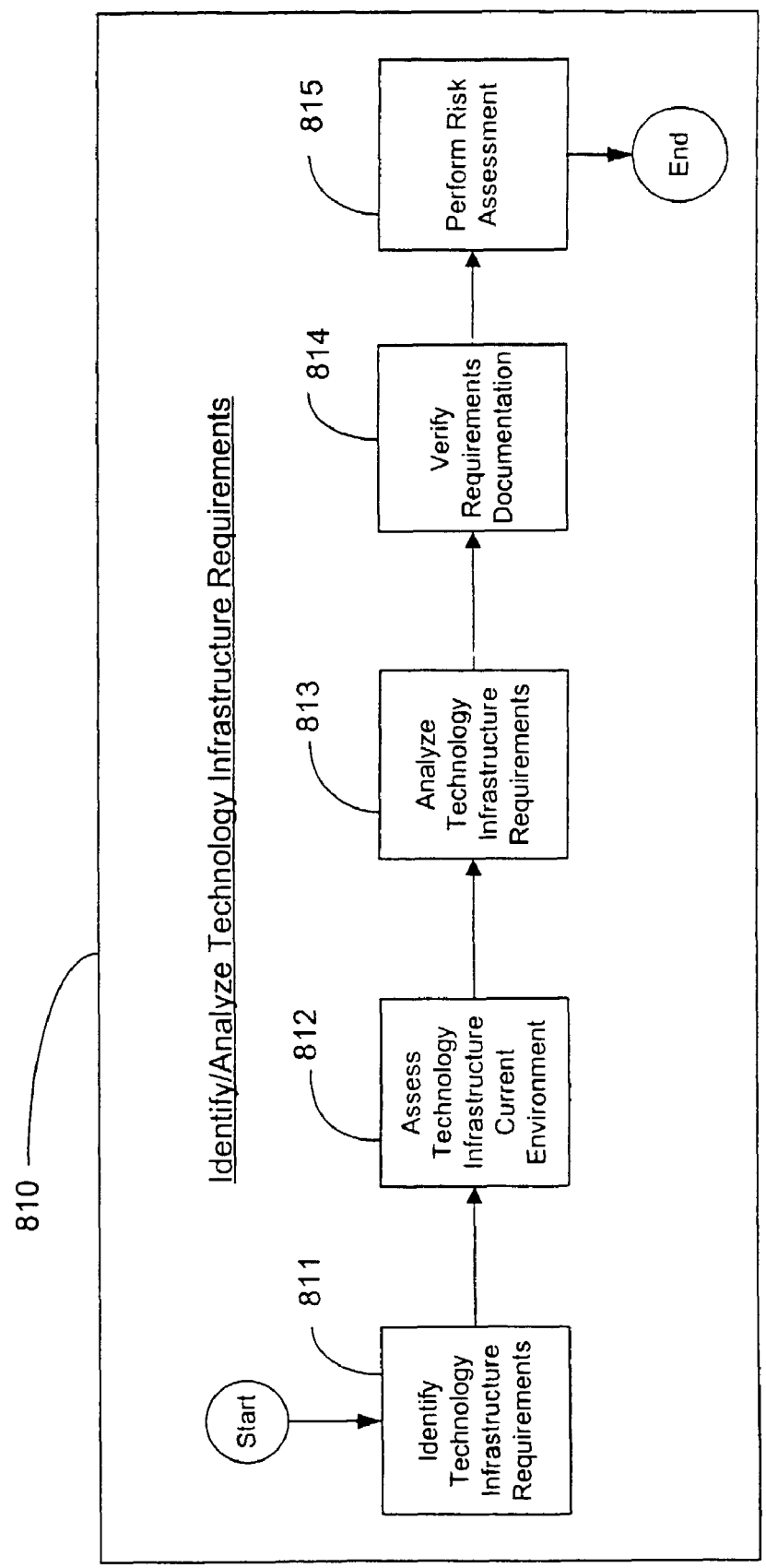

FIG. 8A illustrates one embodiment of the design of the technology infrastructure in step 801. One of the tasks in step 801 is to identify and analyze technology infrastructure requirements, step 810. During step 810, the organization prepares for the selection and design of the technology infrastructure and establishes preliminary plans for technology infrastructure releases and product testing. Furthermore, technology-related requirements are refined to form the component requirements for the technology infrastructure. For instance, step 810, the requirements for the technology infrastructure are outlined and preliminary plans for technology infrastructure releases and product testing are established. As this task is performed, technology-related requirements are refined to form the component requirements for the technology infrastructure. Accordingly, a first task in the identification and analysis of technology infrastructure requirements during step 810 is to identify technology infrastructure requirements, step 811, as illustrated in FIG. 8B. The organization performs step 811 to identify the functional, technical, and performance requirements for the technology infrastructure that should support the solution. During step 811, the organization also identifies key performance indicators, creates baseline estimates of transaction volumes and system size, and sets measurable targets for the performance indicators. Key performance indicators examined during step 811 include resource availability, capacity, throughput, reliability, scalability, and usability.

As indicated in FIG. 8B, a second process in the identification and analysis of technology infrastructure requirements in step 810 is to assess the technology infrastructure's current environment, step 812. In step 812, the organization assesses the ability of the existing technology infrastructure to support identified technology infrastructure requirements.

As depicted in FIG. 8B, the organization subsequently analyzes any potential technology infrastructure requirements, step 813, to refine the detailed functional, technical, and performance requirements for the technology infrastructure as outlined in the physical and performance models and to cover any additional requirements during the assessment of the current environment. The additional requirements may include user and service level requirements, as well as any requirements for the development architecture or the execution/operations architecture. The organization seeks to analyze and document the requirements for each component of the technology infrastructure and define additional needs. As part of step 813, the organization also seeks to involve all project participants impacted by the requirements in the review and sign-off of the requirements.

Returning to FIG. 8B, other steps in the identification and analysis of technology infrastructure requirements in step 810 are (1) verification that requirements documentation is in sync, step 814, and (2) performance of risk assessment against the technical requirements, step 815.

As illustrated in FIG. 8A, the next step in the design of the technology infrastructure, step 801, is the selection and design of execution/operation hardware, step 820. The organization performs step 820 to create and document high-level design and component design for the execution/operation architecture. Preferably, to prepare for testing of the architectural components, an architecture test plan, conditions, scripts and other needed family are also be created or defined during step 820.

Figure 8C:
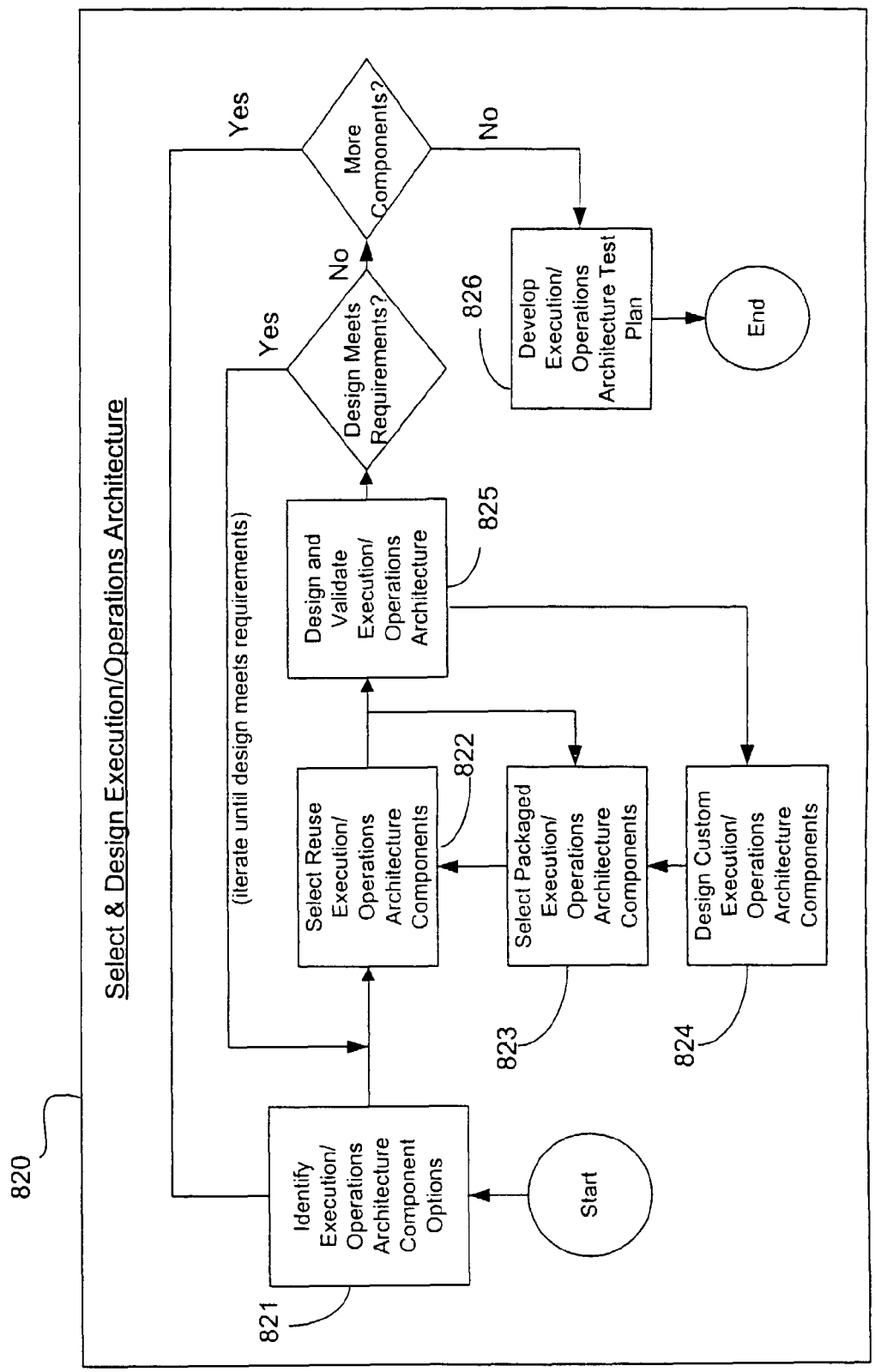

FIG. 8C depicts the individual steps of the selection and design of execution/operation hardware in step 820. A first step in the selection and design of execution/operation hardware in step 820 is to identify execution/operation architecture component options, step 821, so that the organization may create a list of suitable options for selecting and designing execution/operation architecture components that satisfy the technology infrastructure requirements. The organization then selects any reused execution/operation architecture components, step 822, if the execution architecture should utilize reused components from other projects, so that the organization may create a list of suitable options for selecting and designing those components that satisfy the execution/operation technology infrastructure requirements. The organization may also select packaged execution/operation architecture components, step 823, if packaged components should be used in the project. The organization may perform step 823 to evaluate packaged products then and to gain the sponsoring organization's approval to continue. If suitable reusable or packaged components cannot be found, the organization may also choose to design custom execution/operation architecture components, step 824. If custom execution/operation components will be created in the project, the organization may then compare reused or packaged execution/operation solutions against custom-designed alternatives.

Another step in the selection and design of execution hardware 820 is to design and validate the execution/operation architecture, step 825, to develop a complete design for the execution/operation architecture design after individual components have been selected or designed. The design for execution/operation architecture should also include custom component designs and any reused and packaged execution/operation architecture extension designs.

Another step in the selection and design of execution/operation hardware 820 is to develop an execution/operation architecture test plan, step 826, after the execution/operation architecture design is understood and documented, including the selection of reused and packaged execution/operation components. The primary goal of step 826 is to document test approaches and plans for the execution/operation architecture at the component and assembly level.

Figure 8D:
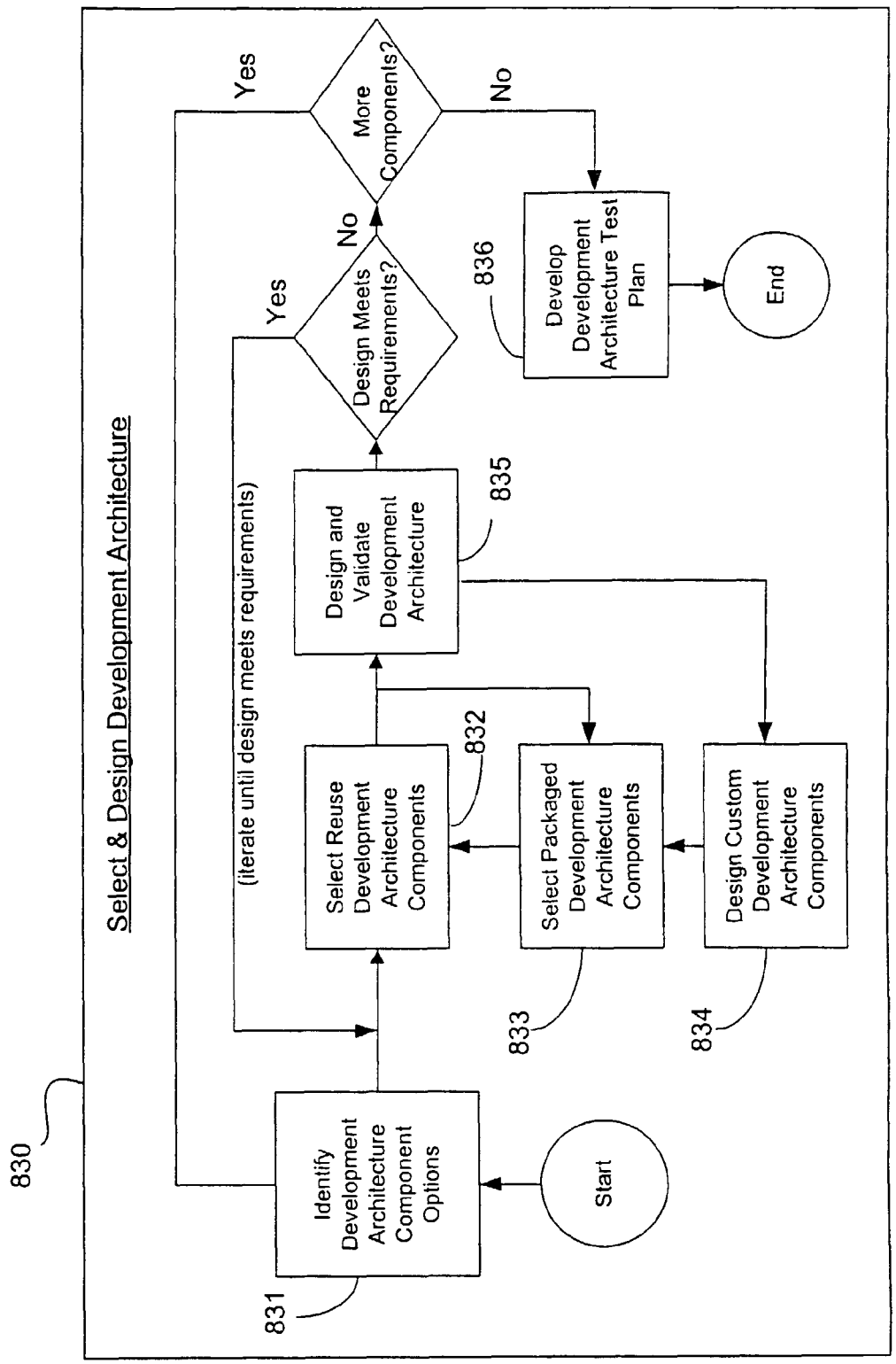

The next step in the design of the technology infrastructure during step 801 is to select and design development architecture, step 830, as illustrated in FIGS. 8A and 8D. The organization may perform this task to create and document the design of the development architecture components and test plans for those components. Specifically, the organization may create a high-level development architecture and component designs. Preferably, to prepare for testing of the architectural components, an architecture test plan, conditions, scripts and other needed family are also be created or defined during step 830.

FIG. 8D illustrates the substeps in the selection and design of development architecture in step 830. A first substep is to identify development architecture component options, step 831. In step 831, the organization may create and document the design of the development architecture components, as well as the test plan for those development architecture components. The organization also finalizes the physical model and selects or designs for development architecture components.

Other tasks in step 830 include the selection of reused development architecture components from the existing technology infrastructure or from external sources, step 832, and the selection of packaged development architecture components, step 833, if they should be used in the project. If the organization should use any packaged development architecture components, the organization should determine which pieces of the development architecture to use and to negotiate contracts with vendors. In a preferred implementation of step 833, the organization also gathers additional information during vendor demonstrations and site visits to evaluate the available packaged development architecture components.

Another substep in the selection and design of development architecture of step 830 is to design custom development architecture components, step 834, if any custom-designed components are needed. The organization may choose to produce a design for each custom component in order to understand the complexity, effort, and skills required to design and build the components efficiently.

In another embodiment of step 830, the organization also designs and validates the development architecture, step 835, to review the development architecture requirements such as interfaces between components, to design custom development architecture components, and to incorporate any reused or packaged components. The organization may also develop a development architecture test plan, step 836. The organization should develop a test approach and a plan for testing, concurrently with the design and prototyping of the development architecture. Before developing the test approaches and plans for each component and the assembly of the development architecture, the organization should further review the objectives and scope for the component, component acceptance, and assembly test approach as defined in the test strategy.

Returning FIG. 8A, a preferred embodiment of the delivery management stage also includes a peer review, step 840, of the other steps 810-830 undertaken during the process of designing the technology infrastructure, step 800. In the peer review, the organization verifies the accuracy and completeness of a deliverable product, whether it is a document or code, for any step in the delivery stage 600. It should be appreciated that, while displayed at this point in the CMM in a BOX method 10, a peer review 240 may be implemented at any time as necessary to satisfy the requirements of the CMM or CMMI as well as other overriding business concerns.

Figure 8E:
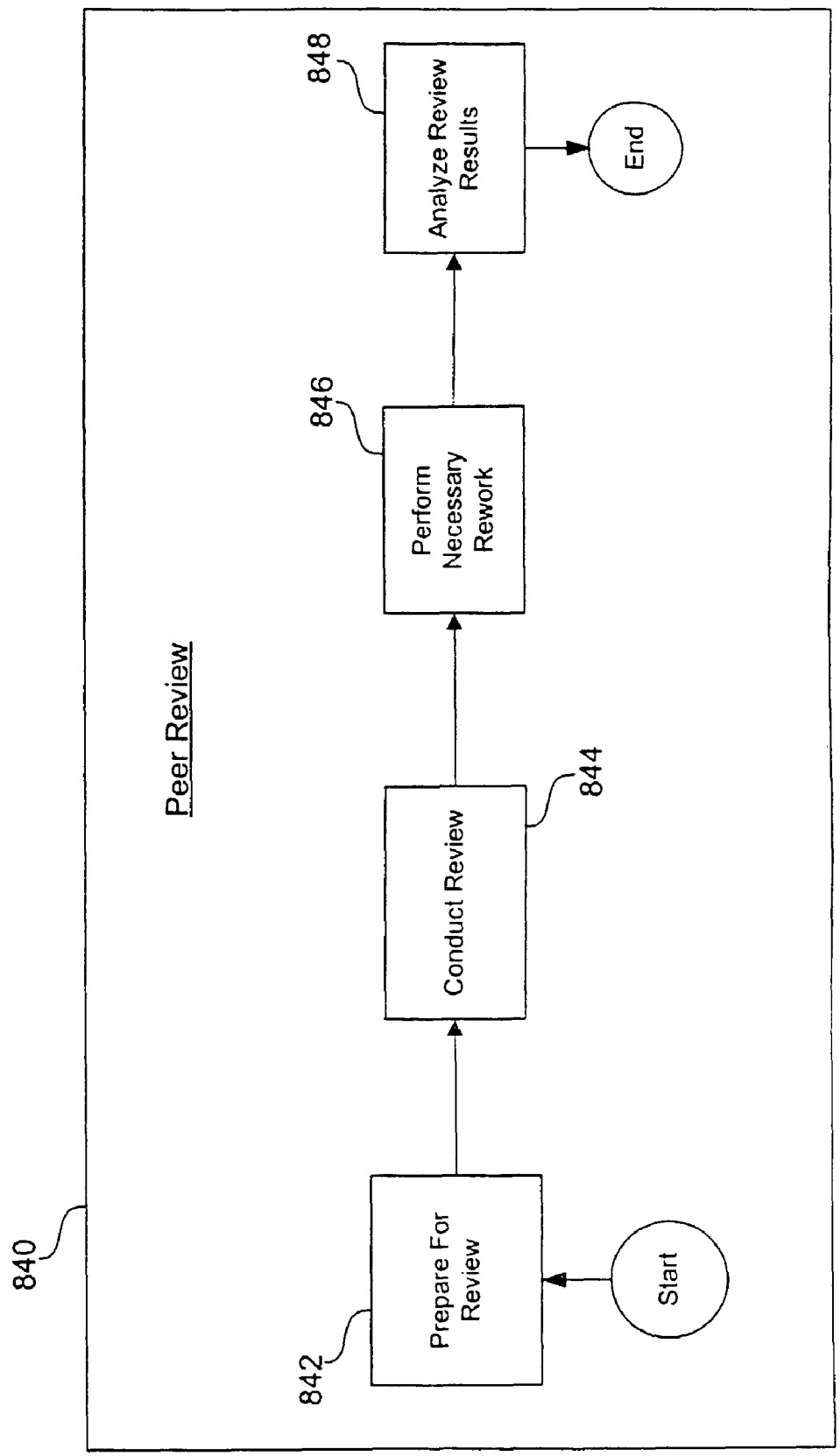

Referring to FIG. 8E, the organization implements the peer review by first preparing for the review, step 842. Specifically, the project manager and team leader should budget time to conduct peer reviews and to establish peer review standards and criteria. Also, the owner of the deliverable product should identify and contact any peer review participants, schedule the peer review session, and distribute materials and standards to the reviewers. The reviewers should then prepare for the review by reading the materials prior to the peer review session and documenting comments and recommendations. Where appropriate, a peer review checklist may be used when conducting the peer review.

Continuing with FIG. 8E, the next step in the peer review 840 is to conduct the peer review, step 844. During the peer review session in step 844, the deliverable owner should document any defects, issues, risks, and action items. The deliverable owner should also record meeting minutes and the time spent on the review. The reviewers are generally responsible for facilitating the discussion, sharing comments and recommendations with the deliverable owner, confirming that all issues are documented, providing metrics data, and scheduling a follow-up session if necessary.

Next, in step 846, the organization should perform any necessary rework of the product, as depicted in FIG. 8E. During the rework in step 846, the deliverable owner implements the actions recommended by the reviewers, collects metrics data (including time spent preparing for review, number of defects found, etc.), and monitors the status of defects, issues, risks, and action items. As necessary, the peer reviewer should also verify that all pertinent items have been closed.

The organization should then analyze the review results, step 848 as depicted in FIG. 8E. The team leader submits the peer review metrics to the project manager for review. The project manager is then generally responsible for analyzing the metrics, evaluating the execution of the peer review process, and identifying areas for process improvement or corrective action with the peer review process.

Figure 8F:
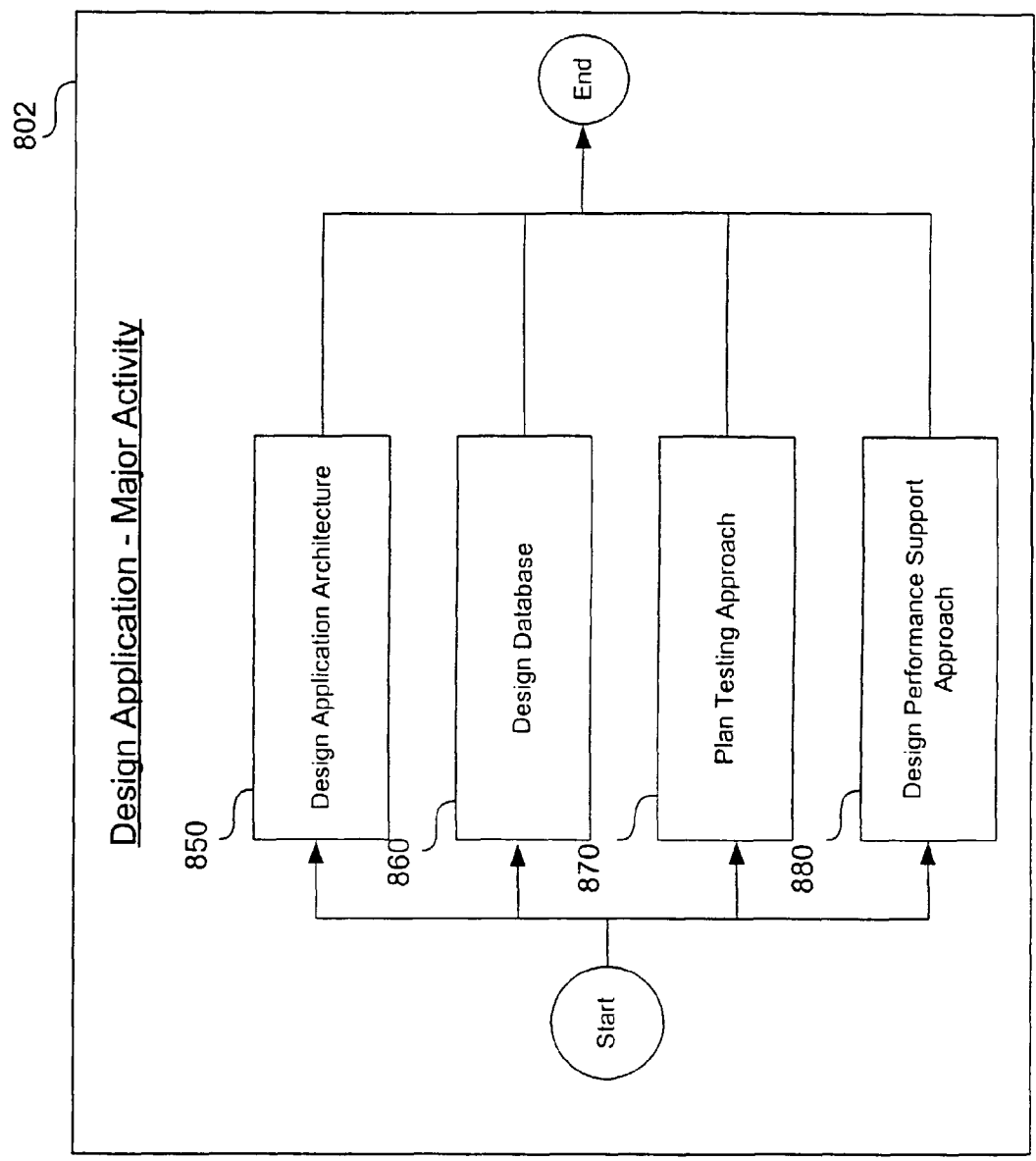

Returning to FIG. 6A, the next step in the delivery management, in step 600, is to design an application, step 802. As illustrated in FIG. 8F, during the design of the application in step 802, the organization designs an application architecture, step 850, to develop and document the conceptual and general design of the application and designs a database, step 860, to transform the data model into logical and physical designs of the application's database, while ensuring that data requirements should be met, and that data should be available through a conversion process. The design of the application in step 802 also entails planning a testing approach, step 870, for developing a comprehensive testing approach that should be used at all levels of testing, including component, assembly, product, user acceptance testing, and production readiness, i.e., deployment testing. Then, in step 880, the organization designs a performance support approach to determine existing workforce training needs, as well as to design methods and standards for performance support products to meet those workforce training needs.

Figure 8G:
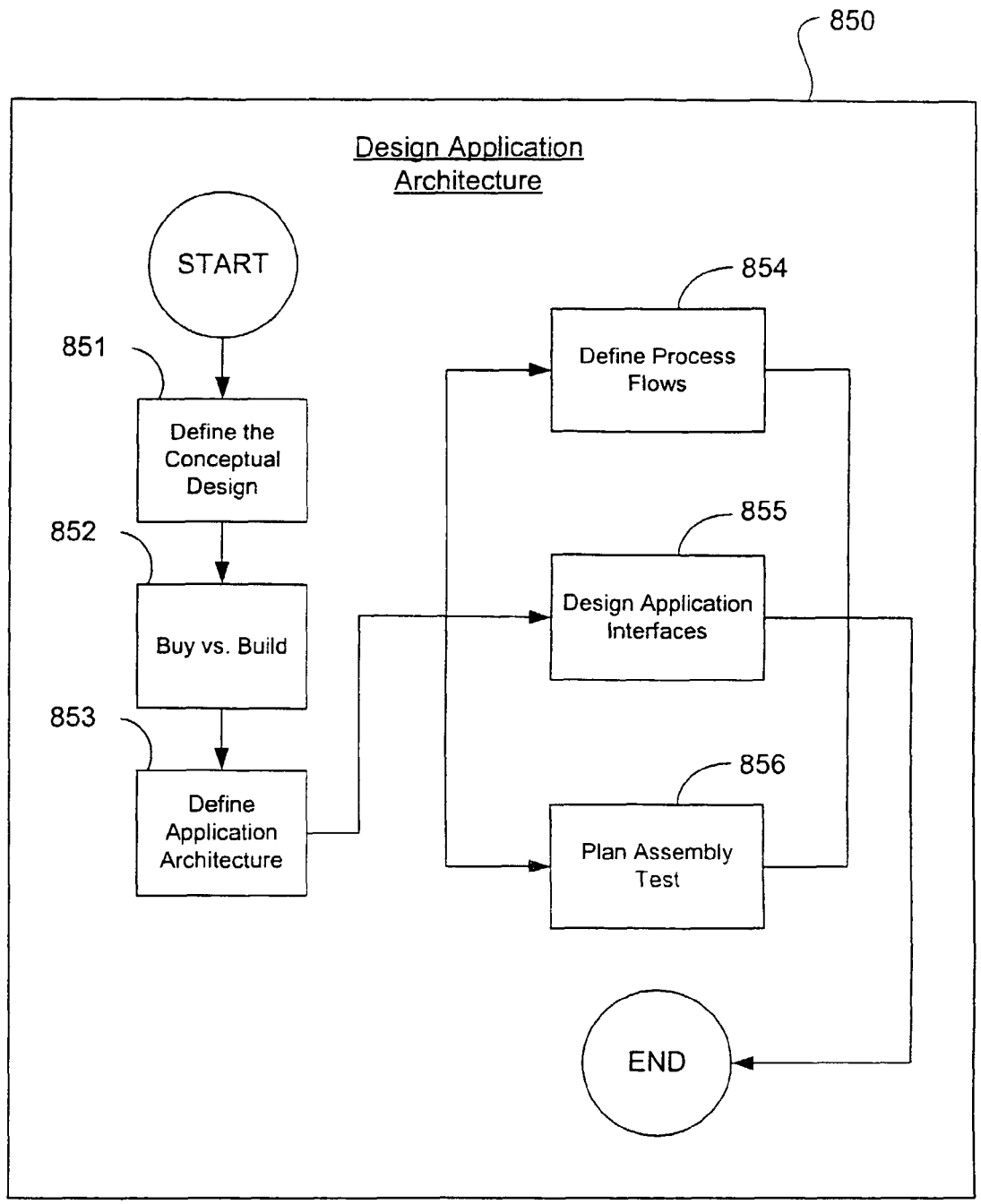

During the design of the application architecture in step 850, the organization seeks to develop and document the conceptual, general, and interface designs of the application. Preferably, to prepare for testing of the architectural components, an architecture test plan, conditions, scripts and other needed family are also be created or defined. As illustrated in FIG. 8G, the first step in the design of the application architecture in step 850 is to define the conceptual design, step 851. Specifically, the organization should document the operational concept for the solution in the conceptual design document. This documentation should outline the functional architecture of the proposed solution.

Continuing with FIG. 8G, the organization should next determine whether to buy or build components, step 852, by reviewing the conceptual design and assessing factors such as historical information, corporate strategy, support infrastructure, product availability, deadlines, and criticality of requirements. At this point, the organization should define an application architecture, step 853. When defining the application architecture in step 853, the organization should determine an approach for conducting design, such as calling group meetings for creating a conceptual approach. The organization should then evolve the conceptual design into a more detailed design as necessary for implementation with application. While evolving the design, key design decisions may trigger the need for a DAR, as described above.

Continuing with the design of the application architecture in step 850, as depicted in FIG. 8G, the organization next undertakes the concurrent tasks of defining a process flow in step 854, designing application interfaces in step 855, and planning an assembly test in step 856. In defining a processing flow in step 854, the organization identifies all programs in the application, identifies their sequence, decomposes the programs into modules, and identifies how the modules communicate. The aim of step 854 is to develop enough detail to estimate the application's costs, resource consumption, and response times.

At the same time, the organization designs application interfaces, step 855. Specifically, the organization designs the automated interfaces between the application being built and other applications with which it should communicate. During step 855, the organization also preferably develops an interface agreement and interface design to outline the expectations of the parties developing the various components. These documents should describe the handling of change requests, data exchange and control, backup and recovery requirements, error handling procedures, and provide escalation procedures in the event of a conflict.

At the same time, the organization also plans assembly tests, step 856, by developing an approach and a plan that should be used to organize and execute assembly tests. The objective of assembly testing is to ensure that related components function properly when assembled into dialogs or batch strings and to verify that the component interfaces have appropriately implemented the design.

Figure 8H:
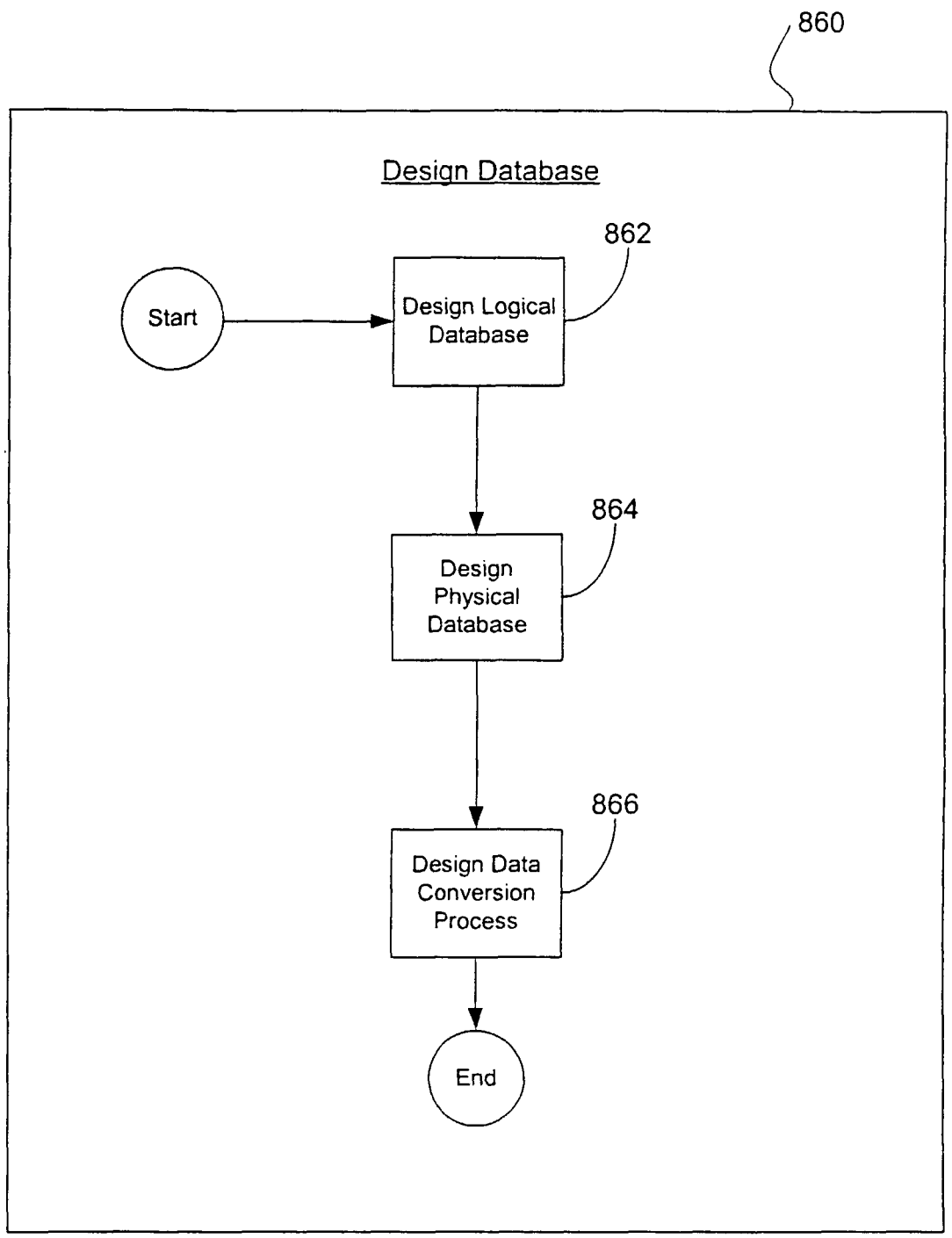

As illustrated in FIG. 8F, the next step in the application design 802 is to design a database, step 860. When designing a database in step 860, the organization transforms the data model into logical and physical designs of the application's database, acts to ensure that all data requirements should be met, and that all data should be available through the conversion process. The steps in the database design 860 are illustrated in FIG. 8H. The first step in the database design 860 is to design a logical database, step 862. The organization may perform this task to transform the data model into the logical data structures using known database techniques. If the design of the logical database in step 862 produces a relational database, the logical database includes tables that contains various data used to define the database such as columns, primary keys, and row lengths; codes tables; foreign keys; integrity rules; views; and denormalization of the statistical data contained in the database. The logical data model is typically delivered to a client in soft copy format using data modeling tools.

Next, the organization designs a physical database, step 864, by selecting or preparing physical storage and access structures for the application's data and by transforming the logical database design into storage and access structures that can be physically implemented. The physical database produced in step 864 generally includes database definitions, database space worksheets, database mappings, relational index definitions, and table space definitions. The database design 860 continues with designing data conversion processes, step 866, such that the required conversion programs and procedures ensure the availability of data required by the application in production. In this step, the organization should produce an approach for converting and mapping documents.

Figure 8I:
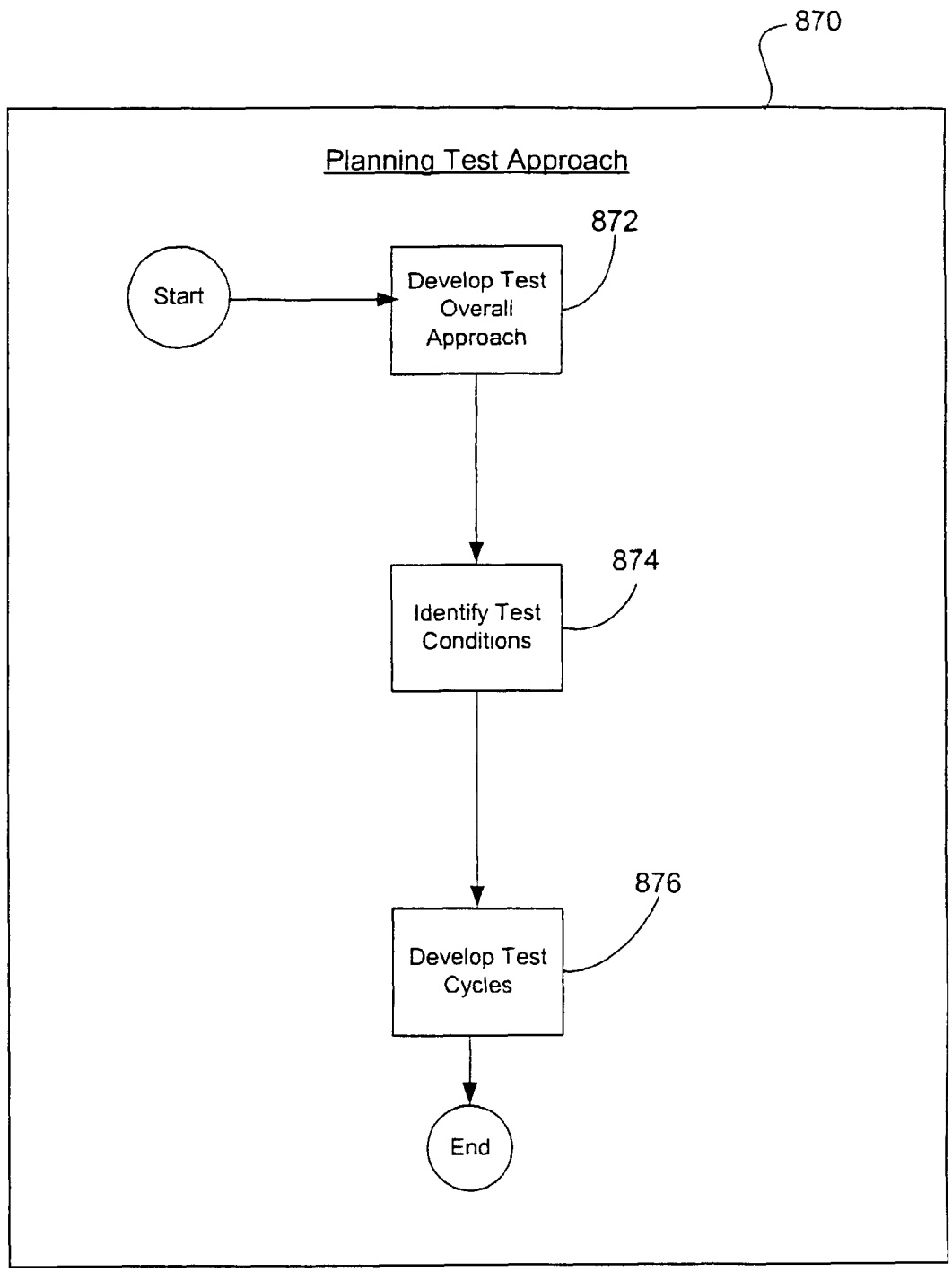

Returning to FIG. 8F, the design of the application in step 802 continues with the development of a planning testing approach, step 870. This planning testing approach should be used at multiple levels of testing such as component, assembly, product, and user acceptance testing, and deployment testing. As illustrated in FIG. 8I, the first step in the development of a planning testing approach in step 870 is to develop an overall testing approach by refining and documenting an overall approach for testing, step 872. In developing the overall test approach, the organization should plan for the testing of interfaces. The overall test approach produced in step 872 should include details on sequence testing and the testing environment and also preferably includes the documentation of the resulting detailed testing procedures. The next two steps in producing a testing approach in step 870 are (1) to identify product test conditions, step 874, where the conditions are used to verify that solutions meets the requirements for the components being created; and (2) to develop product test cycles, step 876.

Figure 8J:
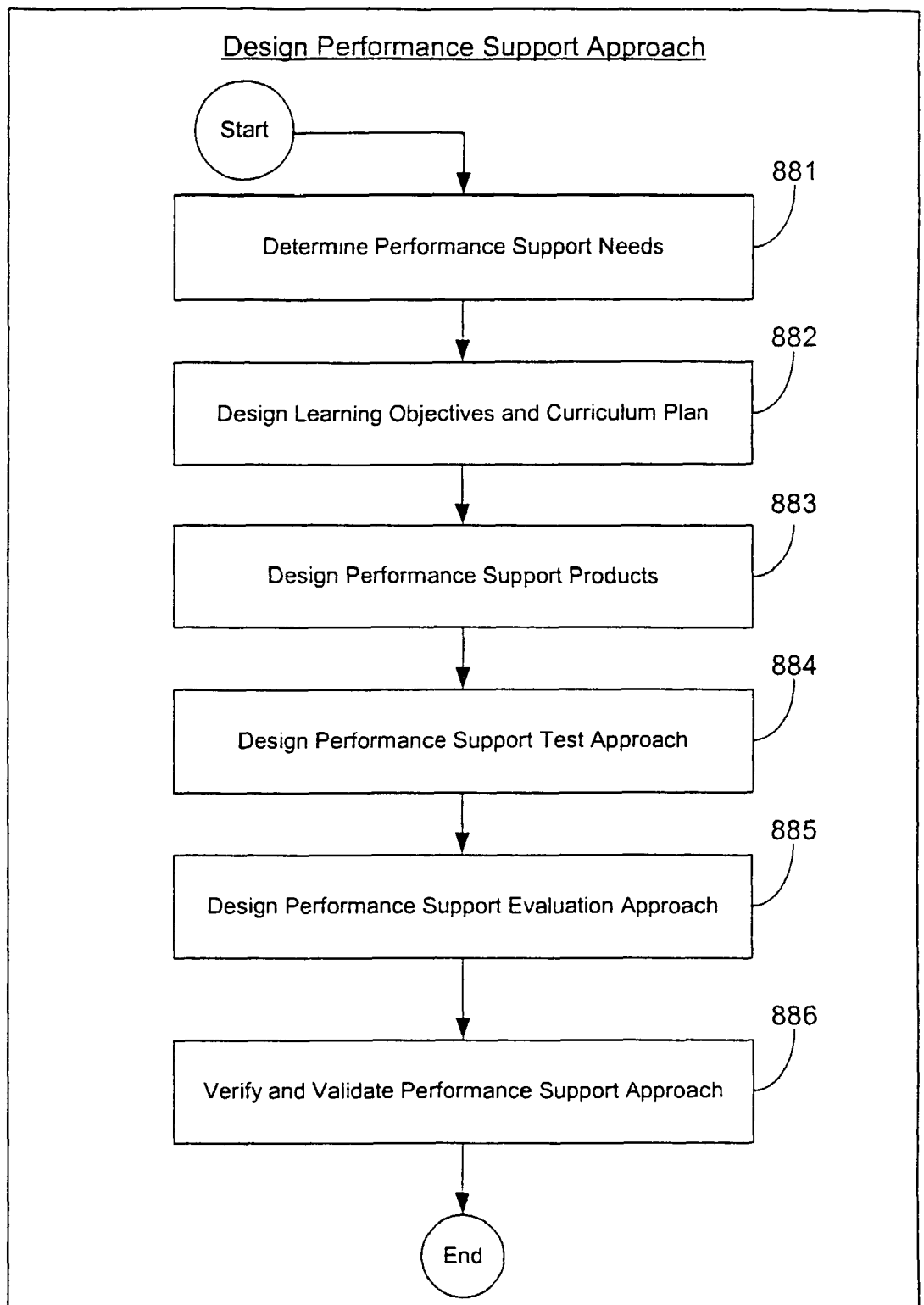

Returning to FIG. 8F, the next step in the application design 802 is to design a performance support approach, step 880, to determine existing workforce training needs, as well as to design methods and standards for performance support products to meet these workforce training needs. In step 880, the organization also designs performance support test and evaluation approaches and completes a validation of the complete test and evaluation approach. With reference to FIG. 8J, the first step in the design of a performance support approach is to determine performance support needs, step 881, to determine the workforce's current proficiency and performance levels. This information is used to assess the gaps between current and expected proficiency and performance levels, which, in turn, drive the design of the performance support approach. Next, the organization designs learning objectives and a curriculum plan necessary to close the proficiency and performance gaps in the organization's workforce, step 882. Another step of the design of a performance support approach is to design performance support products, step 883, to define the delivery methods and standards for performance support. These delivery methods may include instructor-led training, performance simulation, computer-based training, videos, workshops, job aids, on-line quick reference tools, and training databases.

As illustrated in FIG. 8J, the next step is to design a comprehensive approach for testing the performance support products with respect to achieving each product's learning objectives, step 884. In step 884, the organization generally defines an approach that includes the scope and objectives of the test, environment requirements, entry/exit criteria, metrics, and schedule. The organization then designs a comprehensive approach for evaluating the effect of the performance support products on the employees' competency proficiency levels and performance levels in specific areas, step 885. Any designed approach for performance support evaluation should include evaluation methods, proficiency metrics, and schedules. The design of the performance support approach in step 880 may also include the verification and validation of the performance support approach and the curriculum plan with stakeholders and subject matter experts, step 886. The organization should also organize labor review sessions to determine how well the sessions fit together to support the training needs of the workforce.

As illustrated in FIG. 6A the next step in the delivery management 600 is to build and test, step 900. The build and test step 900 concentrates on implementing the business solution elements required for a single release. The delivering teams are responsible for the detailed design and creation of new processes, facilities, learning systems, performance support, application systems and technology infrastructure necessary to implement the new solution. These elements are then tested and implemented within a pilot environment. Thus, the building and testing in step 900 is accomplished through building and testing the technology infrastructure in step 901, building and testing the application in step 902, and planning executing product and acceptance tests in step 903.

Figure 9A:
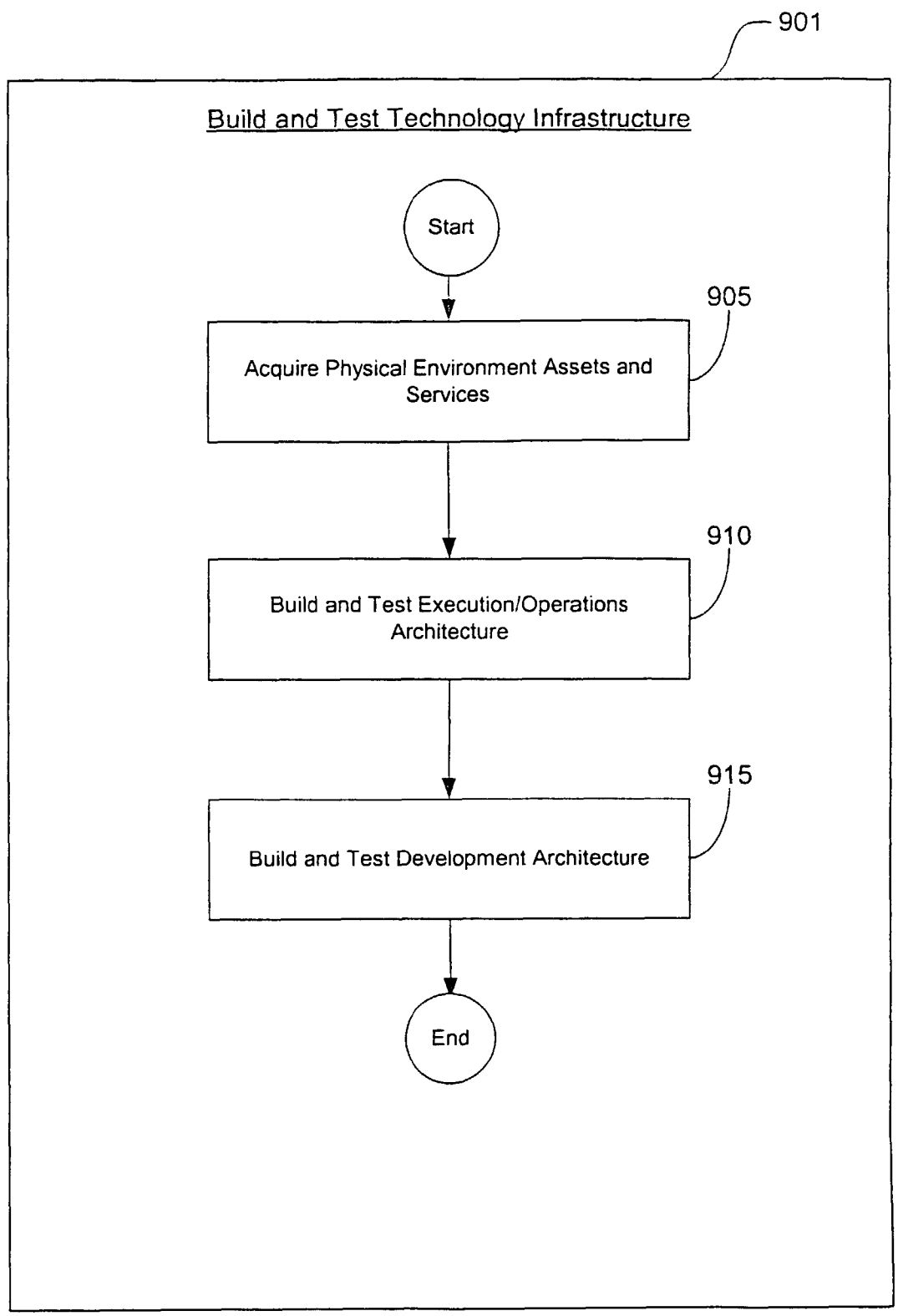
FIGS. 9A-9M are flowcharts depicting the steps of build and test stage of the delivery management of FIG. 6A in accordance with embodiments of the method of FIG. 1.

FIG. 9A presents the elements in the building and testing of the technology infrastructure in step 901. Step 901 focuses on acquiring, developing and testing the technology infrastructure. During step 901, additions and extensions to the execution/operations and development architectures are implemented, physical network and computing resources are developed, and a unified product is tested prior to the application product test. The first task in step 901 is to acquire physical environment assets and services, step 905. Generally, these physical environment assets and services are deployed to enable the implementation of the requirements based on the previously defined details of the physical environment assets. For instance, the organization may apply the data obtained in step 420. The organization uses the listing of physical environment assets and services to decide who should supply the assets and services, how the assets and services should be supplied, and how much the assets and services may cost.

Figure 9B:
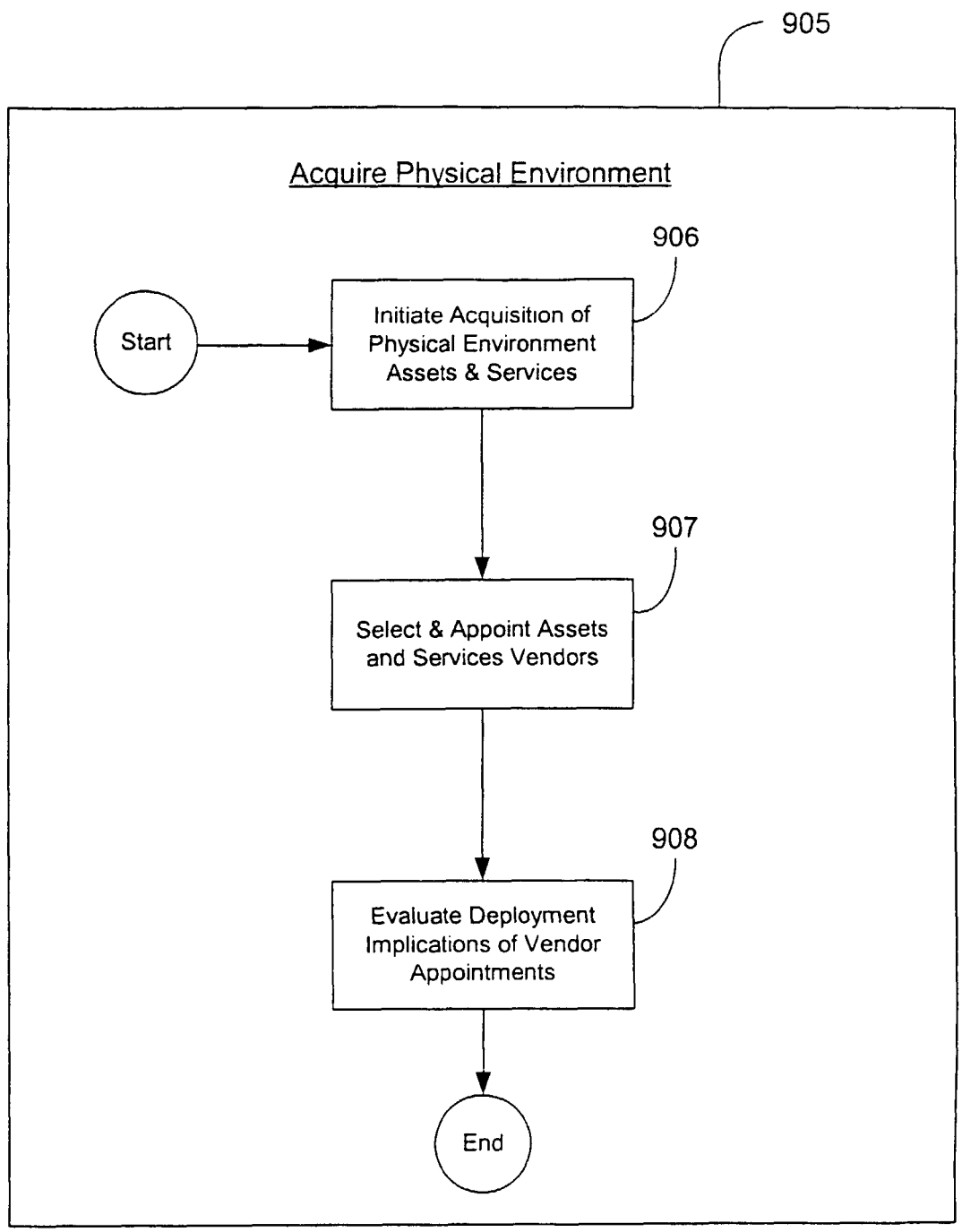

As depicted in FIG. 9B, the first step for acquiring physical environment assets and services is to initiate the acquisition of physical environment assets and services by selecting and appointing providers of assets and services, step 906. For instance, the organization preferably identifies those contracts that need to be negotiated on an expedited basis and ensures that due diligence is applied to the context and content of all contractual arrangements. The organization then selects and appoints assets and services vendors, step 907, to appoint third-party suppliers and contractors who may provide assets, such as property and equipment, and technical/build/transfer/install/maintenance services for deployment of the physical environment, or services relating to decommissioning and disposal of the existing physical environment.

Again, the organizations should prioritize those early purchase requirements that need to be expedited on a "fast track" basis. Subsequently, the organization should evaluate the deployment implications of the vendor appointments, step 908, to analyze the impact and deployment implications of appointing specific providers, either external or internal. These impacts may involve additions or revisions to project documents such as deployment plans, Business Case, project plan, and all subordinate plans.

Figure 9C:
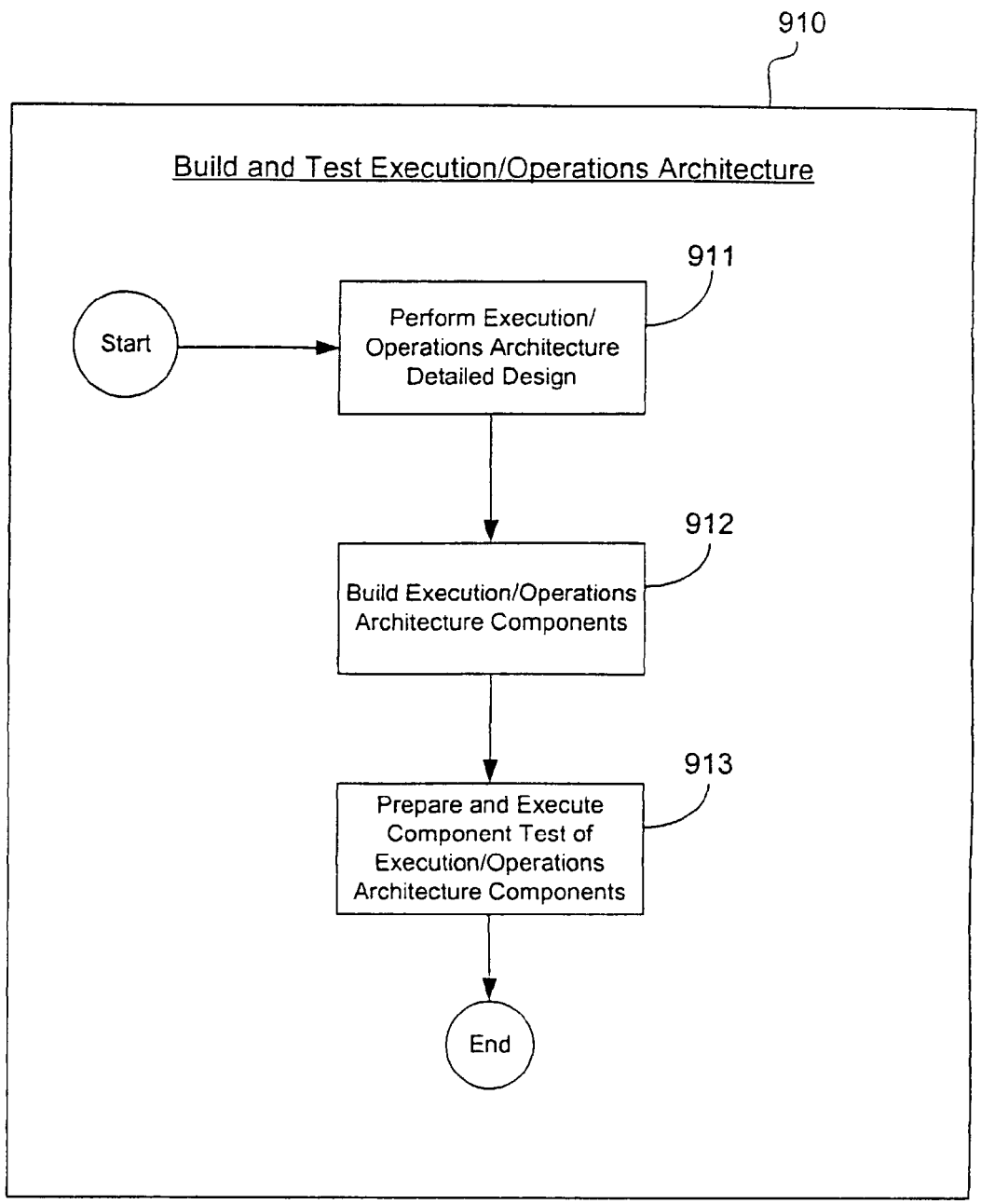

Returning to FIG. 9A, the next step in the building and testing of the technology infrastructure, step 901, is to build and test the execution/operation architecture, step 910, in order to complete a detailed design of the execution/operation architecture and to build and test that architecture. The organization may use the same methodology for application and operation development, as provided above in step 820, to plan and perform the component tests of the execution/operation architecture. As illustrated in FIG. 9C, the first step in the building and testing of the execution/operation architecture is to develop program specifications for each custom component of the execution architecture and to determine software configurations for each packaged or reusable component of that architecture, step 911. The organization may use the resulting detailed design to build custom components and to install packaged or reusable components. This task may also include updating the technology infrastructure component test plans, conducting reviews of the resulting detailed designs, and preparing common test data.

The organization next builds any custom execution/operation architecture components needed for the project, step 912. This step 912 may also include documenting development procedures and standards, and conducting code reviews. The organization then prepares and executes a component test of the execution/operation architecture components, step 913, to verify that the execution/operation architecture components are built according to proper designs. During step 913, any detected errors should be documented, and all of the execution architecture components should be relatively free of errors and ready for a subsequent assembly test.

Figure 9D:
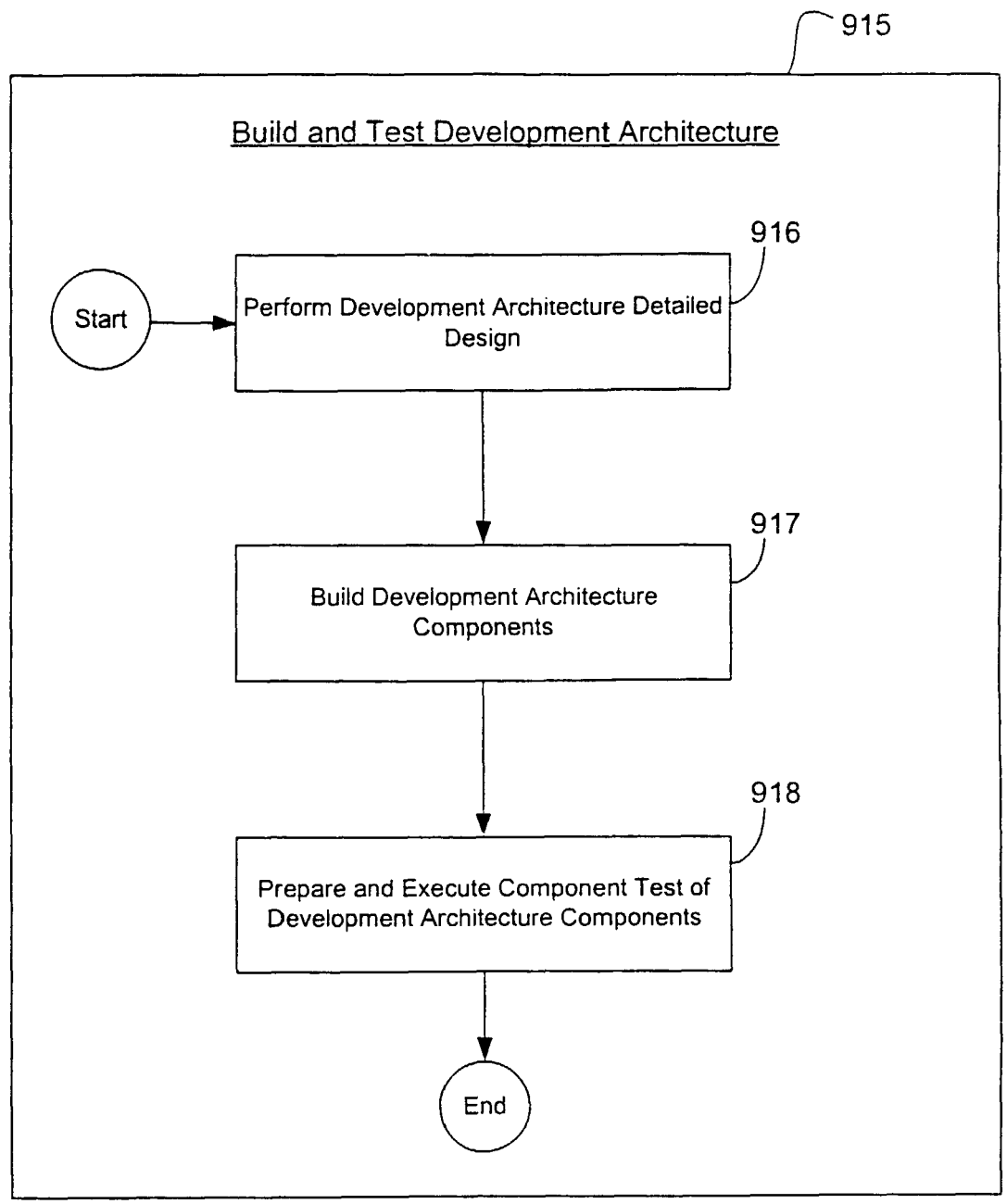

As depicted in FIG. 9D, the organization should similarly build and test the development architecture, step 915. The first task in step 915 is to perform a detailed design of the development architecture, step 916. In step 916, the organization develops program specifications for each custom component of the development architecture and to determine software configurations for each packaged or reused component of that architecture. Step 916 also preferably includes updating the technology infrastructure component test plans, conducting reviews of the resulting detailed designs, and preparing common test data. The organization should then build any needed custom development architecture components, step 917. Step 917 may also include documenting development procedures and standards, and conducting code reviews. The organization then prepares and executes a component test of the development architecture components, step 918, to verify that the development architecture custom components are built according to their designs. During step 918, the detected errors should be documented, and all of the development architecture custom components should be relatively free of errors and ready for the assembly test.

Figure 9E:
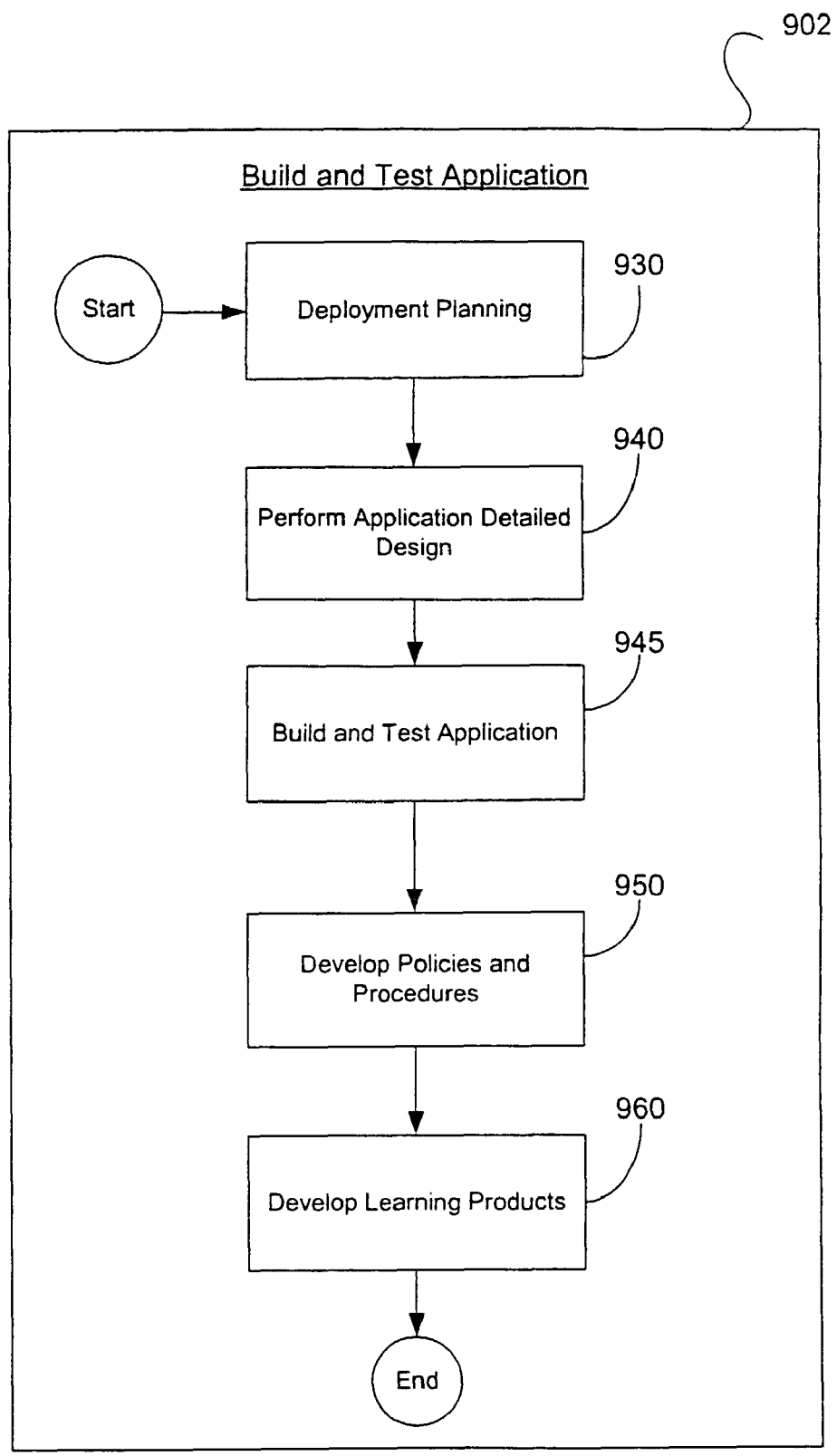

As depicted in FIG. 6A, the build and test stage 900 also includes the building and testing of the application in step 902. Step 902 focuses on building and testing the application, creating training materials and other forms of performance support required by the business solution. During step 902, the detailed design, component testing and assembly testing of the application are completed. Learning products and business policies and procedures are developed to train and guide the users of the application. FIG. 9E illustrates the steps involved in the process to build and test the application, step 902. The first of these tasks is deployment planning, step 930, to produce deliverables that should be needed to test the application and interfaces in an operations environment prior to deployment and to run the application and interfaces after deployment has occurred.

Figure 9F:
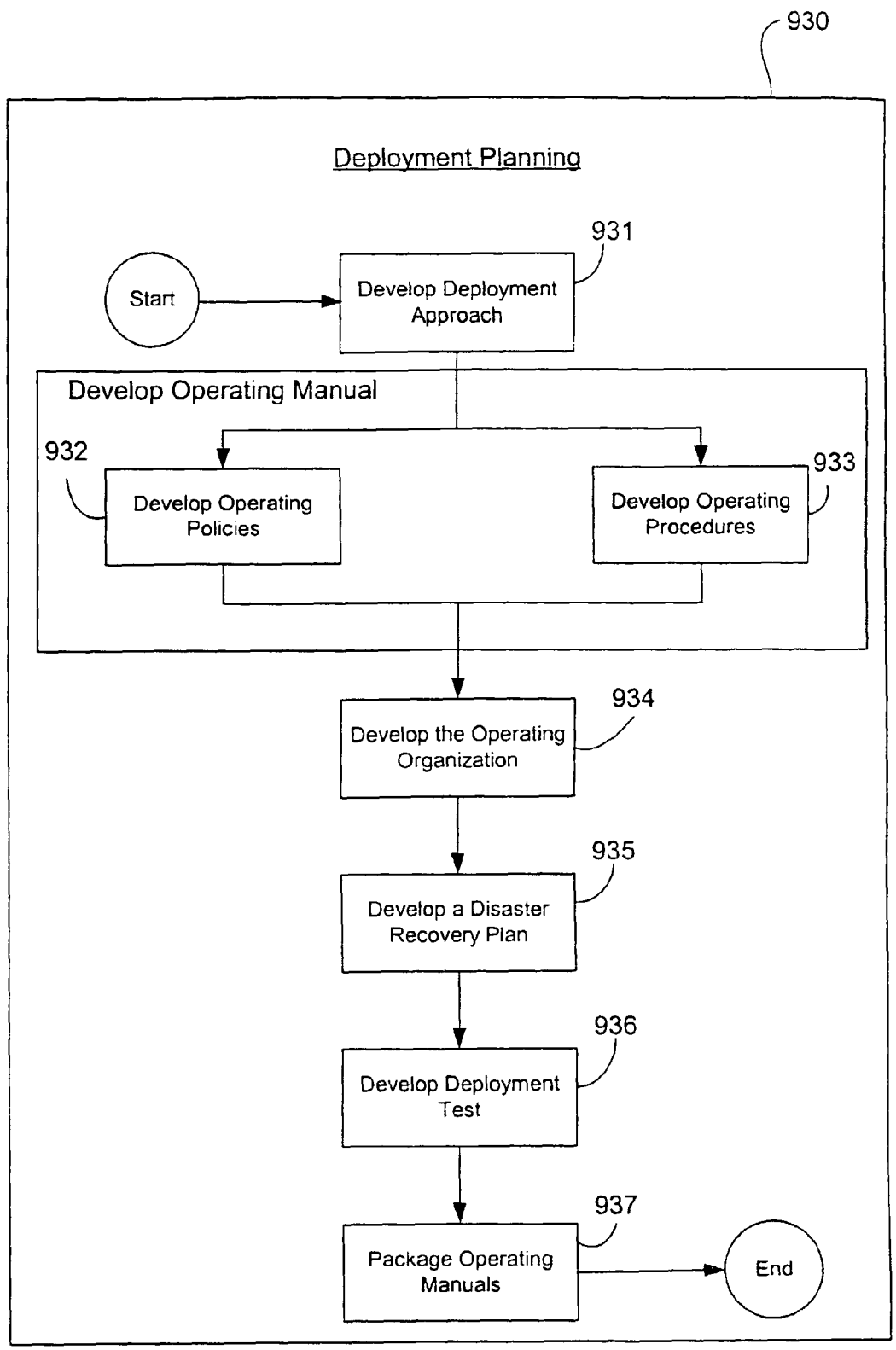

Turning to FIG. 9F, the first task in the deployment planning during step 930 is to develop a deployment approach to document the specifics of the major deployment activities, step 931. The documentation should include items such as Data Conversion, Policy & Procedure Deployment, Risk Mitigation, Deployment Strategy, and workforce transition also should be covered in this document. The organization should next develop appropriate operating policies to produce a document outlining specific policies in the new operation environment, step 932. Responsibilities, system availability, and security should be documented in step 932, and upon completion of the project, this documentation should be given to the client. In a concurrent task, step 933, the organization may develop operating procedures by producing a document outlining the procedures that need to be followed during on-going support and operation of the installed application. Other subsequent tasks are to develop the operating organization to document the long-term organizational requirements that should be needed in the new operation environment, step 934, and to develop a disaster recovery plan that outlines an overall disaster recovery approach, as well as specific steps to follow during the disaster recovery process, step 935. The organization may then prepare the deployment test by creating a deployment test plan, test conditions, test scripts, and test data, step 936. This plan should be executed prior to delivery of a product to clients. Another step is to package operating manuals, so that the manuals may be turned over to client at completion of the project, step 937.

Figure 9G:
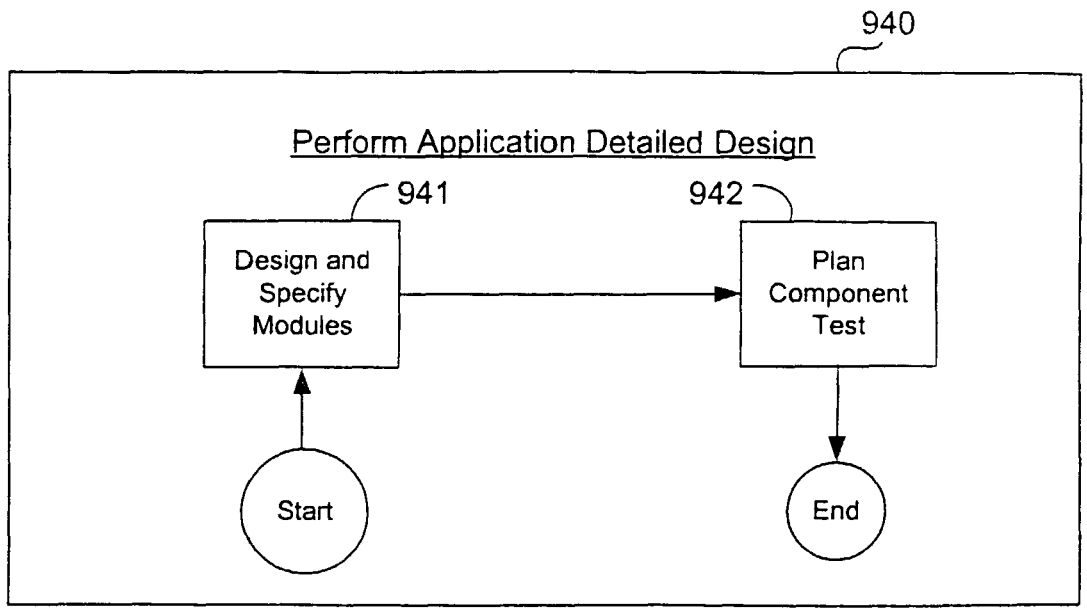

The next step 940, the performing of application detailed design, is illustrated in FIG. 9G, and generally comprises a process to produce completed detailed design specifications that can be directly implemented in code, and a process to develop the approach and plan for component testing the application's modules. The first substep is to design and specify modules, step 941. Step 941 includes the production of a detailed design of the application and interfaces based on the general design and the application/interface requirements specification. During step 941, the organization should continue use of the chosen design methods to complete detailed designs. The organization should also prepare a detailed design of the application by specifying all of the modules and their associated call patterns to the lowest level of detail. The detailed design of the application should also include describing each module's purpose and processing logic, developing database access patterns, and identifying other input/output operations. The organization should also be sure to address interfaces during the design process. In step 941, the organization should also update the interface agreement created during the design stage 600 to reflect any changes associated with the interfaces. The next task in performing a detailed design of the application in step 940 is to plan component testing, step 942, to verify the correctness of implementation of each of the application modules with respect to the application detailed design specifications. Step 942 includes determining common test data requirements and using the requirements to create common test data that can be used in the different stages of testing.

Figure 9H:
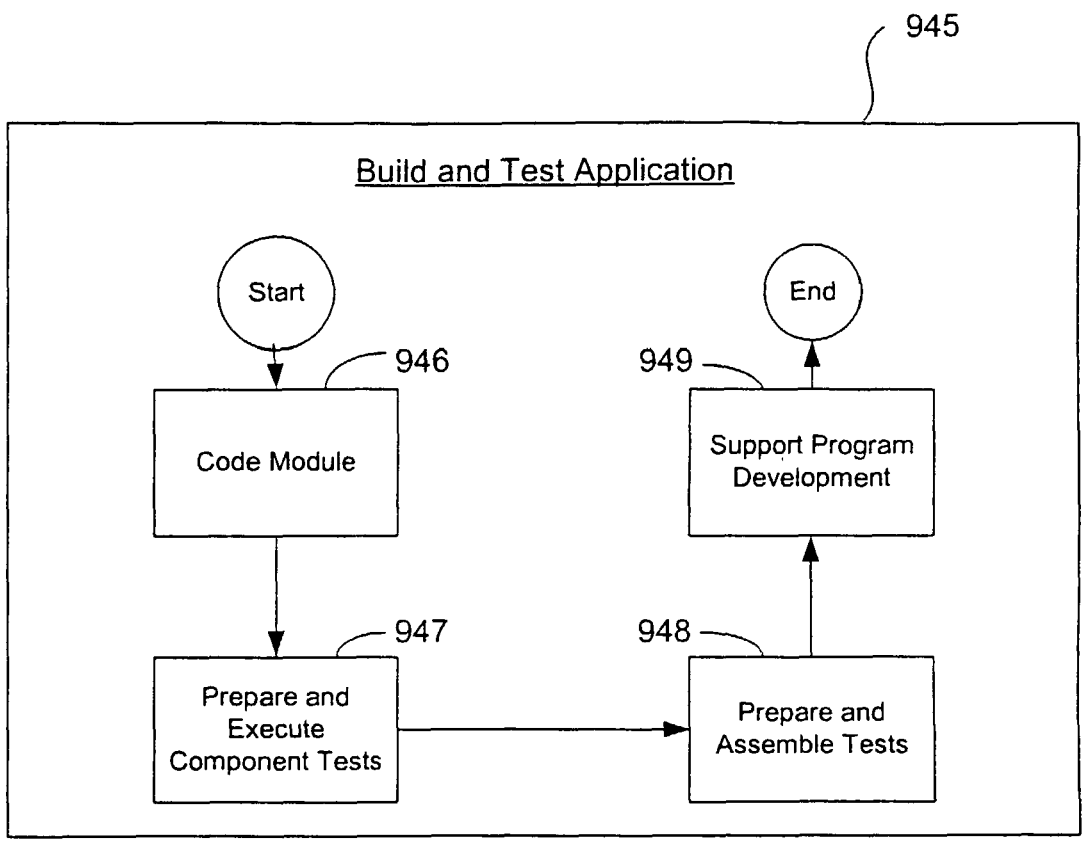

As illustrated in FIG. 9H, the next step in the build and test stage 900 is to build and test the application, step 945. In step 945, the organization builds a complete, high-quality software application from the detailed design of the application. The organization may have developers implement the modules and then review the coded modules to verify correctness. The organization may also execute assembly tests to check interfaces and interdependencies between modules. One task in the building and testing of the application is the coding of modules, step 946, to create the code of each of the modules according to the previously created detailed application design specifications. Once the code is generated, the organization should check and compile the code as necessary for the project to identify and fix all errors, and to ensure that developers have followed any detailed coding procedures outlined in the project developer's guide.

Continuing with FIG. 9H, the goal of the next step, the preparation and execution of the component tests in step 947, is to execute module code and verify that the module specification was correctly translated to the code. The module code should be verified using the component test conditions from the component test plan to prepare the test data and test scripts for the component tests. The organization should document and fix all detected errors before proceeding. The organization may then prepare and execute assembly tests, step 948, as needed to integrate modules and verify that their interfaces and interdependencies are correctly designed and implemented. In step 948, the organization should use the assembly test conditions from the previously prepared assembly test plan to prepare test data and test scripts for the assembly tests. All detected errors should be fixed before proceeding. The next step, the development of a support program in step 949, involves coordinating and controlling the efforts of the development teams by supporting the programming and testing effort through supervision, control, and coordination. The organization may manage the programming and testing schedule, and monitor progress and report status, via the project management task packages outlined in the document repository policy defined in earlier steps.

Figure 9I:
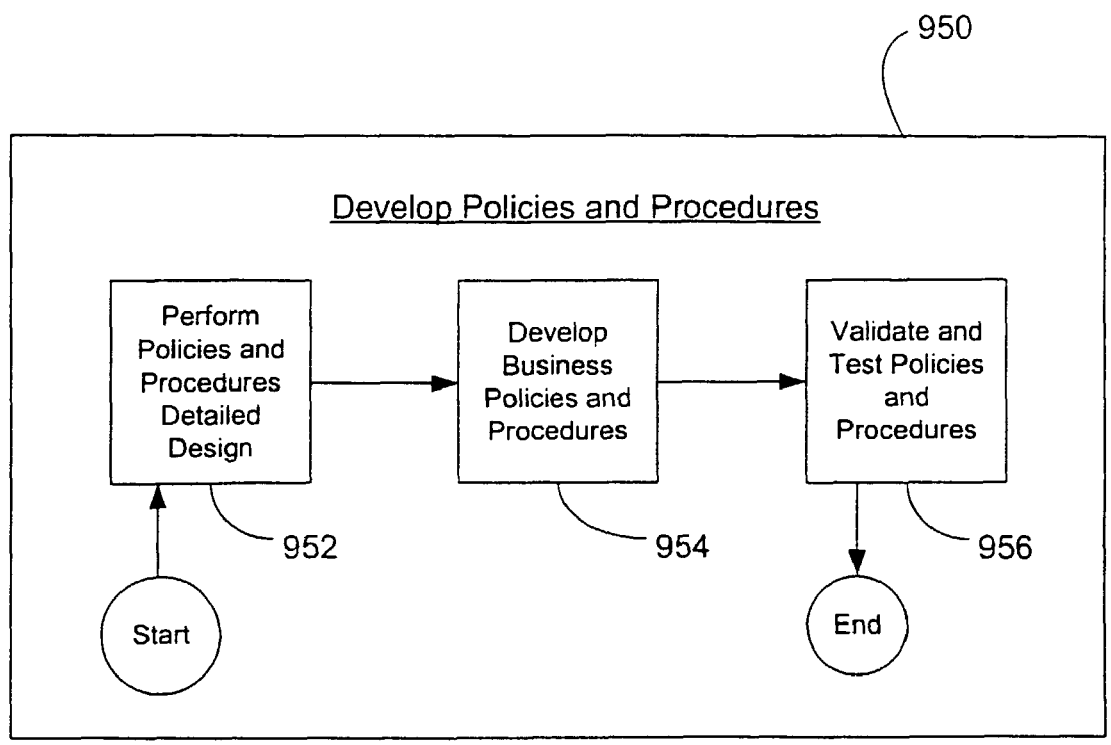

As depicted in FIG. 9I, at this point in the build and test stage 900, the organization may develop a finalized, detailed set of policies and procedures, step 950. The business policies and procedures consist of rules governing work within the organization (policies) and the workflow for executing these rules (procedures). A first task in step 950 is to perform a detailed design of policies and procedures, step 952. In step 952, the organization should (1) define the product structure and design and (2) create and develop prototype templates for all policies and procedures. The organization should then develop business policies and procedures, step 954, by drafting a complete set of business policies and procedures to support the pending product release. In step 954, the business policies describe the business rules governing workflows and drive the development of business procedures and user procedures documentation. Similarly, the business procedures describe the sequential sets of tasks (and related resources, metrics, etc.) to follow based on the business policies. The organization should next validate and test these policies and procedures, step 956, to ensure that the Business Policies and Procedures meet the content of the requirements and can be executed by use of the applicable application. In step 956, the organization should further verify that the information collected is complete and accurately describes the processes.

Figure 9J:
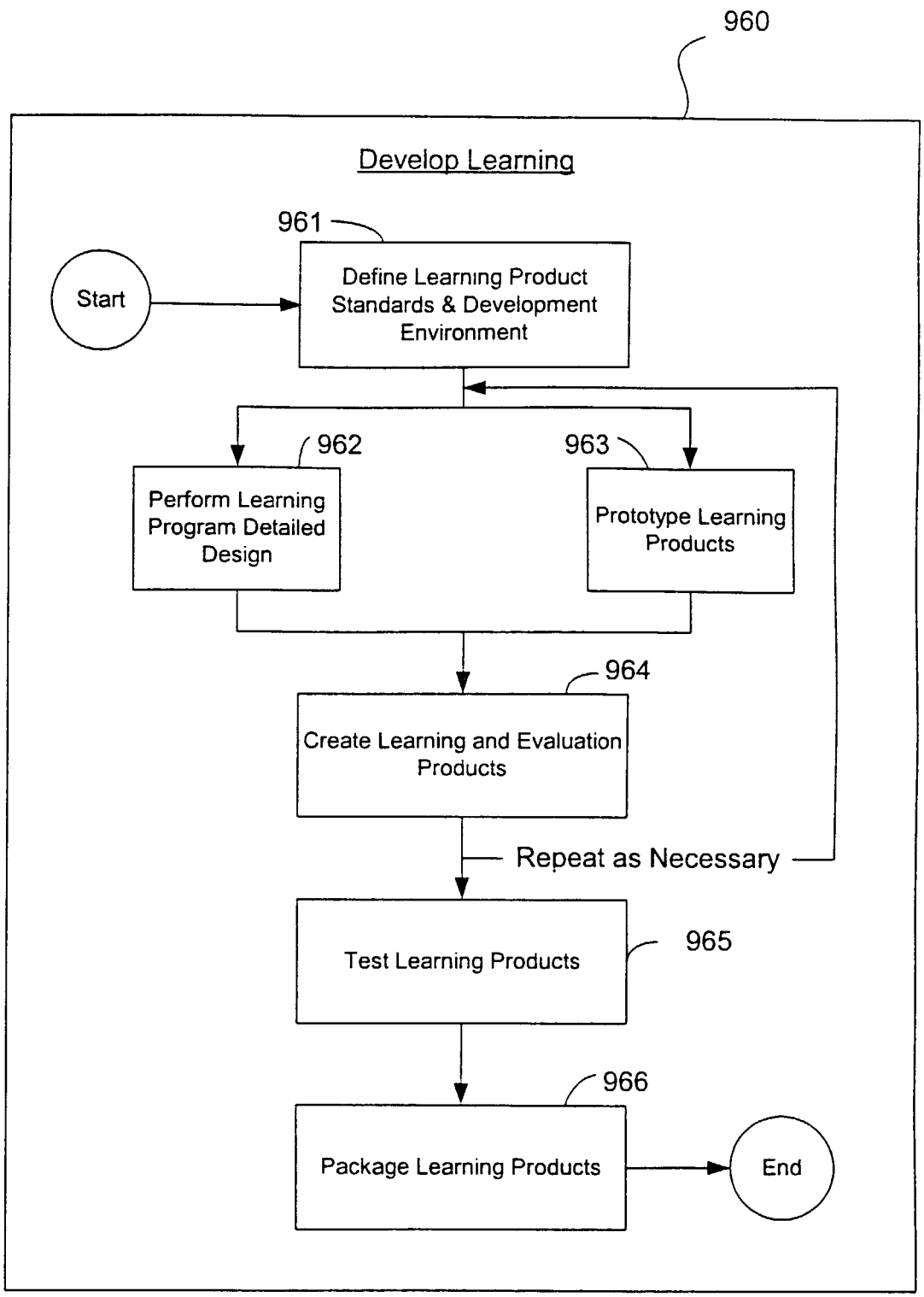

Turning to FIG. 9J, the next task in the building and testing of an application in step 900 is to develop learning products, step 960. In step 960, the organization selects the relevant authoring and development tools and to define standards, templates, and development procedures. Step 960 further includes the defining of detailed learning objectives, determining learning context, and designing learning activities. The organization should also review paper-based learning product prototypes for ease of use. Also, the organization should develop activities and content, and define the support learners should require, and develop learning program evaluation materials for during-delivery and post-delivery evaluation of the learning process. Thus, in step 960, the organization should prepare and execute testing to ensure each learning product meets the stated objectives and instructors are effective when using the learning products.

As depicted in FIG. 9J, one task in the development of learning products in step 960 is to define learning product standards and a development environment, step 961, after the scope of the learning program has been defined and the learning requirements have been identified. In step 961, the organization should further select authoring and development tools and define the standards, templates, and procedures for the learning products. Development environments typically include Word or PowerPoint-based instructor-led materials or computer-based applications, but can also be made more robust with the use of job aids, a training database, on-line quick reference tools, and videos.

Returning to FIG. 9J, concurrent steps in the developing of learning products in step 960 are (1) performing a detailed design of a learning program, step 962, to specify how each learning product identified in the learning product design should be built to meet the business needs of the organization and (2) prototyping learning products, step 963, to complete low-fidelity prototypes and conduct ease-of-use sessions on learning components (e.g., activities, support system, and instructor guide) of classroom-based learning products.

In addition, the organization may create learning and evaluation products, step 964, to develop the learning materials proposed and prototyped during the learning design activities. The creation of learning and evaluation products in step 964 involves the developing of activities, content, and support materials that the learner will require to complete the learning product. Furthermore, evaluation tools are also preferably created in step 964 to ensure that learners have met the learning objectives. Another possible task in the development of learning products in step 960 is the testing of learning products, step 965, which is best implemented after documenting participant profile, sample size, learning testing methods, test cycles, expected results, and script outlines. The goal is to test each learning product with the intended audience to ensure that the product meets the stated learning objectives, that the instructors are effective, and that the learning product meets the overall learning objectives for the release. The organization may also package the learning products, step 966, so that the learning products may be handed over to an appropriate stakeholder at the end of the project.

Figure 9K:
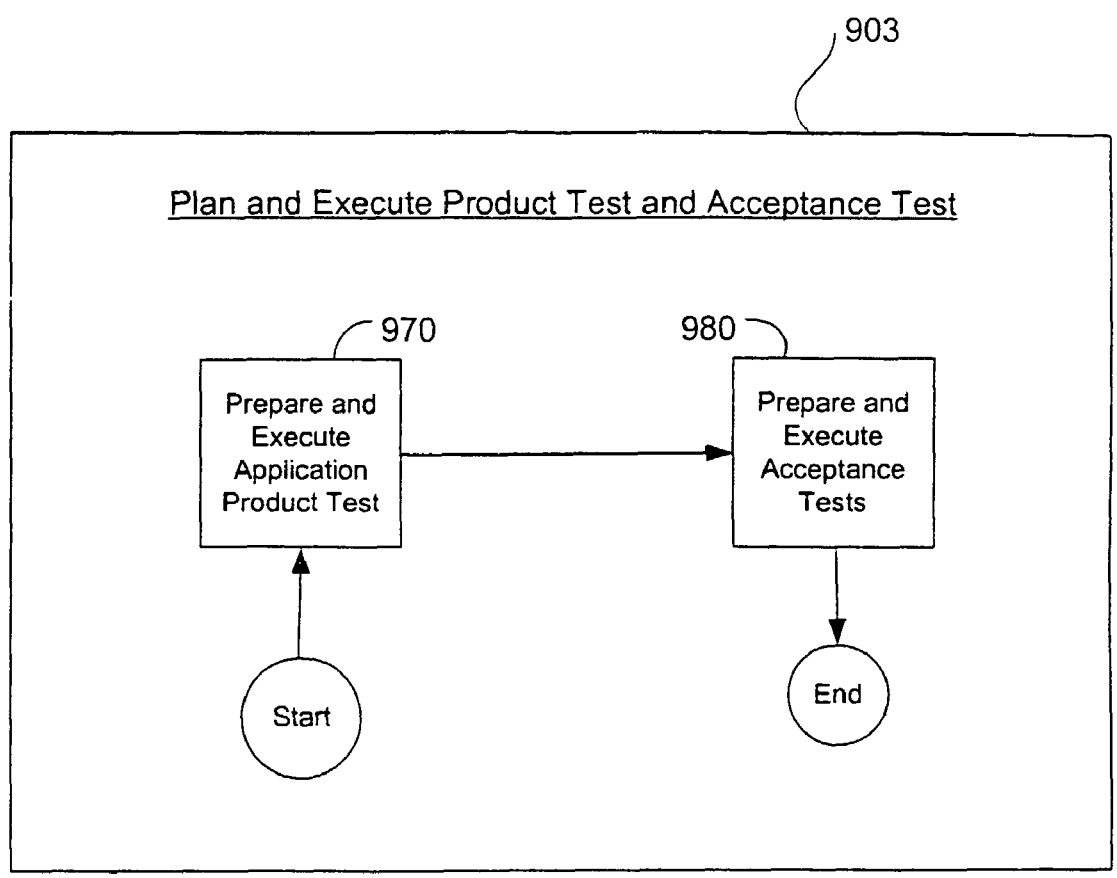

At this point, the organization may plan and execute the product test and acceptance test, step 903, as illustrated in FIGS. 6 and 9K. Product tests evaluate whether the product is properly functioning, whereas acceptance tests evaluate whether the product functions as desired by customers. Step 903 focuses on performing a product test and user acceptance test on the new application to verify the application components and related technology, processes, and procedures work together properly according to the application and interface requirements. The first task in step 903 is to prepare and execute a product test plan, step 970, following the creation of the product test plan, conditions, scripts, and data that are used to execute the product test. The planning and execution of the product test plan in step 970 should not begin until all requirements are finalized, the assembly test has been successfully completed, and the testing approach has been finished.

Figure 9L:
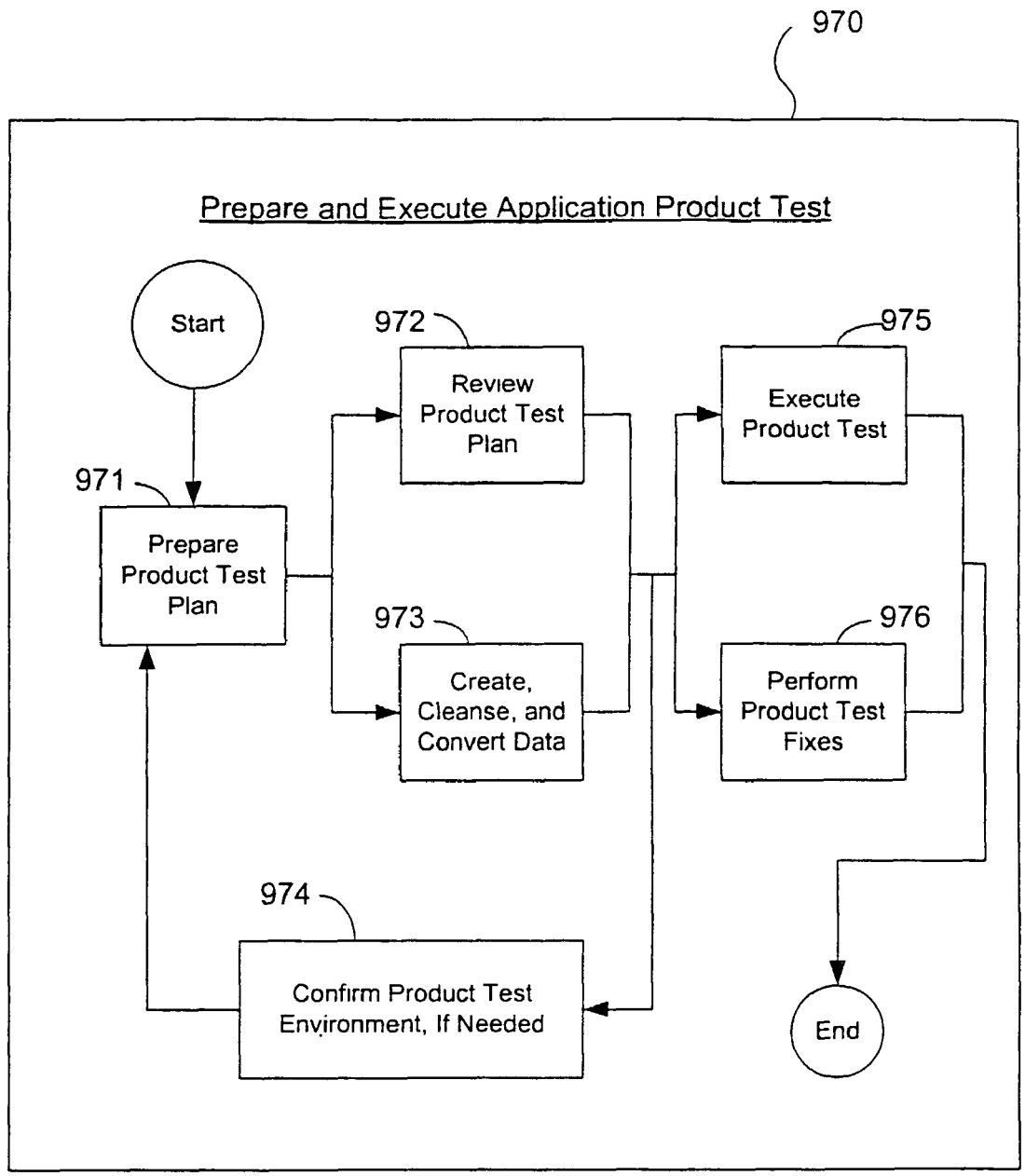

As illustrated in FIG. 9L, to prepare and execute a product test, the organization should prepare a product test plan, step 971, to design and create the test conditions, test scripts, and test data for product testing. The organization should then review its product test plan, step 972, to verify that the product test plan created in step 971 is complete and accurate prior to product test execution. The resulting benefit to this check is that errors are caught early in the test process, where they can be addressed with minimal effort, rather than during test execution, where correction of errors becomes more costly. The organization should also create, cleanse, and convert data, step 973, to prepare the data for product test execution. If needed, the organization may confirm the product test environment, step 974, to verify that the product test environment is ready for application product test execution by confirming that associated items are transferred to the test environment and that the identified configuration is complete and accurate. In this way, in step 974, the organization verifies that any tools needed for managing and executing the product test (for example, scripting tools and test data management tools) are installed and fully operational. This step 974 also helps ensure that the test data is properly copied and identifies responsibility and authority levels for managing code migration into the product test environment.

Continuing with FIG. 9L, following confirmation of the test, the organization may execute the product test, step 975, to verify that the new application can work with the related technology, processes, and procedures to support the business processes successfully. The product test should prove: (1) that the new application and interfaces perform according to the application/interface requirements established in prior steps, and (2) that the application can operate effectively in concert with all other production applications and all available end-user manuals and procedures.

If any problems arise during the testing, the organization may perform product test fixes, step 976, to analyze and resolve all problems identified during product test execution as illustrated in FIG. 9L. Typically, the organization assigns each problem to a specific team member for correction. After a problem is fixed, the organization may reexecute the test condition to verify that the fix was successful, and perform a regression test to ensure other components were not adversely affected by the fix. Once all errors have been resolved the product test can be considered complete.

Figure 9M:
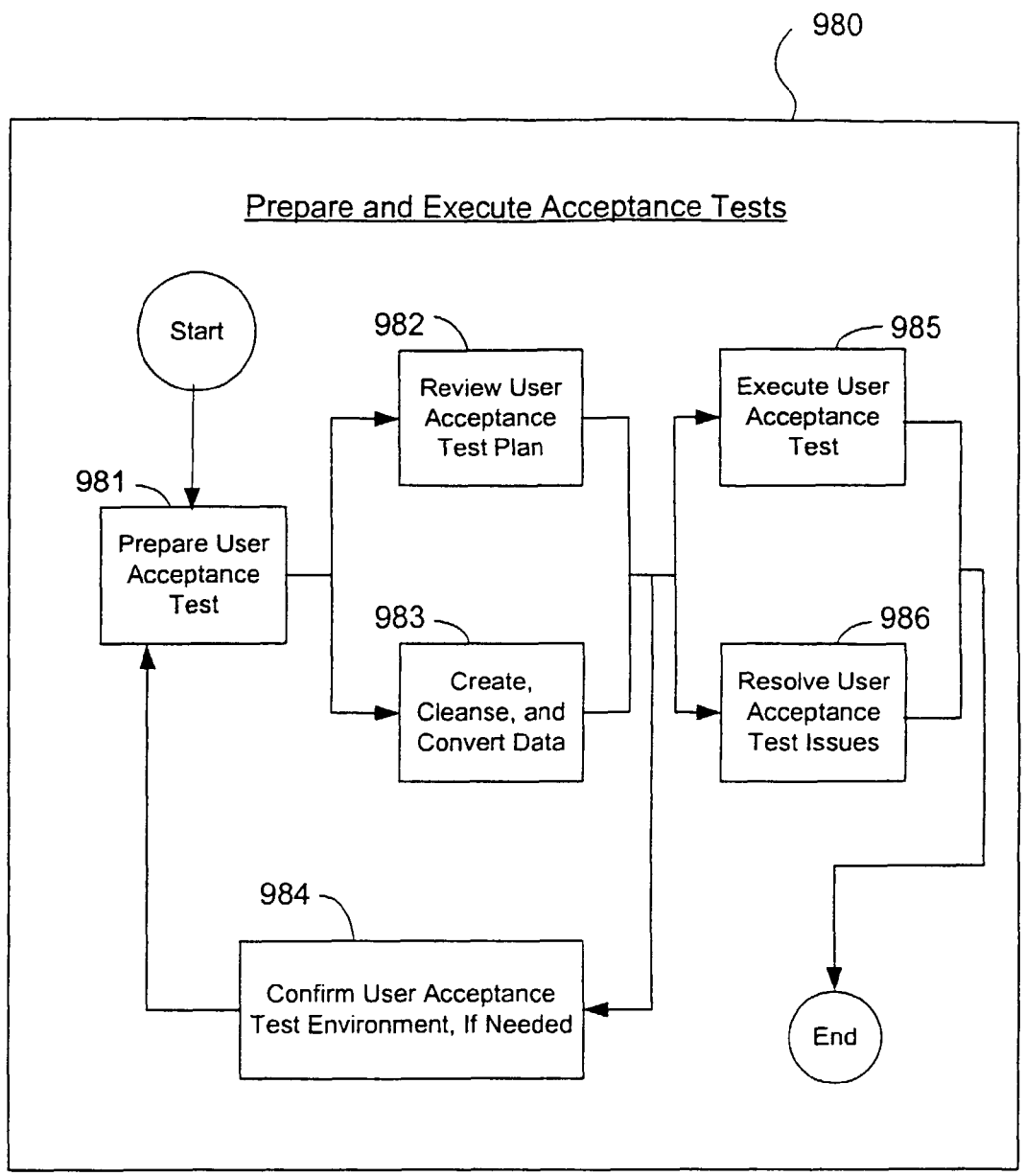

Returning to FIG. 9K, the organization may next prepare and execute acceptance tests, step 980. The organization performs step 980 to create the test plan, test conditions, test scripts, and test data for user acceptance testing. The user acceptance test (UAT) also validates that the solution supports the business performance model and should not begin until successful completion of the product test in step 970. The UAT verifies that the solution works according to the requirements and meets the business objectives. As depicted in FIG. 9M, steps 981-986, the preparation and execution of the acceptance tests during step 980 are very similar to steps 971-976. For instance, the initial step of the preparation and execution of the acceptance tests in step 980 is to prepare a user acceptance test plan, step 981, including plans for testing interfaces and the application. The organization then reviews the user acceptance test plan, step 982, to ensure that the user acceptance test plan is complete. The next step is to create, cleanse, and convert data, step 983, as needed, to prepare the data required for the acceptance testing, including producing new data, converting existing data, and reconciling different data representations and different database schema representations. If necessary, the organizations may also confirm user acceptance of the test environment, step 984, to ensure: (1) that the user acceptance test environment is ready for test execution by checking that all necessary items are transferred to the test environment, (2) that the identified configuration is complete and accurate, and (3) that any tools required during the acceptance test are installed and fully operational.

At this point the organization executes the user acceptance test, step 985, to test the interaction between the components of the solution to verify and validate that they support the model. This acceptance test helps to ensure that the solution works according to the requirements and meets the business objectives. If any problems arise in the test, the organization may resolve user acceptance test issues, step 986. Specifically, the organization may utilize the user acceptance test issues to analyze all problems identified by the user acceptance test execution through investigating each problem, and assigning it to the appropriate development team for correction. After a problem is fixed, the organization should reexecute the test condition to verify the fix was successful. The organization may also perform a regression test to ensure other components were not adversely affected by the fix. Once all errors have been resolved in step 986, the acceptance test may be considered complete.

Figure 10A:
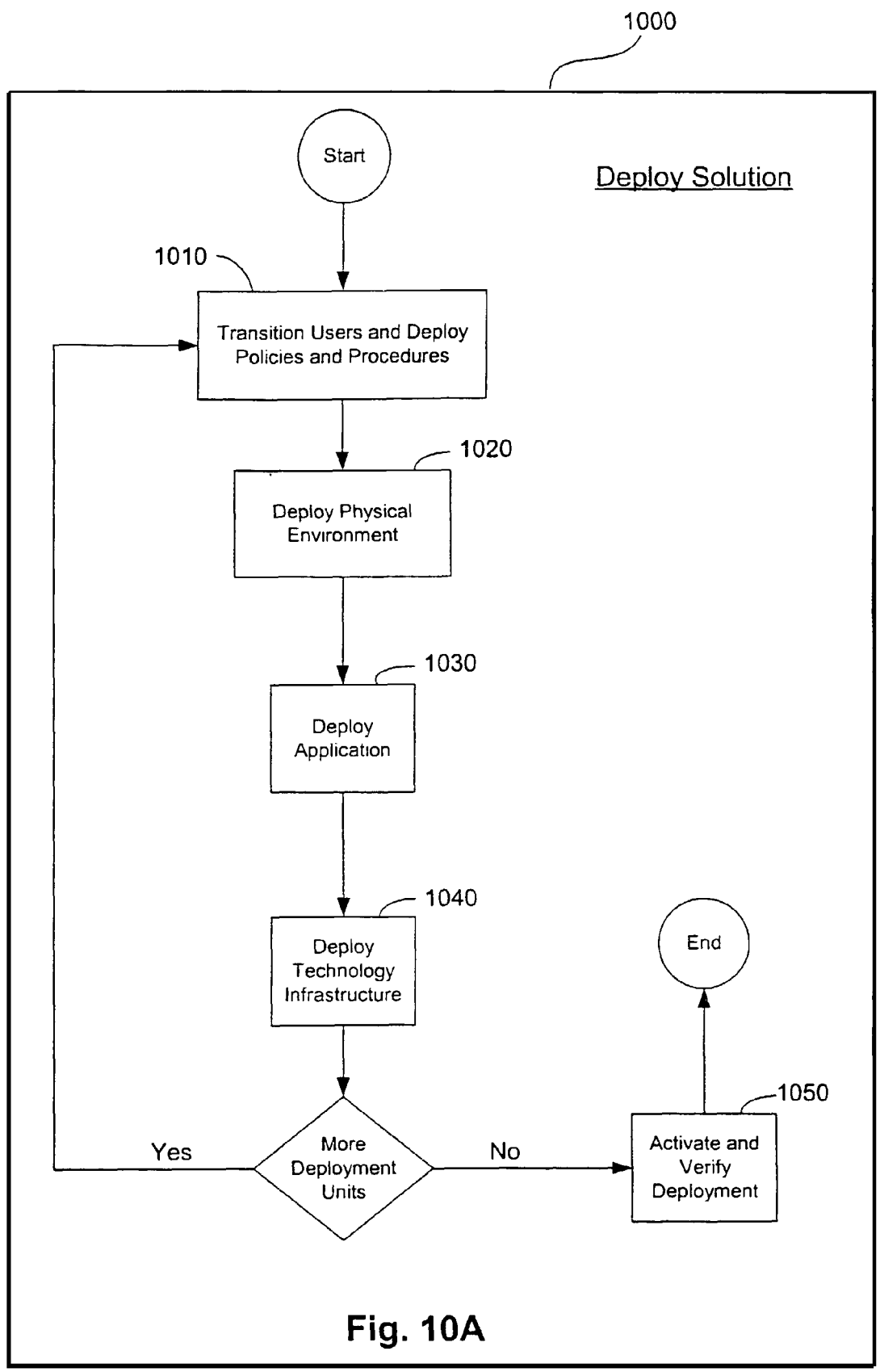
FIGS. 10A-10F are flowcharts depicting the steps of deployment stage of the delivery management of FIG. 6A in accordance with embodiments of the method of FIG. 1.
Figure 10B:
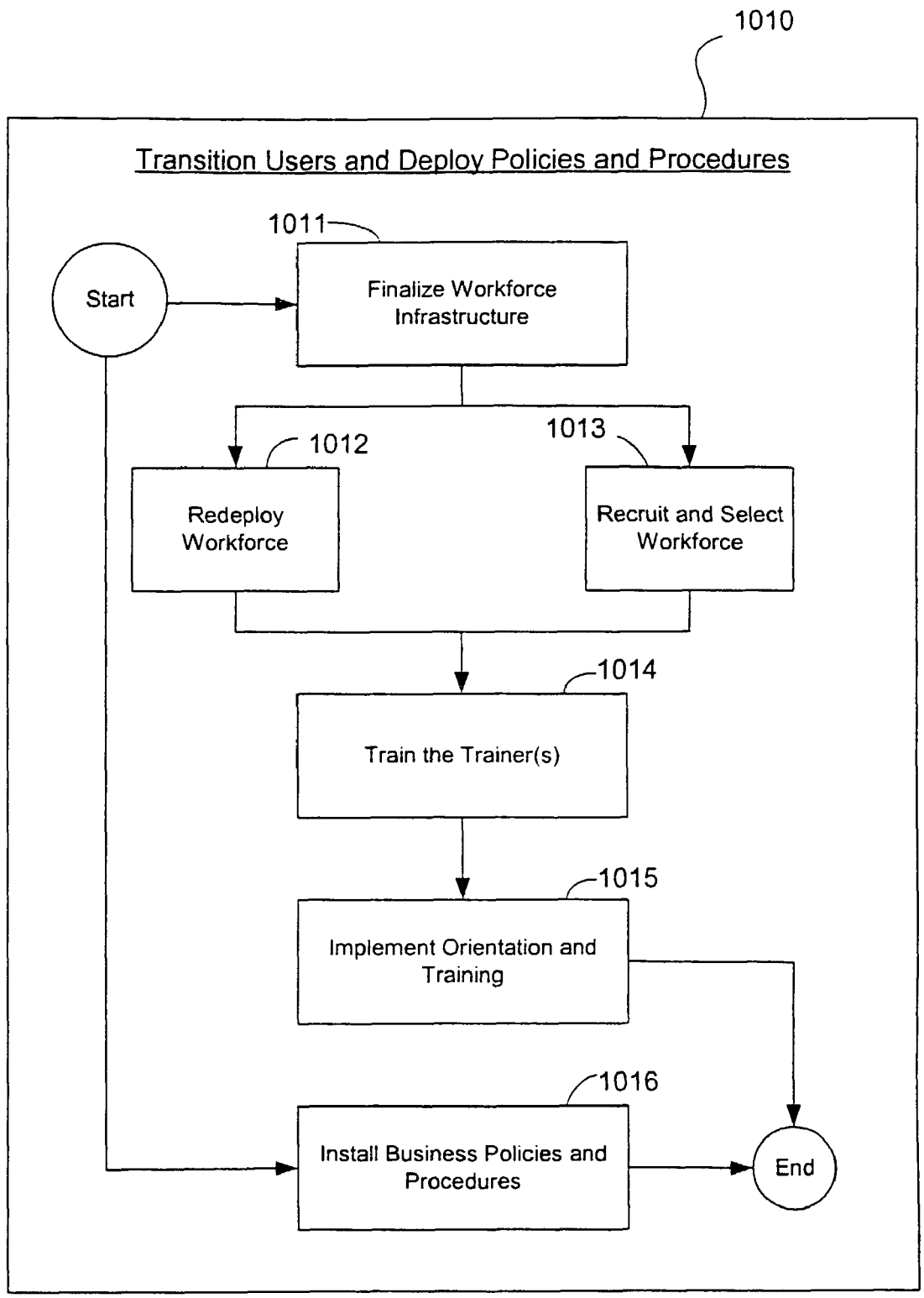

Once solutions to a problem have been analyzed in step 700, designed in step 800, and built and tested in step 900, an organization may deploy the complete solution, as depicted in FIG. 10A. The deployment stage 1000 is conducted to transition the organization to the new business solution. The deployment stage 1000 includes the activities required to transform the personnel, business process, and technology elements required to establish the business solution. The deployment stage is repeated for each deployment site, which is the organizational or geographic unit that will receive the business solution. The first step in the deployment is to transition users and to deploy policies and procedures, step 1010, to evaluate the existing workforce of an organization in terms of roles and skills, and perform a gap analysis against the new organization infrastructure for the deployment unit, as illustrated in FIG. 10B. In step 1010, the organization may finalize the workforce infrastructure, step 1011, to mobilize the people who should eventually use the solution. At the same time, the organization should examine the organizational structure, as well as the skills and roles of the existing workforce, to determine if the resources needed to support the solution exist. If needed roles or skills are missing, another task in step 1011 is to develop a plan to address the gaps. This task should be performed before selecting, hiring, or assigning people to teams.

As illustrated in FIG. 10B, the next task is to redeploy the workforce, step 1012, to transfer existing users into the different roles, teams, or functional areas needed to support the solution. Concurrently, the organization recruits and selects a workforce, step 1013, after developing a profile of the combination of skills and other characteristics necessary to support the solution and using the resulting profile to select internal individuals and to hire external individuals who can fill the necessary roles and teams. The organization then trains the trainers, step 1014, by preparing the instructors and coaches who should eventually train the workforce to use the solution. Step 1014 generally entails conducting practice sessions of the course in order to allow instructors to rehearse their delivery with course developers as the audience. Next, the organization implements orientation and training, step 1015. Specifically, the organization introduces employees to the solution that should be deployed. To maximize the benefits of training in step 1015, the instructors should be trained in step 1014 prior to the training of the workforce. The organization may further give users information on the context of the solution within the organization and train them on how to operate the solution. Furthermore, the organization preferably identifies individual and team development needs, and workers should provide feedback on the learning program in order to improve the process for future releases. Step 1015 should be performed after selecting and recruiting individuals to fill the roles and teams, and after developing the training materials and job aids.

Concurrent with above-described steps 1011-1015, if needed in response to the deployment, the organization may install the new business policies and procedures, step 1016. In step 1016, the organization also acts to en sure that all pieces of the new business policies and procedures are available.

Figure 10C:
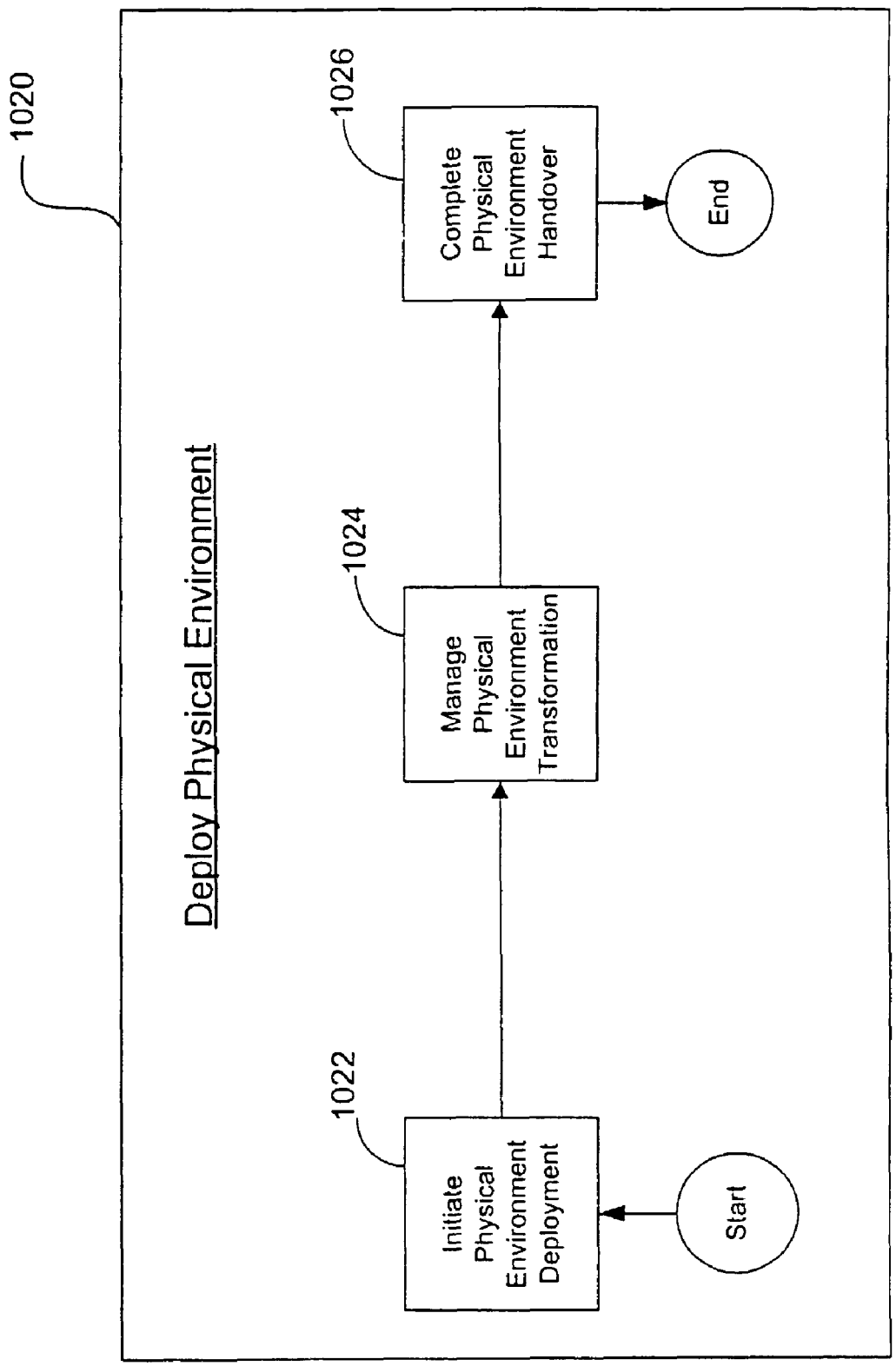

The next step of deployment stage 1000 is to deploy the physical environment, step 1020, as illustrated in FIG. 10C. In step 1020, the organization manages the implementation of changes to facilities, equipment, and other physical assets. Upon completion of step 1020, a formal exchange of the transformed physical environment from the project team to the sponsor's operating management may occur.

Continuing with FIG. 10C, one task in deploying physical environment in step 1020 is to initiate physical environment deployment, step 1022, to mobilize the internal and external resources to prepare the physical environment for the solution that should be deployed, and to establish the necessary communication channels. One aspect of step 1022 is to verify that all of the involved parties understand what work for which they are responsible, when this work is scheduled, and how this work is interdependent with the tasks assigned to others. Other tasks in step 1022 may include defining how to monitor, expedite, and report progress. The organization may optionally determine how to maintain quality control and how to regularly communicate progress with stakeholders. Also, step 1022 may include planning for formal progress and quality control reviews.

Returning to FIG. 10C, the next step in the deployment of the physical environment during step 1020 to is to manage physical environment transformation, step 1024, to carry out the development and configuration of the physical environment needed to support the solution. The management of physical environment transformation in step 1024 includes expediting progress, managing issues and risks that may impact the implementation plan, and providing management with summary progress reports.

Continuing with FIG. 10C, another the next step in the deployment of the physical environment during step 1020 is to complete a physical environment handover, step 1026. During 1026, the organization acts to ensure that the development and configuration of the physical environments are complete, and are transferred to, and accepted by, the sponsoring organization's operations management. Step 1026 generally occurs when both the stakeholders and the deployment project management team are satisfied that the implementation has been completed successfully.

Figure 10D:
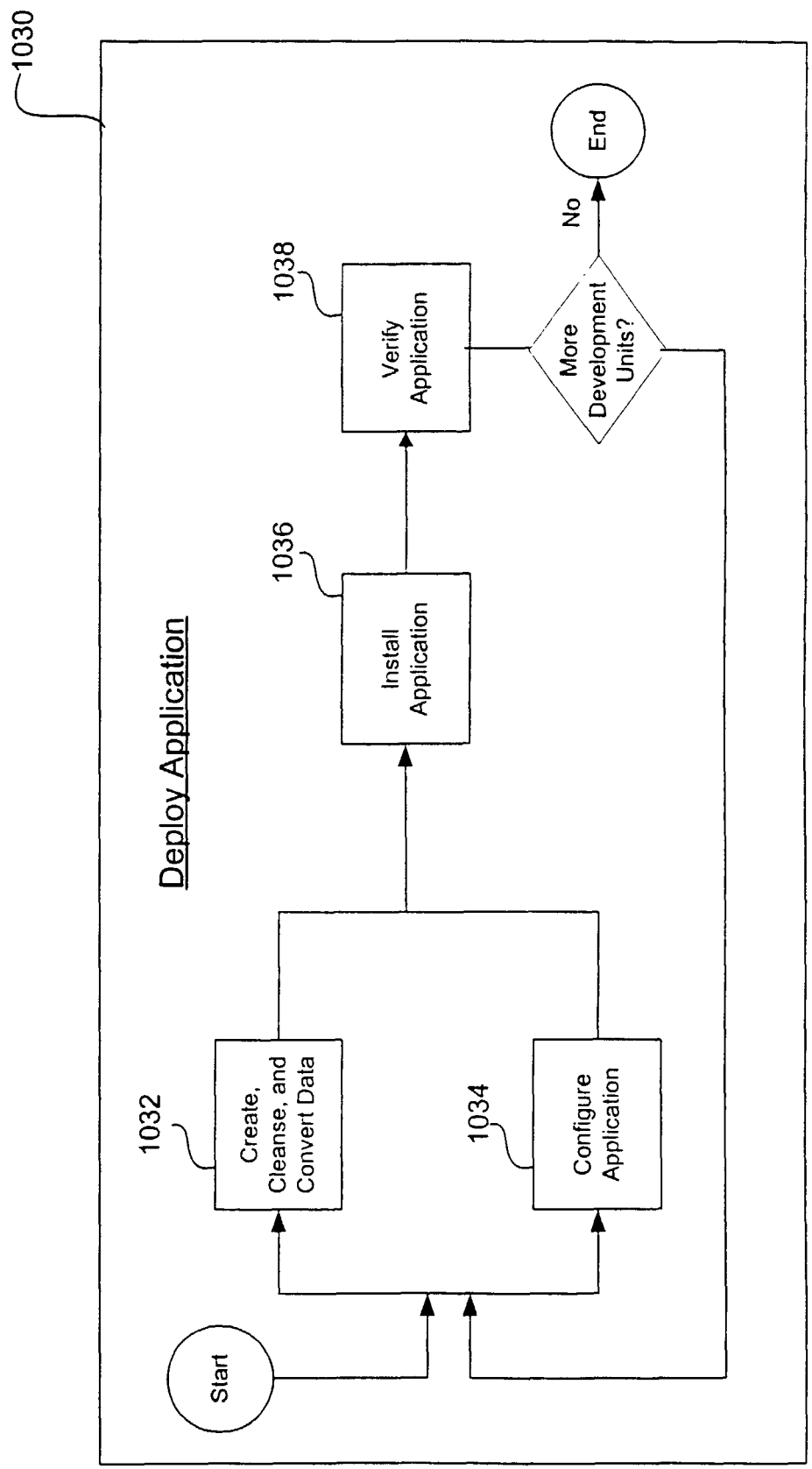

As depicted in FIG. 10D, the next task is to deploy the application, step 1030, to transition the new application and its operating environment into the deployment unit. During step 1030, the organization may establish the data required by the new application; configure the operating environment to the needs of the deployment unit; install the application; configure application parameters needed for the deployment unit; and verify that the application is correct and consistent for the deployment. Tasks in step 1030 may include the creation, cleansing, and conversion of data, step 1032, as needed, to establish the data to be used with the new application. During step 1032, an organization may produce new data and reconcile different data representations and different database schema representations. The organization may also convert an existing electronic representation of data into a format to be used by the new application or use a data conversion application to convert data from an existing database to the new database.

As depicted in FIG. 10D, a concurrent task is to configure the application, step 1034 in order to configure and customize the new application and the existing operating environment to the needs of the deployment unit. Next, the organization installs the application, step 1036. Specifically, the organization may, during step 1036, install and customize the application components of the business capability in the deployment unit, making sure that all pieces of the new application are available. Another task in the deployment of the application during step 1030 is to verify application, step 1038, by installing and customizing the new application components of the business capability in the deployment unit, making sure that all pieces of the new application are available.

Figure 10E:
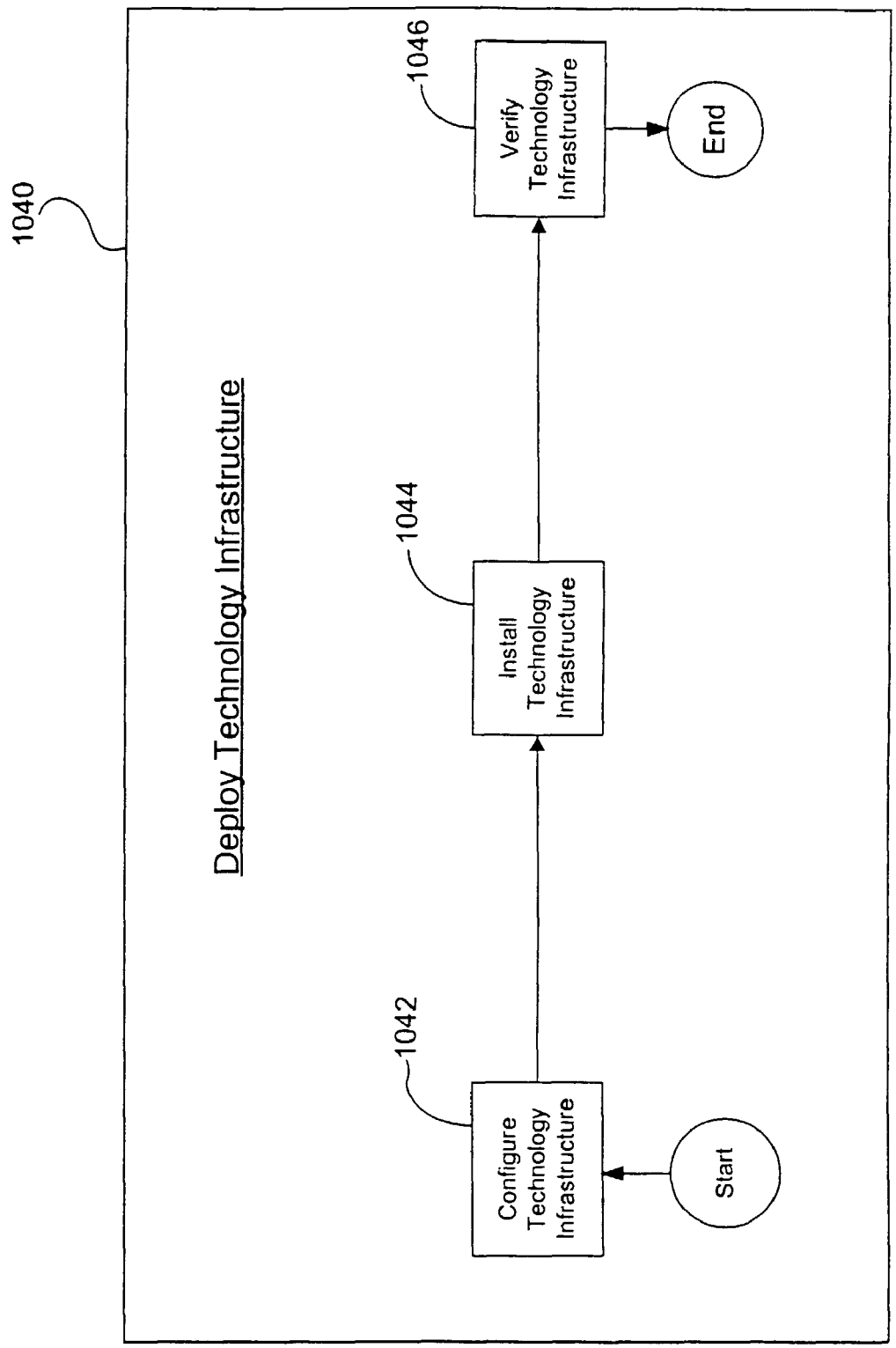
Figure 10F:
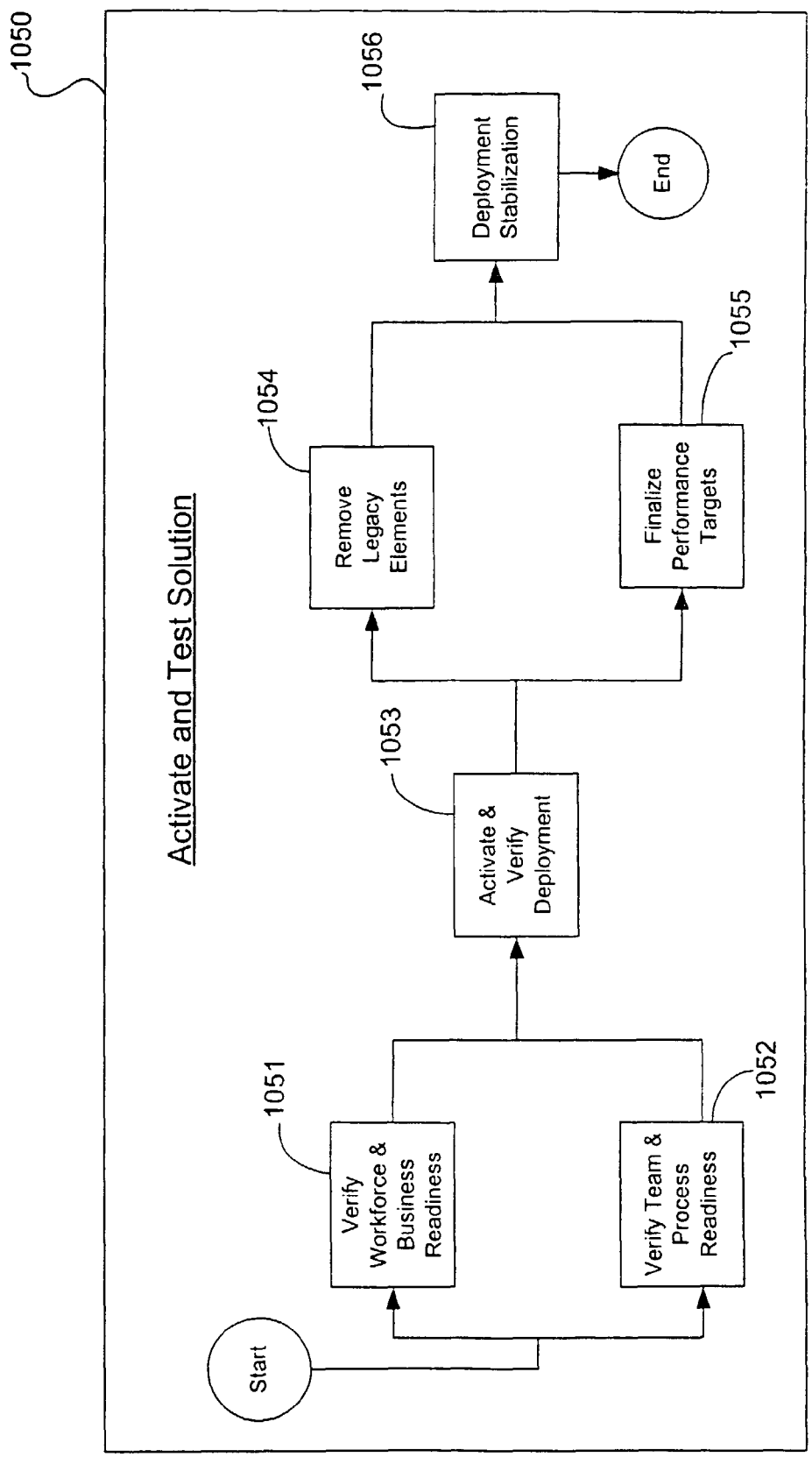

As illustrated in FIG. 10E, another step in the deployment stage 1000 is to deploy the technology infrastructure, step 1040. During step 1040, the organization preferably outlines of the procedures and considerations for deploying technology infrastructure components at a deployment unit. Likewise, the organization should address the potential differences in technology infrastructure environments between deployment units. The goal of step 1040 is to bring the deployment unit up to the technology infrastructure baseline required for the business capability. Deployment of the technology infrastructure in step 1040 may also include the commissioning and decommissioning of infrastructure components. To deploy the technology infrastructure in step 1040, the organization may also configure the technology infrastructure, step 1042, to customize the deployment unit's technology infrastructure in preparation for the new business capability components. Step 1042 generally does not handle the configurations that are part of the installation of any new technology infrastructure elements. Next, the organization installs the technology infrastructure, step 1044, to install the technology infrastructure components of the business capability. The organization should also verify the available technology infrastructure, step 1046, so that whenever a technology infrastructure component is added or modified, the organization performs this task to verify the new technology infrastructure environment and addresses the discoveries of the testing. This verification in step 1046 is generally completed only for the technology infrastructure.

The next task in the deployment stage 1000 is to activate and test a solution, step 1050, to verify the deployment and launch the new operating management processes. Step 1050 generally includes actions required to finalize performance targets, to remove redundant legacy elements, and to stabilize the deployment unit for transition to operations management. One task in the step 1050 is to verify workforce and business readiness, step 1051, after successful completion of the acceptance test and after all elements have been deployed, but before the business capability is activated. Step 1051 includes execution of the deployment test and verifies that the workforce and the other elements of the business are prepared for operation on the first day and all subsequent days. The organization may use the SIRs or CRs to record any errors encountered.

A concurrent task is to verify team and process readiness, step 1052, after all elements have been deployed, but before the business capability is activated. Step 1052 verifies that the deployment team and the deployment processes are prepared to activate the new business capability. Organizations may also activate and verify the deployment, step 1053, to activate and verify the capabilities that have been deployed. In step 1053, any of the organization's various teams should have the confidence and ability needed to proceed with irreversible decisions, such as the removal of legacy systems and procedures. The organization should now begin to operate the deployed business capabilities.

Next, the organization may remove legacy elements, step 1054, to remove the legacy systems from old operations and management processes after making the irreversible decision to proceed with the new business solution. Concurrent with step 1054, the organization should finalize performance targets, step 1055 to formalize the baseline for continuous improvement of the business solution. The finalizing of performance targets is initiated as soon as the business solution has been operating long enough to collect reliable data for adjusting the business performance model.

In another step, the organization may deploy stabilization, step 1056, to prepare the transition of business capabilities to operations management. The organization should also monitor the progress over a period of time to verify the stability of the team using the deployed business capabilities. A decision that the product is ready to release is reached by analyzing the actual performance and productivity forecasts of the team using the deployed business capabilities.

Figure 6B:
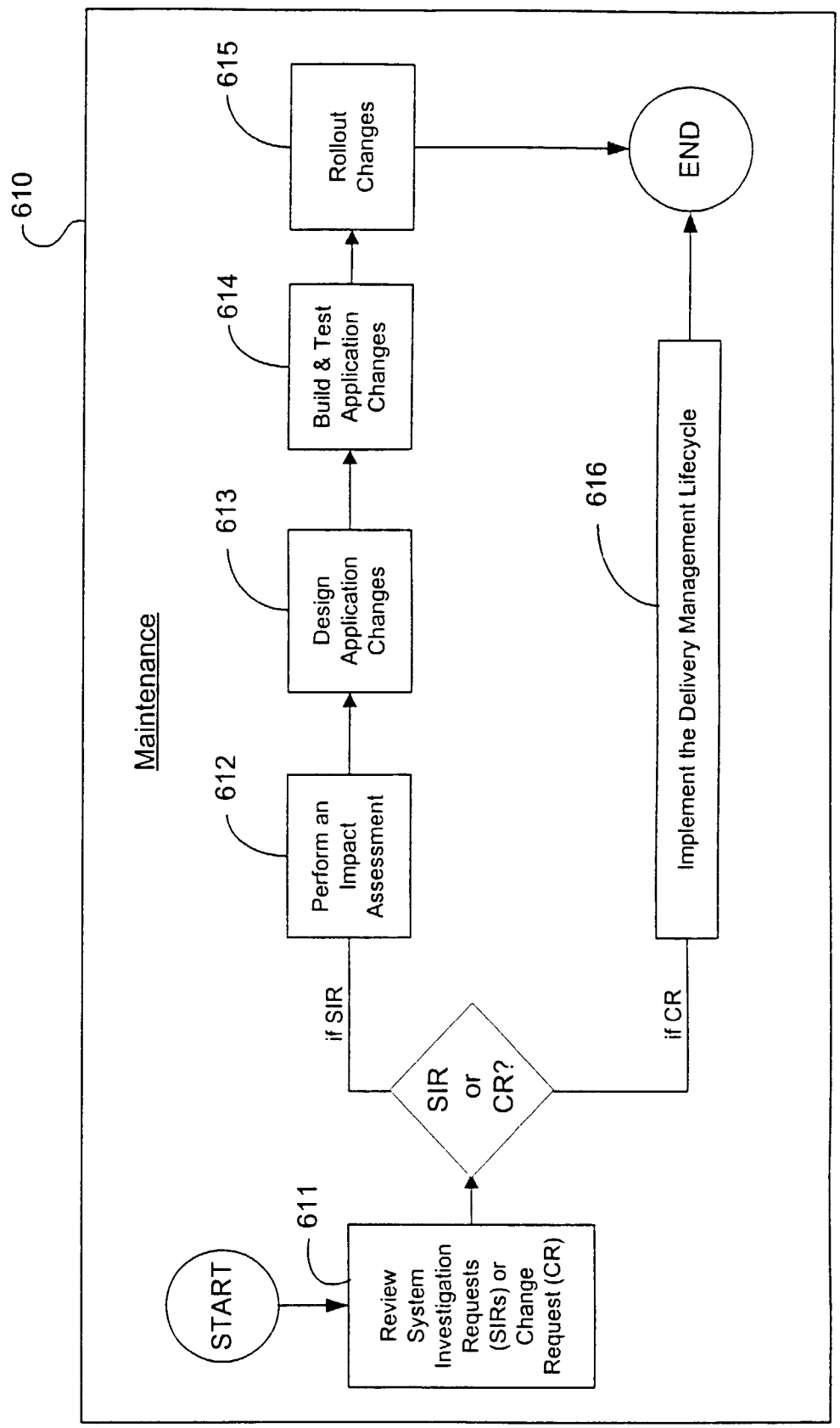

Turning now to FIG. 6B, maintenance, step 610, is the continuing support of an application, addressing both production problem resolution (through SIRs) and application enhancements (through CRs). The first task in the maintenance is to review the SIRs or CRs, step 611. With a SIR, repair work needs to be completed immediately, whereas a CR may be incorporated into a subsequent release of the application. The organization may also review incident or change requests for risk as well. Another step in the maintenance 610 is to perform an impact assessment, step 612. Specific activities in step 612 include investigating the SIR; determining the change required to address the identified problems to resolve the SIR; determining the effort involved; developing alternatives; and selecting the acceptable alternative. Any affected work products altered by the SIR such as requirements, designs, work plans, code, etc., should be updated as necessary. If it is determined that no application change is needed, the system should be retested to ensure that the problem no longer exists or that the problem should be forwarded to the appropriate channels.

Another task in the maintenance 610 is to design application changes, step 613, to create the application design that is needed to build the solution. The organization may also build and test application changes, step 614, to perform the work necessary to implement the desired change. Once the change has been completed, the change should be component tested and product tested to ensure that it is working properly. Additionally, a regression test should be performed in step 614 to help ensure that other peripheral functions were not affected by the change. Next, the organization may roll out changes, step 615, as needed to implement the designed, developed, tested changes into the production environment.

For CRs corresponding with desired enhancements to the product, the organization may also follow the program delivery life cycle, step 616: For changes (CRs) that can be incorporated into a scheduled release, the detailed work involved in modifying the existing application is performed according to the task packages/tasks in the delivering phase 600, including the analysis, design, build and test, and deployment steps 700, 800, 900 and 1000. In this way enhancement that extend beyond the original scope of the product are developed much like a new product.

System

Those skilled in the art of process engineering will recognize that various embodiments of the CMM in a BOX method 10 described above may be implemented in various ways. For instance, the organization may use a set of written templates directing the implementation of the tasks in the CMM in a BOX method 10.

In one implementation, the present invention may be implemented as a computer application that prompts an organization for various inputs regarding its operation and structure. Using these inputs, the application then creates a series of task lists to implement the CMM in a BOX method 10 of the present invention. The application may further create a record of task lists, so that the organization may easily document its actions as required in the CMM and CMMI. Alternatively, the program may provide templates through which the organization may document its activities.

Figure 11A:
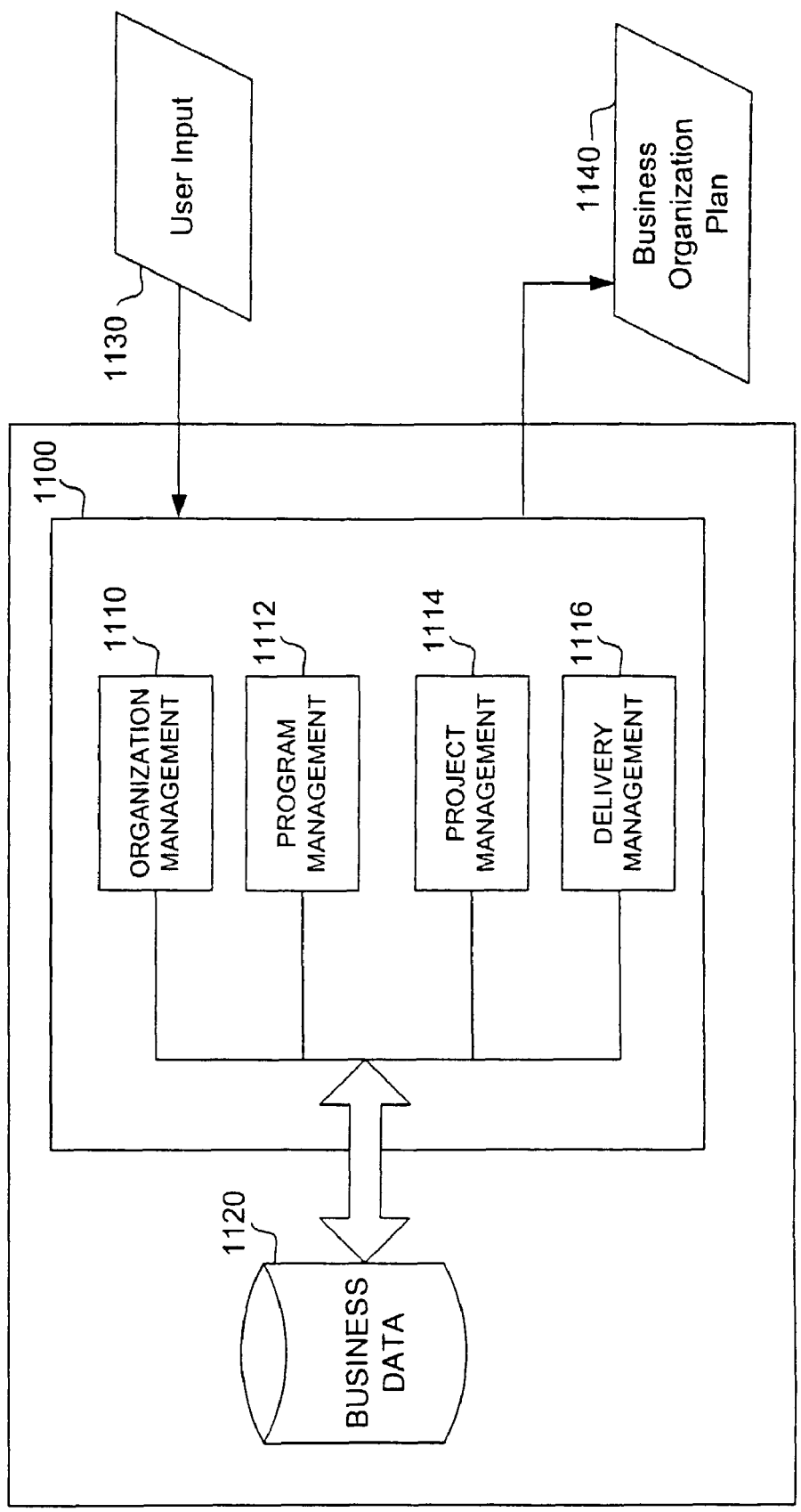
FIGS. 11A-B, 12 and 14 depict systems for implementing the method of FIGS. 1-10F in accordance with various embodiments of the present invention.

In particular, those skilled in the art will recognize that various embodiments of the CMM in a BOX method 10 described above may be implemented using a combination of both electronic hardware and software. Referring to FIG. 11A, a CMM implementation system 1100 receives user input 1130 and produces a business organization plan 1140 based on the user input 1130. The system 1100 may be, for example, a personal computer (PC), a server, or any other computer device used for such purposes. The system 1100 may be coupled to a database 1120 containing information on the organization and its suppliers. In this embodiment, the system 1100 has an organization management module 1110, a program management module 1112, a project management module 1114 and a delivery management module 1116 for implementing organization management 100, program management 400, project management 500, and delivery management 600.

Figure 11B:
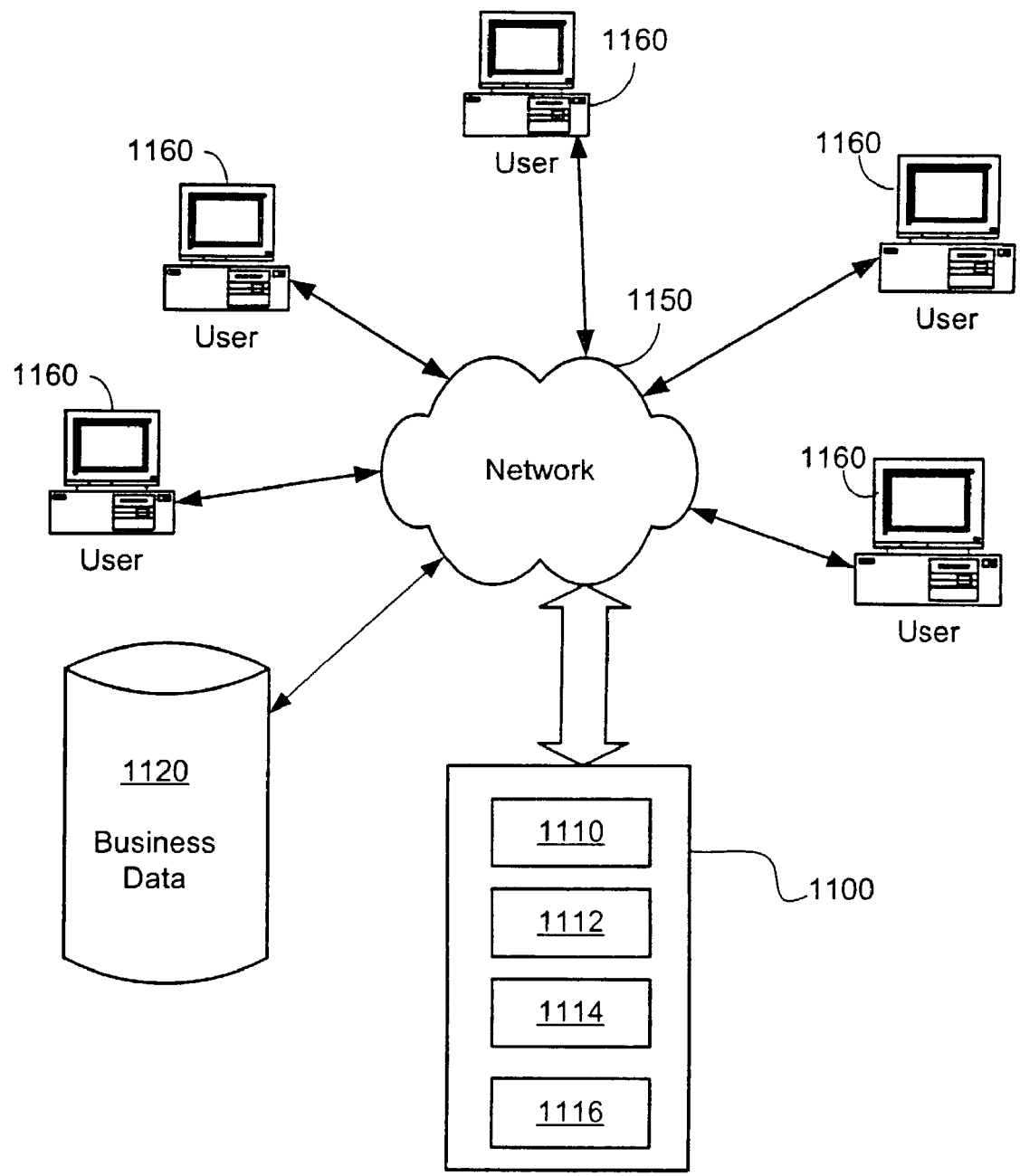

If the computer device 1100 is, for example, a network server, in electronic communication with an electronic network, then users 1160 may be able to use the CMM system 1100 remotely. Referring to FIG. 11B showing the computer device of FIG. 11A in electronic communication with a network 1150. The network 1150, may be, for example, the Internet, an intranet, an extranet, a Wide Area Network ("WAN"), Virtual Product Network (VPN) and the like. Users 1160 may transmit user input data 1120 to the CMM system 1100 via the electronic network 1150 then obtain a business organization plan 1140 based on the input data 1130.

In another embodiment, the CMM system 1100 illustrated in FIGS. 11A-B, may be a software application designed to operate over various hardware and computer systems, as known in the art.

Figure 12:
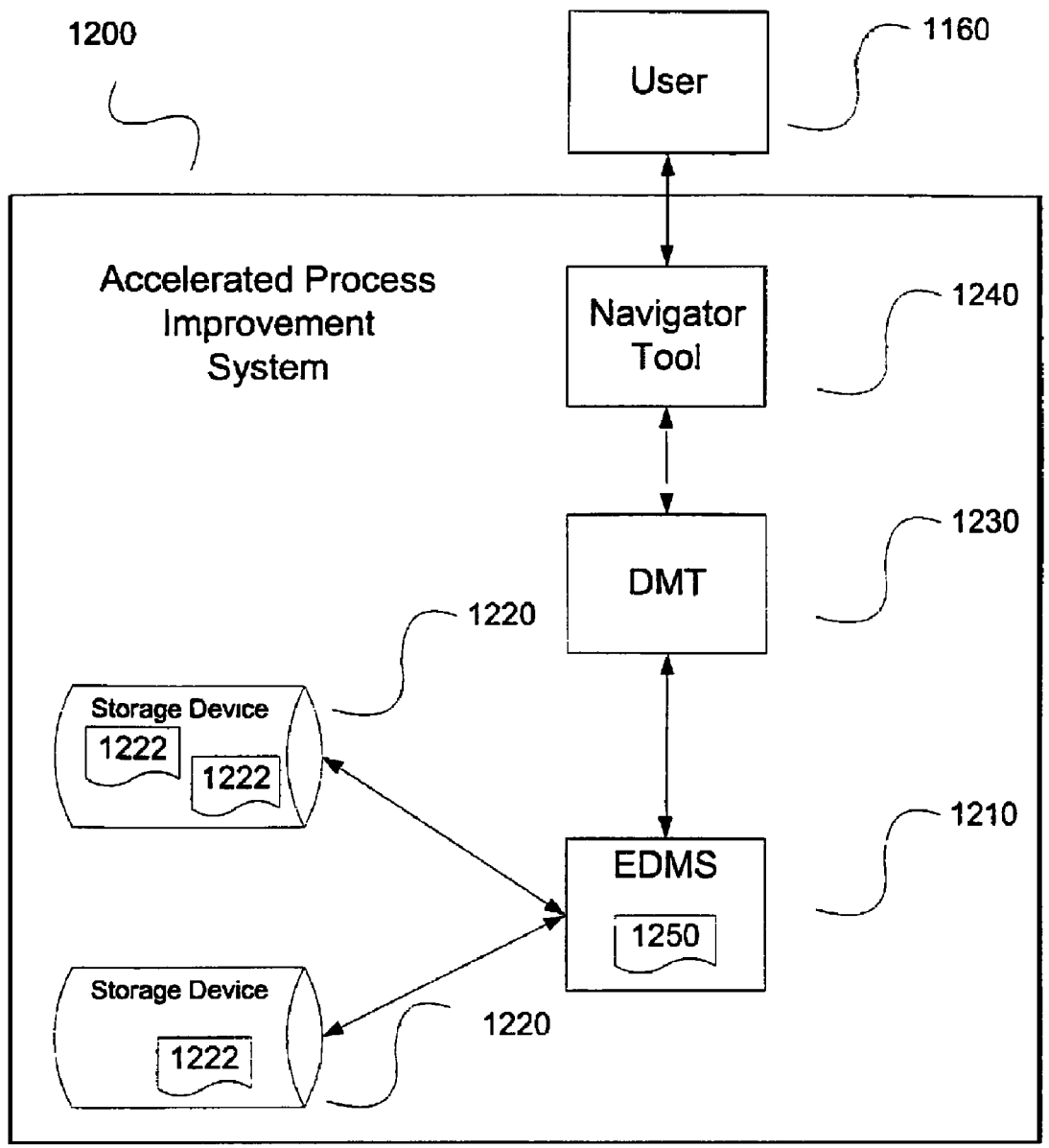

Turning now to FIG. 12, one embodiment of the present invention implements Method 10 of FIG. through the use of an accelerated process improvement framework system (APIF) 1200 including an enterprise document management system (EDMS) 1210. The EDMS 1210 is a software application that permits multiple users to store, retrieve, and manipulate electronic documents on a closed client/server architecture network, such as a local area network (LAN) or wide area network (WAN). Known types of EDMS 1210 include DOCSFusion, available from PCDOCS, Inc., Toronto, Ontario, Canada and Enterprise Document Management in the Documentum Suite available from Documentum, Inc., of Pleasanton, Calif. (http://www.documentum.com). The configuration of these and other document managers function in connection with the techniques of the present invention, and the operation of which will be apparent to one of ordinary skill in the art in view of this disclosure.

The EDMS 1210 generally includes a digital library repository that creates a document space, which may use a replicated infrastructure for document storage. The repository stores a document as an object that encapsulates the document's content along with its attributes, including relationships, associated versions, renditions, formats, workflow characteristics, and security. These document objects can be infinitely combined and re-combined on demand to form dynamic configurations of document objects that may originate from any source. In this way, the document space supports organization of documents via folder and cabinet metaphors and allows searching over both document content and attributes. The document space also provides check in/check-out-style version control, full version histories of documents, and annotations (each with its own attributes and security rules), and supports workflow-style features including notification of updates.

Continuing with APIF 1200 in FIG. 12, the EDMS 1210 connects to and administers one or more file storage devices 1220. The file storage devices 1220, such as various magnetic and optical storage media, are well known technologies and are commonly commercially available. Alternatively, the file storage devices 1220 may be on other LANs and WANs, or may be Storage Area Networks (SANS) or other network-based storage structures. The file storage devices may therefore be positioned at potentially great distances from the user. The user connects to these distant storage devices 1220 via various combinations of connections, networks, webs, intranets, internets, the Internet, etc. (not illustrated) that are well known in the field of computer communications. For example, the Documentum Suite includes a DocControl Manager that runs on top of the Documentum repository to permit secure management of controlled documents over the Web. Using the DocControl Manager, authorized users may instantly access and view documents using the browser or viewer of their choice. The DocControl Manager thereby allows users to create, review, revise, approve and distribute controlled documents online within an audited environment. In place of elaborate manual processes, users may employ the DocControl Manager to create a Web-driven knowledge chain that links disconnected processes for collecting, sharing, and applying knowledge to meet stringent quality goals and compliance requirements.

In the present invention, the file storage device 1220 contains files 1222 that store data relating to one or more steps in Method 10 (FIG. 1). Thus, when performing a step in Method 10, a user may select a file 1222 corresponding to that step. The file 1222 may then provide the user with the information and instructions needed to accomplish that step. For instance, the file may direct the user to undertake certain quality control actions during the development of a software application. The file 1222 may further specify documentation that must be completed by the user during the step. In this way, a user may perform Method 10 of FIG. 1 by opening one or more files 1222, following the actions specified in the files 1222, and then, when applicable, completing required documentation specified in the files 1222. The file 1222 may alternatively instruct the user on the relationship of that step with other steps in Method 10. In doing so, the file 1222 may direct the user to other, subsequent steps in Method 10 by directing the user to files 1222 corresponding to these subsequent steps.

Returning to APIF 1200 in FIG. 12, a document management tool (DMT) 1230 may operate in conjunction with the EDMS 1210. The DMT 1230 maintains and tracks documentation needed for the method being implemented by the user. Documentation is important in many steps of Method 10 because it allows the user to subsequently verify completion of required actions, which the various CMM certifying bodies require before certifying that an organization has achieved higher levels of the CMM. The DMT 1230 works in conjunction with the EDMS 1210.

In particular, the DMT 1230 allows a programmer to associate required documentation with files 1222 corresponding to steps in Method 10. A linking attribute may be added to each document object stored within the EDMS 1210 to facilitate association of the documents with objects in the process control system. Once a user selects and opens a file corresponding to a step having required documentation, the DMT 1230, working together with the EDMS 1210 may automatically present to the user an appropriate documentation form. The DMT 1230 may also present completed examples to assist the user in completing the documentation. In this way, APIF 1200 helps the user to complete the necessary documentation for satisfying the requirements for certification.

Alternatively, APIF 1200 may prevent the user from selecting other files 1222 that lead to additional steps in a process until the required documentation for the current task is completed. This function may be accomplished by altering the document permissions maintained by the EDMS 1210 so that the user cannot access certain files until various conditions are satisfied. While the EDMS 1210 continues to administer storage and retrieval of files, the DMT 1230 affects the ability of the user to access some files until certain conditions are met, i.e., completion of the required documentation.

Figure 13A:
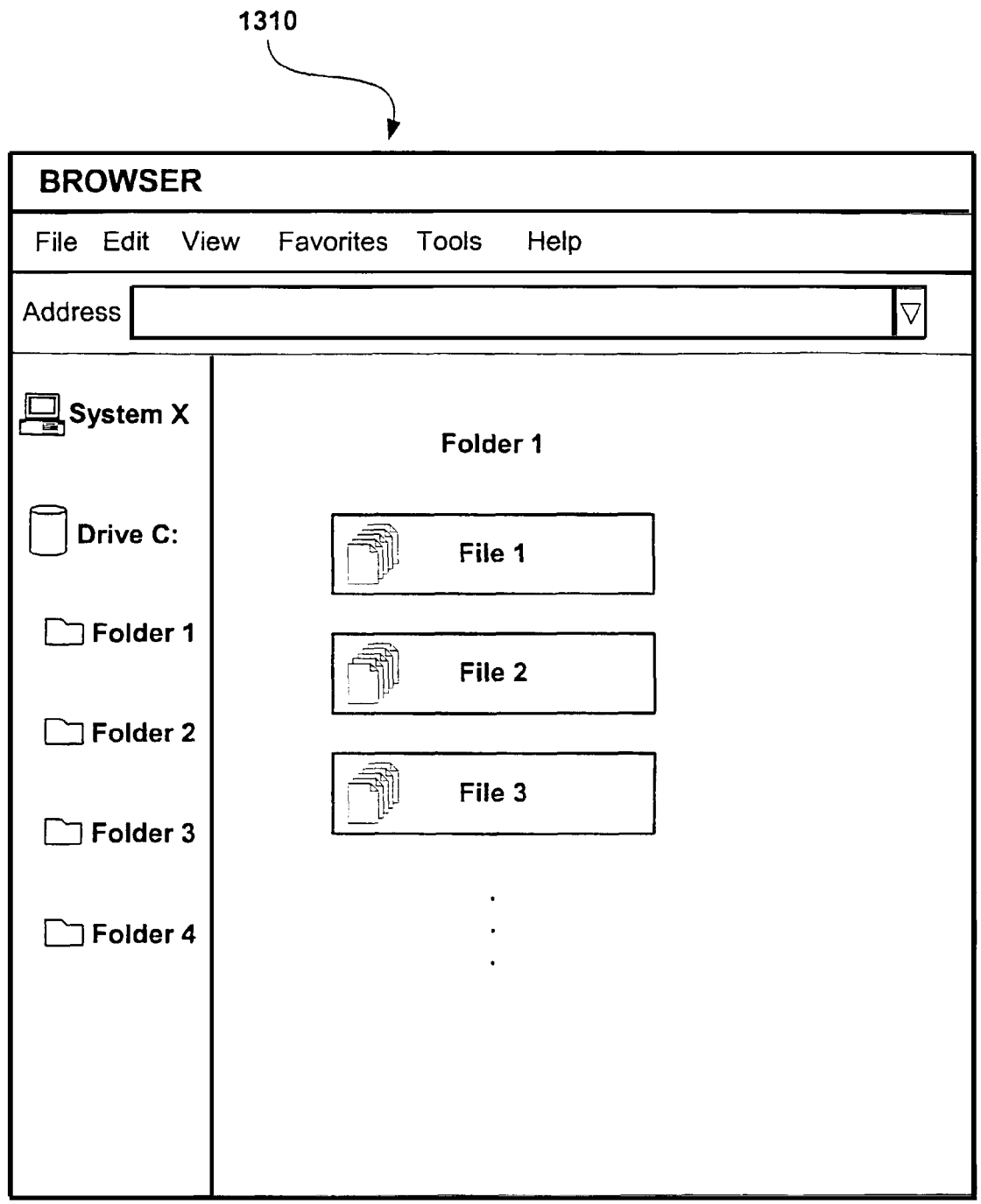
FIGS. 13A-J illustrate display images from the system of FIG. 12 in accordance with a preferred embodiment of the present invention.
Figure 13B:
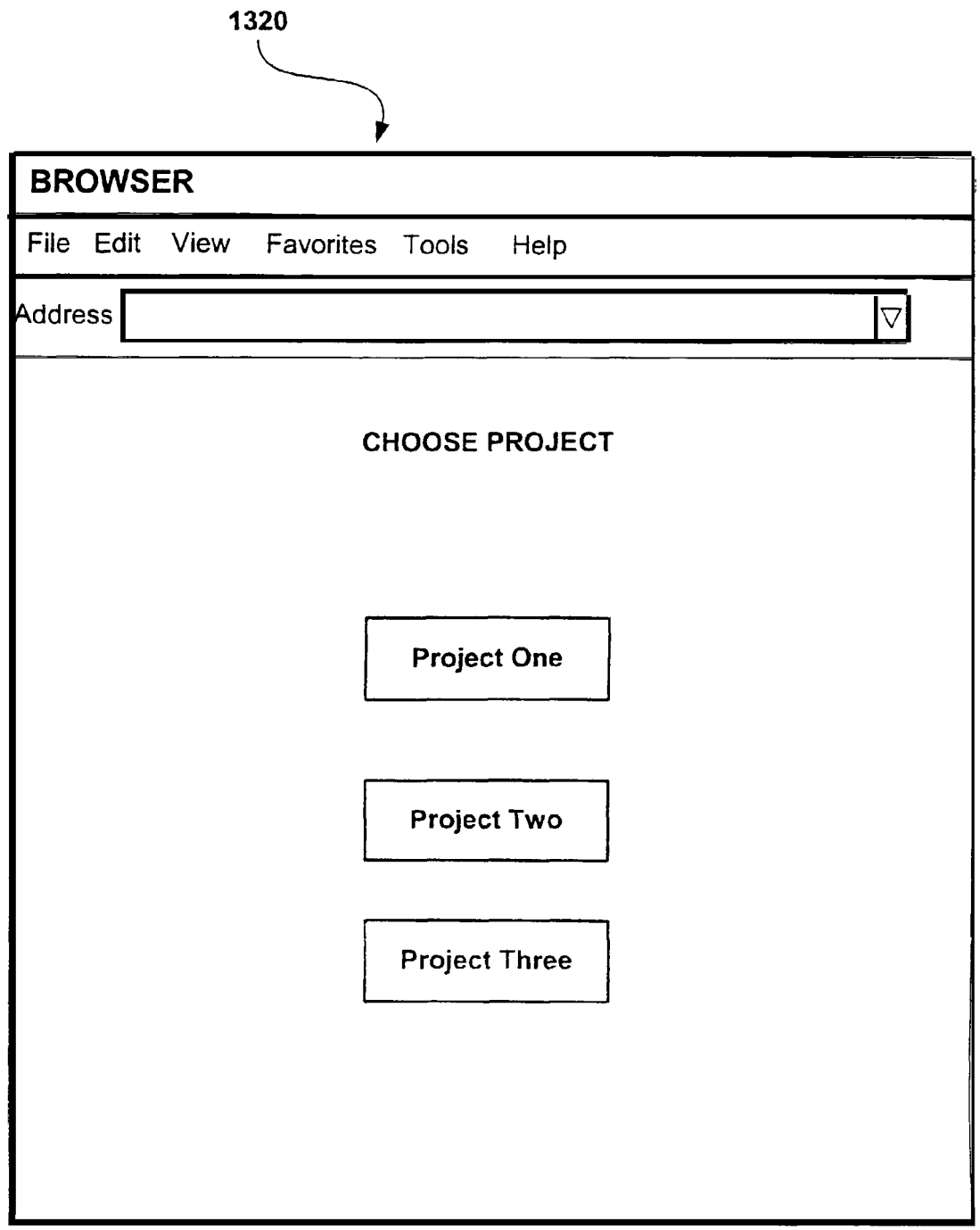

Turning now to FIG. 13A, a document workspace screen 1310 from an EDMS 1210 is shown. In particular, document workspace screen 1310 shows multiple soft "file cabinets," wherein each "file cabinet" stores a different category of documents. In the typical operation of the EDMS 1210, a user may provide an input specifying one of the files 1222 on the document workspace screen 1310. In general, the user may perform a mouse click to select a particular file 1222. In FIG. 13A, the document workspace screen 1310 lists several files in the right hand space that are identified by the DMT 1230 as required documentation. As specified above, these files may contain blank forms for the user to complete, instructions aiding the user in completing the forms, or examples of completed forms to which the user may refer when completing the blank form.

Continuing with FIG. 12, APIF 1200 may further include a navigator tool 1240 that graphically presents to the user the steps in Method 10 or other processes. In this way, the EDMS 1210 may be configured to further support integration of document management with a process control system. In particular, the navigator tool 1240 creates displays using the data contained in the files 1222 based on the user's inputs. For instance the navigator tool 1240 be an application to create HTML pages whose contains are determined by information in the files 1222. Likewise, the HTML pages may contain hyperlinks to the information in the files 1222. The navigator tool 1240 generally functions through the use of navigator data 1250. In a preferred implementation the navigator data 1250 is an XML data file containing information on file names, file types (or template), whether the file is a standard or modified template, the files' locations, and other information specified by the user. Alternatively, the navigator data 1250 may be a source table in a database or other type of data storage structure. Then, when creating the display, the navigator tool 1240 may access the appropriate file 1222 by referencing the navigator data 1250. The navigator data 1250 may be stored by the EDMS 1210 along with the files 1222. If the files 1222 are positioned on a WAN, LAN; or SAN, the navigator data 1250 may be stored on this network as well.

The use of the navigator tool 1240 is illustrated in FIGS. 13B-13J. As depicted in a login screen 1320 in FIG. 13B, a user, after logging into the EDMS 1210, may select different processes including, but not limited to, Method 10. Thus, it should be appreciated that the navigator tool 1240 may be integrated with the EDMS 1210 to assist the user in implementing various other projects and processes other than Method 10.

Once the user selects a process to implement, the navigator tool 1240 accesses the EDMS 1210 to graphically display the selected process. After the user selects a project, the respective project page appears with the project name in the tool bar. The look and feel of the page produced by the navigator tool is generally similar to a standalone HTML Help-based tool. If only one project existed for the EDMS 1210, the user may be would be taken directly to that project's home page (i.e., navigator screen 1330 described below), avoiding the login screen 1320.

Figure 13C:
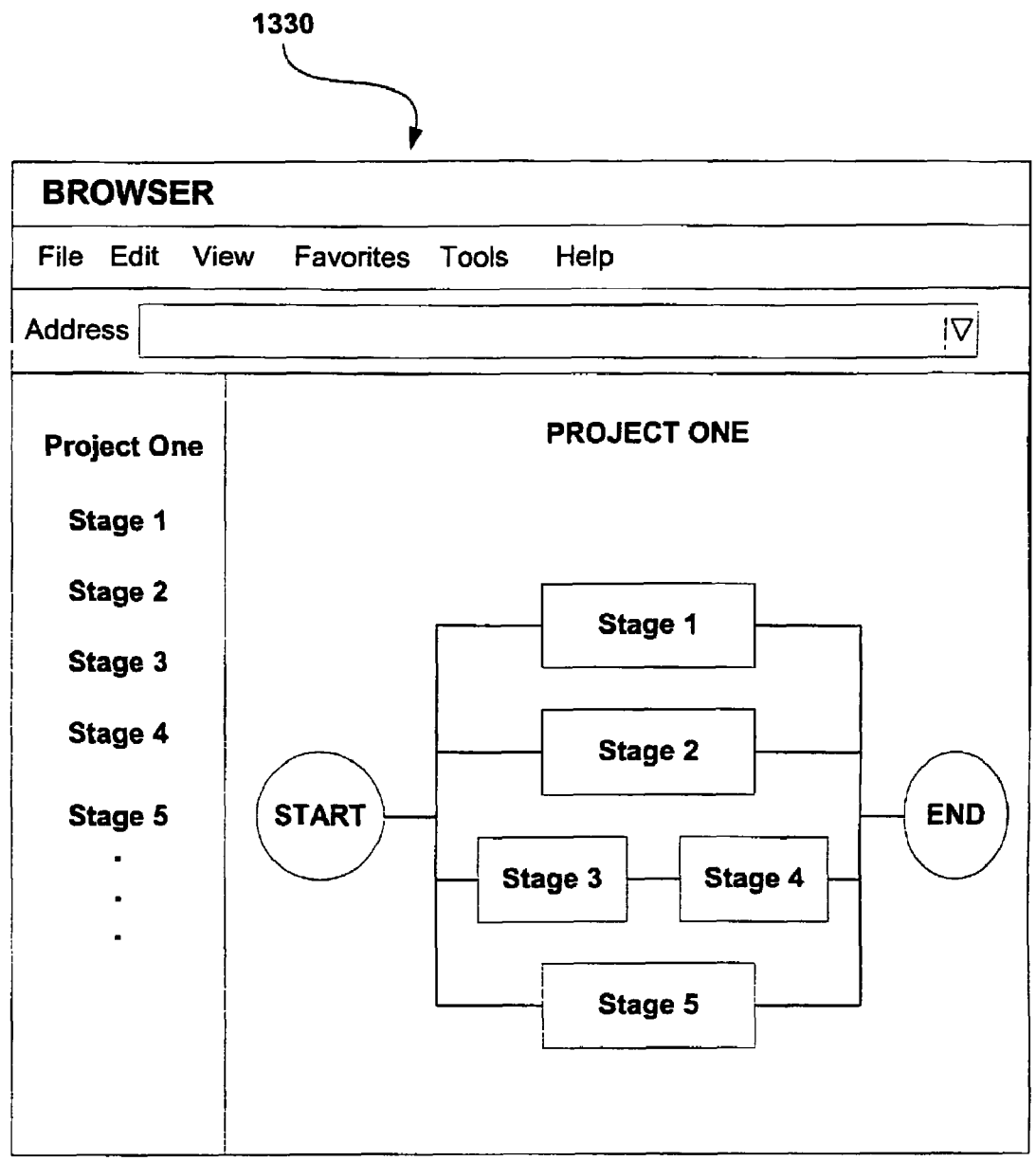

Turning now to FIG. 13C, a navigator screen 1330 contains a high-level, graphical depiction of Method 10 and generally displays the stages in Method 10. Each of the stages in the navigator screen 1330 may be hyperlinked to more specific information on the stage. Thus, the user may obtain further information and/or start implementing one of the stages in Method 10 by selecting a box corresponding to that stage. Continuing with FIG. 13C, the navigator screen 1330 also graphically displays the relationship between the steps in a process so that the user may discern information about the steps, such as their order and interrelation. The navigator screen 1330 further contains, on the left column, an index of the steps and stages so that the user may easily navigate between steps in the process. This ability is particularly valuable in processes such as Method 10 that potentially require the user to simultaneously perform multiple actions.

Figure 13D:
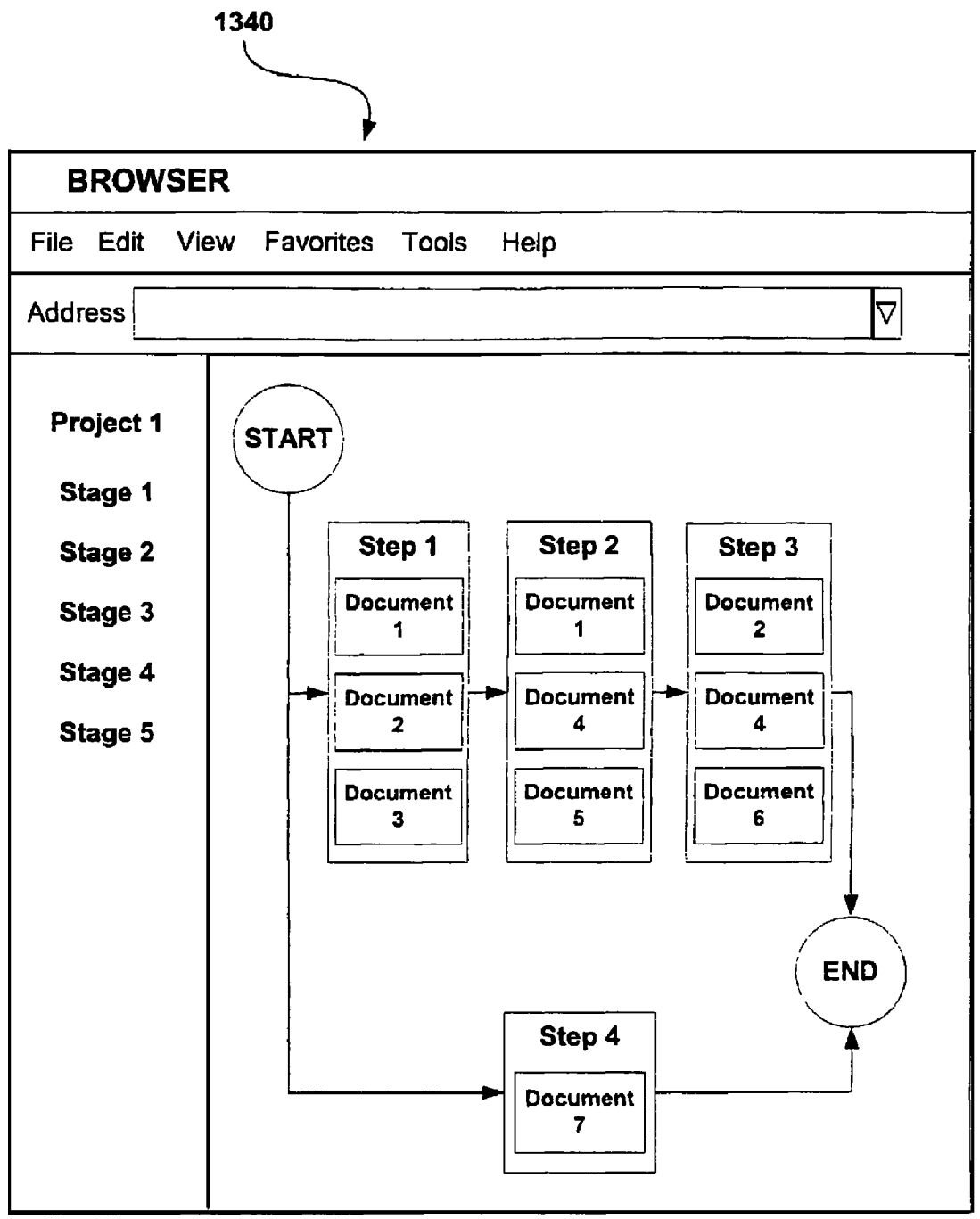

As illustrated in FIG. 13D, a user's selection of one of the steps in the high-level process display in the navigator screen 1330 leads to a detail navigator screen 1340 containing more detailed information on the selected step. Specifically, the detailed navigator screen 1340 lists the individual actions to be undertaken and the documentation to be completed by the user in that step. As with the navigator screen 1330, the detailed navigator screen 1340 graphically displays the relationship between various actions and documentation. For instance, the user may see that a certain action must be undertaken before a document may be completed and that other actions may not be initiated until completion of the document. Again, one or more of the boxes in the detailed navigator screen 1340 may be hyperlinked to more specific information contained in the files 1222.

For instance, the user's selection (or clicking) of a documentation box causes the navigator tool 1240 to provide more information on that documentation. Specifically, the user's selection of a box to compose a document leads to a documentation screen 1350, as displayed in FIG. 13E. The displayed documentation screen 1350 may contain various information, including a description of the document to be created, an indication of the step(s) of Method 10 associated with the document, and samples of the document to be created. As indicated in the top center, the documentation screen 1350 in FIG. 13E may further contain "buttons" or hyperlinked boxes that allow the user to start composing the document (or "deliverable"), to search for existing documents by type, and search for existing documents by file storage location.

Figure 13E:
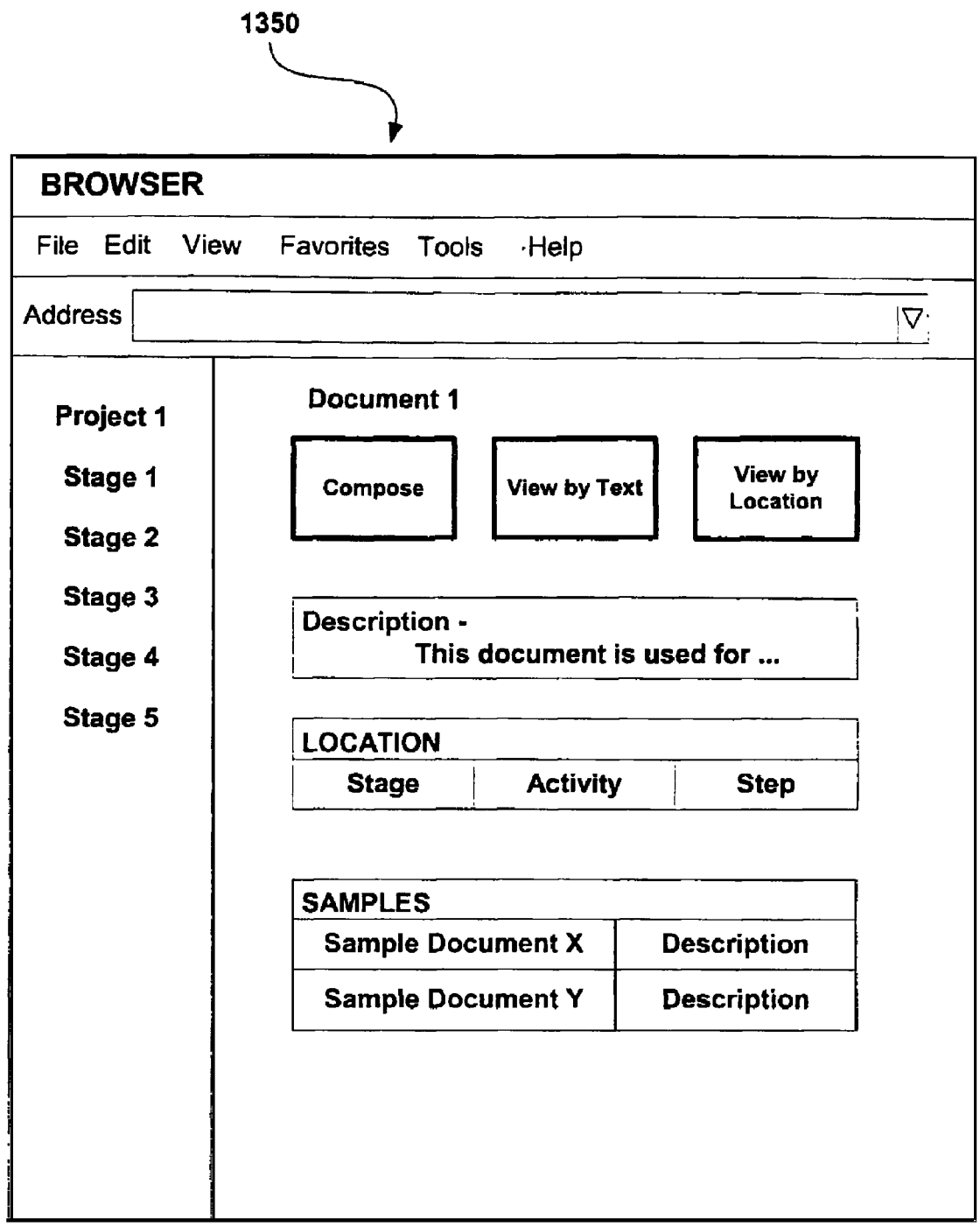
Figure 13F:
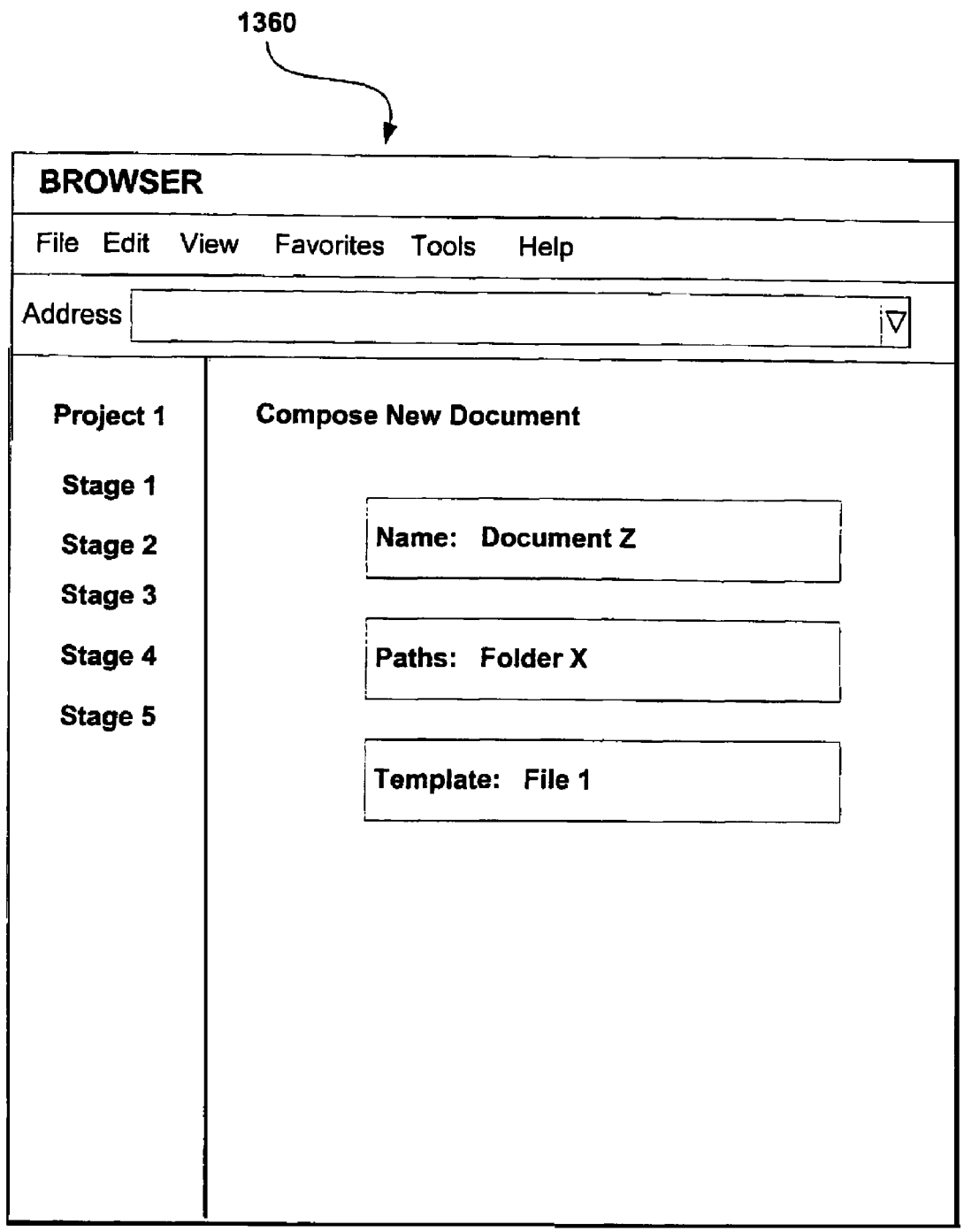
Figure 13G:
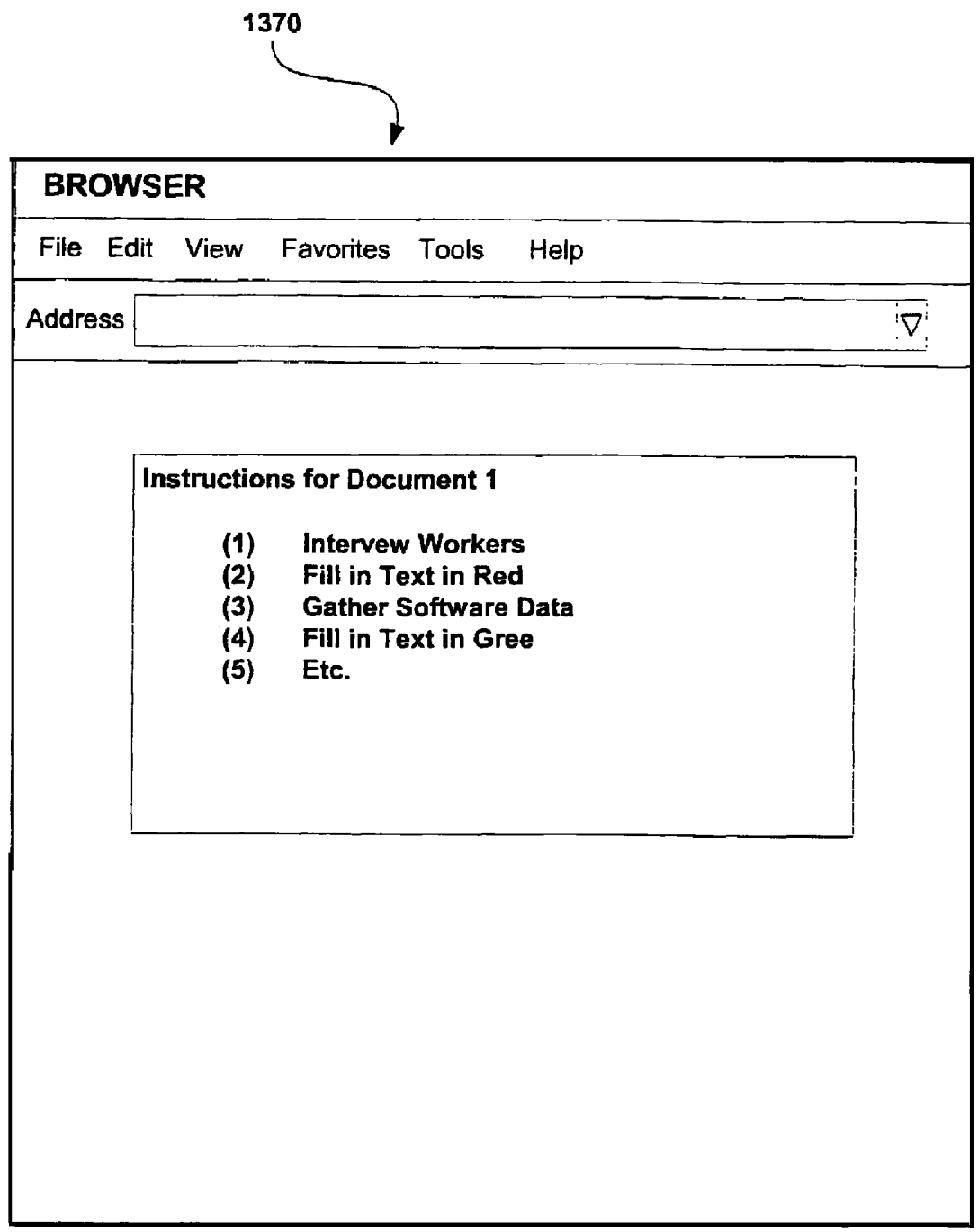
Figure 13H:
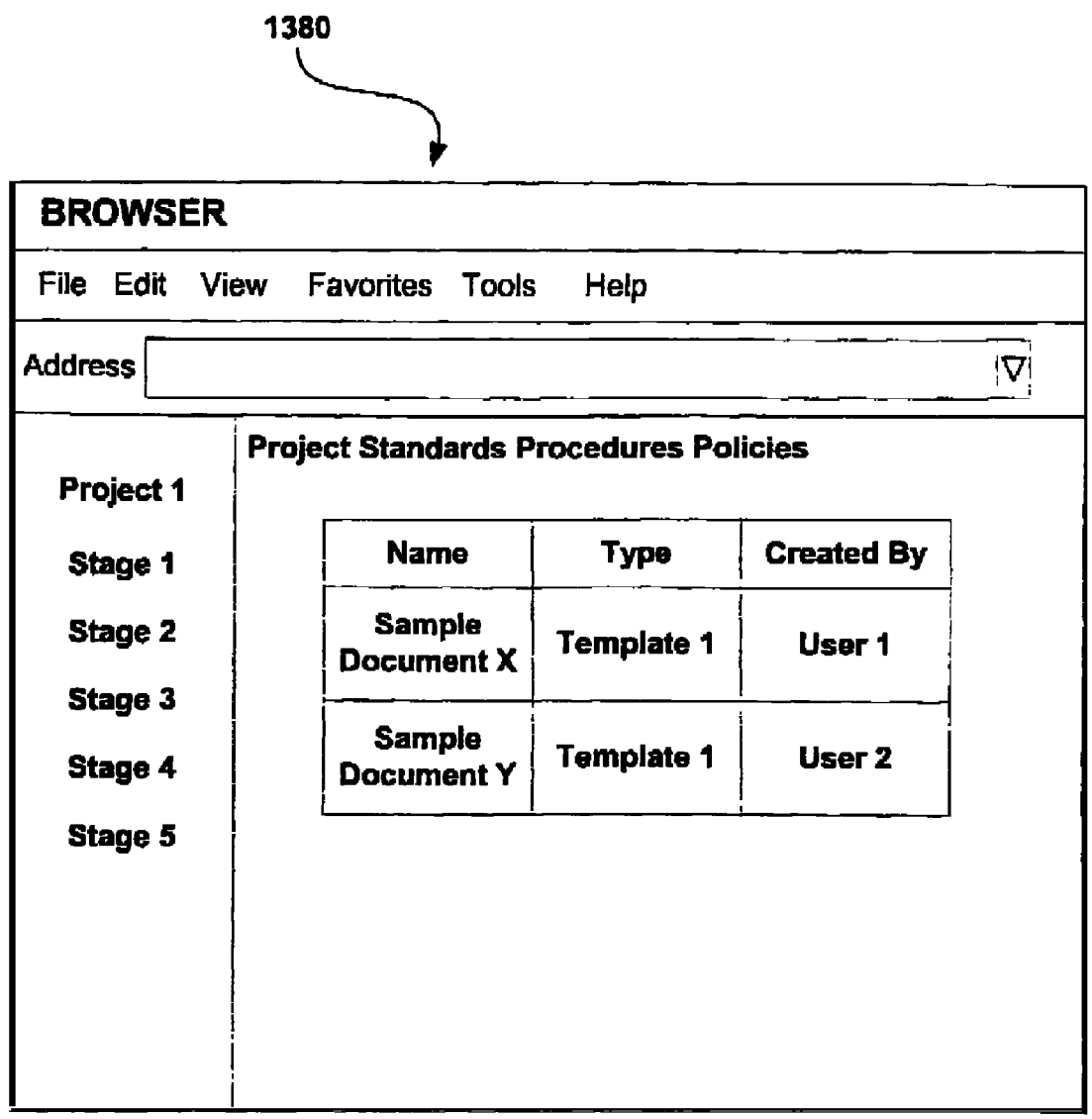
Figure 13I:
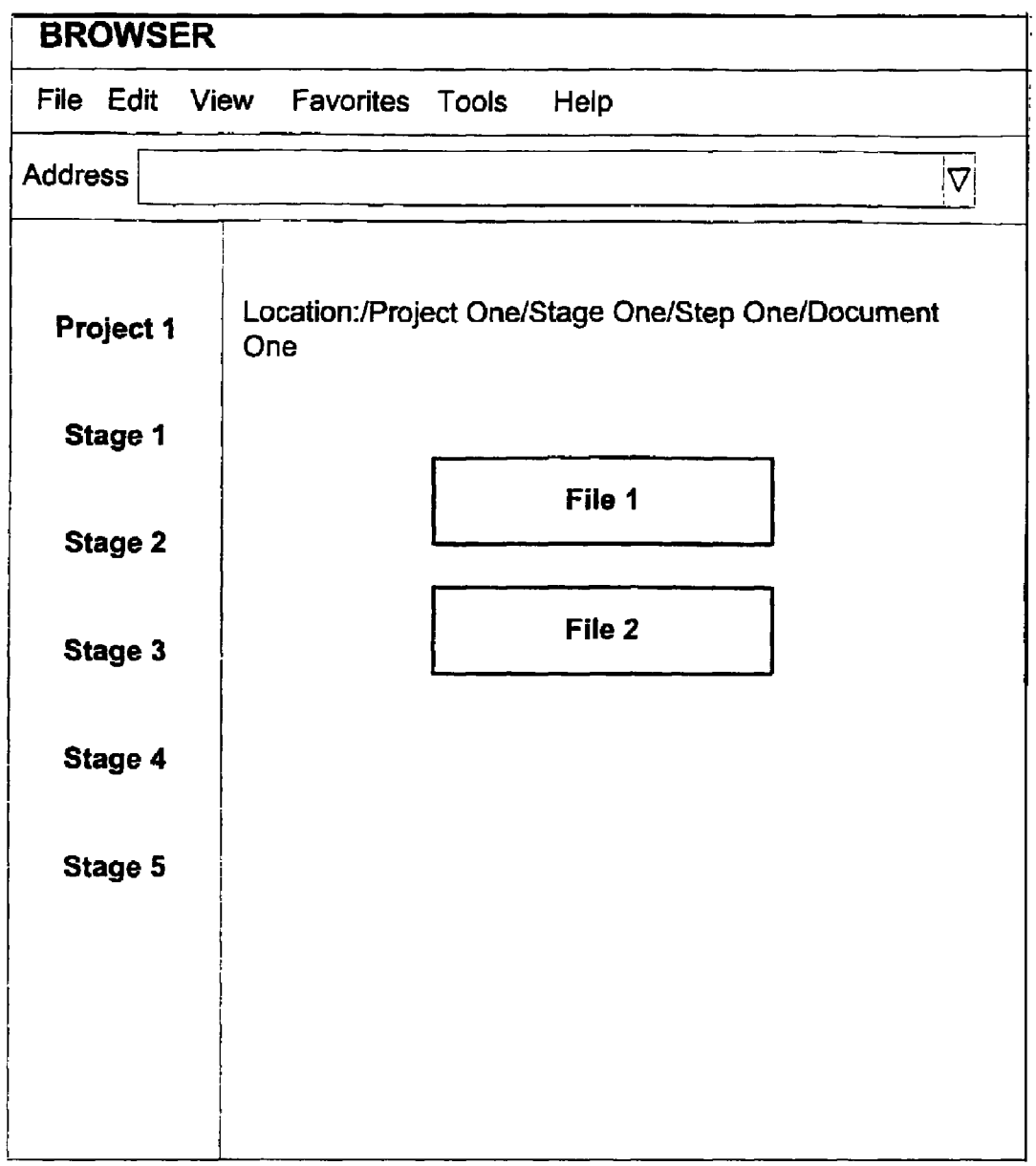
Figure 13J:
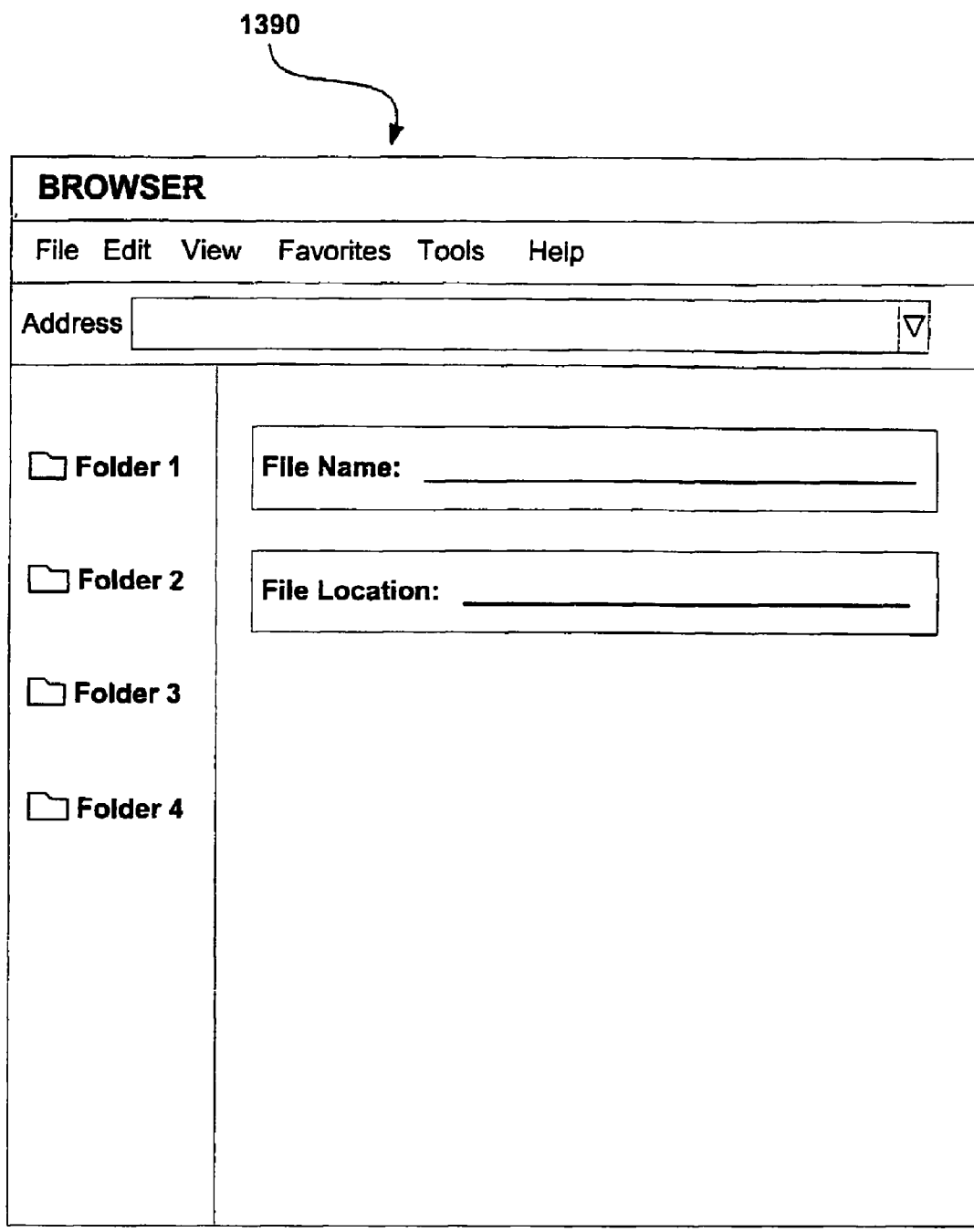

If the user selects the button to compose a document or an equivalent thereof, the navigator tool 1240 produces a composition screen 1360, as illustrated in FIG. 13F. The composition screen 1360 presents to the user a template for the document. The composition screen 1360 generally allows the user to select a template for the document to be created and to specify a name for this the created document. In one implementation, a defaulted storage location, or "path," for the deliverable is determined according to the project and the template type. Specifically, a particular type of documents created for a project may be stored at a particular location. This feature allows the user to easily locate other examples of a document. When the user selects a template for a document, the navigator tool 1240 produces a template screen 1370, as displayed in FIG. 13G, to provide instruction and information to the user regarding the creation of the document.

The user may also select the "View By Type" button in the documentation screen 1350 of FIG. 13E. This selection causes the navigator tool 1240 to create a list of all documents of a specific type (e.g., documents created from the same template) that are stored by the EDMS 1210. For instance, the type search screen 1380 in FIG. 13H displays files related to "project standards procedures policies." In this way, the user may locate examples of a document, even if these examples are associated with a different project or method or are located in different file storage locations. Conversely, the user may select the "View By Location" button in the documentation screen 1350 of FIG. 13E. In response, the navigator tool 1240 works with the EDMS 1210 to create a list of documents at the specified location. As described above, similar documents related to a specific process are typically stored in single location. Searching files at a particular storage location thus generally allows the user to examine similar documents pertaining to the same project. In the location search screen 1385 in FIG. 13I, the navigator tool 1240 displays files related to "project standard procedure policies" located at the path/project one/stage one/step one/document one. If the user knows the name and location for a file, the user may subsequently locate and view the file using the EDMS 1210, as depicted in the search screen 1390 in FIG. 13K.

Figure 14:
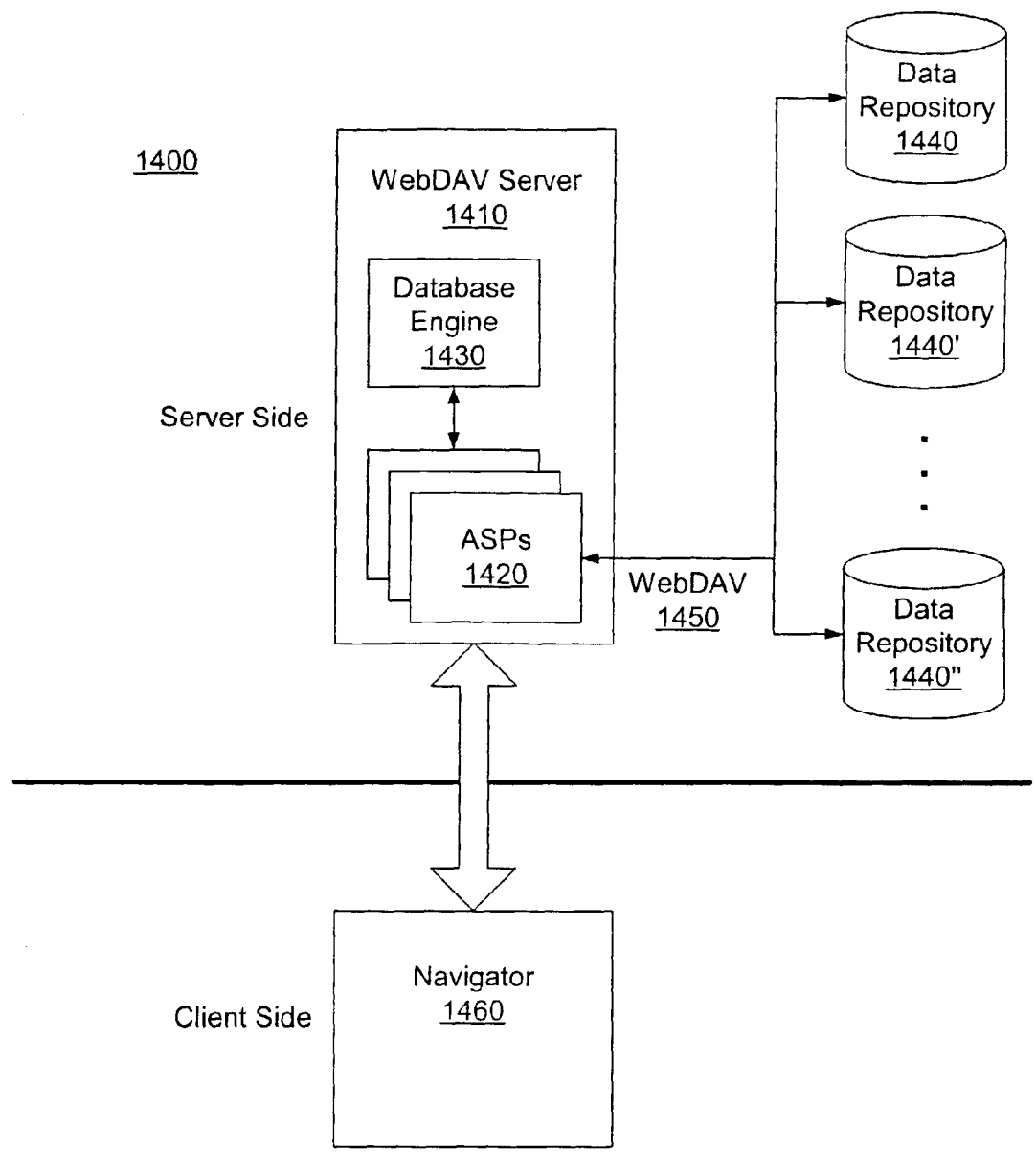

In another embodiment, as depicted in FIG. 14, a multiple repository APIF system 1400 distributes the documents needed for the Method 10. As described above, these documents include, for example, instructions for implementing the Method 10 and documentation to evidence actions taken in the Method 10. The multiple repository APIF system 1400 has a navigator application 1460 (described in greater detail below) that allows a user on the client-side to access documentation and data from multiple data repositories 1440 through a server 1410. The data repositories 1440 may have different formats and protocols and may be located at different locations. For instance, the data repositories 1440 may be: (1) PVCS or other well known systems of version control and configuration management software; (2) a LAN; (3) an information sharing application, such as Sharepoint® by Microsoft Inc. of Redmond, Wash., that gives users the ability to organize information, readily access that information, manage documents, and enable efficient collaboration; or (4) the above-described EDMS application such as the Documentum.

The server 1410 generally includes Active Server Pages (ASPs) 1420. ASPs 1420 is a specification for a dynamically created Web page with a ".ASP" extension that utilizes ActiveX scripting, generally a VisualBasic Script or JavaScript code. When a browser requests an ASP page, the server 1410 generates a page with HTML code and sends it back to the browser. The operation of the ASPs 1420 is described in greater detail below.

The server 1410 further includes a database engine 1410. The database engine is well-known technology for organizing, locating, and accessing data contained in the data repositories 1440. Examples of the database engine include Oracle®, SQL Server®, and Access®.

The components in the server 1410 use Web-based Distributed Authoring and Versioning (WebDAV) technology 1450 to coordinate with the different data repositories 1440. WebDAV 1450 is an extension to HyperText Transport Protocol (HTTP). Specifically, WebDAV 1450 adds new HTTP methods and headers and specifies how to use the new extensions, how to format request and response bodies, how existing HTTP behavior may change, etc.

HTTP is the standard mechanism by which information is transported over TCP/IP (Transmission Control Protocol/Internet Protocol) compatible networks, such as the Internet, intranets, and extranets. A protocol specifies what occurs in the connections between a client and a server. Basically, the protocol specifies data formats and algorithms so that the client and server can interoperate. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is extensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML).

HTTP, and hence XML in the context of HTTP, allows for the access of resources. The term resource refers to any piece of information that has a location described by a Uniform Resource Locator (URL) of the form HTTP://<domain>.<extension>, where <domain> specifies a particular domain, and <extension> can be, for example, .com, .edu, and net, among others. A resource can be, for example, a Web page, a document, a database, a bitmap image, or a computational object.

Extensions to HTTP allow for, among other things, the setting and retrieval of properties for resources. A property is specifically a name/value pair that contains descriptive information about a resource. More generally, a property is any information about a resource. Thus, properties provide for the ability to create, remove, and query such information about resources, such as their authors, creation dates, etc. Properties also provide for the ability to link web pages of any media type to other related web pages.

The goal of WebDAV 1450, broadly speaking, is to add remote authoring capabilities to HTTP, so that HTTP can be more convenient as a readable and writable collaborative medium, and not necessarily only a browsing medium for web pages. To achieve this goal, WebDAV allows an extended uniform set of functionality to be attached with documents available through a web server. Thus, the WebDAV 1450 protocol allows Web clients to create and edit documents over the Web. WebDAV 1450 also defines collections and a mechanism for associating arbitrary properties with resources. WebDAV 1450 also provides a means for creating typed links between any two documents, regardless of media type where previously, only HTML documents could contain links.

WebDAV 1450 may operate as a remote file system with extra properties. Specifically, WebDAV extensions may be used to specify an access control list (ACL), a set of data that informs a computer's operating system which permissions, or access rights, that each user or group has to specific system objects, such as directories and file. Each object can then have a unique security attribute that identifies which users have access to it, and the ACL is a list of each object and user access privileges such as read, write or execute.

WebDAV 1450 works with the file access system in an operating system, such as the Windows Explorer® in Microsoft Windows (D to allow a user to seamlessly access a remote storage device.

Returning to FIG. 14, the operation of the multiple repository system 1400 is now summarized. In operation, a user at the client side uses the navigator application 1460 to access or create a document. The navigator 1460 works with Internet Explorer® browser. For instance, to access and view a document, the user provides some type of input (such as clicking on a desired button) to the navigator application 1460 to specify the document to be viewed. Based on the input, the navigator 1460 forwards information to the server 1410 identifying the document, such as name or type of the document, the software project of interest, and the name of the server storing the document. In response, one of the ASPs 1420 accesses the database engine 1430 to locate the document named in the request. Then, ASP 1420 then connects the user to appropriate the data repository 1440 via WebDAV 1450. Typically, the user may view a web folder displaying the contents of the data repository 1440, from which the user may select a desired document via WebDAV 1450.

Similarly, to compose a document through a stored template, the user specifies the document to be created through the navigator application 1460. In turn, the navigator application 1460 forwards to the server 1410 information identifying the document. For instance, the navigator 1460 may forward the name of the document, the project of interest, and server storing the document. In response, one of the ASPs 1420 accesses the database engine 1430 to locate the desired template. The ASP 1420 further creates an entry in the database engine 1430 for the document to be created. The name of the template is then used to build a location for the template, typically in the form of a URL. One of the ASPs 1420 then copies a template from the data repository to a target folder using WebDAV 1450. An ASP 1420 then forwards a page to the navigator 1460 displaying the target folder with the new document. The user may then open the document through the navigator 1450 to view and edit the template. The navigator 1460 may then forward the document to one of the repositories 1440 via WebDAV 1450. The database engine 1430 then stores the location for the stored document.

CONCLUSION

The CMM method of the present invention has been empirically shown to allow organizations to achieve higher levels of CMM hierarchy much more rapidly. On average, an organization or a project within an organization takes about three years to achieve compliance with level 3 of the CMM. In contrast, several projects implementing the CMM in a BOX method 10 of the present invention have reached level 3 of the CMM in an average of nine months. These results suggest the utility and benefit of the present invention in assisting organizations to achieve higher levels of CMM maturity.

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to meet the requirements of new versions of CMM and other maturity models as they are developed. It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

TABLE 1

| Document Name (Navigator Item) | Type | Description | Stage | Step |
| --- | --- | --- | --- | --- |
| SEPG Project Plan | Template | The SEPG Project Plan serves as a guideline for defining, measuring, and monitoring commitment to quality by all team members on a project. It also identifies the key project roles, responsibilities, and personnel, and houses the project organization chart. | Process<br><br>Process<br><br>Process | Plan SEPG Project Execution<br>Organize SEPG Project Resources<br>Control SEPG Project Work |
| Decision Analysis and Resolution Reference Document | Reference Document | The Decision Analysis and Resolution (DAR) reference document defines DAR and its value, explains the purpose of DAR, identifies typical decisions requiring DAR, describes DAR techniques and artifacts, and provides guidelines for selecting the appropriate DAR technique. It also specifically outlines the process that all projects must follow when performing DAR. In addition, the DAR reference document informs project teams of the various resources available for resolving and analyzing project decisions during all phases of an organization's application lifecycle. Included are sample artifacts that may be created when using DAR. | Process | Plan SEPG Project Execution |

TABLE 1-continued

| Document Name (Navigator Item) | Type | Description | Stage | Step |
|---|---|---|---|---|
| SEPG Work Plan | Template | The SEPG Work Plan describes the key deliverables to be produced, the activities to be performed, the estimated effort required, key completion dates. They are produced at the project planning time: either at the end of a preceding phase of work, or during the project definition process. This will be the basis for the project's approach and staffing requirements. | Process<br><br>Process | Plan SEPG Project Execution<br>Control SEPG Project Work |
| Communication and Sponsorship Toolkit | Reference Document | The Communication and Sponsorship Plan Toolkit documents the instructions and areas of consideration for the Communication and Sponsorship Plan. The Communication and Sponsorship Plan serves as a guide to the communication and sponsorship efforts throughout the duration of the project. | Process | Plan SEPG Project Execution |
| Communication and Sponsorship Plan | Template and Sample | The Communication and Sponsorship Plan serves as a guide to the communication and sponsorship efforts throughout the duration of the project. It is a living and working document and should be updated periodically as audience needs change. | Process<br><br>Process | Plan SEPG Project Execution<br>Control SEPG Project Work |
| Configuration Management Plan | Template | The Configuration Management Plan applies to all information systems and related system engineering activities that might affect the achievement of a project's effort. This would include hardware, software, and documentation. In particular, the focus of this plan is on the enterprise perspective of configuration management. This plan identifies the need for a configuration management function that will maintain focus on the overall technical and functional objectives of the program. This enterprise configuration management function will also provide the continuous guidance needed to support the delivery of targeted business capabilities. Implementing a configuration management structure will provide senior management with oversight ability. | Process<br><br>Process | Plan SEPG Project Execution<br>Control SEPG Project Work |
| Risk Management Plan | Template | The purpose of Risk Management Planning is to focus attention on minimizing threats in the achievement of project objectives. It will provide a systematic approach for identifying and assessing risks, determining cost-effective risk reductions, and monitoring and reporting progress in reducing risk. All projects must perform risk planning in order to achieve Risk Management Planning objectives. Large projects should create a formal Risk Management Plan, but smaller projects need only to incorporate their risk planning into the Project Plan. | Process<br><br>Process | Plan SEPG Project Execution<br>Control SEPG Project Work |
| Training Needs Matrix | Template | The Training Needs Matrix lists the required training by role on a project, and describes the format of each training. It is used as a guide in identifying training needs, and as a tracking mechanism to ensure that project team members receive the necessary training required to fulfill their roles. | Process<br><br>Process<br><br>Process | Plan Project Execution<br>Organize Project Resources<br>Control SEPG Project Work |
| Orientation Binder | Template | The Orientation Binder acts as a key source of information for a new team member. The topics and information provided within the binder will help the new member get acquainted with the project's purpose, administrative processes and programs. Projects are required to create physical binders to hold the information outlined in the orientation binder template and must update the Orientation Binder with applicable project information. | Process | Organize SEPG Project Resources |

TABLE 1-continued

| Document Name (Navigator Item) | Type | Description | Stage | Step |
|---|---|---|---|---|
| SEPG Processes & Policies Table of Contents | Template | The SEPG Project Processes & Policies Table of Contents documents the project's formalized policies, standards, and processes. It also indicates the policies, standards, and processes that the project is required to develop. | Process | Organize SEPG Project Resources |
| Project Processes & Policies | Template | This Project Processes & Policies document is used to record standards and procedures that are specific to a project. Such documents would include the Issue Tracking Process, Risk Tracking Process, New Process Definition Process, all development and testing procedures, etc. See attached samples as a starting point for developing project-specific processes. | Process | Organize SEPG Project Resources |
| Training Needs Matrix (shaded for update) | Template | See first occurrence of Navigator Item. | See first occurrence of Navigator Item. | See first occurrence of Navigator Item. |
| CMMI Awareness Training | Training | The CMMI Awareness Training is a presentation designed to help training attendees understand the CMMI framework and its benefits, understand CMMI Level 2 concepts and examples, and understand CMMI Level 3 concepts and examples. This Training pertains to the Capability Maturity Model - Integrated (CMMI) framework. CMM in a Box is based on the CMMI framework. | Process | Organize SEPG Project Resources |
| CMMI Awareness for Sponsors Training | Training | The CMMI Awareness for Sponsors Training is a presentation designed to help sponsors understand the CMMI framework and its benefits, understand CMMI Level 2 concepts and examples, and understand CMMI Level 3 concepts and examples. | Process | Organize SEPG Project Resources |
| SEPG Overview Training | Training | The SEPG Program Overview is a brief presentation designed to help the training attendees understand CMMI and why it is important to the organization as well as understand how the SEPG supports the CMMI. | Process | Organize SEPG Project Resources |
| Quality Reviews Training | Training | The Quality Reviews Training provides attendees with a definition and purpose for the Software Quality Assurance and Peer Reviews. The training will help to better understand the importance of Quality Reviews, the process to carry out each Quality Review, and understand the roles and responsibilities for each Quality Review. Contact Resources are included to provide more information for attendees. | Process | Organize SEPG Project Resources |
| Metrics Training | Training | The Metrics Training will help projects to implement metrics. | Process | Organize SEPG Project Resources |
| Document Repository Overview | Reference Document | The Document Repository Overview defines a document repository, outlines its purpose, and provides guidance in choosing a document repository for your project/organization. The Document Repository Overview should be utilized when selecting a document repository. | Process | Organize SEPG Project Resources |
| Issues | Tool | Issue Management is the process of recording, tracking and resolving issues that are impacting the project. Issues are generally problems that involve a significant choice between two or more alternatives for an event that is happening now. Projects should track at minimum the nature of the issue, the impact, priority, status and resolution. | All Stages | All Task Packages |

TABLE 1-continued

| Document Name (Navigator Item) | Type | Description | Stage | Step |
|---|---|---|---|---|
| Risks | Tool | Risk Management is the process of recording, tracking, and mitigating risks that may result in issues that affect the project. Risks are situations that could occur and if they do, they would have a significant impact on the project. Projects should track at minimum the nature of the risk, the impact, mitigation approach and final outcome. | All Stages | All Task Packages |
| SIRs/CRs | Tool | Incident Management is the process of recording, tracking and resolving incidents that impact the project. Incidents include system investigation requests (SIRs) and change requests (CRs). Projects should track at minimum the nature of the incident, the impact, priority, status and resolution. | All Stages | All Task Packages |
| Agenda/Minutes | Template | The Meeting Minutes/Agenda documents the purpose and content of a meeting, as well as any key meeting outcomes and action items. | Process | Control SEPG Project Work |
| Individual and/or Team Status Reports | Template | Individual and/or Team Status Reports contain status information from each team member, or for the entire team. This will list accomplishments for the week, tasks for next week, issues, and other information that may be appropriate for status communication. | Process | Control SEPG Project Work |
| Project Status Reports | Template | The Project Status Report summarizes project status and reports on project metrics, key milestones, effort, issues and risks. | Process | Control SEPG Project Work |
| Configuration Management Status Report | Template | The Configuration Management Status Report presents a high-level status of CM activities to project management. The Configuration Management status must be reported to project management on a periodic basis as established in the Configuration Management Plan. | Process | Control SEPG Project Work |
| SEPG Project Plan (shaded for update) | Template | See first occurrence of Navigator Item at the Process Plan and Organize SEPG Stage. | See first occurrence of Navigator Item at the Process Plan and Organize SEPG Stage. | See first occurrence of Navigator Item at the Process Plan and Organize SEPG Stage. |
| SEPG Work Plan (shaded for update) | Template | See first occurrence of Navigator Item at the Process Plan and Organize SEPG Stage. | See first occurrence of Navigator Item at the Process Plan and Organize SEPG Stage. | See first occurrence of Navigator Item at the Process Plan and Organize SEPG Stage. |
| Communication and Sponsorship Plan (shaded for update) | Template | See first occurrence of Navigator Item at the Process Plan and Organize SEPG Stage. | See first occurrence of Navigator Item at the Process Plan and Organize SEPG Stage. | See first occurrence of Navigator Item at the Process Plan and Organize SEPG Stage. |
| Risk Management Plan (shaded for update) | Template | See first occurrence of Navigator Item at the Process Plan and Organize SEPG Stage. | See first occurrence of Navigator Item at the Process Plan and Organize SEPG Stage. | See first occurrence of Navigator Item at the Process Plan and Organize SEPG Stage. |
| Configuration Management Plan (shaded for update) | Template | See first occurrence of Navigator Item at the Process Plan and Organize SEPG Stage. | See first occurrence of Navigator Item at the Process Plan and Organize SEPG Stage. | See first occurrence of Navigator Item at the Process Plan and Organize SEPG Stage. |

TABLE 1-continued

| Document Name (Navigator Item) | Type | Description | Stage | Step |
|---|---|---|---|---|
| Training Needs Matrix (shaded for update) | Template | See first occurrence of Document at the Process Plan and Organize SEPG Stage. | See first occurrence of Navigator Item at the Process Plan and Organize SEPG Stage. | See first occurrence of Navigator Item at the Process Plan and Organize SEPG Stage. |
| Service Level Agreement | Reference Document | The purpose of this Service Level Agreement is to define the service level and communication requirements between a project and the Software Engineering Process Group (SEPG). This document is presented to the project manager who must agree to and sign before a substantive SEPG support commences. The SEPG will distribute a copy of the Service Level Agreement to the Engagement Partner, while it is the responsibility of the Project Manager to distribute/educate project team members on the contents. The Service Level Agreement provides an overview of estimated time commitments to support execution of SEPG efforts. | Process | Rollout & Support Projects |
| Tailoring & Waiver Request | Reference Document | The Tailoring & Waiver Request template provides guidance on how a project can tailor the methodology to better suit their needs. It includes guidelines on policy, process, deliverable, and tool tailoring. After reviewing the guidelines, if your project determines that a waiver request form is required, please complete the waiver request form using the "Compose Deliverable" option above. | Process | Rollout & Support Projects |
| Metrics Workbook | Reference Document | The Project Metrics Workbook template is used as a central repository for the metrics required by the Project Team. The project must complete the Metrics Workbook on a monthly basis and submit it to the SEPG team lead. The Metrics Plan outlines the overall metrics program and provides detailed explanations for each metric included in the Metrics Workbook. | Process | Rollout & Support Projects |
| Metrics Plan | Reference Document | The Metrics Plan describes the overall approach for identifying, collecting, and analyzing delivery metrics. Projects must use this document to plan for their metrics. | Process | Rollout & Support Projects |
| Project Management Review Tool | Template | The purpose of the document is to provide information on how to demonstrate each best practice by KPA (Key Process Area). It includes references to templates, job aids and samples deliverables. | Process<br><br>Project Management | Rollout & Support Projects<br>Plan Project Execution |
| Closing Memo | Reference Document | This memo is used to communicate and summarize the project. This memo should include project results, pertinent project metrics including schedule and budget plan versus actual, project successes, and project shortcomings. | Process | Rollout & Support Projects |
| SQA Debrief | Reference Document | The Software Quality Assurance (SQA) Debrief is conducted at the end of the project. During this meeting, the Software Engineering Process Group (SEPG) project manager gathers metrics on the effectiveness of the SQA process for the project and discusses "lessons learned" with project management executives. The results of the SQA Debrief are used to continuously improve the SQA process, methodology and tools. | Process | Rollout & Support Projects |
| Super SQA Training | Training | The Super SQA Reviewer Training is a presentation designed to help the SQA Reviewer trainee understand and articulate the Super SQA Process, understand the roles and responsibilities involved in a Super SQA Review, and be able to participate in a Super SQA Review. | Process | Conduct Super SQA Review |

TABLE 1-continued

| Document Name (Navigator Item) | Type | Description | Stage | Step |
|---|---|---|---|---|
| SQA Report | Template | The Software Quality Assurance (SQA) Report lists deviations in standard processes and deliverables as listed on the CMM Best Practices matrix. The SQA Reviewer produces this document as a result of the SQA review. | Process | Conduct Super SQA Review |
| Maturity Questionnaire | Sample | The Software Maturity Questionnaire is a detailed questionnaire to identify respondents, their background information, and to assess the project's maturity level based on responses to questions pertaining to key process areas within the maturity level. | Process | Conduct Assessment |
| Schedule | Sample | This document can be used as a template to create the Assessment Schedule for the period that the assessors are on the project site, the on-site period (OSP), usually last 5–10 days. Prior to the assessment, a series of training, interviews, documentation review, and consolidation sessions will need to be conducted so that the assessment team can map the existing management and development processes back to the Capability Maturity Model - Integrated (CMMI). This schedule sample outlines a generic OSP agenda. | Process | Conduct Assessment |
| Logistics | Sample | The Logistics Sample document can be modified to create a logistics checklist for the organization's assessment. It includes room booking, acquiring necessary equipment, catering, accommodations, and building access information. | Process | Conduct Assessment |
| Participant List | Sample | This sample participant list can be used as a guide in developing a participant list for the organization's assessment. | Process | Conduct Assessment |
| Assessment Preparation Training | Sample | The Assessment Preparation Training Sample provides an outline that includes the Assessment Purpose & Overview, Roles & Responsibilities, Interviews Do's & Don'ts, Process Assets, Interview Questions, Schedule Logistics, and Questions. | Process | Conduct Assessment |
| Participant Information Sample | Sample | The purpose of the Participant Information Sheet is to set expectations of the assessment participants as they prepare for the assessment process. | Process | Conduct Assessment |
| Mini-Appraisal Plan | Template | The purpose of this plan is to outline the of a mini-appraisal process for the organization. This plan documents the goals, objectives, expected outcomes, scope, participants, schedule, and logistics of the evaluation. It also specifies the tailoring of the Standard CMMI Assessment Method for Process Improvement method for the purposes of the mini-appraisal. | Process | Conduct Assessment |
| Process Improvement Survey | Reference Document | The Process Improvement Survey should be distributed to all participants to gather information regarding their experience with the Software Engineering Process Group (SEPG). The information gathered from this survey should be used as an input in improving the processes of the Software Process Engineering Group. | Process | Conduct Quarterly Survey |
| Organizational Design & Development Toolkit | Reference Document | The purpose of the Organization Design and Development (OD&D)Toolkit is to help create, modify, and/or develop organization structures to meet internal and external needs. Depending on the scope of the organization design and development initiative, some or all of the information can be used to facilitate the initiative. The steps within the toolkit provide guidance in | Personnel Personnel Personnel | Identify Organization Strategy Conduct Organization Assessment Design Organization Infrastructure |

TABLE 1-continued

| Document Name (Navigator Item) | Type | Description | Stage | Step |
|---|---|---|---|---|
| | | planning, designing, and implementing organization design changes. This toolkit includes detailed information for each step of organization design and development. | Personnel | Verify and Validate Organization Structure |
| | | The appendices to the OD&D Toolkit contain sample deliverables and/or templates for many of the steps. Use the templates/samples as a starting point for your own documents. | Personnel | Design Performance Management Infrastructure |
| | | | Personnel | Determine Organization Infrastructure Mobilization Approach |
| Core Competencies | Template | The Core Competencies document lists sample core competencies that will be developed as part of the Organization Design and Development process. A competency is a cluster of related knowledge, skills, and other attributes/abilities associated with high performance on a job. Below is a list of sample competencies. For more information about competencies, see the Organization Design and Development Toolkit. | Personnel | Determine Organization Infrastructure Mobilization Approach |
| Guiding Principles | Template | The Guiding Principles should be produced through discussions with members of the organization to reflect the current operation model, organizational values and norms, and business strategies. These guiding principles should be used as guidelines. Think of them as tips on how to ensure that the organization infrastructure design is consistent with the intent of the organization strategy. The guiding principles can be a general list or broken into broad categories. | Personnel | Determine Organization Infrastructure Mobilization Approach |
| Organizational Design & Development Toolkit | Reference Document | See first occurrence of Navigator Item in Identify Organization Strategy. | See first occurrence of Navigator Item in Identify Organization Strategy. | See first occurrence of Navigator Item in Identify Organization Strategy. |
| Gap Analysis | Template | The Gap Analysis worksheet is a table used to capture the gap between the current assessment and the desired organization. | Personnel | Conduct Organization Assessment |
| Organizational Design & Development Toolkit | Reference Document | See first occurrence of Navigator Item in Identify Organization Strategy. | See first occurrence of Navigator Item in Identify Organization Strategy. | See first occurrence of Navigator Item in Identify Organization Strategy. |
| Competency Model | Template | The Competency Model begins with the Competency Model Name module with the name of the Team Lead. The next module, Team Lead Competency Model, contains a table that illustrates the competencies associated with the "team lead" career field, The competency definitions, and the required proficiency levels for all competencies. The last module, Proficiency Scale, contains a table that illustrates the proficiency level and corresponding behavioral indicators for the problem-solving competency. | Personnel | Design Organization Infrastructure |
| Role Description | Template | The purpose of this document is to aid in the process of role design that consists of arranging tasks that make up a role in order to maximize the contribution the role makes to the business processes and the agency. Role descriptions should be written concurrently with the design of the competency model. More information about role design can be found in the Organization Design and Development Toolkit. | Personnel | Design Organization Infrastructure |

TABLE 1-continued

| Document Name (Navigator Item) | Type | Description | Stage | Step |
|---|---|---|---|---|
| Preliminary Job Description | Template | A job is a group of related roles that defines an individual's place within the organization. The organization design initiative is only tasked with creating the preliminary job description. The final job description will be developed by the offices after implementation based on the level of the employees assigned to each position. Job descriptions should be written concurrently with the design of the competency model. More information about role design can be found in the Organization Design and Development Toolkit. | Personnel | Design Organization Infrastructure |
| Sample Organization Structures | Sample | This sample document outlines the different Organizational Structure Types and provides samples of each. These include Functional, Process, Product, Matrix, and Customer/Industry-focused. | Personnel | Design Organization Infrastructure |
| Organizational Design & Development Toolkit | Reference Document | See first occurrence of Navigator Item in Identify Organization Strategy. | See first occurrence of Navigator Item in Identify Organization Strategy. | See first occurrence of Navigator Item in Identify Organization Strategy. |
| Competency Model (shaded for update) | Template | See first occurrence of Navigator Item in Design Organization Infrastructure. | See first occurrence of Navigator Item in Design Organization Infrastructure. | See first occurrence of Navigator Item in Design Organization Infrastructure. |
| Role Description (shaded for update) | Template | See first occurrence of Navigator Item in Design Organization Infrastructure. | See first occurrence of Navigator Item in Design Organization Infrastructure. | See first occurrence of Navigator Item in Design Organization Infrastructure. |
| Preliminary Job Description (shaded for update) | Template | See first occurrence of Navigator Item in Design Organization Infrastructure. | See first occurrence of Navigator Item in Design Organization Infrastructure. | See first occurrence of Navigator Item in Design Organization Infrastructure. |
| Organizational Design & Development Toolkit | Reference Document | See first occurrence of Navigator Item in Identify Organization Strategy. | See first occurrence of Navigator Item in Identify Organization Strategy. | See first occurrence of Navigator Item in Identify Organization Strategy. |
| Performance Measurement Toolkit | Toolkit | The purpose of the Performance Measurement (PM) Toolkit is to assist the organization in formulating a performance measurement process to develop goals, measures, and targets of performance that link to the strategic vision, mission, and overall business objectives of the organization. The Performance Measurement Toolkit does not apply to individual measurement. Please refer to the Organization Design and Development Toolkit for more information on individual performance measurement tools and processes. | Personnel | Design Performance Management Infrastructure |
| Organizational Design & Development Toolkit | Reference Document | See first occurrence of Navigator Item in Identify Organization Strategy. | See first occurrence of Navigator Item in Identify Organization Strategy. | See first occurrence of Navigator Item in Identify Organization Strategy. |

TABLE 1-continued

| Document Name (Navigator Item) | Type | Description | Stage | Step |
|---|---|---|---|---|
| Training Toolkit | Reference Document | The Training Toolkit will help plan and deliver training to the audience(s) who will use newly identified processes. This will help people to perform their roles effectively and efficiently. The training task for each new initiative is a critical component of preparing employees for change. The Training Toolkit is intended to provide guidance on developing training to "get people started" and to explain "what's new and different"- NOT for developing ongoing training. It is not intended to provide guidance on creating continuing training programs in the organization, even if a need for such training is identified. This toolkit can be used to create short-term, one-time training on the newly defined process(es). | Personnel Personnel Personnel Personnel Personnel Personnel | Conduct Training Needs Analysis Develop Training Plan Design Training Develop Training Deliver Training Provide Post-Implementation Support |
| Training Needs Analysis | Template | The Training Needs Analysis course is used to prepare instructors for the needs of affected training audiences. It includes a high level training needs analysis by audience or group and a more detailed analysis for individuals. | Personnel | Conduct Training Needs Analysis |
| Training Toolkit | Template | See first occurrence of Navigator Item in Conduct Training Needs Analysis. | See first occurrence of Navigator Item in Conduct Training Needs Analysis. | See first occurrence of Navigator Item in Conduct Training Needs Analysis. |
| Training Plan | Template | The Training Plan course is used to prepare instructors how to teach a particular course. It includes training approach, course curriculum, and module descriptions. | Personnel | Develop Training Plan |
| Training Toolkit | Template | See first occurrence of Navigator Item in Conduct Training Needs Analysis. | See first occurrence of Navigator Item in Conduct Training Needs Analysis. | See first occurrence of Navigator Item in Conduct Training Needs Analysis. |
| Training Development Standards | Template | The purpose of the Training Development Standards is to ensure that training materials are created with consistent instructional design and development principles and techniques. This consistent "look and feel" promotes effective learning for training participants. | Personnel | Design Training |
| Instructor Guide | Template | The Instructor Guide is used to prepare instructors to teach a particular course. It includes a course overview containing objectives, prerequisites, and topic timing. The template is organized in modules that walk the instructor through entire course agenda along with instructor notes. | Personnel | Design Training |
| Participant Guide | Template | The Participant Guide is used to provide participants with the agenda and presentation information for the course without the instructor notes. | Personnel | Design Training |
| Training Toolkit | Template | See first occurrence of Navigator Item in Conduct Training Needs Analysis. | See first occurrence of Navigator Item in Conduct Training Needs Analysis. | See first occurrence of Navigator Item in Conduct Training Needs Analysis. |
| Train-the-Trainer Course Description | Template | The Train-the-Trainer course is used to prepare instructors to teach a particular Course. The Course Description defines the objectives, pre-requisites, expectations, length, and agenda for the training course. | Personnel | Develop Training |

TABLE 1-continued

| Document Name (Navigator Item) | Type | Description | Stage | Step |
|---|---|---|---|---|
| Training Development Standards (shaded for update) | Template | See first occurrence of Navigator Item in Design Training. | See first occurrence of Navigator Item in Design Training. | See first occurrence of Navigator Item in Design Training. |
| Instructor Guide (shaded for update) | Template | See first occurrence of Navigator Item in Design Training. | See first occurrence of Navigator Item in Design Training. | See first occurrence of Navigator Item in Design Training. |
| Participant Guide (shaded for update) | Template | See first occurrence of Navigator Item in Design Training. | See first occurrence of Navigator Item in Design Training. | See first occurrence of Navigator Item in Design Training. |
| Sign In Sheet | Template | The Sign-In Sheet document can be used to record training attendee information. This document should be used in conjunction with the Develop Training section of the Training Toolkit. Reference the Develop Training section of the Training Toolkit for additional background information regarding The Sign-In Sheet. | Personnel | Develop Training |
| Course Evaluation | Template | The Course Evaluation document should be used by training attendees who are expected to complete this evaluation at the end of each training session. This document should be used in conjunction with the Develop Training section of the Training Toolkit. Reference the Develop Training section of the Training Toolkit for additional background information regarding the Course Evaluation. | Personnel | Develop Training |
| Training Toolkit | Template | See first occurrence of Navigator Item in Conduct Training Needs Analysis. | See first occurrence of Navigator Item in Conduct Training Needs Analysis. | See first occurrence of Navigator Item in Conduct Training Needs Analysis. |
| Training Toolkit | Template | See first occurrence of Navigator Item in Conduct Training Needs Analysis. | See first occurrence of Navigator Item in Conduct Training Needs Analysis. | See first occurrence of Navigator Item in Conduct Training Needs Analysis. |
| Program Business Case Approach | Reference | The objective of the Program Business Case Approach is to define the process for identifying, estimating, documenting, and submitting project initiatives for the upcoming year. First, it defines the process by which the next year's projects are identified. Second, it defines a process to ensure that all costs and benefits associated with the implementation of projects are estimated in a consistent manner. Third, it defines a process to ensure that all business cases are documented and in a consistent manner that allows ease of comparison across projects. And last, it defines the processes for reviewing and submitting the business cases. This process is applicable to all programs and subordinate projects. | Program Management | Justify Program |

TABLE 1-continued

| Document Name (Navigator Item) | Type | Description | Stage | Step |
|---|---|---|---|---|
| Program Business Case | Template and Sample | The Program Business Case is to be used in conjunction with the Program Business Case Approach and the Program Business Case Sample. This document is to be used as a template for building a business case while the Program Business Case Sample document provides an example of what the actual Business Case should look like. This document should be used if the organization does not have an existing and well-defined Business Case. In cases where a Business Case already exists, use the existing document. | Program Management Program Management | Justify Program Control Program Work |
| Program Management Approach | Reference Document | The Program Management Approach reference document describes the various organizational approaches that can be used when operating the program office. This document also identifies the key processes, initiation and start-up activities, deliverables, and general responsibilities of a program office. This document should be used for guidance when developing the Program Plan. | Program Management Program Management Program Management Program Management | Plan Program Execution Organize Program Resources Control Program Work Complete Program |
| Program Plan | Template | The Program Plan defines the overall management approach and processes for running the program. Written during the planning phase, this document serves as a roadmap for running the program. It includes all major management functions such as program organization, quality, metrics, and reporting. | Program Management Program Management Program Management | Plan Program Execution Organize Program Resources Control Program Work |
| Program Performance Reporting Approach | Reference | Performance Reporting involves the assessment and documentation of the overall program and each project's performance and progress against the plan. Project status reporting and team member time reporting are critical functions within this process. The purpose of this deliverable is to develop the Performance Reporting process and to record any future changes in direction, scope, or timeframes. | Program Management | Plan Program Execution |
| Program Financial Management Plan | Template | This document defines the financial controls and processes for the program, including financial management and reporting. | Program Management | Plan Program Execution |
| Program Resource Management Plan | Template | The Program Resource Management Plan defines the method for sourcing and managing the program's human and physical resources. The objectives include obtaining, preparing, managing, and releasing human and physical resources required by the individual project teams on the program, as well as to provide assistance in other human resource concerns. | Program Management Program Management Program Management | Plan Program Execution Organize Program Resources Control Program Work |
| Program Release Management Approach | Reference | The Program Release Management Approach is a set of guidelines that cover the management approach for defining, planning and delivering releases. Release management is responsible for defining and managing the individual releases as well as the dependencies and interfaces between releases. Although the techniques described in these guidelines are particularly applicable to large, long-term programs of change covering multiple releases, with appropriate scaling they can also be applied to more limited-scope programs or projects. It is important to note that these guidelines specify a generic release management approach. The actual release strategy and the definition of the releases themselves for a given program are contained in the Release Plan, which is a separate, program-specific document. | Program Management | Plan Program Execution |

TABLE 1-continued

| Document Name (Navigator Item) | Type | Description | Stage | Step |
| --- | --- | --- | --- | --- |
| Program Management Approach | Reference | See first occurrence of Navigation Item. | See first occurrence of Navigation Item. | See first occurrence of Navigation Item. |
| Program Resource Management Plan (shaded for update) | Template | See first occurrence of Navigation Item. | See first occurrence of Navigation Item. | See first occurrence of Navigation Item. |
| Program Resource Request | Template | The purpose of the Program Resource Request is to outline the process by which to request resources for a program. This includes request specifications, role and responsibilities requirements, resource preparation, and request approval. When completing the Performance Resource Request, the Program Manager should review the Program Management Approach for input into the request process. | Program Management | Organize Program Resources |
| Program Plan (shaded for update) | Template | See first occurrence of Navigation Item. | See first occurrence of Navigation Item. | See first occurrence of Navigation Item. |
| Program Management Approach | Reference | See first occurrence of Navigation Item. | See first occurrence of Navigation Item. | See first occurrence of Navigation Item. |
| Program Resource Management Plan (shaded for update) | Template | See first occurrence of Navigation Item. | See first occurrence of Navigation Item. | See first occurrence of Navigation Item. |
| Program Business Case (shaded for update) | Template | See first occurrence of Navigation Item. | See first occurrence of Navigation Item. | See first occurrence of Navigation Item. |
| Program Plan (shaded for update) | Template | See first occurrence of Navigation Item. | See first occurrence of Navigation Item. | See first occurrence of Navigation Item. |
| Program Management Approach | Reference | See first occurrence of Navigation Item. | See first occurrence of Navigation Item. | See first occurrence of Navigation Item. |
| Program Closeout Report | Template | The Program Closeout Report documents the closure of the program. It includes details of the final disposition of all human and physical resources and describes the archived location of all historical program records that are captured. | Program Management | Complete Program |
| Service Level Agreement | Template | The purpose of this Service Level Agreement is to define the service level and communication requirements between a project and the Software Engineering Process Group (SEPG). This document is presented to the project manager who must agree to and sign before a substantive SEPG support commences. The SEPG will distribute a copy of the Service Level Agreement to the Engagement Partner, while it is the responsibility of the Project Manager to distribute/educate project team members on the contents. The Service Level Agreement provides an overview of estimated time commitments to support execution of SEPG efforts. | Project Management | Plan Project Execution |
| Best Practices Matrix | Reference Document | The purpose of the document is to provide information on how to demonstrate each best practice by KPA (Key Process Area). It includes references to templates, job aids and samples deliverables. | Project Management | Plan Project Execution |

TABLE 1-continued

| Document Name (Navigator Item) | Type | Description | Stage | Step |
|---|---|---|---|---|
| Tailoring & Waiver Request | Template | The Waiver Request and Tailoring template provides guidance on how a project can tailor the methodology to better suit their needs. It includes guidelines on policy, process, deliverable, and tool tailoring. After reviewing the guidelines, if your project determines that a waiver request form is required, please complete the waiver request form using the "Compose Deliverable" option above. | Project Management | Plan Project Execution |
| Metrics Plan | Reference Document | The Metrics Plan describes the overall approach for identifying, collecting, and analyzing delivery metrics. Projects must use this document to plan for their metrics. | Project Management | Plan Project Execution |
| Project Plan | Template | The Project Plan serves as a guideline for defining, measuring, and monitoring commitment to quality by all team members on a project. It also identifies the key project roles, responsibilities, and personnel, and houses the project organization chart. | Project Management Project Management Project Management | Plan Project Execution Organize Project Resources Control Project Work |
| Decision Analysis and Resolution | Reference Document | The Decision Analysis and Resolution (DAR) reference document defines DAR and its value, explains the purpose of DAR, identifies typical decisions requiring DAR, describes DAR techniques and artifacts, and provides guidelines for selecting the appropriate DAR technique. It also specifically outlines the process that all projects must follow when performing DAR. In addition, the DAR reference document informs project teams of the various resources available for resolving and analyzing project decisions during all phases of an organization's application lifecycle. | Project Management | Plan Project Execution |
| Work Plan | Template | The Work Plan describe the key deliverables to be produced, the activities to be performed, the estimated effort required, key completion dates. They are produced at the project planning time: either at the end of a preceding phase of work, or during the project definition process. This will be the basis for the project's approach and staffing requirements. | Project Management Project Management | Plan Project Execution Organize Subcontractor Management Resources |
| Communication and Sponsorship Toolkit | Reference Document | The Communication and Sponsorship Plan serves as a guide to the communication and sponsorship efforts throughout the duration of the project. It is a living and working document and should be updated periodically as audience needs change. The Communication and Sponsorship Plan Toolkit documents the instructions and areas of consideration for the Communication and Sponsorship Plan. | Project Management | Plan Project Execution |
| Communication and Sponsorship Plan | Template and Sample | The Communication and Sponsorship Plan serves as a guide to the communication and sponsorship efforts throughout the duration of the project. It is a living and working document and should be updated periodically as audience needs change. | Project Management | Plan Project Execution |
| Estimating Worksheet | Sample | The estimating process applies the cost factors against the tailored work plan to produce an estimate of the effort that will be required for a project. The project's overall complexity can also inflate or deflate the project's estimate. This process involves determining the project's complexity, determining the factor values, and applying these values to determine the final estimated project costs in dollars and days. Upon completing a project, the estimating worksheet sheet should be updated based on the actuals that were tracked. This will allow future estimates to be more accurate. | Project Management | Plan Project Execution |

TABLE 1-continued

| Document Name (Navigator Item) | Type | Description | Stage | Step |
|---|---|---|---|---|
| Configuration Management Plan | Template | The Configuration Management Plan applies to all information systems and related system engineering activities that might affect the achievement of a project's effort. This would include hardware, software (COTS and/or custom), and documentation. In particular, the focus of this plan is on the enterprise perspective of configuration management. This plan identifies the need for a configuration management function that will maintain focus on the overall technical and functional objectives of the program. This enterprise configuration management function will also provide the continuous guidance needed to support the delivery of targeted business capabilities. Implementing a configuration management structure will provide senior management with oversight ability. | Project Management | Plan Project Execution |
| Risk Management Plan | Template | The purpose of Risk Management Planning is to focus attention on minimizing threats in the achievement of project objectives. It will provide a systematic approach for identifying and assessing risks, determining cost-effective risk reductions, and monitoring and reporting progress in reducing risk. All projects must perform risk planning in order to achieve Risk Management Planning objectives. Large projects should create a formal Risk Management Plan, but smaller projects need only to incorporate their risk planning into the Project Plan. | Project Management | Plan Project Execution |
| Training Needs Matrix | Template | The training needs matrix lists the required training by role on a project, and describes the format of each training. It is used as a guide in identifying training needs, and as a tracking mechanism to ensure that project team members receive the necessary training required to fulfill their roles. | Project Management Project Management Project Management | Plan Project Execution Organize Project Resources Control Project Work |
| Metrics Workbook | Template | The Project Metrics Workbook template is used as a central repository for the metrics required by the Project Team. The project must complete the Metrics Workbook on a monthly basis and submit it to the SEPG team lead. The Metrics Plan outlines the overall metrics program and provides detailed explanations for each metric included in the Metrics Workbook. | Project Management Project Management Project Management | Plan Project Execution Control Project Work Complete Project |
| Project Plan (shaded for update) | Template | See first occurrence of Navigator Item. | See first occurrence of Navigator Item. | See first occurrence of Navigator Item. |
| Project Processes & Policies Table of Contents | Template | The Project Processes & Policies Table of Contents documents the project's formalized policies, standards, and processes. It also indicates the policies, standards, and processes that the project is required to develop. | Project Management | Organize Project Resources |
| Project Processes & Policies | Template | This document is used to record standards and procedures that are specific to a project. Such documents would include the Issue Tracking Process, Risk Tracking Process, New Process Definition Process, all development and testing procedures, etc. See attached samples as a starting point for developing project-specific processes. | Project Management | Organize Project Resources |

TABLE 1-continued

| Document Name (Navigator Item) | Type | Description | Stage | Step |
|---|---|---|---|---|
| Training Needs Matrix (shaded for update) | Template | See first occurrence of Navigator Item. | See first occurrence of Navigator Item. | See first occurrence of Navigator Item. |
| Issues | | Issue Management is the process of recording, tracking and resolving issues that are impacting the project. Issues are generally problems that involve a significant choice between two or more alternatives for an event that is happening now. Projects should track at minimum the nature of the issue, the impact, priority, status and resolution. | All Stages | All Task Packages |
| Risks | | Risk Management is the process of recording, tracking, and mitigating risks that may result in issues that affect the project. Risks are situations that could occur and if they do, they would have a significant impact on the project. Projects should track at minimum the nature of the risk, the impact, mitigation approach and final outcome. | All Stages | All Task Packages |
| Agenda/Minutes | Template | The Meeting Minutes/Agenda documents the purpose and content of a meeting, as well as any key meeting outcomes and action items. | Project Management | Control Project Work |
| Individual and/or Team Status Reports | Template | This contains status information from each team member, or for the entire team. This will list accomplishments for the week, tasks for next week, issues, and other information that may be appropriate for status communication. | Project Management | Control Project Work |
| Project Status Reports | Template | The Project Status Report summarizes project status and reports on project metrics, key milestones, effort, issues and risks. | Project Management | Control Project Work |
| Configuration Management Status Report | Template | The Configuration Management Status Report presents a high-level status of CM activities to project management. The CM status must be reported to project management on a periodic basis as established in the CM Plan. | Project Management | Control Project Work |
| Training Needs Matrix (shaded for update) | Template | See first occurrence of Navigator Item. | See first occurrence of Navigator Item. | See first occurrence of Navigator Item. |
| Requirements Traceability Matrix (shaded for update) | Template | See first occurrence of Navigator Item at the Analysis Stage. | See first occurrence of Navigator Item at the Analysis Stage. | See first occurrence of Navigator Item at the Analysis Stage. |
| Configuration Audits | Template | The Configuration Audit Template is used to document the conduct of a configuration audit and record the discrepancies and the corrective actions for those discrepancies. The three main components of the audit template describe the project information, lists the components audited, and lists the findings resulting from the audit. All discrepancies must be resolved or answered prior to establishing a new baseline and before the audit can be called complete. Completing the additional comments and issues to consider during next audit sections will prove beneficial in clarifying the table entries. | Project Management | Control Project Work |
| Metrics Workbook (Shaded for Update | Template | See first occurrence of Navigator Item. | See first occurrence of Navigator Item. | See first occurrence of Navigator Item. |
| Project Plan (shaded for update) | Template | See first occurrence of navigator item. | See first occurrence of navigator item. | See first occurrence of navigator item. |

TABLE 1-continued

| Document Name (Navigator Item) | Type | Description | Stage | Step |
|---|---|---|---|---|
| Closing Memo | Template | This memo is used to communicate and summarize the project. This memo should include project results, pertinent project metrics including schedule and budget plan versus actual, project successes, and project shortcomings. | Project Management<br><br>Project Management<br><br>Project Management | Complete Project<br><br>Complete Subcontractor Management<br><br>Complete Product Acquisition |
| Metrics Workbook (Shaded for Update | Template | See first occurrence of Navigator Item. | See first occurrence of Navigator Item. | See first occurrence of Navigator Item. |
| SQA Report & Project Response | Template | The Software Quality Assurance (SQA) Report lists deviations in standard processes and deliverables as listed on the CMM Best Practices matrix. The SQA Reviewer produces this document as a result of the SQA review. | Project Management | SQA Review Execution |
| Business Case | Template | The Business Case provides economic justification for the change journey and for each program within the change journey. The Business Case explains why the sponsoring organization must change, what value it receives by changing, and what steps are necessary for a successful change. The Business Case addresses three main components: (1) business context and change imperatives, (2) value impact analysis, and (3) change journey. | Analysis | Define Business Case |
| Current Business Assessment | Template | The Current Business Assessment allows for reviewing of the existing system. This makes it possible to identify potential reusable components, required interfaces, and eventually the scope of the required application and its supporting network. | Analysis | Requirements Development & Analysis |
| Business and User Requirements | Template | The Business and User Requirements document outlines the requirements for design in a structured, top-down manner. The objective is to describe "what needs to be done and/or achieved" and includes general information about the proposed solution, business rules, functions, process flows, and the requirements themselves. This document should map to the application interface requirements and ultimately to the requirements traceability matrix. | Analysis<br><br>Analysis | Requirements Development & Analysis<br><br>Assess Deployment Environment |
| New Business Assessment | Template | The New Business Assessment deliverable identifies the number of users per location that will be using the application. It is required for estimating hardware and software needs. | Analysis | Requirements Development & Analysis |
| Business and User Requirements (shaded for update) | Template | See first occurrence of Navigator Item. | See first occurrence of Navigator Item. | See first occurrence of Navigator Item. |
| Peer Review | Template | Moved to Peer Review design matrix. | Moved to Peer Review design matrix. | Moved to Peer Review design matrix. |
| Plan Delivery | Task Package | Moved to Commit design matrix. | Moved to Commit design matrix. | Moved to Commit design matrix. |
| Commit | Template | Moved to Commit design matrix. | Moved to Commit design matrix. | Moved to Commit design matrix. |
| Application and Interface Requirements | Template | The Application and Interface Requirements document describes the application and interface requirements. It is a further breakdown of the business requirements and includes: general overview of the system, operating environment, system interfaces, and references to the requirements traceability matrix. | Analysis | Identify and Analyze Application and Interface Requirements |

TABLE 1-continued

| Document Name (Navigator Item) | Type | Description | Stage | Step |
|---|---|---|---|---|
| Requirements Traceability Matrix | Template | The Requirements Traceability Matrix lists requirements from stakeholders that the solution needs to fulfill. Stakeholders can include: users, customers, suppliers, other systems or client representatives. To demonstrate that all requirements are satisfied, the Requirements Traceability Matrix links requirements back to a solution component(s) or document. | Analysis<br><br>Project Management | Identify and Analyze Application and Interface Requirements<br>Control Project Work |
| User and Service Level Requirements | Template | The User and Service Level Requirements document describes the users that the solution will support. It also lists the business and transaction volumes that solution must handle as well as required response times. | Design | Analyze Technology Infrastructure Requirements |
| Execution/Operations Architecture Requirements | Template | The Execution/Operations Architecture is a collection of services and control structures that support the solution. It is an intermediate layer between the application and the operating system software. The Execution/Operations Architecture Requirements deliverable lists the requirements for the execution/operations architecture. | Design | Analyze Technology Infrastructure Requirements |
| Technology Selection Matrix | Template | The Technology Selection Matrix categorizes requirements for the technology infrastructure, lists options for satisfying each requirement category and lists the recommended solution including the rationale for its selection. | Design | Analyze Technology Infrastructure Requirements |
| Development Architecture Requirements | Template | The purpose of the development architecture is to support the tasks involved in the analysis, design, construction, and maintenance of the solution, as well as the associated management processes. The Development Architecture Requirements deliverable lists the requirements for the development architecture. | Design | Analyze Technology Infrastructure Requirements |
| Technology Infrastructure Scope | Template | The Technology Infrastructure Scope consists of a graphical representation of the scope of the technology infrastructure. It depicts the technology components that make up technology infrastructure and will ultimately support the solution, including links to external systems and peripherals. | Design | Analyze Technology Infrastructure Requirements |
| Technology Blueprint | Template | The Technology Blueprint provides a high-level view of the technical infrastructure necessary to enable the business objectives. This document should outline the general design for the execution, development and operations environments. | Design<br><br>Design | Select and Design Execution/Operations Architecture<br>Select and Design Development Architecture |
| Execution/Operations Architecture Component Design | Template | The Execution/Operations Architecture Component Design deliverable documents the sub-processes and interfaces necessary for a component to meet the specified requirements. The design covers custom components as well as packaged and reuse component extensions for the execution/operations architecture. A document should be created for each development architecture component deliverable. | Design | Select and Design Execution/Operations Architecture |
| Execution/Operations Architecture Physical Model | Template | The Execution/Operations Architecture Physical Model shows the actual components comprising the execution/operations architecture and their relative location and interfaces. Interfaces across architectures should also be reflected (e.g., operations architecture interfaces to execution). Moreover, the model will depict the platforms on which the components will reside as well as the distribution across the environment. | Design | Select and Design Execution/Operations Architecture |

TABLE 1-continued

| Document Name (Navigator Item) | Type | Description | Stage | Step |
|---|---|---|---|---|
| Execution/Operations Architecture Test Plan | Template | The Execution/Operations Architecture Test Plan documents the specific steps in the testing process. It includes descriptions of the test processes or passes, the cycle definitions, the phase containment criteria, the use of the testing database and configuration management for version control. | Design<br><br>Build and Test | Select and Design Execution/Operations Architecture<br><br>Build and Test Execution/Operations Architecture |
| Execution/Operations Architecture Test Conditions | Template | The Execution/Operations Architecture Test Conditions describe the conditions by which the component will be tested. The conditions map directly to the architecture requirements. | Design<br><br>Build and Test | Select and Design Execution/Operations Architecture<br><br>Build and Test Execution/Operations Architecture |
| Execution/Operations Architecture Test Scripts | Template | The Execution/Operations Architecture Test Scripts define the steps to be followed by the testing executor to test the conditions that have been identified. The scripts are instructions that are clear, unambiguous and repeatable in manner. | Design<br><br>Build and Test | Select and Design Execution/Operations Architecture<br><br>Build and Test Execution/Operations Architecture |
| Execution/Operations Architecture Test Results | Template | The Execution/Operations Architecture Test Results describe the actual results of the test and any issues or lessons learned from the test effort. | Design<br><br>Build and Test | Select and Design Execution/Operations Architecture<br><br>Build and Test Execution/Operations Architecture |
| Execution/Operations Architecture Test Data | Template | The Execution/Operations Architecture Test Data is the data used as input to test the conditions. The data is used in conjunction with the test scripts to validate that the conditions are being met accurately and as required. | Design<br><br>Build and Test | Select and Design Execution/Operations Architecture<br><br>Build and Test Execution/Operations Architecture |
| Technology Blueprint (Shaded for update) | Template | See first occurrence of Navigator Item. | See first occurrence of Navigator Item. | See first occurrence of Navigator Item. |
| Development Architecture Component Design | Template | The Development Architecture Component Design deliverable documents the sub-processes and interfaces necessary for a component to meet the specified requirements. The design covers custom components as well as packaged and reusable component extensions for the development architecture. A document should be created for each development architecture component deliverable. | Design | Select and Design Development Architecture |
| Development Architecture Physical Model | Template | The Development Architecture Physical Model shows the actual components comprising the development architecture and their relative location and interfaces. Interfaces across architectures should also be reflected (e.g., operations architecture interfaces with development). Moreover, the model will depict the platforms on which the components will reside as well as the distribution across the environment. | Design | Select and Design Development Architecture |
| Overall Testing Approach | Template | This Deliverable documents the various stages involved in testing. A Testing Approach consists of Test Objectives and Scope, Test Overview, Deficiency Tracking Approach, Regression Testing Approach, Test Environment, and Risk Management. | Design<br><br>Design | Select and Design Development Architecture<br><br>Plan Testing Approach |
| Development Architecture Test Plan | Template | The Development Architecture Test Plan documents the specific steps in the testing process. It includes descriptions of the test processes or passes, the cycle definitions, the phase containment criteria, the use of the testing database and configuration management for version control. | Design<br><br>Build and Test | Select and Design Development Architecture<br><br>Build and Test Technology Infrastructure |

TABLE 1-continued

| Document Name (Navigator Item) | Type | Description | Stage | Step |
|---|---|---|---|---|
| Development Architecture Test Conditions | Template | The Development Architecture Test Conditions describe the conditions by which the component will be tested. The conditions map directly to the architecture requirements. | Design<br><br>Build and Test | Select and Design Development Architecture<br>Build and Test Technology Infrastructure |
| Development Architecture Test Scripts | Template | The Development Architecture Test Scripts define the steps to be followed by the testing executor to test the conditions that have been identified. The scripts are instructions that are clear, unambiguous and repeatable in manner. | Design<br><br>Build and Test | Select and Design Development Architecture<br>Build and Test Technology Infrastructure |
| Development Architecture Test Results | Template | The Development Architecture Test Results describe the actual results of the test and any issues or lessons learned from the test effort. | Design<br><br>Build and Test | Select and Design Development Architecture<br>Build and Test Technology Infrastructure |
| Development Architecture Test Data | Template | The Development Architecture Test Data is the data used as input to test the conditions. The data is used in conjunction with the test scripts to validate that the conditions are being met accurately and as required. | Design<br><br>Build and Test | Select and Design Development Architecture<br>Build and Test Technology Infrastructure |
| Conceptual Design | Template | The Conceptual Design deliverable, often called the operational concept, describes the key functional and interface requirements for the work product. This document addresses the design method, functional and data requirements, screen design, report design, interfaces, and data conversion at a high level. The details will be expanded later in the general design and detailed design documents. | Design | Design Application Architecture |
| General Design | Template | The General Design deliverable describes an independently compiled entity, composed of three basic components: formal parameters, local variables, and a complete body of logic. Also known as Programs, Components, or work Units, Modules are packets of grouping all the information necessary to code a portion of an application. It also provides a graphical display of the logical components of a module. Items displayed include Inputs, Outputs, Functional Description, and Interfaces. | Design | Design Application Architecture |
| Interface Agreement | Template | The Interface Agreement describes the business units or systems associated with an interface and outlines the expectations of the parties developing the various units. This deliverable addresses the handling of change requests, data exchange and control, backup and recovery requirements, error handling procedures, and provides escalation procedures in the event of a conflict. | Design | Design Application Architecture |
| Interface Design | Template | The Interface Design Approach is used to outline the process of transferring data in and out of a system. It should include the following features:<br>Interface Execution - The ability to launch interface processes and record information about the processing of those interfaces.<br>File Transfer - A method to transfer the file securely from sending system to receiving system.<br>Error Processing - The process of capturing information about errant data or a process failure in the transfer of data.<br>Restart/Recovery - The ability to restart an interface that encountered errors during processing.<br>Archiving - The storage of interface files for backup and recovery purposes. | Design | Design Application Architecture |

TABLE 1-continued

| Document Name (Navigator Item) | Type | Description | Stage | Step |
|---|---|---|---|---|
| Assembly Test Plan | Template | The Assembly Test Plan documents the specific steps in the testing process. It includes descriptions of the test processes or passes, the cycle definitions, the phase containment criteria, the use of the testing database and configuration management for version control. | Design<br><br>Build & Test | Design Application Architecture<br><br>Build and Test Application |
| Assembly Test Conditions | Template | The Assembly Test Conditions describe the conditions by which the component will be tested. The conditions map directly to the application and interface requirements. | Design<br><br>Build & Test | Design Application Architecture<br><br>Build and Test Application |
| Assembly Test Scripts | Template | The Assembly Test Scripts define the steps to be followed by the testing executor to test the conditions that have been identified. The scripts are instructions that are clear, unambiguous and repeatable in manner. | Design<br><br>Build & Test | Design Application Architecture<br><br>Build and Test Application |
| Assembly Test Results | Template | The Assembly Test Results describe the actual results of the test and any issues or lessons learned from the test effort. | Design<br><br>Build & Test | Design Application Architecture<br><br>Build and Test Application |
| Assembly Test Data | Template | The Assembly Test Data is the data used as input to test the conditions. The data is used in conjunction with the test scripts to validate that the conditions are being met accurately and as required. | Design<br><br>Build & Test | Design Application Architecture<br><br>Build and Test Application |
| Logical Data Model | Tool | The first iteration of database design for a system. This model includes the entities, keys and relationships as well as a first cut at attributes. This deliverable is typically developed using data modeling tools such as ERWin or Oracle Designer. | Design | Design Database |
| Data Dictionary | Template | This document supports the logical data model and describes the entities and attributes for the logical data model. | Design | Design Database |
| Database Configuration | None | Defines the details of the actual database installation configuration including sizes and locations for databases. | Design | Design Database |
| Database Definition | Template | This document identifies a database, which makes up part of the Physical Database Design. It captures the key aspects of the database, such as the various components: tables, indexes, views, and tablespaces. Optionally, it may include description of the disk configuration, sizings, placement, and segment management strategies. Create this document as an entry point for referencing all the components that belong to this database. | Design | Design Database |
| Database Space Worksheet | Template | This document describes in detail the assumptions and formulas used to calculate the space requirements for a database. The appropriate formulas for calculating the space requirements are based on the type of database defined. In order to use document database space requirements effectively, a database expert should be consulted to obtain the appropriate formulas. | Design | Design Database |
| Database to File Mapping | Template | The Database to File System Mapping document defines the sizing estimates for application data as well as for the database components that facilitate rollback and recovery activities. This document is a component of a Physical Database Design. Use this document when designing the physical space considerations for the database. This document should also be used when planning and executing the technical infrastructure product test and the application product test to monitor and optimize system performance. | Design | Design Database |

TABLE 1-continued

| Document Name (Navigator Item) | Type | Description | Stage | Step |
|---|---|---|---|---|
| Relational Index Definition | Template | This document defines the physical index that provides an access path onto a relational table. It defines the columns that constitute the access path. For all applications using relational databases, use the Relational Index Definition deliverable to describe the characteristics of an index of the table. This document is typically created by a Technical Analyst or Database Administrator (DBA) or Data Administrator (DA). | Design | Design Database |
| Tablespace Definition | Template | This document describes the rational for the physical database design by defining the Tablespace of this database and should give context to the database so technical staff can understand the database design. Use this template to document Tables. Additional information to document: Physical Storage Strategy, Data Partitioning Strategy, Freespace Strategy, and Locking Strategy. | Design | Design Database |
| Conversion Approach | Template | The Conversion Process outlines the approach to executing both the data conversion and the system rollout. A summary of the functionality to be delivered, the strategies and timelines for delivering that functionality, and the impacts to the organization will outline the rollout segment. Data conversion will be covered by identifying what data needs to be converted, along with outlining the procedures that will be followed in converting that data and the controls that will be in place to ensure the quality and continuity of the data conversion. Finally, any risks and/or assumptions that may impact the conversion approach will be identified along with mitigation strategies and contingency plans for each. | Design | Design Database |
| Conversion Mapping | Template | This deliverable will identify which source system fields(s) will be used to populate target system field(s). Any logic used to translate or reformat source system information into target system information will also be included. | Design | Design Database |
| Overall Testing Approach (shaded for update) | Template | See first occurrence of Navigator Item on Design Technology Infrastructure design matrix. | See first occurrence of Navigator Item on Design Technology Infrastructure design matrix. | See first occurrence of Navigator Item on Design Technology Infrastructure design matrix. |
| Execution/ Operations Architecture Detailed Design | Template | The Execution/Operations Architecture Detailed Design is used to document the detailed design specifications for the execution architecture components. | Build and Test | Build and Test Execution/ Operations Architecture |
| Execution/ Operations Architecture Guide | Template | The Execution/Operations Architecture Guide is a spreadsheet that tracks the inventory of Execution Architecture components. | Build and Test | Build and Test Execution/ Operations Architecture |
| API Documentation | Template | Typically API documentation comes from the vendor. If API's are developed internally proper coding standards should be followed. | Build and Test | Build and Test Execution/ Operations Architecture |
| Execution/Operations Architecture Test Plan (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |

TABLE 1-continued

| Document Name (Navigator Item) | Type | Description | Stage | Step |
|---|---|---|---|---|
| Execution/Operations Architecture Test Conditions (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Execution/Operations Architecture Test Scripts (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Execution/Operations Architecture Test Results (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Execution/Operations Architecture Test Data (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Development Architecture Detailed Design | Template | The Development Architecture Detail Design is used to document the detailed design specifications for the development architecture components. | Build and Test | Build and Test Development Architecture |
| Development Architecture Guide | Template | The Development Architecture Guide is a spreadsheet, which tracks the inventory of Development Architecture components. | Build and Test | Build and Test Development Architecture |
| Development Architecture Test Plan (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Development Architecture Test Conditions (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Development Architecture Test Scripts (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Development Architecture Test Results (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |

TABLE 1-continued

| Document Name (Navigator Item) | Type | Description | Stage | Step |
|---|---|---|---|---|
| Development Architecture Test Data (shaded for update) | Template | See first occurrence of Navigator Item in Design Technology Infrastructure design matrix. | See first occurrence of Navigator Item in Design Technology Infrastructure design matrix. | See first occurrence of Navigator Item in Design Technology Infrastructure design matrix. |
| Deployment Approach | Template | This document describes how the major activities of deployment will be performed. Such activities include: data conversion, policy and procedures deployment, workforce transition, risk management and activation of the business capabilities. | Build & Test | Deployment Planning |
| Operations Manual | Template | This documents the guiding principles of the operational environment. Typically this document would describe responsibilities, batch and online processing, system availability and security. | Build & Test | Deployment Planning |
| Disaster Recovery Plan | Template | This deliverable serves as a reference document in the event of a disaster. It is intended to reduce confusion and provide assistance in recovering the business functions as quickly as possible. | Build & Test | Deployment Planning |
| Deployment Test Plan | Template | The Deployment Test Plan documents the specific steps in the deployment test process. It includes descriptions of the test processes or passes, the cycle definitions and entry and exit criteria. | Deployment<br><br>Build & Test | Activate and Verify Deployment<br>Deployment Planning |
| Deployment Test Conditions | Template | The Deployment Test Conditions describe the conditions by which the component will be tested. The conditions map directly to the requirements. | Deployment<br><br>Build & Test | Activate and Verify Deployment<br>Deployment Planning |
| Deployment Test Scripts | Template | The Deployment Test Scripts define the steps to be followed by the testing executor to test the conditions that have been identified. The scripts are instructions that are clear, unambiguous and repeatable in manner. | Deployment<br><br>Build & Test | Activate and Verify Deployment<br>Deployment Planning |
| Deployment Test Results | Template | The Deployment Test Results describe the actual results of the test and any issues or lessons learned from the test effort. | Deployment<br><br>Build & Test | Activate and Verify Deployment<br>Deployment Planning |
| Deployment Test Data | Template | The Deployment Test Data is the data used as input to test the conditions. The data is used in conjunction with the test scripts to validate that the conditions are being met accurately and as required. | Deployment<br><br>Build & Test | Activate and Verify Deployment<br>Deployment Planning |
| Online Detailed Design | Template | The Online Detail Design provides an overview of the components necessary for online development. It contains information that a programmer would need to successfully do his/her job. This will include standard naming conventions; the names of libraries or directories where files or test data may be found; a team contact list or a technical support contact list. Diagram flows, process flows and any general design changes will be included. A document describing expected results and space to provide actual results will be included, along with a time line indicating when the work is to be completed will be included. | Build & Test | Perform Application Detailed Design |
| Report Detailed Design | Template | The Report Detail Design provides an overview of the components necessary for creating reports. There exist notes for the programmer, including general design changes. There are process flows that describe how the reports are created, such as, where the information comes from that populates the reports, the format of the report and the program(s) used to create the reports. Information describing how often the reports are produced (daily, weekly, monthly, etc.) may be included also. | Build & Test | Perform Application Detailed Design |

TABLE 1-continued

| Document Name (Navigator Item) | Type | Description | Stage | Step |
|---|---|---|---|---|
| Interface Agreement (shaded for update) | Template | See first occurrence of navigator item on the item on the Design Application stage. | See first occurrence of navigator item on the Design Application stage. | See first occurrence of navigator item on the Design Application stage. |
| Interface Detailed Design | Template | The Interface Detail Design provides an overview of the Interface components and their functionality. There exists a process flow that visually shows each component and how the components fit together. There is a written description of each component, its functionality, how it receives information, processes it, and passes it on. Also included are programmer's notes; the names of stored procedures that may be used; and any issues that need to be known. | Build & Test | Perform Application Detailed Design |
| Component Test Plan | Template | The Component Test Plan documents the specific steps in the testing process. It includes descriptions of the test processes or passes, the cycle definitions, the phase containment criteria, the use of the testing database and configuration management for version control. | Build & Test<br><br>Build & Test | Build & Test Application<br><br>Perform Application Detailed Design |
| Component Test Conditions | Template | The Component Test Conditions describe the conditions by which the component will be tested. The conditions map directly to the requirements. | Build & Test<br><br>Build & Test | Build & Test Application<br><br>Perform Application Detailed Design |
| Component Test Scripts | Template | The Component Test Scripts define the steps to be followed by the testing executor to test the conditions that have been identified. The scripts are instructions that are clear, unambiguous and repeatable in manner. | Build & Test<br><br>Build & Test | Build & Test Application<br><br>Perform Application Detailed Design |
| Component Test Results | Template | The Component Test Results describe the actual results of the test and any issues or lessons learned from the test effort. | Build & Test<br><br>Build & Test | Build & Test Application<br><br>Perform Application Detailed Design |
| Component Test Data | Template | The Component Test Data is the data used as input to test the conditions. The data is used in conjunction with the test scripts to validate that the conditions are being met accurately and as required. | Build & Test<br><br>Build & Test | Build & Test Application<br><br>Perform Application Detailed Design |
| Stored Procedures | Template | Documents the SQL that is utilized to access one or more databases from multiple locations | Build & Test | Build and Test Application |
| Shells | Template | Shells are the coding templates used for stored procedures or functions so that all code is in a standardized format. | Build & Test | Build and Test Application |
| Source Code | Template | Source Code is developed for the project based on the projects standards and coding shells. It is a piece of software that meets all design and requirements and is completely tested and documented. | Build & Test | Build and Test Application |
| Component Test Plan (shaded for update) | Template | See first occurrence of Navigator Item. | See first occurrence of Navigator Item. | See first occurrence of Navigator Item. |
| Component Test Conditions (shaded for update) | Template | See first occurrence of Navigator Item. | See first occurrence of Navigator Item. | See first occurrence of Navigator Item. |
| Component Test Scripts (shaded for update) | Template | See first occurrence of Navigator Item. | See first occurrence of Navigator Item. | See first occurrence of Navigator Item. |
| Component Test Results (shaded for update) | Template | See first occurrence of Navigator Item. | See first occurrence of Navigator Item. | See first occurrence of Navigator Item. |
| Component Test Data (shaded for update) | Template | See first occurrence of Navigator Item. | See first occurrence of Navigator Item. | See first occurrence of Navigator Item. |

TABLE 1-continued

| Document Name (Navigator Item) | Type | Description | Stage | Step |
|---|---|---|---|---|
| Assembly Test Plan (shaded for update) | Template | See first occurrence of Navigator Item in Design Application design matrix. | See first occurrence of Navigator Item in Design Application design matrix. | See first occurrence of Navigator Item in Design Application design matrix. |
| Assembly Test Conditions (shaded for update) | Template | See first occurrence of Navigator Item in Design Application design matrix. | See first occurrence of Navigator Item in Design Application design matrix. | See first occurrence of Navigator Item in Design Application design matrix. |
| Assembly Test Scripts (shaded for update) | Template | See first occurrence of Navigator Item in Design Application design matrix. | See first occurrence of Navigator Item in Design Application design matrix. | See first occurrence of Navigator Item in Design Application design matrix. |
| Assembly Test Results (shaded for update) | Template | See first occurrence of Navigator Item in Design Application design matrix. | See first occurrence of Navigator Item in Design Application design matrix. | See first occurrence of Navigator Item in Design Application design matrix. |
| Assembly Test Data (shaded for update) | Template | See first occurrence of Navigator Item in Design Application design matrix. | See first occurrence of Navigator Item in Design Application design matrix. | See first occurrence of Navigator Item in Design Application design matrix. |
| SIRs/CRs | Tool/ Template | See first occurrence of Navigator Item in Project Management design matrix. | See first occurrence of Navigator Item in Project Management design matrix. | See first occurrence of Navigator Item in Project Management design matrix. |
| Business Policies & Procedures | Template | This document consists of rules governing work within the organizations (policies) and the workflow for executing these rules (procedures). Business policies and procedures often drive creation of user procedures, or step-by-step instructions for users to integrate business rules and application steps, documented in job aids and/or online quick reference (OLQR) tools. | Built & Test | Develop Policies and Procedures |
| Product Test Plan | Template | The Product Test Plan documents the specific steps in the testing process. It includes descriptions of the test processes or passes, the cycle definitions, the phase containment criteria, the use of the testing database and configuration management for version control. | Build & Test | Prepare & Execute Application Product Test |
| Product Test Conditions | Template | The Product Test Conditions describe the conditions by which the component will be tested. The conditions map directly to the application and interface requirements. | Build & Test | Prepare & Execute Application Product Test |
| Product Test Scripts | Template | The Product Test Scripts define the steps to be followed by the testing executor to test the conditions that have been identified. The scripts are instructions that are clear, unambiguous and repeatable in manner. | Build & Test | Prepare & Execute Application Product Test |
| Product Test Results | Template | The Product Test Results describe the actual results of the test and any issues or lessons learned from the test effort. | Build & Test | Prepare & Execute Application Product Test |
| Product Test Data | Template | The Product Test Data is the data used as input to test the conditions. The data is used in conjunction with the test scripts to validate that the conditions are being met accurately and as required. | Build & Test | Prepare & Execute Application Product Test |

TABLE 1-continued

| Document Name (Navigator Item) | Type | Description | Stage | Step |
|---|---|---|---|---|
| SIRs/CRs | Template | See first occurrence of navigator item in Project Management stage design matrix. | See first occurrence of navigator item in Project Management stage design matrix. | See first occurrence of navigator item in Project Management stage design matrix. |
| User Acceptance Test Plan | Template | The User Acceptance Test Plan documents the specific steps in the testing process. It includes descriptions of the test processes or passes, the cycle definitions, the phase containment criteria, the use of the testing database and configuration management for version control. | Build & Test | Prepare & Execute User Acceptance Test |
| User Acceptance Test Conditions | Template | The User Acceptance Test Conditions describe the conditions by which the component will be tested. The conditions map directly to the user requirements. | Build & Test | Prepare & Execute User Acceptance Test |
| User Acceptance Test Scripts | Template | The User Acceptance Test Scripts define the steps to be followed by the testing executor to test the conditions that have been identified. The scripts are instructions that are clear, unambiguous and repeatable in manner. | Build & Test | Prepare & Execute User Acceptance Test |
| User Acceptance Test Results | Template | The User Acceptance Test Results describe the actual results of the test and any issues or lessons learned from the test effort. | Build & Test | Prepare & Execute User Acceptance Test |
| User Acceptance Test Data | Template | The User Acceptance Test Data is the data used as input to test the conditions. The data is used in conjunction with the test scripts to validate that the conditions are being met accurately and as required. | Build & Test | Prepare & Execute User Acceptance Test |
| SIRs/CRs | Template | See first occurrence of navigator item in Project Management stage design matrix. | See first occurrence of navigator item in Project Management stage design matrix. | See first occurrence of navigator item in Project Management stage design matrix. |
| Deployment Test Plan (shaded for update) | Template | See first occurrence of navigator item on the Build & Test App design matrix. | See first occurrence of navigator item on the Build & Test App design matrix. | See first occurrence of navigator item on the Build & Test App design matrix. |
| Deployment Test Conditions (shaded for update) | Template | See first occurrence of navigator item on the Build & Test App design matrix. | See first occurrence of navigator item on the Build & Test App design matrix. | See first occurrence of navigator item on the Build & Test App design matrix. |
| Deployment Test Scripts (shaded for update) | Template | See first occurrence of navigator item on the Build & Test App design matrix. | See first occurrence of navigator item on the Build & Test App design matrix. | See first occurrence of navigator item on the Build & Test App design matrix. |
| Deployment Test Results (shaded for update) | Template | See first occurrence of navigator item on the Build & Test App design matrix. | See first occurrence of navigator item on the Build & Test App design matrix. | See first occurrence of navigator item on the Build & Test App design matrix. |
| Deployment Test Data (shaded for update) | Template | See first occurrence of navigator item on the Build & Test App design matrix. | See first occurrence of navigator item on the Build & Test App design matrix. | See first occurrence of navigator item on the Build & Test App design matrix. |

TABLE 1-continued

| Document Name (Navigator Item) | Type | Description | Stage | Step |
|---|---|---|---|---|
| SIRs/CRs | Template | See first occurrence of navigator item in Project Management stage design matrix. | See first occurrence of navigator item in Project Management stage design matrix. | See first occurrence of navigator item in Project Management stage design matrix. |
| Sign-off Sheet | Template | The Sign-off document contains the signatures of the project manager and project sponsor (client), indicating whether or not the given deliverable has been accepted. | Commit | Sign-off |
| Subcontractor Selection Criteria | Template | The Subcontractor Selection Criteria documents the criteria used to evaluate subcontractors. This deliverable should be used to summarize and compare the subcontractors' ability to satisfy the selection criteria. The use of this document will ensure the subselection process is an orderly, well-defined process, that leads to a "best-fit" and best value" subcontractor solution to meet the project's needs. | Supplier Agreement Management Supplier Agreement Management | Plan Subcontractor Management Organize Subcontractor Management Resources |
| Subcontractor Management Plan | Template | The Subcontractor Management Plan captures all activities relating to the project's management of subcontractors. The plan serves as a guideline to assist project management in defining, measuring, and monitoring commitment to quality by all subcontractors assigned to the project. This plan is not intended for subcontractors who will work directly on the project team. Subcontractors that function as part of the project team should be addressed in the project plan. | Supplier Agreement Management Supplier Agreement Management | Plan Subcontractor Management Organize Subcontractor Management Resources |
| Statement of Work | Reference Document | The project should use this space to store the agreed upon statement of work. | Supplier Agreement Management | Plan Subcontractor Management |
| Work Plan (shaded for update) | Template | See first occurrence of navigator item on Project Management stage design matrix. | See first occurrence of navigator item on Project Management stage design matrix. | See first occurrence of navigator item on Project Management stage design matrix. |
| Subcontractor Selection Criteria (shaded for update) | Template | See first occurrence of navigator item. | See first occurrence of navigator item. | See first occurrence of navigator item. |
| Subcontractor Management Plan (shaded for update) | Template | See first occurrence of navigator item. | See first occurrence of navigator item. | See first occurrence of navigator item. |
| Subcontractor Status Report | Template | The Subcontractor Status Report is to be completed by the subcontracting organization. It presents the status of a subcontractor's activities to project management at a high level. It summarizes status of the task order and provides more detailed information for incidents, scope impacts and deliverable schedules only when project management attention is needed. The Subcontractor Status Report template should be customized by the project based on the contract with the subcontractor to capture the desired information. The status report cannot require the subcontractor to provide status reporting beyond what is detailed in the task order. | Supplier Agreement Management | Control Subcontractor Management |
| Closing Memo (shaded for update) | Template | See first occurrence of navigator item on Project Management stage design matrix. | See first occurrence of navigator item on Project Management stage design matrix. | See first occurrence of navigator item on Project Management stage design matrix. |

TABLE 1-continued

| Document Name (Navigator Item) | Type | Description | Stage | Step |
|---|---|---|---|---|
| Product Selection Approach | Template | The Product Selection Approach provides an approach that the project will follow to select the best fit product (i.e. software, hardware) for the project. The approach will cover the following key tasks: (1) identify and list viable products from the marketplace, (2) narrow the list to a handful of finalists based on screening criteria, and (3) select the best solution for the client through comprehensive questionnaires and business scenarios. | Supplier Agreement Management | Plan Product Acquisition |
| Product Selection Criteria | Template | The Product Selection Criteria deliverable is used throughout the Product Selection process. Initially, the Product Selection Criteria should be used to list the key requirements that any candidate product must meet to become a final candidate, such as the desired high-level functional, technical, vendor, and quality criteria for products. These criteria will be input to the RFI, RFP and vendors will be screened against these criteria and against each other. Once the long list of vendors and products have been screened and reduced to a short list, the criteria will be refined to define the selection criteria upon which the final product will be selected. | Supplier Agreement Management  Supplier Agreement Management | Plan Product Acquisition  Organize Product Acquisition Tasks |
| Product Selection Criteria (shaded for update) | Template | See first occurrence of navigator item. | See first occurrence of navigator item. | See first occurrence of navigator item. |
| Vendor Response to Business Scenarios | Template | The Vendor Response to Business Scenarios document identifies the overall internal and external operations and business scenarios of the project. This document should be used to describe the key scenarios in which the product will have to perform. The document will be used to perform assessment of the product "finalist" against the scenarios. | Project Management | Organize Product Acquisition Tasks |
| Product Acceptance Test Plan | Template | The Product Acceptance Test Plan documents the specific used by the project to test the product prior to final acceptance from the vendor. | Supplier Agreement Management | Control Product Acquisition |
| Product Acceptance Test Conditions | Template | The Product Acceptance Test Conditions describe the conditions by which the product will be tested. The conditions map directly to the product selection criteria. | Supplier Agreement Management | Control Product Acquisition |
| Product Acceptance Test Scripts | Template | The Product Acceptance Test Scripts define the steps to be followed by the testing executor to test the conditions that have been identified. The scripts are instructions that are clear, unambiguous and repeatable in manner. | Supplier Agreement Management | Control Product Acquisition |
| Product Acceptance Test Results | Template | The Product Acceptance Test Results describe the actual results of the test and any issues or lessons learned from the test effort. | Supplier Agreement Management | Control Product Acquisition |
| Product Acceptance Test Data | Template | The Product Acceptance Test Data is the data used as input to test the conditions. The data is used in conjunction with the test scripts to validate that the conditions are being met accurately and as required. | Supplier Agreement Management | Control Product Acquisition |
| Product Performance Test Plan | Template | The Product Performance Test Plan documents the specific steps used by the project to ensure the performance of the product meets the specified requirements. | Supplier Agreement Management | Control Product Acquisition |
| Product Performance Test Conditions | Template | The Product Performance Test Conditions describe the conditions by which the component will be tested. The conditions map directly to the product selection criteria. | Supplier Agreement Management | Control Product Acquisition |
| Product Performance Test Scripts | Template | The Product Performance Test Scripts define the steps to be followed by the testing executor to test the conditions that have been identified. The scripts are instructions that are clear, unambiguous and repeatable in manner. | Supplier Agreement Management | Control Product Acquisition |

TABLE 1-continued

| Document Name (Navigator Item) | Type | Description | Stage | Step |
|---|---|---|---|---|
| Product Performance Test Results | Template | The Product Performance Test Results describe the actual results of the test and any issues or lessons learned from the test effort. | Supplier Agreement Management | Control Product Acquisition |
| Product Performance Test Data | Template | The Product Performance Test Data is the data used as input to test the conditions. The data is used in conjunction with the test scripts to validate that the conditions are being met accurately and as required. | Supplier Agreement Management | Control Product Acquisition |
| Closing Memo (shaded for update) | Template | See first occurrence of navigator item on Project Management stage design matrix. | See first occurrence of navigator item on Project Management stage design matrix. | See first occurrence of navigator item on Project Management stage design matrix. |
| SIRs/CRs | Tool | See first occurrence of Navigator Item in Project Management design matrix. | See first occurrence of Navigator Item in Project Management design matrix. | See first occurrence of Navigator Item in Project Management design matrix. |
| Tracking Tool Installation Guide | Reference Document | The Tracking Tool Installation Guide outlines the steps to take when installing any of the various tracking tools including the Issues, Risk, and SIRs/CRs tools. | Process | Organize SEPG Project Resources |
| SEPG Project Processes & Policies | Template | The SEPG Project Processes & Policies document is used to record standards and procedures that are specific to a project. Such documents would include the Issue Tracking Process, Risk Tracking Process, New Process Definition Process, all development and testing procedures, etc. See attached samples as a starting point for developing project-specific processes. | Process | Organize SEPG Project Resources |
| CMM Awareness Training | Training | The CMM Awareness Training is a presentation designed to help training attendees understand the CMM framework and its benefits, understand CMM Level 2 concepts and examples, and understand CMM Level 3 concepts and examples. This Training pertains to the Capability Maturity Model (CMM) for Software only, not to CMM-Integrated (CMMI) framework. This training does not cover aspects of CMMI that are not common with the CMM for Software. CMM in a Box is based on the CMMI framework. | Process | Organize SEPG Project Resources |
| CMM to CMMI Transition Training | Training | The CMM to CMMI Transition Training is a presentation that focuses on the transition from the Capability Maturity Model (CMM) for Software to CMM - Integrated (CMMI). The training provides generic examples of the difference between the models and what new processes have been added to CMMI. CMM in a Box is based on the CMMI framework. It is designed to help the training attendees understand the transition from Capability Maturity Model (CMM) to Capability Maturity Model - Integrated (CMMI) and how the new CMMI requirements are being implemented within the organization. | Process | Organize SEPG Project Resources |
| CMMI for Sponsors Training | Training | The CMMI Awareness for Sponsors Training is a presentation designed to help sponsors understand the CMMI framework and its benefits, understand CMMI Level 2 concepts and examples, and understand CMMI Level 3 concepts and examples. | Process | Organize SEPG Project Resources |

TABLE 1-continued

| Document Name (Navigator Item) | Type | Description | Stage | Step |
|---|---|---|---|---|
| Tracking Tool Design Document | Reference Document | This purpose of the Tracking Tool Design document is to provide design information for projects who wish to customize the tracking tools. The primary audience would be the Access developers doing the modifications. This document provides design information for the forms, events, macros, queries and reports for the Issue Tracking Tool and System Investigation Request (SIR) & Change Request (CR) Tracking Tool. | Process | Organize SEPG Project Resources |
| Service Level Agreement Reference | Reference Document | This document is included on the page for reference purposes only. The projects are responsible for completing these documents. Do not download or save from this page, go to the Project Management Stage if you need a copy of this document. The purpose of this Service Level Agreement is to define the service level and communication requirements between a project and the Software Engineering Process Group (SEPG). This document is presented to the project manager who must agree to and sign before a substantive SEPG support commences. The SEPG will distribute a copy of the Service Level Agreement to the Engagement Partner, while it is the responsibility of the Project Manager to distribute/educate project team members on the contents. The Service Level Agreement provides an overview of estimated time commitments to support execution of SEPG efforts. | Process | Rollout & Support Projects |
| Tailoring & Waiver Request Reference | Reference Document | This document is included on the page for reference purposes only. The projects are responsible for completing these documents. Do not download or save from this page, go to the Project Management Stage if you need a copy of this document.<br>The Tailoring & Waiver Request template provides guidance on how a project can tailor the methodology to better suit their needs. It includes guidelines on policy, process, deliverable, and tool tailoring. After reviewing the guidelines, if your project determines that a waiver request form is required, please complete the waiver request form using the "Compose Deliverable" option above. | Process | Rollout & Support Projects |
| Metrics Workbook Reference | Reference Document | This document is included on the page for reference purposes only. The projects are responsible for completing these documents. Do not download or save from this page, go to the Project Management Stage if you need a copy of this document.<br>The Project Metrics Workbook template is used as a central repository for the metrics required by the Project Team. The project must complete the Metrics Workbook on a monthly basis and submit it to the SEPG team lead. The Metrics Plan outlines the overall metrics program and provides detailed explanations for each metric included in the Metrics Workbook. | Process | Rollout & Support Projects |
| Metrics Plan Reference | Reference Document | This document is included on the page for reference purposes only. The projects are responsible for completing these documents. Do not download or save from this page, go to the Project Management Stage if you need a copy of this document.<br>The Metrics Plan describes the overall approach for identifying, collecting, and analyzing delivery metrics. Projects must use this document to plan for their metrics. | Process | Rollout & Support Projects |

TABLE 1-continued

| Document Name (Navigator Item) | Type | Description | Stage | Step |
|---|---|---|---|---|
| Closing Memo Reference | Reference Document | This document is included on the page for reference purposes only. The projects are responsible for completing these documents. Do not download or save from this page, go to the Project Management Stage if you need a copy of this document. This memo is used to communicate and summarize the project. This memo should include project results, pertinent project metrics including schedule and budget plan versus actual, project successes, and project shortcomings. | Process | Rollout & Support Projects |
| SQA Debrief Reference | Reference Document | This document is included on the page for reference purposes only. The projects are responsible for completing these documents. Do not download or save from this page, go to the Project Management Stage if you need a copy of this document. The Software Quality Assurance (SQA) Debrief is conducted at the end of the project. During this meeting, the Software Engineering Process Group (SEPG) project manager gathers metrics on the effectiveness of the SQA process for the project and discusses "lessons learned" with project management executives. The results of the SQA Debrief are used to continuously improve the SQA process, methodology and tools. | Process | Rollout & Support Projects |
| Participant Information | Sample | The purpose of the Participant Information Sheet is to set expectations of the assessment participants as they prepare for the assessment process. | Process | Conduct Assessment |
| Sample Organization Structures | Sample | This sample document outlines the different Organizational Structure Types and provides samples of each. These include Functional, Process, Product, Matrix, and Customer/Industry-focused. | Personnel | Verify and Validate Organization Structure |
| | | | Personnel | Design Organization Infrastructure |
| Balanced Scorecard | Template | The Balanced Scorecard should be used to integrate financial and operational measures within the organization as a means to focus management on strategy and vision. The Balanced Scorecard documents a set of measures that give top managers a fast but comprehensive view of the business. The Balanced Scorecard has five key elements: Perspectives, Objectives, Metrics, Targets, and Actuals. | Personnel | Design Performance Management Infrastructure |
| Project Management Review Tool | Reference Document | The purpose of the Project Management Review Tool is to provide information on how to demonstrate each best practice by KPA (Key Process Area). It includes references to templates, job aids and samples deliverables. | Project Management | Plan Project Execution |
| Orientation Binder | Template | See first occurrence of Navigator Item in the Organizational Management Plan & Organize SEPG design Matrix | See first occurrence of Navigator Item in the organizational Management Plan & Organize SEPG design Matrix | See first occurrence of Navigator Item in the Organizational Management Plan & Organize SEPG design Matrix |
| SQA Debrief | Template | The Software Quality Assurance (SQA) Debrief is conducted at the end of the project. During this meeting, the Software Engineering Process Group (SEPG) project manager gathers metrics on the effectiveness of the SQA process for the project and discusses "lessons learned" with project management executives. The results of the SQA Debrief are used to continuously improve the SQA process, methodology and tools. | Project Management | Complete Project |

TABLE 1-continued

| Document Name (Navigator Item) | Type | Description | Stage | Step |
|---|---|---|---|---|
| Peer Review | Template | Moved to Peer Review design matrix. | Moved to Peer Review design matrix. | Moved to Peer Review design matrix. |
| Plan Delivery | Task Package | Moved to Commit design matrix. | Moved to Commit design matrix. | Moved to Commit design matrix. |
| Commit | Template | Moved to Commit design matrix. | Moved to Commit design matrix. | Moved to Commit design matrix. |
| Database Configuration | None | The Database Configuration defines the details of the actual database installation configuration including sizes and locations for databases. This information can be obtained from the database design tool. | Design | Design Database |
| Conversion Process | Template | The Conversion Process document outlines the approach to executing both the data conversion and the system rollout. A summary of the functionality to be delivered, the strategies and timelines for delivering that functionality, and the impacts to the organization will outline the rollout segment. Data conversion will be covered by identifying what data needs to be converted, along with outlining the procedures that will be followed in converting that data and the controls that will be in place to ensure the quality and continuity of the data conversion. Finally, any risks and/or assumptions that may impact the conversion approach will be identified along with mitigation strategies and contingency plans for each. | Design | Design Database |

What is claimed is:

1. A method for increasing a level of maturity of an organization developing a software product, as the level of maturity is measured by at least one capability maturing model, the method comprising:

managing, on a computer, an infrastructure of the organization managing, on the computer, a software development project for developing the software product;

managing, on the computer, a business solution delivery comprising delivery of a business solution comprising a business process, organizational changes, and the software product, the managing the business solution delivery comprising:

determining a technology infrastructure to support the business solution, the determining comprising:

identifying performance requirements for the technology infrastructure to support the business solution;

identifying key performance indicators, wherein the key performance indicators include at least one of resource availability, capacity, throughput, reliability, scalability, or usability;

creating baseline estimates of transaction volumes and system size;

setting measurable targets for the performance indicators; and assessing the ability of the existing technology infrastructure to support the identified technology infrastructure requirements; and developing the technology infrastructure in coordination with developing the business process, the software product, and the organizational changes, the developing the technology infrastructure comprising:

identifying architecture components that are selected or designed to achieve the measurable targets for the performance requirements wherein the architecture components include at least one of reused architecture components from legacy protects, packaged architecture components, or custom architecture components;

creating documentation and test plans for the selected or the designed components including creating metrics of the measurable targets wherein the measurable targets include at least one of time, issues, risks, or action items; and transforming the metrics in a logical relational database, the logical relational database having at least one table that includes at least one of keys, codes tables, integrity rules, or statistical data; and deploying the developed software product in coordination with deploying the developed technology infrastructure, the developed business process, and the developed organizational changes; and providing to a user access to a process improvement framework having a data management system for administering and storing one or more files associated with at least one step in the managing the infrastructure of the organization, the managing the software development project, and the managing the business solution delivery.

2. The method of claim 1, wherein managing the software development project comprises:

developing a project plan to determine tasks required for the organization to create the software product based on project requirements of the software development project;

selecting team members for the SEPG based on the project requirements;

determining physical resource needs of the software development project based on the tasks; and controlling work of the software development project by comparing an execution of the software development project against the project plan to identify problems with the execution of the software development project, and determining and taking corrective actions to resolve the problems.

3. The method of claim 1, wherein managing the infrastructure of the organization comprises:
creating a Software Engineering Process Group (SEPG) to oversee developing the software product for the software development project;
determining a method for measuring a performance of the organization based on financial and non-financial indicators;
determining the performance of the organization based on the method for measuring the performance;
designing a new infrastructure of the organization by comparing the performance of the organization to a performance of an ideal organization, identifying the differences between the performance of the organization and the performance of the ideal organization, and identifying a course of action to eliminate the differences;
implementing the new infrastructure; and
training personnel on the new infrastructure.

4. The method of claim 1,
wherein the process improvement framework allows the user to select a step in one or more of the managing the infrastructure of the organization, the managing the software development project, and the managing the business solution delivery; and
wherein the process improvement framework allows the user to retrieve, view, or revise at least one file associated with the selected step.

5. The method of claim 1,
further comprising managing, on the computer, a business program for managing or developing business processes for the managing the organization, the managing the software development project, or the managing the business solution delivery; and
wherein the data management system is further configured to store one or more files associated with at least one step in the managing the business program.

6. The method of claim 1, wherein the data management system comprises:
a server having a database engine storing a location of the one or more files, and
a navigator application accepting an input from the user identifying one of the one or more files and connecting the user to that file.

7. The method of claim 1, wherein the process improvement framework further comprises a composition application for providing at least one template and at least one example document to the user for use in creating a document for storage in the data management system.

8. The method of claim 1, wherein the one or more files comprise instructions for performing the managing the infrastructure of the organization, the managing the software development project, and the managing the business solution delivery.

9. The method of claim 1,
wherein the data management system comprises a server and a plurality of storage devices to store the one or more files; and
wherein the server uses Web-based Distributed Authoring and Versioning (WebDAV) technology to allow the user to connect to the plurality of storage devices.

10. The method of claim 1, wherein deploying the developed software product in coordination with deploying the developed technology infrastructure, the developed business process, and the developed organizational changes comprises:
transitioning users and deploying policies and procedures;
deploying a physical environment to support the software product;
deploying the developed software product;
deploying the developed technology infrastructure; and
activating and testing the business solution.

11. A system for increasing a level of maturity of an organization developing a software product, as the level of maturity is measured by at least one capability maturing model, the system comprising:
at least one memory storing data and instructions; and
at least one processor configured to access the at least one memory and, when executing the instructions, to perform:
managing an infrastructure of the organization;
managing a software development project for developing the software product; and
managing delivery of a business solution comprising a business process, organizational changes, and the software product,
wherein the managing delivery of a business solution comprises:
determining a technology infrastructure to support the business solution, the determining comprising:
identifying performance requirements for the technology infrastructure to support the business solution;
identifying key performance indicators, wherein the key performance indicators include at least one of resource availability, capacity, throughput, reliability, scalability, or usability;
creating baseline estimates of transaction volumes and system size;
setting measurable targets for the performance indicators; and
assessing the ability of the existing technology infrastructure to support the identified technology infrastructure requirements; and
developing the technology infrastructure in coordination with developing the business process, the software product, and the organizational changes the developing the technology infrastructure comprising:
identifying architecture components that are selected or designed to achieve the measurable targets for the performance requirements wherein the architecture components include at least one of reused architecture components from legacy projects, packaged architecture components, or custom architecture components;
creating documentation and test plans for the selected or the designed components including creating metrics of the measurable targets wherein the measurable targets include at least one of time, issues, risks, or action items; and
transforming the metrics in a logical relational database, the logical relational database having at least one table that includes at least one of keys, codes tables, integrity rules, or statistical data; and deploying the developed software product in coordination with deploying the developed technology infrastructure, the developed business process, and the developed organizational changes; and a process improvement framework having a data management system for administering and storing one or more files associated with at least one step in the managing the infrastructure of the organization, the managing the software development project, and the managing the business solution delivery.

12. The system of claim 11,
wherein the process improvement framework is configured to allow the user to select a step in one or more of the managing the infrastructure of the organization, the managing the project, and the managing the delivery of the business solution; and
wherein the process improvement framework is configured to allow the user to retrieve, view, or revise at least one file associated with the selected step.

13. The system of claim 11,
wherein the at least one processor is further configured perform managing a business program for managing or developing business processes for the managing the organization, the managing the software development project; or the managing the business solution delivery; and
wherein the data management system is further configured to store one or more files associated with at least one step in the managing the business program.

14. The system of claim 11, wherein the data management system comprises
a server having a database engine configured to store a location of the one or more files; and
a navigator application configured to accept an input from the user identifying one of the one or more files and to connect the user to that file.

15. The system of claim 11, wherein the one or more files comprise instructions for performing the managing the infrastructure of the organization, the managing the software development project, and the managing the business solution delivery.

16. The system of claim 11,
wherein the data management system comprises a server and a plurality of storage devices configured to store the one or more files; and
wherein the server uses Web-based Distributed Authoring and Versioning (WebDAV) technology to allow the user to connect to the plurality of storage devices.

17. The system of claim 11, wherein the at least one processor is further configured perform deploying the developed software product in coordination with deploying the developed technology infrastructure, the developed business process, and the developed organizational changes by:
transitioning users and deploying policies and procedures;
deploying a physical environment to support the software product;
deploying the developed software product;
deploying the developed technology infrastructure; and
activating and testing the business solution.

18. A non-transitory computer readable medium embodied with a computer program for increasing a level of maturity of an organization developing a software product, as the level of maturity is measured by at least one capability maturing model, wherein the computer program configured when executed by a computer to perform a method comprising:

managing, on the computer, an infrastructure of the organization;
managing, on the computer, a software development project for developing the software product;
managing, on the computer; business solution delivery comprising delivery of a business solution comprising a business process, organizational changes, and the software product, the managing the delivery of the business solution comprising:
determining a technology infrastructure to support the business solution, the determining comprising:
identifying performance requirements for the technology infrastructure to support the business solution;
identifying key performance indicators, wherein the key performance indicators include at least one of resource availability, capacity, throughput, reliability, scalability, or usability;
creating baseline estimates of transaction volumes and system size;
setting measurable targets for the performance indicators; and
assessing the ability of the existing technology infrastructure to support the identified technology infrastructure requirements; and
developing the technology infrastructure in coordination with developing the business process, the software product, and the organizational changes, the developing the technology infrastructure comprising:
identifying architecture components that are selected or designed to achieve the measurable targets for the performance requirements wherein the architecture components include at least one of reused architecture components from legacy protects, packaged architecture components, or custom architecture components;
creating documentation and test plans for the selected or the designed components including creating metrics of the measurable targets wherein the measurable targets include at least one of time, issues, risks, or action items; and
transforming the metrics in a logical relational database, the logical relational database having at least one table that includes at least one of keys, codes tables, integrity rules, or statistical data; and
deploying the developed software product in coordination with deploying the developed technology infrastructure, the developed business process, and the developed organizational changes; and
providing to a user access to a process improvement framework having a data management system for administering and storing one or more files associated with at least one step in the managing the infrastructure of the organization, the managing the software development project, and the managing the business solution delivery.

19. The non-transitory computer readable medium of claim 18,
wherein the process improvement framework allows the user to select a step in one or more of the managing the infrastructure of the organization, the managing the project, and the managing the delivery of the business solution, and
wherein the process improvement framework allows the user to retrieve, view, or revise at least one file associated with the selected step.

20. The non-transitory computer readable medium of claim 18,
wherein the computer program is further configured to perform managing, on the computer, a business program for managing or developing business processes for the managing the organization, the managing the software development project; and the managing the business solution delivery; and
wherein the data management system is configured to store one or more files associated with at least one step in the managing the business program.

21. The non-transitory computer readable medium of claim 18, wherein the data management system comprises:
a server having a database engine for storing a location of the one or more files; and
a navigator application for accepting an input from the user identifying one of the one or more files and connecting the user to that file.

22. The non-transitory computer readable medium of claim 18, wherein the computer program is further configured to provide at least one template and at least one example document to the user for use in creating a document for storage in the data management system.

23. The non-transitory computer readable medium of claim 18, wherein the one or more files comprise instructions for performing the managing the infrastructure of the organization, the managing the software development project, and the managing the business solution delivery.

24. The non-transitory computer readable medium of claim 18,
wherein the data management system comprises a server and a plurality of storage devices to store the one or more files; and
wherein the server uses Web-based Distributed Authoring and Versioning (WebDAV) technology to allow the user to connect to the plurality of storage devices.

25. The non-transitory computer readable medium of claim 18, wherein the computer program is further configured to perform deploying the developed software product in coordination with deploying the developed technology infrastructure, the developed business process, and the developed organizational changes by:
transitioning users and deploying policies and procedures;
deploying a physical environment to support the product;
deploying the developed software product;
deploying the developed technology infrastructure; and
activating and testing the business solution.

* * * * *